US011146313B2

(12) United States Patent
Forenza et al.

(10) Patent No.: US 11,146,313 B2
(45) Date of Patent: *Oct. 12, 2021

(54) SYSTEMS AND METHODS FOR RADIO FREQUENCY CALIBRATION EXPLOITING CHANNEL RECIPROCITY IN DISTRIBUTED INPUT DISTRIBUTED OUTPUT WIRELESS COMMUNICATIONS

(71) Applicant: REARDEN, LLC, Mountain View, CA (US)

(72) Inventors: Antonio Forenza, Palo Alto, CA (US); Fadi Saibi, Sunnyvale, CA (US); Timothy A. Pitman, San Francisco, CA (US); Stephen G. Perlman, Palo Alto, CA (US)

(73) Assignee: REARDEN, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,169

(22) Filed: Dec. 18, 2019

(65) Prior Publication Data
US 2020/0127712 A1    Apr. 23, 2020

Related U.S. Application Data

(63) Continuation of application No. 13/844,355, filed on Mar. 15, 2013, now Pat. No. 10,547,358.

(51) Int. Cl.
*H04B 7/0452* (2017.01)
*H04B 17/12* (2015.01)
(Continued)

(52) U.S. Cl.
CPC ........... *H04B 7/0452* (2013.01); *H04B 7/024* (2013.01); *H04B 7/0456* (2013.01);
(Continued)

(58) Field of Classification Search
CPC .............................. H04B 7/0452; H04B 7/024
See application file for complete search history.

(56) References Cited

U.S. PATENT DOCUMENTS 2,127,656 A   8/1938  Terry
3,085,877 A   4/1963  Reid
(Continued)

FOREIGN PATENT DOCUMENTS

AU    2018200832 A1   2/2018
CA        1307842 C   9/1992
(Continued)

OTHER PUBLICATIONS

3GPP Technical Specification Group, "Spatial channel model, SCM-134 text V6.0", Spatial Channel Model AHG (Combined ad-hoc from 3GPP and 3GPP2), Apr. 2003, pp. 1-45.
(Continued)

*Primary Examiner* — Romani Ohri
(74) *Attorney, Agent, or Firm* — Nicholson De Vos Webster & Elliott LLP

(57) ABSTRACT

Systems and methods are described for radio frequency (RF) calibration in a multiple antenna system (MAS) with multi-user (MU) transmissions ("MU-MAS") exploiting uplink/downlink channel reciprocity. The RF calibration is used to compute open-loop downlink precoder based on uplink channel estimates, thereby avoiding feedback overhead for channel state information as in closed-loop schemes. For example, a MU-MAS of one embodiment comprises a wireless cellular network with one or multiple beacon stations, multiple client devices and multiple distributed antennas operating cooperatively via precoding methods to eliminate inter-client interference and increase network capacity.

22 Claims, 21 Drawing Sheets

(51) Int. Cl.
*H04B 7/0456* (2017.01)
*H04B 7/06* (2006.01)
*H04B 7/024* (2017.01)
*H04L 25/02* (2006.01)

(52) U.S. Cl.
CPC .......... *H04B 7/0626* (2013.01); *H04B 17/12* (2015.01); *H04L 25/0224* (2013.01)

(56) References Cited

U.S. PATENT DOCUMENTS

| | | |
|---|---|---|
| 3,335,716 A | 8/1967 | Alt et al. |
| 3,699,856 A | 10/1972 | Chabot et al. |
| 3,805,238 A | 4/1974 | Rothfjell |
| 3,887,906 A | 6/1975 | Minnaja |
| 3,887,925 A | 6/1975 | Ranghelli et al. |
| 4,003,016 A | 1/1977 | Remley |
| 4,075,097 A | 2/1978 | Paul |
| 4,076,097 A | 2/1978 | Clarke |
| 4,209,780 A | 6/1980 | Cannon et al. |
| 4,253,193 A | 2/1981 | Kennard et al. |
| 4,331,225 A | 5/1982 | Bolger |
| 4,360,797 A | 11/1982 | Fenimore et al. |
| 4,389,670 A | 6/1983 | Davidson et al. |
| 4,417,791 A | 11/1983 | Erland et al. |
| 4,564,935 A | 1/1986 | Kaplan |
| 4,688,246 A | 8/1987 | Eilers et al. |
| 4,771,289 A | 9/1988 | Masak |
| 4,855,061 A | 8/1989 | Martin |
| 4,943,811 A | 7/1990 | Alden et al. |
| 4,955,562 A | 9/1990 | Martin et al. |
| 5,045,862 A | 9/1991 | Alden et al. |
| 5,076,687 A | 12/1991 | Adelson |
| 5,088,091 A | 2/1992 | Schroeder et al. |
| 5,095,500 A | 3/1992 | Tayloe et al. |
| 5,097,485 A | 3/1992 | O'Connor et al. |
| 5,227,985 A | 7/1993 | Dementhon |
| 5,235,416 A | 8/1993 | Stanhope |
| 5,304,809 A | 4/1994 | Wickersheim |
| 5,305,124 A | 4/1994 | Chern et al. |
| 5,315,309 A | 5/1994 | Rudow et al. |
| 5,321,414 A | 6/1994 | Alden et al. |
| 5,377,183 A | 12/1994 | Dent |
| 5,400,037 A | 3/1995 | East |
| 5,420,622 A | 5/1995 | Faroudja |
| 5,424,533 A | 6/1995 | Schmutz |
| 5,440,428 A | 8/1995 | Hegg et al. |
| 5,467,104 A | 11/1995 | Furness et al. |
| 5,472,467 A | 12/1995 | Pfeffer |
| 5,479,026 A | 12/1995 | Schmutz et al. |
| 5,480,341 A | 1/1996 | Plakos |
| 5,483,667 A | 1/1996 | Faruque |
| 5,503,350 A | 4/1996 | Foote |
| 5,519,826 A | 5/1996 | Harper et al. |
| 5,555,257 A | 9/1996 | Dent |
| 5,563,614 A | 10/1996 | Alden et al. |
| 5,569,317 A | 10/1996 | Sarada et al. |
| 5,573,090 A | 11/1996 | Ross |
| 5,575,719 A | 11/1996 | Gobush et al. |
| 5,596,339 A | 1/1997 | Furness et al. |
| 5,600,326 A | 2/1997 | Yu et al. |
| 5,606,165 A | 2/1997 | Chiou et al. |
| 5,644,207 A | 7/1997 | Lew et al. |
| 5,653,751 A | 8/1997 | Samiy et al. |
| 5,659,327 A | 8/1997 | Furness et al. |
| 5,661,765 A | 8/1997 | Ishizu |
| 5,689,577 A | 11/1997 | Arata |
| 5,699,798 A | 12/1997 | Hochman et al. |
| 5,701,132 A | 12/1997 | Kollin et al. |
| 5,712,649 A | 1/1998 | Kenji |
| 5,742,229 A | 4/1998 | Smith |
| 5,742,253 A | 4/1998 | Conroy et al. |
| 5,756,026 A | 5/1998 | Sanchez et al. |
| 5,757,005 A | 5/1998 | Callas et al. |
| 5,809,422 A | 9/1998 | Raleigh et al. |
| 5,821,989 A | 10/1998 | Lazzaro et al. |
| 5,838,671 A | 11/1998 | Ishikawa et al. |
| 5,852,672 A | 12/1998 | Lu |
| 5,864,384 A | 1/1999 | McClure et al. |
| 5,872,814 A | 2/1999 | McMeekin |
| 5,878,283 A | 3/1999 | House et al. |
| 5,883,606 A | 3/1999 | Smoot |
| 5,903,397 A | 5/1999 | Melville et al. |
| 5,910,834 A | 6/1999 | McClure et al. |
| 5,930,379 A | 7/1999 | Rehg et al. |
| 5,940,166 A | 8/1999 | Miller |
| 5,950,124 A | 9/1999 | Trompower et al. |
| 5,966,129 A | 10/1999 | Matsukuma et al. |
| 5,969,822 A | 10/1999 | Fright et al. |
| 5,982,139 A | 11/1999 | Parise |
| 5,983,104 A | 11/1999 | Wickman et al. |
| 6,005,516 A | 12/1999 | Reudink et al. |
| 6,005,856 A | 12/1999 | Jensen et al. |
| 6,014,107 A | 1/2000 | Wiesenfarth |
| 6,020,892 A | 2/2000 | Kelly |
| 6,041,365 A | 3/2000 | Kleinerman |
| 6,043,799 A | 3/2000 | Tidwell |
| 6,052,582 A | 4/2000 | Blasing et al. |
| 6,061,021 A | 5/2000 | Zibell |
| 6,061,023 A | 5/2000 | Daniel et al. |
| 6,067,290 A | 5/2000 | Paulraj et al. |
| 6,072,496 A | 6/2000 | Guenter et al. |
| 6,097,353 A | 8/2000 | Melville et al. |
| 6,114,834 A | 9/2000 | Parise |
| 6,141,104 A | 10/2000 | Schulz et al. |
| 6,148,280 A | 11/2000 | Kramer |
| 6,151,118 A | 11/2000 | Norita et al. |
| 6,154,321 A | 11/2000 | Melville et al. |
| 6,205,195 B1 | 3/2001 | Lanza |
| 6,229,503 B1 | 5/2001 | Mays et al. |
| 6,232,921 B1 | 5/2001 | Aiken et al. |
| 6,241,622 B1 | 6/2001 | Gobush et al. |
| 6,243,198 B1 | 6/2001 | Sedlmayr |
| 6,252,912 B1 | 6/2001 | Salinger |
| 6,271,900 B1 | 8/2001 | Zong-Fu |
| 6,275,738 B1 | 8/2001 | Kasevich et al. |
| 6,308,080 B1 | 10/2001 | Burt et al. |
| 6,320,853 B1 | 11/2001 | Wong et al. |
| 6,323,823 B1 | 11/2001 | Wong et al. |
| 6,330,460 B1 | 12/2001 | Wong et al. |
| 6,364,253 B1 | 4/2002 | Cavanagh |
| 6,377,782 B1 | 4/2002 | Bishop et al. |
| 6,400,761 B1 | 6/2002 | Smee et al. |
| 6,411,612 B1 | 6/2002 | Halford et al. |
| 6,421,543 B1 | 7/2002 | Molnar |
| 6,421,600 B1 | 7/2002 | Ross |
| 6,442,151 B1 | 8/2002 | H et al. |
| 6,445,910 B1 | 9/2002 | Stefan |
| 6,448,937 B1 | 9/2002 | Aiken et al. |
| 6,453,177 B1 | 9/2002 | Wong et al. |
| 6,454,414 B1 | 9/2002 | Chin-Lung |
| 6,459,900 B1 | 10/2002 | Stefan |
| 6,473,467 B1 | 10/2002 | Wallace et al. |
| 6,473,717 B1 | 10/2002 | Claussen et al. |
| 6,484,030 B1 | 11/2002 | Antoine et al. |
| 6,487,516 B1 | 11/2002 | Netzer |
| 6,509,970 B1 | 1/2003 | Seki et al. |
| 6,513,921 B1 | 2/2003 | Houle |
| 6,519,478 B1 | 2/2003 | Scherzer et al. |
| 6,533,674 B1 | 3/2003 | William |
| 6,554,706 B2 | 4/2003 | Kim et al. |
| 6,592,465 B2 | 7/2003 | Lutz et al. |
| 6,611,231 B2 | 8/2003 | Crilly, Jr. et al. |
| 6,633,294 B1 | 10/2003 | Rosenthal et al. |
| 6,643,386 B1 | 11/2003 | Foster |
| 6,654,590 B2 | 11/2003 | Boros et al. |
| 6,668,161 B2 | 12/2003 | Boros et al. |
| 6,684,366 B1 | 1/2004 | Trott et al. |
| 6,685,326 B2 | 2/2004 | Debevec et al. |
| 6,697,644 B2 | 2/2004 | Scherzer et al. |
| 6,710,797 B1 | 3/2004 | McNelley et al. |
| 6,718,180 B1 | 4/2004 | Lundh et al. |
| 6,718,184 B1 | 4/2004 | Aiken et al. |
| 6,737,652 B2 | 5/2004 | Lanza et al. |

(56) References Cited

U.S. PATENT DOCUMENTS

| | | |
|---|---|---|
| 6,758,759 B2 | 7/2004 | Gobush et al. |
| 6,760,388 B2 | 7/2004 | Ketchum et al. |
| 6,760,599 B1 | 7/2004 | Uhlik |
| 6,760,603 B1 | 7/2004 | Scherzer et al. |
| 6,763,225 B1 | 7/2004 | Farmine et al. |
| 6,771,706 B2 | 8/2004 | Ling et al. |
| 6,785,341 B2 | 8/2004 | Walton et al. |
| 6,791,508 B2 | 9/2004 | Berry et al. |
| 6,792,259 B1 | 9/2004 | Parise |
| 6,794,939 B2 | 9/2004 | Kim et al. |
| 6,795,413 B1 | 9/2004 | Uhlik |
| 6,799,026 B1 | 9/2004 | Scherzer et al. |
| 6,801,580 B2 | 10/2004 | Kadous |
| 6,804,311 B1 | 10/2004 | Dabak et al. |
| 6,834,043 B1 | 12/2004 | Vook et al. |
| 6,836,673 B1 | 12/2004 | Trott |
| 6,847,832 B2 | 1/2005 | Wong et al. |
| 6,850,872 B1 | 2/2005 | Marschner et al. |
| 6,862,271 B2 | 3/2005 | Medvedev et al. |
| 6,888,795 B2 | 5/2005 | Gupta et al. |
| 6,888,809 B1 | 5/2005 | Foschini et al. |
| 6,888,899 B2 | 5/2005 | Raleigh et al. |
| 6,895,258 B1 | 5/2005 | Scherzer et al. |
| 6,901,062 B2 | 5/2005 | Scherzer et al. |
| 6,919,847 B2 | 7/2005 | Caplan et al. |
| 6,919,857 B2 | 7/2005 | Shamblin et al. |
| 6,920,192 B1 | 7/2005 | Laroia et al. |
| 6,925,127 B1 | 8/2005 | Dent |
| 6,943,949 B2 | 9/2005 | Sedlmayr |
| 6,956,537 B2 | 10/2005 | Scherzer et al. |
| 6,963,742 B2 | 11/2005 | Boros et al. |
| 6,970,682 B2 | 11/2005 | Crilly, Jr. et al. |
| 6,978,150 B2 | 12/2005 | Kojiro |
| 6,982,653 B2 | 1/2006 | Voeller et al. |
| 6,996,060 B1 | 2/2006 | Dahlby et al. |
| 7,006,043 B1 | 2/2006 | Vahakn |
| 7,009,652 B1 | 3/2006 | Tanida et al. |
| 7,013,144 B2 | 3/2006 | Yamashita et al. |
| 7,016,649 B1 | 3/2006 | Narasimhan et al. |
| 7,020,490 B2 | 3/2006 | Khatri |
| 7,027,415 B1 | 4/2006 | Dahlby et al. |
| 7,027,523 B2 | 4/2006 | Jalali et al. |
| 7,027,837 B1 | 4/2006 | Uhlik et al. |
| 7,031,336 B2 | 4/2006 | Scherzer et al. |
| 7,031,754 B2 | 4/2006 | Scherzer et al. |
| 7,044,613 B2 | 5/2006 | Debevec |
| 7,068,277 B2 | 6/2006 | Menache |
| 7,068,704 B1 | 6/2006 | Orr |
| 7,068,991 B2 | 6/2006 | Parise |
| 7,072,413 B2 | 7/2006 | Walton et al. |
| 7,072,693 B2 | 7/2006 | Farlow et al. |
| 7,075,254 B2 | 7/2006 | Chitta et al. |
| 7,075,438 B2 | 7/2006 | Kent et al. |
| 7,075,485 B2 | 7/2006 | Song et al. |
| 7,079,809 B1 | 7/2006 | Scherzer |
| 7,081,997 B2 | 7/2006 | Sedlmayr |
| 7,085,240 B2 | 8/2006 | Wu et al. |
| 7,086,954 B2 | 8/2006 | Gobush et al. |
| 7,089,319 B2 | 8/2006 | Lysenko et al. |
| 7,095,723 B2 | 8/2006 | Sezgin et al. |
| 7,096,040 B1 | 8/2006 | Scherzer et al. |
| 7,116,723 B2 | 10/2006 | Kim et al. |
| 7,117,014 B1 | 10/2006 | Van Rensburg et al. |
| 7,120,440 B2 | 10/2006 | Cho et al. |
| 7,127,081 B1 | 10/2006 | Erdem |
| 7,139,527 B2 | 11/2006 | Tamaki et al. |
| 7,142,154 B2 | 11/2006 | Quilter et al. |
| 7,152,984 B1 | 12/2006 | Hayes |
| 7,154,671 B2 | 12/2006 | Sedlmayr |
| 7,154,936 B2 | 12/2006 | Bjerke et al. |
| 7,154,960 B2 | 12/2006 | Liu et al. |
| 7,158,493 B1 | 1/2007 | Uhlik et al. |
| 7,167,684 B2 | 1/2007 | Kadous et al. |
| 7,181,167 B2 | 2/2007 | Onggosanusi et al. |
| 7,184,047 B1 | 2/2007 | Crampton |
| 7,184,492 B2 | 2/2007 | Dent |
| 7,193,991 B2 | 3/2007 | Melpignano et al. |
| 7,194,006 B2 | 3/2007 | Wong et al. |
| 7,197,082 B2 | 3/2007 | Alexiou et al. |
| 7,197,084 B2 | 3/2007 | Ketchum et al. |
| 7,197,282 B2 | 3/2007 | Dent et al. |
| 7,209,511 B2 | 4/2007 | Dent |
| 7,218,320 B2 | 5/2007 | Gordon et al. |
| 7,218,689 B2 | 5/2007 | Gupta |
| 7,224,942 B2 | 5/2007 | Dent |
| 7,227,855 B1 | 6/2007 | Barratt et al. |
| 7,242,724 B2 | 7/2007 | Alexiou et al. |
| 7,242,964 B1 | 7/2007 | Aiken et al. |
| 7,248,645 B2 | 7/2007 | Vialle et al. |
| 7,248,841 B2 | 7/2007 | Agee et al. |
| 7,248,879 B1 | 7/2007 | Walton et al. |
| 7,257,237 B1 | 8/2007 | Luck et al. |
| 7,269,231 B2 | 9/2007 | Ding et al. |
| 7,272,294 B2 | 9/2007 | Zhou et al. |
| 7,299,071 B1 | 11/2007 | Barratt et al. |
| 7,310,680 B1 | 12/2007 | Graham |
| 7,313,403 B2 | 12/2007 | Gong et al. |
| 7,324,110 B2 | 1/2008 | Edwards et al. |
| 7,327,362 B2 | 2/2008 | Oliver |
| 7,327,795 B2 | 2/2008 | Oprea |
| 7,333,113 B2 | 2/2008 | Demian |
| 7,333,540 B2 | 2/2008 | Suan |
| 7,336,626 B1 | 2/2008 | Barratt et al. |
| 7,339,906 B1 | 3/2008 | Dahlby et al. |
| 7,339,908 B2 | 3/2008 | Uhlik et al. |
| 7,352,774 B2 | 4/2008 | Uhlik et al. |
| 7,356,164 B2 | 4/2008 | Aliaga et al. |
| 7,358,972 B2 | 4/2008 | Gordon et al. |
| 7,363,376 B2 | 4/2008 | Uhlik et al. |
| 7,366,202 B2 | 4/2008 | Scherzer et al. |
| 7,366,245 B2 | 4/2008 | Li et al. |
| 7,366,519 B2 | 4/2008 | Jason et al. |
| 7,369,681 B2 | 5/2008 | Foth et al. |
| 7,369,841 B1 | 5/2008 | Uhlik et al. |
| 7,369,876 B2 | 5/2008 | Lee et al. |
| 7,373,133 B2 | 5/2008 | Mickle et al. |
| 7,394,858 B2 | 7/2008 | Sadowsky et al. |
| 7,406,315 B2 | 7/2008 | Uhlik et al. |
| 7,412,212 B2 | 8/2008 | Ari |
| 7,418,053 B2 | 8/2008 | Perlman et al. |
| 7,426,422 B2 | 9/2008 | Carman et al. |
| 7,430,197 B1 | 9/2008 | Uhlik |
| 7,436,403 B2 | 10/2008 | Debevec |
| 7,437,177 B2 | 10/2008 | Ozluturk et al. |
| 7,450,489 B2 | 11/2008 | Sandhu |
| 7,451,839 B2 | 11/2008 | Perlman |
| 7,471,736 B2 | 12/2008 | Ding et al. |
| 7,486,931 B2 | 2/2009 | Cho et al. |
| 7,492,743 B2 | 2/2009 | Uhlik |
| 7,499,548 B2 | 3/2009 | Meandzija et al. |
| 7,502,420 B2 | 3/2009 | Ketchum |
| 7,519,011 B2 | 4/2009 | Petrus et al. |
| 7,548,272 B2 | 6/2009 | Perlman et al. |
| 7,548,752 B2 | 6/2009 | Sampath et al. |
| 7,554,549 B2 | 6/2009 | Sagar et al. |
| 7,558,575 B2 | 7/2009 | Losh et al. |
| 7,587,520 B1 | 9/2009 | Kent et al. |
| 7,599,420 B2 | 10/2009 | Forenza et al. |
| 7,599,443 B2 | 10/2009 | Ionescu et al. |
| 7,606,192 B2 | 10/2009 | Uhlik |
| 7,609,751 B1 | 10/2009 | Giallorenzi et al. |
| 7,616,698 B2 | 11/2009 | Sun et al. |
| 7,630,337 B2 | 12/2009 | Zheng et al. |
| 7,633,944 B1 | 12/2009 | Chang et al. |
| 7,633,994 B2 | 12/2009 | Forenza et al. |
| 7,636,381 B2 | 12/2009 | Forenza et al. |
| 7,671,321 B2 | 3/2010 | Perlman et al. |
| 7,684,753 B2 | 3/2010 | Ionescu et al. |
| 7,688,789 B2 | 3/2010 | Pan et al. |
| 7,689,639 B2 | 3/2010 | Dent |
| 7,719,993 B2 | 5/2010 | Li et al. |
| 7,720,259 B2 | 5/2010 | Gordon et al. |
| 7,729,316 B2 | 6/2010 | Uhlik |
| 7,729,433 B2 | 6/2010 | Jalloul et al. |

(56) References Cited

U.S. PATENT DOCUMENTS

| | | | |
|---|---|---|---|
| 7,729,443 B2 | 6/2010 | Fukuoka et al. | |
| 7,747,250 B2 | 6/2010 | Larsson et al. | |
| 7,751,368 B2 | 7/2010 | Li et al. | |
| 7,751,843 B2 | 7/2010 | Butala | |
| 7,756,222 B2 | 7/2010 | Chen et al. | |
| 7,767,950 B2 | 8/2010 | Perlman et al. | |
| 7,792,423 B2 | 9/2010 | Raskar et al. | |
| 7,801,490 B1 | 9/2010 | Scherzer | |
| 7,849,173 B1 | 12/2010 | Uhlik | |
| 7,864,663 B2 | 1/2011 | Dent | |
| 7,923,677 B2 | 4/2011 | Slinger | |
| 7,948,444 B2 | 5/2011 | Signell et al. | |
| 7,961,809 B2 | 6/2011 | Bourdoux et al. | |
| 7,978,673 B1 | 7/2011 | Uhlik et al. | |
| 7,986,742 B2 | 7/2011 | Ketchum et al. | |
| 7,995,973 B2 | 8/2011 | Dent et al. | |
| 8,013,285 B2 | 9/2011 | Perlman et al. | |
| 8,041,362 B2* | 10/2011 | Li | H04L 5/0041 455/452.1 |
| 8,054,312 B2 | 11/2011 | Gordon | |
| 8,081,944 B2 | 12/2011 | Shaolin | |
| 8,086,271 B2 | 12/2011 | Dent | |
| 8,090,320 B2 | 1/2012 | Dent et al. | |
| 8,116,710 B2 | 2/2012 | Dent et al. | |
| 8,126,510 B1 | 2/2012 | Samson et al. | |
| 8,144,153 B1 | 3/2012 | Sullivan et al. | |
| 8,170,081 B2 | 5/2012 | Forenza et al. | |
| 8,243,353 B1 | 8/2012 | Gutin et al. | |
| 8,260,198 B2 | 9/2012 | Tomoya | |
| 8,288,704 B2 | 10/2012 | Perlman et al. | |
| 8,320,432 B1 | 11/2012 | Chockalingam et al. | |
| 8,428,177 B2 | 4/2013 | Tsai et al. | |
| 8,451,764 B2 | 5/2013 | Chao et al. | |
| 8,482,462 B2 | 7/2013 | Komijani et al. | |
| 8,548,384 B2 | 10/2013 | Lee et al. | |
| 8,638,880 B2 | 1/2014 | Baldemair et al. | |
| 8,654,815 B1 | 2/2014 | Forenza et al. | |
| 8,675,768 B2 | 3/2014 | Xu et al. | |
| 8,705,484 B2 | 4/2014 | Caire et al. | |
| 8,731,480 B2 | 5/2014 | Kim et al. | |
| 8,787,469 B2 | 7/2014 | Kim et al. | |
| 8,797,970 B2 | 8/2014 | Xing et al. | |
| 8,849,339 B2 | 9/2014 | Anto et al. | |
| 8,902,862 B2 | 12/2014 | Yu et al. | |
| 8,971,380 B2 | 3/2015 | Forenza et al. | |
| 8,989,155 B2 | 3/2015 | Forenza et al. | |
| 9,094,180 B2 | 7/2015 | Zirwas et al. | |
| 9,177,387 B2 | 11/2015 | Marks | |
| 9,179,495 B1 | 11/2015 | Scherzer et al. | |
| 9,252,858 B2 | 2/2016 | Abbasfar et al. | |
| 9,307,506 B1 | 4/2016 | Kelly et al. | |
| 9,331,882 B2 | 5/2016 | Fehri et al. | |
| 9,685,997 B2 | 6/2017 | Forenza et al. | |
| 9,698,881 B2 | 7/2017 | Nammi et al. | |
| 10,205,513 B1 | 2/2019 | Winters et al. | |
| 10,277,290 B2 | 4/2019 | Forenza et al. | |
| 10,349,417 B2 | 7/2019 | Forenza et al. | |
| 10,637,554 B2 | 4/2020 | Zhu et al. | |
| 10,749,583 B2 | 8/2020 | Park et al. | |
| 10,804,985 B2 | 10/2020 | Ge et al. | |
| 10,985,811 B2 | 4/2021 | Forenza et al. | |
| 2001/0031647 A1 | 10/2001 | Scherzer et al. | |
| 2002/0027985 A1 | 3/2002 | Farrokh | |
| 2002/0051433 A1 | 5/2002 | Affes et al. | |
| 2002/0060649 A1 | 5/2002 | Perlman | |
| 2002/0061004 A1 | 5/2002 | Lomp et al. | |
| 2002/0097705 A1 | 7/2002 | Sezgin et al. | |
| 2002/0114526 A1 | 8/2002 | Dennis | |
| 2002/0130867 A1 | 9/2002 | Yang et al. | |
| 2002/0132933 A1 | 9/2002 | Dingemans et al. | |
| 2002/0136169 A1 | 9/2002 | Struhsaker et al. | |
| 2002/0138581 A1 | 9/2002 | MacIntosh et al. | |
| 2002/0142723 A1 | 10/2002 | Foschini et al. | |
| 2002/0168017 A1 | 11/2002 | Berthet et al. | |
| 2002/0177447 A1 | 11/2002 | Walton et al. | |
| 2002/0181444 A1 | 12/2002 | Acampora | |
| 2002/0193146 A1 | 12/2002 | Wallace et al. | |
| 2003/0003863 A1 | 1/2003 | Thielecke et al. | |
| 2003/0012315 A1 | 1/2003 | Fan | |
| 2003/0027655 A1 | 2/2003 | Lutz et al. | |
| 2003/0036359 A1 | 2/2003 | Dent et al. | |
| 2003/0043887 A1 | 3/2003 | Hudson | |
| 2003/0043929 A1 | 3/2003 | Hemanth | |
| 2003/0045297 A1 | 3/2003 | Dent | |
| 2003/0048753 A1 | 3/2003 | Ahmad | |
| 2003/0065779 A1 | 4/2003 | Malik et al. | |
| 2003/0092456 A1 | 5/2003 | Wilkinson | |
| 2003/0095186 A1 | 5/2003 | Aman et al. | |
| 2003/0114165 A1 | 6/2003 | Charles | |
| 2003/0114193 A1 | 6/2003 | Kavak et al. | |
| 2003/0125026 A1 | 7/2003 | Tsunehara et al. | |
| 2003/0125040 A1 | 7/2003 | Walton et al. | |
| 2003/0138206 A1 | 7/2003 | Sheng et al. | |
| 2003/0139196 A1 | 7/2003 | Medvedev et al. | |
| 2003/0147362 A1 | 8/2003 | Dick et al. | |
| 2003/0148738 A1 | 8/2003 | Das et al. | |
| 2003/0149726 A1 | 8/2003 | Spear | |
| 2003/0156056 A1 | 8/2003 | Perry | |
| 2003/0161282 A1 | 8/2003 | Medvedev et al. | |
| 2003/0193599 A1 | 10/2003 | Campbell et al. | |
| 2003/0200227 A1 | 10/2003 | Kyle | |
| 2003/0211843 A1 | 11/2003 | Song et al. | |
| 2003/0214431 A1 | 11/2003 | Hager et al. | |
| 2003/0220112 A1 | 11/2003 | Bugeja | |
| 2003/0222820 A1 | 12/2003 | Karr et al. | |
| 2003/0223391 A1 | 12/2003 | Malaender et al. | |
| 2003/0235146 A1 | 12/2003 | Wu et al. | |
| 2004/0002835 A1 | 1/2004 | Nelson | |
| 2004/0008650 A1 | 1/2004 | Le et al. | |
| 2004/0009755 A1 | 1/2004 | Shousei | |
| 2004/0017313 A1 | 1/2004 | Alberto | |
| 2004/0042556 A1 | 3/2004 | Medvedev et al. | |
| 2004/0043784 A1 | 3/2004 | Czaja et al. | |
| 2004/0045031 A1 | 3/2004 | Gautier | |
| 2004/0063450 A1 | 4/2004 | Uhlik | |
| 2004/0072091 A1 | 4/2004 | Mochizuki et al. | |
| 2004/0082356 A1* | 4/2004 | Walton | H04B 7/0669 455/522 |
| 2004/0095907 A1 | 5/2004 | Agee et al. | |
| 2004/0097197 A1 | 5/2004 | Juncker et al. | |
| 2004/0104935 A1 | 6/2004 | Williamson et al. | |
| 2004/0119716 A1 | 6/2004 | Park et al. | |
| 2004/0131011 A1 | 7/2004 | Sandell et al. | |
| 2004/0136349 A1 | 7/2004 | Walton et al. | |
| 2004/0152480 A1 | 8/2004 | Willars et al. | |
| 2004/0153512 A1 | 8/2004 | Edward | |
| 2004/0155962 A1 | 8/2004 | Marks | |
| 2004/0170430 A1 | 9/2004 | Gorokhov | |
| 2004/0176097 A1 | 9/2004 | Wilson et al. | |
| 2004/0179627 A1 | 9/2004 | Ketchum et al. | |
| 2004/0185909 A1 | 9/2004 | Alexiou et al. | |
| 2004/0190636 A1 | 9/2004 | Oprea | |
| 2004/0203347 A1 | 10/2004 | Nguyen | |
| 2004/0203987 A1 | 10/2004 | Butala | |
| 2004/0205173 A1 | 10/2004 | Hall | |
| 2004/0209579 A1 | 10/2004 | Vaidyanathan | |
| 2004/0252632 A1 | 12/2004 | Bourdoux et al. | |
| 2005/0003865 A1 | 1/2005 | Lastinger et al. | |
| 2005/0020237 A1 | 1/2005 | Alexiou et al. | |
| 2005/0024231 A1 | 2/2005 | Fincher et al. | |
| 2005/0030625 A1 | 2/2005 | Cattin-Liebl | |
| 2005/0031047 A1 | 2/2005 | Maltsev et al. | |
| 2005/0040085 A1 | 2/2005 | Carman et al. | |
| 2005/0041750 A1 | 2/2005 | Lau | |
| 2005/0041751 A1 | 2/2005 | Nir et al. | |
| 2005/0042988 A1 | 2/2005 | Hoek et al. | |
| 2005/0043031 A1 | 2/2005 | Cho et al. | |
| 2005/0047515 A1 | 3/2005 | Walton et al. | |
| 2005/0058217 A1 | 3/2005 | Sandhu et al. | |
| 2005/0075110 A1 | 4/2005 | Posti et al. | |
| 2005/0085267 A1 | 4/2005 | Lemson et al. | |
| 2005/0096058 A1 | 5/2005 | Warner et al. | |
| 2005/0101259 A1 | 5/2005 | Tong et al. | |
| 2005/0101352 A1 | 5/2005 | Logothetis et al. | |

(56) References Cited

U.S. PATENT DOCUMENTS

| | | |
|---|---|---|
| 2005/0104543 A1 | 5/2005 | Kazanov et al. |
| 2005/0105772 A1 | 5/2005 | Voronka et al. |
| 2005/0111406 A1 | 5/2005 | Pasanen et al. |
| 2005/0111599 A1 | 5/2005 | Walton et al. |
| 2005/0114073 A1 | 5/2005 | Gobush |
| 2005/0119868 A1 | 6/2005 | Scheidemann et al. |
| 2005/0143183 A1 | 6/2005 | Shirai et al. |
| 2005/0148368 A1 | 7/2005 | Scheinert et al. |
| 2005/0157683 A1 | 7/2005 | Ylitalo et al. |
| 2005/0161118 A1 | 7/2005 | Carman et al. |
| 2005/0168578 A1 | 8/2005 | Gobush |
| 2005/0169396 A1 | 8/2005 | Baier et al. |
| 2005/0174771 A1 | 8/2005 | Conner |
| 2005/0174977 A1 | 8/2005 | Pedlar et al. |
| 2005/0186991 A1 | 8/2005 | Bateman |
| 2005/0215336 A1 | 9/2005 | Ueda et al. |
| 2005/0215337 A1 | 9/2005 | Shirai et al. |
| 2005/0230597 A1 | 10/2005 | Hsieh et al. |
| 2005/0232135 A1 | 10/2005 | Mukai et al. |
| 2005/0239406 A1 | 10/2005 | Shattil |
| 2005/0259627 A1 | 11/2005 | Song et al. |
| 2005/0265273 A1 | 12/2005 | Karabinis et al. |
| 2005/0271009 A1 | 12/2005 | Shirakabe et al. |
| 2005/0287962 A1 | 12/2005 | Mehta et al. |
| 2006/0023803 A1 | 2/2006 | Perlman et al. |
| 2006/0032979 A1 | 2/2006 | Mitchell et al. |
| 2006/0046658 A1 | 3/2006 | Cruz et al. |
| 2006/0050804 A1 | 3/2006 | Leclair |
| 2006/0055706 A1 | 3/2006 | Perlman et al. |
| 2006/0056855 A1 | 3/2006 | Nakagawa et al. |
| 2006/0061680 A1 | 3/2006 | Madhavan et al. |
| 2006/0062180 A1* | 3/2006 | Sayeedi ............ H04W 36/0033 370/328 |
| 2006/0077258 A1 | 4/2006 | Allen et al. |
| 2006/0098568 A1 | 5/2006 | Oh et al. |
| 2006/0098754 A1 | 5/2006 | Kim et al. |
| 2006/0127836 A1 | 6/2006 | Huafeng |
| 2006/0146755 A1 | 7/2006 | Pan et al. |
| 2006/0159160 A1 | 7/2006 | Kim et al. |
| 2006/0159187 A1 | 7/2006 | Wang et al. |
| 2006/0165120 A1* | 7/2006 | Karabinis .......... H04B 7/18563 370/466 |
| 2006/0184209 A1 | 8/2006 | John et al. |
| 2006/0192785 A1 | 8/2006 | Marschner et al. |
| 2006/0198461 A1 | 9/2006 | Hayase |
| 2006/0199584 A1 | 9/2006 | Bergstrom et al. |
| 2006/0199620 A1 | 9/2006 | Greene et al. |
| 2006/0203096 A1 | 9/2006 | Lasalle et al. |
| 2006/0203708 A1 | 9/2006 | Sampath et al. |
| 2006/0209979 A1 | 9/2006 | Sandell et al. |
| 2006/0266564 A1 | 11/2006 | Perlman |
| 2006/0270359 A1 | 11/2006 | Karmi et al. |
| 2006/0281421 A1 | 12/2006 | Pan et al. |
| 2006/0287743 A1 | 12/2006 | Sampath et al. |
| 2006/0292990 A1 | 12/2006 | Karabinis et al. |
| 2007/0004337 A1 | 1/2007 | Biswas et al. |
| 2007/0015526 A1 | 1/2007 | Hansen |
| 2007/0024946 A1 | 2/2007 | Panasyuk et al. |
| 2007/0025464 A1 | 2/2007 | Perlman |
| 2007/0054633 A1 | 3/2007 | Piirainen |
| 2007/0058590 A1 | 3/2007 | Wang et al. |
| 2007/0058839 A1 | 3/2007 | Echegaray et al. |
| 2007/0060410 A1 | 3/2007 | Gobush |
| 2007/0064823 A1 | 3/2007 | Hwang et al. |
| 2007/0066331 A1 | 3/2007 | Zheng et al. |
| 2007/0082674 A1 | 4/2007 | Pedersen et al. |
| 2007/0086400 A1 | 4/2007 | Shida et al. |
| 2007/0091085 A1 | 4/2007 | Wang et al. |
| 2007/0091178 A1 | 4/2007 | Cotter et al. |
| 2007/0093273 A1 | 4/2007 | Liyu |
| 2007/0093274 A1 | 4/2007 | Jafarkhani et al. |
| 2007/0099665 A1 | 5/2007 | Kim et al. |
| 2007/0132653 A1 | 6/2007 | Weller et al. |
| 2007/0135125 A1 | 6/2007 | Kim et al. |
| 2007/0183362 A1 | 8/2007 | Mondal et al. |
| 2007/0200930 A1 | 8/2007 | Demian |
| 2007/0206504 A1* | 9/2007 | Koo ................ H04L 25/0242 370/245 |
| 2007/0206832 A1 | 9/2007 | Gordon et al. |
| 2007/0211747 A1 | 9/2007 | Kim |
| 2007/0220151 A1 | 9/2007 | Li et al. |
| 2007/0242782 A1 | 10/2007 | Han et al. |
| 2007/0243871 A1 | 10/2007 | Chen et al. |
| 2007/0249380 A1 | 10/2007 | Stewart et al. |
| 2007/0253508 A1 | 11/2007 | Zhou et al. |
| 2007/0254602 A1 | 11/2007 | Li et al. |
| 2007/0258531 A1 | 11/2007 | Chen et al. |
| 2007/0263736 A1 | 11/2007 | Yuda et al. |
| 2007/0273951 A1 | 11/2007 | Ribi |
| 2007/0279494 A1 | 12/2007 | Aman et al. |
| 2007/0280116 A1 | 12/2007 | Wang et al. |
| 2007/0285559 A1 | 12/2007 | Perlman et al. |
| 2007/0286298 A1 | 12/2007 | Choi et al. |
| 2008/0013644 A1 | 1/2008 | Hugl et al. |
| 2008/0051150 A1 | 2/2008 | Masafumi |
| 2008/0080631 A1* | 4/2008 | Forenza ................ H04L 1/0057 375/260 |
| 2008/0080635 A1 | 4/2008 | Hugl et al. |
| 2008/0089396 A1 | 4/2008 | Zhang et al. |
| 2008/0100622 A1 | 5/2008 | Gordon |
| 2008/0102881 A1 | 5/2008 | Han et al. |
| 2008/0107135 A1 | 5/2008 | Ibrahim |
| 2008/0117961 A1 | 5/2008 | Han et al. |
| 2008/0118004 A1 | 5/2008 | Forenza et al. |
| 2008/0125051 A1 | 5/2008 | Kim et al. |
| 2008/0130790 A1 | 6/2008 | Forenza et al. |
| 2008/0132281 A1 | 6/2008 | Kim et al. |
| 2008/0165866 A1 | 7/2008 | Teo et al. |
| 2008/0181285 A1 | 7/2008 | Hwang et al. |
| 2008/0192683 A1 | 8/2008 | Han et al. |
| 2008/0192697 A1 | 8/2008 | Shaheen |
| 2008/0205538 A1 | 8/2008 | Han et al. |
| 2008/0214185 A1 | 9/2008 | Cho et al. |
| 2008/0227422 A1* | 9/2008 | Hwang ............ H04L 25/03343 455/278.1 |
| 2008/0232394 A1 | 9/2008 | Kozek et al. |
| 2008/0233902 A1 | 9/2008 | Pan et al. |
| 2008/0239938 A1 | 10/2008 | Jalloul et al. |
| 2008/0260054 A1 | 10/2008 | Myung et al. |
| 2008/0261587 A1 | 10/2008 | Lennartson et al. |
| 2008/0268833 A1 | 10/2008 | Huang et al. |
| 2008/0292011 A1 | 11/2008 | Yang |
| 2008/0317014 A1 | 12/2008 | Veselinovic et al. |
| 2009/0010204 A1 | 1/2009 | Pratt, Jr. et al. |
| 2009/0016463 A1 | 1/2009 | Roh |
| 2009/0023467 A1 | 1/2009 | Huang et al. |
| 2009/0028451 A1 | 1/2009 | Slinger et al. |
| 2009/0034636 A1* | 2/2009 | Kotecha ................ H04L 5/0094 375/260 |
| 2009/0041148 A1 | 2/2009 | Li et al. |
| 2009/0041151 A1 | 2/2009 | Khan et al. |
| 2009/0046678 A1 | 2/2009 | Lee et al. |
| 2009/0046800 A1 | 2/2009 | Xu et al. |
| 2009/0060013 A1 | 3/2009 | Ashikhmin et al. |
| 2009/0067198 A1 | 3/2009 | Graham et al. |
| 2009/0067402 A1 | 3/2009 | Forenza et al. |
| 2009/0069054 A1 | 3/2009 | Zangi et al. |
| 2009/0075686 A1 | 3/2009 | Gomadam et al. |
| 2009/0086648 A1 | 4/2009 | Xu et al. |
| 2009/0086855 A1 | 4/2009 | Jin et al. |
| 2009/0090868 A1 | 4/2009 | Payne |
| 2009/0135944 A1 | 5/2009 | Dyer et al. |
| 2009/0151987 A1 | 6/2009 | Yang et al. |
| 2009/0168914 A1 | 7/2009 | Chance et al. |
| 2009/0195355 A1 | 8/2009 | Mitchell |
| 2009/0202016 A1 | 8/2009 | Seong et al. |
| 2009/0207822 A1 | 8/2009 | Kim et al. |
| 2009/0209206 A1 | 8/2009 | Zou et al. |
| 2009/0227249 A1 | 9/2009 | Ylitalo |
| 2009/0227292 A1 | 9/2009 | Laroia et al. |
| 2009/0232245 A1 | 9/2009 | Ismail |
| 2009/0254790 A1 | 10/2009 | Pi et al. |
| 2009/0262695 A1* | 10/2009 | Chen ................ H04B 7/0456 370/329 |

(56) References Cited

U.S. PATENT DOCUMENTS

| | | | |
|---|---|---|---|
| 2009/0268675 A1* | 10/2009 | Choi | H04L 5/0032 370/329 |
| 2009/0274196 A1 | 11/2009 | Black et al. | |
| 2009/0283466 A1 | 11/2009 | Martin et al. | |
| 2009/0285156 A1 | 11/2009 | Huang et al. | |
| 2009/0290517 A1 | 11/2009 | Rao et al. | |
| 2009/0290632 A1 | 11/2009 | Wegener | |
| 2009/0296650 A1 | 12/2009 | Venturino et al. | |
| 2009/0316014 A1 | 12/2009 | Lim et al. | |
| 2009/0316807 A1 | 12/2009 | Kim et al. | |
| 2009/0318183 A1 | 12/2009 | Hugl et al. | |
| 2010/0002934 A1 | 1/2010 | Sullivan et al. | |
| 2010/0008331 A1 | 1/2010 | Li et al. | |
| 2010/0034151 A1 | 2/2010 | Alexiou et al. | |
| 2010/0068999 A1 | 3/2010 | Bangs et al. | |
| 2010/0080323 A1 | 4/2010 | Mueck et al. | |
| 2010/0098030 A1 | 4/2010 | Wang et al. | |
| 2010/0099428 A1 | 4/2010 | Bhushan et al. | |
| 2010/0119001 A1 | 5/2010 | Walton et al. | |
| 2010/0128630 A1 | 5/2010 | Barak et al. | |
| 2010/0150013 A1 | 6/2010 | Hara et al. | |
| 2010/0157861 A1 | 6/2010 | Na et al. | |
| 2010/0164802 A1 | 7/2010 | Li et al. | |
| 2010/0172309 A1 | 7/2010 | Forenza et al. | |
| 2010/0178934 A1 | 7/2010 | Moeglein et al. | |
| 2010/0183099 A1 | 7/2010 | Toda et al. | |
| 2010/0189191 A1 | 7/2010 | Taoka et al. | |
| 2010/0195527 A1 | 8/2010 | Gorokhov et al. | |
| 2010/0203887 A1 | 8/2010 | Hakscong | |
| 2010/0220679 A1 | 9/2010 | Abraham et al. | |
| 2010/0224725 A1 | 9/2010 | Perlman et al. | |
| 2010/0227562 A1 | 9/2010 | Shim et al. | |
| 2010/0232336 A1 | 9/2010 | Choudhury et al. | |
| 2010/0234071 A1 | 9/2010 | Shabtay et al. | |
| 2010/0238824 A1 | 9/2010 | Farajidana et al. | |
| 2010/0238984 A1 | 9/2010 | Sayana et al. | |
| 2010/0260060 A1 | 10/2010 | Abraham et al. | |
| 2010/0260103 A1 | 10/2010 | Guey et al. | |
| 2010/0260115 A1 | 10/2010 | Frederiksen et al. | |
| 2010/0265842 A1 | 10/2010 | Khandekar et al. | |
| 2010/0279625 A1 | 11/2010 | Ko et al. | |
| 2010/0290369 A1 | 11/2010 | Hui et al. | |
| 2010/0290382 A1 | 11/2010 | Hui et al. | |
| 2010/0296591 A1 | 11/2010 | Xu et al. | |
| 2010/0315966 A1 | 12/2010 | Weigand | |
| 2010/0316154 A1 | 12/2010 | Park et al. | |
| 2010/0316163 A1 | 12/2010 | Forenza et al. | |
| 2010/0322176 A1 | 12/2010 | Chen et al. | |
| 2010/0323611 A1 | 12/2010 | Sayantan | |
| 2011/0002371 A1 | 1/2011 | Forenza et al. | |
| 2011/0002410 A1 | 1/2011 | Forenza et al. | |
| 2011/0002411 A1 | 1/2011 | Forenza et al. | |
| 2011/0003606 A1 | 1/2011 | Forenza et al. | |
| 2011/0003607 A1 | 1/2011 | Forenza et al. | |
| 2011/0003608 A1 | 1/2011 | Forenza et al. | |
| 2011/0007856 A1 | 1/2011 | Jang et al. | |
| 2011/0019715 A1 | 1/2011 | Brisebois | |
| 2011/0038436 A1 | 2/2011 | Kim et al. | |
| 2011/0044193 A1 | 2/2011 | Forenza et al. | |
| 2011/0051832 A1 | 3/2011 | Mergen et al. | |
| 2011/0069638 A1 | 3/2011 | Ishizu et al. | |
| 2011/0076954 A1 | 3/2011 | Wee et al. | |
| 2011/0077038 A1 | 3/2011 | Montojo et al. | |
| 2011/0085610 A1 | 4/2011 | Zhuang et al. | |
| 2011/0086611 A1 | 4/2011 | Klein et al. | |
| 2011/0090840 A1 | 4/2011 | Lee et al. | |
| 2011/0090885 A1 | 4/2011 | Safavi | |
| 2011/0104174 A1 | 5/2011 | Strakhova et al. | |
| 2011/0105174 A1 | 5/2011 | Pelletier et al. | |
| 2011/0111781 A1 | 5/2011 | Chen et al. | |
| 2011/0135308 A1 | 6/2011 | Tarlazzi et al. | |
| 2011/0142020 A1 | 6/2011 | Kang et al. | |
| 2011/0142104 A1 | 6/2011 | Coldrey et al. | |
| 2011/0149765 A1 | 6/2011 | Gorokhov et al. | |
| 2011/0164597 A1 | 7/2011 | Amini et al. | |
| 2011/0164697 A1 | 7/2011 | Liao et al. | |
| 2011/0194504 A1 | 8/2011 | Gorokhov et al. | |
| 2011/0195670 A1 | 8/2011 | Dakshinamurthy et al. | |
| 2011/0199946 A1 | 8/2011 | Breit et al. | |
| 2011/0205963 A1 | 8/2011 | Tang et al. | |
| 2011/0207416 A1 | 8/2011 | Yoshimaru | |
| 2011/0211485 A1 | 9/2011 | Xu et al. | |
| 2011/0216662 A1 | 9/2011 | Nie et al. | |
| 2011/0228895 A1 | 9/2011 | Ridley et al. | |
| 2011/0261769 A1 | 10/2011 | Ji et al. | |
| 2011/0274053 A1 | 11/2011 | Baik et al. | |
| 2011/0294527 A1 | 12/2011 | Brueck et al. | |
| 2011/0305195 A1 | 12/2011 | Forck et al. | |
| 2011/0306381 A1 | 12/2011 | Jia et al. | |
| 2011/0310987 A1 | 12/2011 | Lee et al. | |
| 2011/0310994 A1 | 12/2011 | Ko et al. | |
| 2011/0315855 A1 | 12/2011 | Perlman et al. | |
| 2012/0002743 A1* | 1/2012 | Cavalcante | H04L 25/0242 375/267 |
| 2012/0014415 A1 | 1/2012 | Su et al. | |
| 2012/0014477 A1 | 1/2012 | Ko et al. | |
| 2012/0021707 A1 | 1/2012 | Forrester et al. | |
| 2012/0039419 A1 | 2/2012 | Maddah-Ali et al. | |
| 2012/0046039 A1 | 2/2012 | Hagerman et al. | |
| 2012/0051257 A1 | 3/2012 | Kim et al. | |
| 2012/0054172 A1 | 3/2012 | Agrawal et al. | |
| 2012/0076023 A1 | 3/2012 | Ko et al. | |
| 2012/0076028 A1* | 3/2012 | Ko | H04B 7/0626 370/252 |
| 2012/0076042 A1 | 3/2012 | Chun et al. | |
| 2012/0076236 A1 | 3/2012 | Ko et al. | |
| 2012/0082038 A1 | 4/2012 | Xu et al. | |
| 2012/0087261 A1 | 4/2012 | Yoo et al. | |
| 2012/0087430 A1 | 4/2012 | Forenza et al. | |
| 2012/0093078 A1 | 4/2012 | Perlman et al. | |
| 2012/0106388 A1 | 5/2012 | Shimezawa et al. | |
| 2012/0108278 A1 | 5/2012 | Kim et al. | |
| 2012/0114021 A1 | 5/2012 | Chung et al. | |
| 2012/0127977 A1 | 5/2012 | Copeland et al. | |
| 2012/0151305 A1 | 6/2012 | Zhang et al. | |
| 2012/0163427 A1 | 6/2012 | Young-Il | |
| 2012/0176982 A1 | 7/2012 | Wolfgang et al. | |
| 2012/0188988 A1 | 7/2012 | Chung et al. | |
| 2012/0218968 A1 | 8/2012 | Kim et al. | |
| 2012/0224528 A1 | 9/2012 | Tapia et al. | |
| 2012/0230691 A1* | 9/2012 | Hui | H04L 5/0035 398/58 |
| 2012/0236741 A1 | 9/2012 | Xu et al. | |
| 2012/0236840 A1 | 9/2012 | Kim et al. | |
| 2012/0252470 A1 | 10/2012 | Wong et al. | |
| 2012/0258657 A1 | 10/2012 | Scheinert | |
| 2012/0275530 A1 | 11/2012 | Olesen et al. | |
| 2012/0281555 A1 | 11/2012 | Gao et al. | |
| 2012/0281622 A1 | 11/2012 | Saban et al. | |
| 2012/0288022 A1 | 11/2012 | Guey et al. | |
| 2012/0289284 A1 | 11/2012 | Tarmo | |
| 2012/0300717 A1 | 11/2012 | Cepeda et al. | |
| 2012/0314570 A1 | 12/2012 | Forenza et al. | |
| 2012/0314649 A1 | 12/2012 | Forenza et al. | |
| 2012/0328301 A1 | 12/2012 | Gupta et al. | |
| 2013/0010840 A1 | 1/2013 | Maddah-Ali et al. | |
| 2013/0028109 A1 | 1/2013 | Joengren et al. | |
| 2013/0033998 A1 | 2/2013 | Seo et al. | |
| 2013/0038766 A1 | 2/2013 | Perlman et al. | |
| 2013/0039168 A1 | 2/2013 | Forenza et al. | |
| 2013/0039332 A1* | 2/2013 | Nazar | H04W 72/04 370/330 |
| 2013/0039349 A1 | 2/2013 | Ebrahimi et al. | |
| 2013/0039387 A1 | 2/2013 | Qu | |
| 2013/0058307 A1 | 3/2013 | Kim et al. | |
| 2013/0077514 A1 | 3/2013 | Dinan | |
| 2013/0077569 A1 | 3/2013 | Nam et al. | |
| 2013/0083681 A1 | 4/2013 | Ebrahimi et al. | |
| 2013/0089009 A1* | 4/2013 | Li | H04L 27/2601 370/278 |
| 2013/0089159 A1 | 4/2013 | Liu | |
| 2013/0094548 A1 | 4/2013 | Park | |
| 2013/0114437 A1 | 5/2013 | Yoo et al. | |
| 2013/0114763 A1 | 5/2013 | Park | |

(56) References Cited

U.S. PATENT DOCUMENTS

| | | |
|---|---|---|
| 2013/0115986 A1 | 5/2013 | Mueck et al. |
| 2013/0128821 A1 | 5/2013 | Hooli et al. |
| 2013/0142290 A1 | 6/2013 | Farmanbar et al. |
| 2013/0170360 A1 | 7/2013 | Xu et al. |
| 2013/0188567 A1* | 7/2013 | Wang .................... H04L 5/0094 370/329 |
| 2013/0195047 A1 | 8/2013 | Koivisto et al. |
| 2013/0195086 A1 | 8/2013 | Xu et al. |
| 2013/0195467 A1 | 8/2013 | Schmid et al. |
| 2013/0208604 A1* | 8/2013 | Lee ...................... H04B 7/0626 370/252 |
| 2013/0208671 A1 | 8/2013 | Royz et al. |
| 2013/0242890 A1 | 9/2013 | He et al. |
| 2013/0242956 A1 | 9/2013 | Hall |
| 2013/0272170 A1 | 10/2013 | Chatterjee et al. |
| 2013/0272250 A1 | 10/2013 | Shimezawa et al. |
| 2013/0273950 A1 | 10/2013 | Sun et al. |
| 2013/0286958 A1 | 10/2013 | Liang et al. |
| 2013/0286997 A1* | 10/2013 | Davydov ............ H04W 72/042 370/329 |
| 2013/0315189 A1* | 11/2013 | Kim ...................... H04L 1/0026 370/329 |
| 2013/0315195 A1 | 11/2013 | Ko et al. |
| 2013/0315211 A1 | 11/2013 | Balan et al. |
| 2013/0322308 A1 | 12/2013 | Yu et al. |
| 2013/0329592 A1 | 12/2013 | Warwick |
| 2014/0029490 A1 | 1/2014 | Kim et al. |
| 2014/0038619 A1 | 2/2014 | Timothy |
| 2014/0064206 A1* | 3/2014 | Bao .................... H04W 72/1278 370/329 |
| 2014/0086296 A1 | 3/2014 | Badic et al. |
| 2014/0087680 A1 | 3/2014 | Luukkala et al. |
| 2014/0094169 A1 | 4/2014 | Hiroaki |
| 2014/0112216 A1 | 4/2014 | Seo et al. |
| 2014/0113677 A1 | 4/2014 | Parkvall et al. |
| 2014/0140225 A1 | 5/2014 | Wala |
| 2014/0146756 A1 | 5/2014 | Sahin et al. |
| 2014/0153427 A1 | 6/2014 | Seo et al. |
| 2014/0185700 A1 | 7/2014 | Dong et al. |
| 2014/0198744 A1 | 7/2014 | Wang et al. |
| 2014/0206280 A1 | 7/2014 | Nilsson et al. |
| 2014/0219142 A1 | 8/2014 | Schulz et al. |
| 2014/0219152 A1 | 8/2014 | Anto et al. |
| 2014/0219202 A1 | 8/2014 | Kim et al. |
| 2014/0219267 A1 | 8/2014 | Eyuboglu et al. |
| 2014/0225788 A1 | 8/2014 | Schulz et al. |
| 2014/0226570 A1 | 8/2014 | Comeau et al. |
| 2014/0241209 A1 | 8/2014 | Pollakowski et al. |
| 2014/0241218 A1 | 8/2014 | Mehran |
| 2014/0241240 A1 | 8/2014 | Kloper et al. |
| 2014/0245095 A1* | 8/2014 | Nammi .................. H04L 1/08 714/749 |
| 2014/0295758 A1 | 10/2014 | Pedersen |
| 2014/0301345 A1 | 10/2014 | Kim et al. |
| 2014/0307630 A1 | 10/2014 | Nagata et al. |
| 2014/0340255 A1 | 11/2014 | Meerkerk et al. |
| 2014/0340260 A1 | 11/2014 | Richards |
| 2014/0341143 A1 | 11/2014 | Yang et al. |
| 2014/0348077 A1 | 11/2014 | Chen et al. |
| 2014/0348090 A1 | 11/2014 | Nguyen et al. |
| 2014/0348131 A1 | 11/2014 | Duan et al. |
| 2015/0003311 A1 | 1/2015 | Feuersaenger et al. |
| 2015/0011197 A1 | 1/2015 | Tarraf et al. |
| 2015/0016317 A1 | 1/2015 | Park et al. |
| 2015/0092416 A1 | 4/2015 | Potucek et al. |
| 2015/0098410 A1 | 4/2015 | Jongren et al. |
| 2015/0117392 A1 | 4/2015 | Hammarwall et al. |
| 2015/0118369 A1 | 4/2015 | Hyde et al. |
| 2015/0131751 A1 | 5/2015 | Bayesteh et al. |
| 2015/0270882 A1 | 9/2015 | Shattil |
| 2015/0271003 A1 | 9/2015 | Kuchi et al. |
| 2015/0296533 A1 | 10/2015 | Jin |
| 2015/0304855 A1 | 10/2015 | Perlman et al. |
| 2015/0305010 A1 | 10/2015 | Guan et al. |
| 2016/0013855 A1 | 1/2016 | Campos et al. |
| 2016/0061027 A1 | 3/2016 | Gao et al. |
| 2016/0094318 A1 | 3/2016 | Shattil |
| 2016/0157146 A1 | 6/2016 | Karabinis |
| 2016/0248559 A1 | 8/2016 | Guo et al. |
| 2016/0302028 A1 | 10/2016 | Ling et al. |
| 2016/0353290 A1 | 12/2016 | Nammi et al. |
| 2016/0374070 A1 | 12/2016 | Ghosh |
| 2019/0385057 A1 | 12/2019 | Litichever et al. |

FOREIGN PATENT DOCUMENTS

| | | |
|---|---|---|
| CA | 1309769 C | 11/1992 |
| CA | 2011298 C | 5/1999 |
| CA | 2006481 C | 9/1999 |
| CA | 2856772 A1 | 1/2006 |
| CN | 1256803 A | 6/2000 |
| CN | 1516370 A | 7/2004 |
| CN | 1538636 A | 10/2004 |
| CN | 1703113 A | 11/2005 |
| CN | 1734972 A | 2/2006 |
| CN | 1820424 A | 8/2006 |
| CN | 1898973 A | 1/2007 |
| CN | 101238648 A | 8/2008 |
| CN | 101291503 A | 10/2008 |
| CN | 101310454 A | 11/2008 |
| CN | 101405965 A | 4/2009 |
| CN | 101442388 A | 5/2009 |
| CN | 101536320 A | 9/2009 |
| CN | 101542938 A | 9/2009 |
| CN | 101682432 A | 3/2010 |
| CN | 101873281 A | 10/2010 |
| CN | 101981826 A | 2/2011 |
| CN | 102007707 A | 4/2011 |
| CN | 102185641 A | 9/2011 |
| CN | 102186541 A | 9/2011 |
| CN | 102439891 A | 5/2012 |
| CN | 102948085 A | 2/2013 |
| CN | 103069903 A | 4/2013 |
| CN | 103117975 A | 5/2013 |
| CN | 103797725 A | 5/2014 |
| CN | 104025684 A | 9/2014 |
| EP | 1359683 A1 | 11/2003 |
| EP | 1392029 A1 | 2/2004 |
| EP | 1597842 A1 | 11/2005 |
| EP | 1775937 A2 | 4/2007 |
| EP | 2244390 A2 | 10/2010 |
| EP | 2889957 A1 | 7/2015 |
| EP | 2904814 A1 | 8/2015 |
| EP | 3419188 A1 | 12/2018 |
| GB | 2300547 A | 11/1996 |
| JP | 03-179948 A | 8/1991 |
| JP | 05-231858 A | 9/1993 |
| JP | 05-333398 A | 12/1993 |
| JP | 11-252613 A | 9/1999 |
| JP | 2000-503393 A | 3/2000 |
| JP | 2001-217759 A | 8/2001 |
| JP | 2002-152995 A | 5/2002 |
| JP | 2002-281551 A | 9/2002 |
| JP | 2002-374224 A | 12/2002 |
| JP | 2003-018054 A | 1/2003 |
| JP | 2003-134013 A | 5/2003 |
| JP | 2003-179948 A | 6/2003 |
| JP | 2003-284128 A | 10/2003 |
| JP | 2004-502376 A | 1/2004 |
| JP | 2004-104206 A | 4/2004 |
| JP | 2004-229425 A | 8/2004 |
| JP | 2004-242380 A | 8/2004 |
| JP | 2005-039822 A | 2/2005 |
| JP | 2005-073313 A | 3/2005 |
| JP | 2005-159448 A | 6/2005 |
| JP | 2006-081162 A | 3/2006 |
| JP | 2006-245871 A | 9/2006 |
| JP | 2007-060106 A | 3/2007 |
| JP | 2007-116686 A | 5/2007 |
| JP | 2008-035287 A | 2/2008 |
| JP | 2009-213052 A | 9/2009 |
| JP | 2009-273167 A | 11/2009 |
| JP | 2009-540692 A | 11/2009 |

(56) References Cited

FOREIGN PATENT DOCUMENTS

| | | |
|---|---|---|
| JP | 2010-016674 A | 1/2010 |
| JP | 2010-021999 A | 1/2010 |
| JP | 2010-068496 A | 3/2010 |
| JP | 2010-074520 A | 4/2010 |
| JP | 2010-193189 A | 9/2010 |
| JP | 2010-206794 A | 9/2010 |
| JP | 2010-537577 A | 12/2010 |
| JP | 2011-035912 A | 2/2011 |
| JP | 2011-078025 A | 4/2011 |
| JP | 2011-097225 A | 5/2011 |
| JP | 2011-517393 A | 6/2011 |
| JP | 2011-524117 A | 8/2011 |
| JP | 2011-176493 A | 9/2011 |
| JP | 2012-120063 A | 6/2012 |
| JP | 2012-124859 A | 6/2012 |
| JP | 2012-175189 A | 9/2012 |
| JP | 2012-521180 A | 9/2012 |
| JP | 2012-532495 A | 12/2012 |
| JP | 2013-502117 A | 1/2013 |
| JP | 2013-507064 A | 2/2013 |
| JP | 2013-102450 A | 5/2013 |
| JP | 2016-513940 A | 5/2016 |
| KR | 10-2008-0081698 A | 9/2008 |
| KR | 10-2009-0132625 A | 12/2009 |
| KR | 10-2010-0057071 A | 5/2010 |
| KR | 10-2012-0003781 A | 1/2012 |
| KR | 10-2012-0024836 A | 3/2012 |
| KR | 10-2012-0084243 A | 7/2012 |
| KR | 10-2012-0119175 A | 10/2012 |
| KR | 10-2018-0061394 A | 6/2018 |
| RU | 2143775 C1 | 12/1999 |
| RU | 2330381 C2 | 7/2008 |
| RU | 2010110620 A | 9/2011 |
| RU | 2012121952 A | 2/2014 |
| RU | 2543092 C2 | 2/2015 |
| TW | 201031243 A | 8/2010 |
| TW | 201112665 A | 4/2011 |
| TW | 201212570 A | 3/2012 |
| TW | 201220741 A | 5/2012 |
| WO | 99/23767 A1 | 5/1999 |
| WO | 00/54463 A1 | 9/2000 |
| WO | 02/01732 A2 | 1/2002 |
| WO | 02/08785 A1 | 1/2002 |
| WO | 02/54626 A1 | 7/2002 |
| WO | 02/93784 A1 | 11/2002 |
| WO | 02/99995 A2 | 12/2002 |
| WO | 03/03604 A1 | 1/2003 |
| WO | 03/71569 A2 | 8/2003 |
| WO | 03/84092 A2 | 10/2003 |
| WO | 03/94460 A2 | 11/2003 |
| WO | 2003/107582 A2 | 12/2003 |
| WO | 2004/017586 A1 | 2/2004 |
| WO | 2004/045884 A1 | 6/2004 |
| WO | 2004/073210 A1 | 8/2004 |
| WO | 2004/077550 A1 | 9/2004 |
| WO | 2005/046081 A1 | 5/2005 |
| WO | 2005/064871 A1 | 7/2005 |
| WO | 2006/049417 A1 | 5/2006 |
| WO | 2006/063138 A2 | 6/2006 |
| WO | 2006/078019 A1 | 7/2006 |
| WO | 2006/110737 A2 | 10/2006 |
| WO | 2006/113872 A1 | 10/2006 |
| WO | 2007/024913 A1 | 3/2007 |
| WO | 2007/027825 A2 | 3/2007 |
| WO | 2007/046621 A1 | 4/2007 |
| WO | 2007/114654 A1 | 10/2007 |
| WO | 2008/119216 A1 | 10/2008 |
| WO | 2009/026400 A | 2/2009 |
| WO | 2009/099752 A1 | 8/2009 |
| WO | 2009/125962 A2 | 10/2009 |
| WO | 2009/151989 A2 | 12/2009 |
| WO | 2010/017482 A1 | 2/2010 |
| WO | 2010/019524 A2 | 2/2010 |
| WO | 2010/067419 A1 | 6/2010 |
| WO | 2011/018121 A1 | 2/2011 |
| WO | 2011/099802 A2 | 8/2011 |
| WO | 2011/100492 A1 | 8/2011 |
| WO | 2011/116824 A1 | 9/2011 |
| WO | 2011/155763 A2 | 12/2011 |
| WO | 2012/001086 A1 | 1/2012 |
| WO | 2012/007837 A1 | 1/2012 |
| WO | 2012/024454 A1 | 2/2012 |
| WO | 2012/044969 A1 | 4/2012 |
| WO | 2012/058600 A2 | 5/2012 |
| WO | 2012/061325 A1 | 5/2012 |
| WO | 2012/108807 A | 8/2012 |
| WO | 2012/108976 A1 | 8/2012 |
| WO | 2012/127246 A1 | 9/2012 |
| WO | 2012/130071 A1 | 10/2012 |
| WO | 2013/040089 A2 | 3/2013 |
| WO | 2013/166464 A1 | 11/2013 |
| WO | 2013/173809 A1 | 11/2013 |
| WO | 2014/055294 A1 | 4/2014 |
| WO | 2016/057304 A1 | 4/2016 |

OTHER PUBLICATIONS

3GPP TR 25.876 V7.0.0 (Mar. 2007), Technical Report, 3rd Generation Partnership Project; Technical Specification Group Radio Access Network; Multiple Input Multiple Output in UTRA; (Release 7), pp. 2-76.
3GPP TR 25.912, "Feasibility Study for Evolved UTRA and UTRAN", V9.0.0 (Oct. 2009), Oct. 2009, pp. 1-66.
3GPP TR 25.913, "Requirements for Evolved UTRA (E-UTRA) and Evolved UTRAN (E- UTRAN)", V8.0.0 (Jan. 2009), Jan. 2009, pp. 1-20.
3GPP TR 36.819, "3rd Generation Partnership Project; Technical Specification Group Radio Access Network Coordinated multi-point operation for LTE physical layer aspects (Release 11)", Dec. 20, 2011, 69 pages.
3GPP TS 36.211 V8.7.0 (May 2009), Technical Specification, 3rd Generation Partnership Project; Technical Specification Group Radio Access Network; Evolved Universal Terrestrial Radio Access (E-UTRA); Physical Channels and Modulation (Release 8), pp. 1-83.
3GPP, "LTE", downloaded from http://www.3gpp.org/LTE on Aug. 14, 2014, 4 pages.
3GPP, "UMTS", Universal Mobile Telecommunications System, pp. 1-2, printed on Nov. 17, 2014, Retrieved from the Internet: < URL: www.3gpp.orgarticleumts>.
3GPP, ETSI 136 212 V9.1.0 (2010), "Technical Specification LTE; Evolved Universal Terrestrial Radio Access (E-UTRA); Multiplexing and Channel Coding (3GPP TS 36.212 VERION 9.1.0 Release 9) 3GPP, ETSI 136 212 V9.1.0 (2010)" 63 pages.
3GPP, TS 36.201, "Evolved Universal Terrestrial Radio Access (E-UTRA); LTE Physical Layer- General Description (Release 11)," Oct. 2012, pp. 1-14.
3GPP, TS 36.211, "Evolved Universal Terrestrial Radio Access (E-UTRA); Physical Channels and Modulation (Release 11)," pp. 1-107, Oct. 2012, submitted as Part 1 and Part 2.
3GPP, TS 36.212, Evolved Universal Terrestrial Radio Access (E-UTRA); Multiplexing and channel coding (Release 11) pp. 1-80, Oct. 2012, submitted as Part 1 and Part 2.
3GPP, TS 36.212.V8.7.0 (May 2009), "Technical Specification 3rd Generation Partnership Project; Technical Specification Group Radio Access Network; Evolved Universal Terrestrial Radio Access (E-UTRA); Multiplexing and channel Coding (Release 8) 3GPP, TS 36.212.V8.7.0 (May 2005)," May 2009, 60 pages.
3GPP, TS 36.213, "Evolved Universal Terrestrial Radio Access (E-UTRA); Physical layer procedures (Release 11)," Oct. 2012, 145 pages.
3GPP, TS 36.808, "Evolved Universal Terrestrial Radio Access (E-UTRA); Carrier Aggregation (Release 1O)", v10.0.0, Jun. 2012, 28 pages.
Abandonment from U.S. Appl. No. 13/475,598, filed Feb. 8, 2016, 1 page.
Abandonment from U.S. Appl. No. 14/086,700, filed Dec. 26, 2017, 2 pages.

(56) References Cited

OTHER PUBLICATIONS

Abbasi N., "Capacity estimation of HF-MIMO systems", International Conference on Ionospheric Systems and Techniques, 2009, 5 pages.

Advisory Action for U.S. Appl. No. 10/758,475, dated Oct. 1, 2008, 3 pages.

Advisory Action for U.S. Appl. No. 12/802,989, dated May 4, 2017, 3 pages.

Advisory Action from U.S. Appl. No. 13/844,355, dated Jul. 17, 2019, 3 pages.

Aggarwal R., et al., "On the Design of Large Scale Wireless Systems," IEEE Journal of Selected Areas Communications, 2013, vol. 31 (2), pp. 215-225.

AIRGO—Wireless without Limits—Homepage, http:www.airgonetworks.com, printed on Apr. 9, 2004, 1 page.

Akbudak T., et al., "CoMP in Heterogeneous networks: A Low-Complexity Linear Transceiver Design,"Workshop on Cooperative and Cognitive Mobile Networks, Communications (ICC), 2012 IEEE International Conference on, IEEE, Jun. 10, 2012, pp. 5624-5629.

Aktas D., et al., "Scaling Results on the Sum Capacity of Cellular Networks with MIMO Links", IEEE Transactions on Information Theory, 2006, vol. 52, pp. 3264-3274.

Akyildiz I. F., et al., "The Evolution to 4G Cellular Systems: LTE-Advanced," Physical Communication, Elsevier, 2010, vol. 3 (2010), pp. 217-244.

Alamouti S.M., et al., "A simple transmit diversity technique for wireless communications," IEEE Journal on Selected Areas in Communications, 1998, vol. 16(8), pp. 1451-1458.

Alrabadi O.N., et al., "Beamforming via Large and Dense Antenna Arrays above a Clutter," Institute of Electrical and Electronics Engineers Journal on Selected Areas in Communications, 2013, vol. 31 (2), pp. 314-325.

Andersen J. B., et al., "The MIMO Cube—a Compact MIMO Antenna," IEEE Proceedings of Wireless Personal Multimedia Communications International Symposium, vol. 1, Oct. 2002, pp. 112-114.

Andersen J.B., "Antenna Arrays in Mobile Communications: Gain, diversity, and Channel Capacity.1," IEEE Antennas and Propagation Magazine, vol. 42 (2), Apr. 2000, pp. 12-16.

Anderson A. L., et al., "Beamforming in large-scale MIMO Multiuser Links Under a Per-node Power Constraint," Proceedings in International Symposium on Wireless Communication Systems, Aug. 2012, pp. 821-825.

Andrews J.G., "Seven Ways That Hetnet are a Cellular Paradigm Shift," IEEE Communications Magazine, Mar. 2013, [online], Retrieved from the Internet: http://users.ece.utexas.edu/-jandrews/pubs/AndHetNet CommMag2012v3.pdf, pp. 136-144.

Andrews M. R., et al., "Tripling the Capacity of Wireless Communications using Electromagnetic Polarization", Nature, 2001, vol. 409, pp. 316-318.

Anritsu, "LTE resource guide", 18 pages, 2009, www.us.anritsu.com.

Araujo D. C., et al., "Channel Estimation for Millimeter-Wave Very-Large MIMO Systems," EUSPICO 2014, in proceedings, Sep. 1-5, 2014, 5 pages.

Arnau J., et al., "Dissection of Multibeam Satellite Communications with a Large-scale Antenna System Toolbox," European Wireless 2014 (EW2014), May 14-16, 2014, pp. 548-553.

ArrayComm, "Field-Proven Results," Improving wireless economics through MAS software, printed on Mar. 28, 2011, www.arraycomm.comserve phppage=proof, 3 pages.

Artigue C., et al., "On the Precoder Design of Flat Fading MIMO Systems Equipped with MMSE Receivers: A Large System Approach", IEEE Trans Inform. Theory, 2011, vol. 57 (7), pp. 4138-4155.

AT&T, "1946: First Mobile Telephone Call" 1 page, Jun. 17, 1946 [online]. Retrieved from the Internet: http:www.corp.att.comattlabsreputationtimeline46mobile.html.

B. J. Love, D. J. Love and J. V. Krogmeier, "Like deck chairs on the Titanic: why spectrum reallocation won't avert the coming data crunch but technology might keep the wireless industry afloat", Feb. 2012, 705-719 pages.

Baker M., "LTE-Advanced Physical Layer," Alcatel-Lucent, Dec. 2009, 48 pages.

Barbieri A., et al., "Coordinated Downlink Multi-point Communications in Heterogeneous Cellular Networks", (Qualcomm), Information Theory and App. Workshop, Feb. 2012, pp. 7-16.

BelAir Networks, "Small cells", 4 pages, 2007 [online], Retrieved from the Internet:<URL:http:www.belairnetworks.comsitesdefaultfilesVVP SmallCells.pdf>.

Benedetto M.D., et al., "Analysis of the effect of the I/Q baseband i-lter mismatch in an OFDM modem," Wireless personal communications, 2000, pp. 175-186.

Bengtsson E.L., "UE Antenna Properties and Their Influence on Massive MIMO System Performance," 2002, 5 pages.

Bengtsson, M, "A Pragmatic Approach to Multi-User Spatial Multiplexing", IEEE 2002, pp. 130-134.

Bernstein, Daniel J., et al., "Post-quantum cryptography" Springer, 2009, 248 pages ISBN 978-3-540-88701-0.

Besson O., et al., "On parameter estimation of MIMO flat-fading channels with frequency offsets," IEEE Transactions on Transaction, Signal Processing, see also Acoustics, Speech, and Signal Processing, vol. 51 (3), 2003, pp. 602-613.

Bhagavatula R., et al., "Sizing up MIMO Arrays," IEEE Vehicular Technology Magazine, 2008, vol. 3 (4), pp. 31-38.

Bjornson E, et al., Designing Multi-User MIMO for Energy Efficiency: When is Massive MIMO the Answer?, IEEE Wireless Communications and Networking Conference (WCNC), Istanbul, Turkey, Apr. 2014, 6 pages.

Shen Z., et al., "Sum capacity of multiuser MIMO broadcast channels with block diagonalization," IEEE Trans. Wireless Comm, 2005, 5 pages.

Shepard C., Argos: Practical Many-Antenna Base Stations, in Proc. ACM Int. Conf. Mobile Computing and Networking (MobiCom), Aug. 2012, 12 pages.

Shepard C., ArgosV2: A Flexible Many-Antenna Research Platform, Extended Abstract for demonstration in Proc. ACM Int. Conf. Mobile Computing and Networking (MobiCom), Oct. 2013, 3 pages.

Shi, K , et al., "Coarse frame and carrier synchronization of OFDM systems: a new metric and comparison", IEEE Trans Wireless Commun., vol. 3, No. 4, (Jul. 2004), 1271-1284 pages.

Shiu D., et al., "Fading correlation and its effect on the capacity of multielement antenna systems," IEEE Trans. Comm, 2000, vol. 48 (3), pp. 502-513.

Shuangqing Wei., et al., "On the Asymptoticcapacity of MIMO Systems With Fixed Length Linear Antenna Arrays," IEEE International Conference on Communications, 2003, vol. 4, pp. 2633-2637.

Simon S.H., et al., "Optimizing MIMO Antenna Systems with Channel Covariance Feedback," IEEE Journal on Selected Areas in Communications, 2003, vol. 2003, pp. 406-417.

Simon, M.K., et al., "Digital Communication Over Fading Channels," A Unified Approach to Performance Analysis, Wiley Series in Telecommunications and Signal Processing, 2000, 10 pages.

Spencer Q. H., et al., "Zero-forcing methods for downlink spatial multiplexing in multiuser MIMO channels," IEEE Trans. Sig. Proc, 2004, vol. 52, pp. 461-471.

Spencer, Quentin H., et al., "Adaptive Antennas and MIMO Systems for Wireless Communications—An Introduction to the Multi-User MIMI Downlink", IEEE Communications Magazine, Oct. 2004, pp. 60-67.

Srinidhi N., et al., "Layered Tabu Search Algorithm for Large-MIMO Detection and a Lower Bound on ML Performance," IEEE Trans. Commun, 2010, 5 pages.

Stancil D.D., et al., "Doubling wireless channel capacity using co-polarised, co-located electric and magnetic dipoles", Electronics Letters, 2002, vol. 38 (14), pp. 746-747.

Stanford Tech Report CTSR 2005-02, "Light Field Photography with a Hand-held Plenoptic Camera,"11 pages.

(56) References Cited

OTHER PUBLICATIONS

Sternad M., et al., "Channel Estimation and Prediction for Adaptive OFDM Downlinks [Vehicular Applications]," in Proceeding IEEE Vehicular Technology Conference, vol. 2, Oct. 2003, pp. 1283-1287.
Stoytchev M., et al., "Compact antenna arrays for MIMO applications," IEEE Proc. IEEE Antennas and Prop. Symp., 2001, vol. 3, pp. 708-711.
Strangeways H., "Determination of the Correlation Distance For Spaced Antennas on Multipath HF Links and Implications for Design of SIMO and MIMO Systems," School of Electronic and Electrical Engineering, University of Leeds, IEEE First European Conf, on Antennas and Prop., 12 pages.
Strangeways, www.esaspaceweather.net/spweather/workshops/eswwll/proc/Session3/Strangew- ays HFMIMOposter.pdf.
Strangways H.J., "Investigation of signal correlation for spaced and co-located antennas on multipath HF links and implications for the design of SIMO and MIMO system," IEEE First European Conf, on Antennas and Propagation (EuCAP 2006), Nov. 2006, pp. 1-6.
Strohmer, T., et al., "Application of Time-Reversal with MMSE Equalizer to UWB Communications", Proc. of IEEE Globecom, vol. 5, pp. 3123-3127, Nov. 2004.
Studer C., et al., "PAR-Aware Large-Scale Multi-User MIMO-OFDM Downlink", IEEE J. Sel. Areas Commun., Sep. 4, 2012, vol. 31 (2), pp. 303-313.
Sulonen K., et al. "Comparison of MIMO Antenna Configurations in Picocell and Microcell Environments," IEEE Journal on Selected Areas in Communications, 2003, vol. 21 (5), pp. 703-712.
Summons to attend oral proceedings pursuant to rule 115(1) EPC for Application No. 10156954.9, Jan. 30, 2019, 8 pages.
Supplemental Notice of Allowance from U.S. Appl. No. 12/802,958, dated Dec. 3, 2018, 11 pages.
Supplementary European Search Report for Application No. EP05733294, dated Apr. 5, 2012,4 pages.
Supplementary European Search Report, EP. Appl. No. 13790935, dated Dec. 1, 2015, 9 pages.
Supplementary Partial European Search Report for Application No. EP11838640.8, dated Mar. 2, 2017, 13 pages.
Supplementary Partial European Search Report for Application No. EP14770916, dated Oct. 21, 2016, 6 pages.
Suraweera H. A, et al., Multi-Pair Amplify-and-Forward Relaying with Very Large Antenna Arrays, Proceedings in IEEE International Conference on Communications (ICC), Budapest, Hungary, Jun. 2013, 7 pages.
Suthisopapan P., et al., "Near Capacity Approaching Capacity of Large MIMO Systems by Non-Binary LDPC Codes and MMSE Detection", in Proc, of the IEEE International Symposium on Information Theory, Mar. 2012, 7 pages.
Suzuki H., et al., Highly Spectrally Efficient Ngara Rural Wireless Broadband Access Demonstrator, Proceedings in IEEE International Symposium on Communications and Information Technologies (ISCIT), Oct. 2012, 6 pages.
Suzuki H., et al., Large-scale multiple antenna fixed wireless systems for rural areas, Proceedings in IEEE PIMRC, Sep. 2012, 6 pages.
Svac P., et al., Soft-Heuristic Detectors for Large MIMO Systems, IEEE Trans. Signal Processing, 2013, vol. 61 (18), pp. 4573-4586.
Svantesson T., et al., "Analysis of Electromagnetic Field Polarizations in Multiantenna Systems," IEEE Transactions on Wireless Communications, vol. 3 (2), Mar. 2004, pp. 641-646.
Svantesson T., et al., "On Capacity and Correlation of Multi-Antenna Systems Employing Multiple Polarizations," IEEE Antennas and Propagation Society, 2002, vol. 3, pp. 202-205.
Syntonies, "FORAX RF-over-fiber Communications Systems", pages pp. 1-3, printed on Mar. 8, 2011, http://www.syntonicscorp.com/products/products-foraxRF.html.
Takeuchi K., et al. "On an Achievable Rate of Large Rayleigh Block-Fading MIMO Channels with No CSI," IEEE Transactions on Information Theory, 2011, 47 pages.
Taluja PS., et al., Diversity Limits of Compact Broadband Multi-Antenna Systems, IEEE J. Sel. Areas Communication, 2013, vol. 31 (2), pp. 326-337.
Tanaka T., et al., "Power Supply System of Electric Automobile Electric Automobile used for its System and the Same Power Supply Device,"Patent Abstract, 2005, 1 page.
Tang T., et al., "Joint frequency offset estimation and interference cancellation for MIMO- OFDM systems [mobile radio]," 2004 IEEE 60th Vehicular Technology Conference, VTC2004-Fal, 2004, vol. 3, pp. 1553-1557.
Tanumay Datta., A., et al., "A Novel Monte-Carlo-Sampling-Based Receiver for Large-Scale Uplink Multiuser MIMO Systems," IEEE Transactions on Vehicular Technology, 2013, vol. 62(7), pp. 3019-3038.
Taricco G., et al., "Asymptotic Mutual Information Statistics of Separately-Correlated Rician Fading MIMO Channels," IEEE Trans. Inform. Theory, Aug. 2008, vol. 54 (8), pp. 3490-3504.
Tarighat A., et al., "Compensation schemes and performance analysis of IQ imbalances in OFDM receivers," IEEE Signal Processing, Transactions on [see also Acoustics, Speech, and Signal Processing, IEEE Transactions on], 2005, vol. 53, pp. 3257-3268.
Tarighat, et al., "MIMO OFDM receivers for systems with IQ imbalances," IEEE Trans. Sig. Pro, for orthogonal space-time block codes (OSTBC), 2005, vol. 53, pp. 3583-3596.
Tarokh V., et al., "Space-time block codes from orthogonal designs," IEEE Trans. Info, 1999, vol. 45, pp. 1456-1467.
Tarokh V., et al., "Space-Time Codes for High Data Rate Wireless Communication: Performance Criterion and Code Construction," IEEE Transactions on Information Theory, 1998, vol. 44, pp. 744 765.
Teletar I. E., "Capacity of Multi-antenna Gaussian Channels", European Transactions on Telecommunications, vol. 10, Nov. 1999, pp. 1-28.
Tesla's Experiments With Electric Cars, Teslas FAQ No. 15, Interesting Facts About Nik, Twenty First Century Books, Could you write something about Tesla's experiments with electric cars?, downloaded from http://www.tfcbooks.com/teslafaq/q&a_015.htm dated Apr. 17, 2006, 1 page.
Teukolsky S.A., Numerical Recipes in C: The Art of Scientific Computing, Cambridge University Press, 1992, 949 pages.
Texas Instruments, "Aspects of Coordinated Multi-Point Transmission for Advanced E- UTRA," Nov. 11-15, 2008, 3GPP TSG RAN WG1 #55, R1-084444, 5 pages.
The White House, "Presidential Memorandum: Unleashing the Wireless Broadband Revolution", [retrieved on Jun. 28, 2010] Retrieved from the Internet: URL: http://www.whitehouse.gov/the-press-office/presidential-memorandum-unleashing-wireless-broadband-revolution.
Piazza D., et al., "Design and Evaluation of a Reconfigurable Antenna Array for MIMO Systems", IEEE Transactions on Antennas and Propagation, 2008, vol. 56 (3), pp. 869-881.
Ping-Heng., et al., "Compressive Sensing Based Channel Feedback Protocols for Spatially- Correlated Massive Antenna Arrays", in Proc. IEEE Wireless Communications and Networking Conference (WCNC 2012), Apr. 2012, pp. 492-497.
Pitarokoilis A. et al., "On the Optimality of Single-Carrier Transmission in Large-Scale Antenna Systems," IEEE Wireless Commun. Lett., Aug. 2012, vol. 1, No. 4, pp. 276-279.
Pitarokoilis, "Effect of Oscillator Phase Noise on Uplink Performance of Large MU-MIMO Systems," in Proc. of the 50th Annual Allerton Conference on Communication, Control, and Computing, Oct. 2012, 9 pages.
Pohl, V., et al., "Antenna spacing in MIMO indoor channels", Proc. IEEE Veh. Technol. Conf., vol. 2,, (May 2002), 749-753 pages.
Pollock et al., "Antenna Saturation Effects on MIMO Capacity," IEEE International Conference on Communications, 2003, vol. 4, pp. 2301-2305.
Post-quantum cryptography. Web. Retrieved Aug. 29, 2010. <http://pqcrypto.org/>.
Preliminary Report on Patentability and Written Opinion for Application No. PCT/US2014/025105, dated Sep. 24, 2015, 10 pages.

(56) References Cited

OTHER PUBLICATIONS

Proakis J., "Digital Communications Fourth edition," 2001, pp. 9, Department of Electrical and Computer Engineering, Northeastern University, ISBN 0-07-232111-3, Cover page, Title page, Table of Contents.
Propagation, printed Oct. 21, 2005, http://home.planet.nl/.about.alphe078/propagat1.htm, 2 pages.
Qian, "Partially Adaptive Beamforming for Correlated Interference Rejection", IEEE Trans. on Sign. Proc., 1995, vol. 43 (2), pp. 506-515.
Qibi, "A Forward Link Performance Study of the 1 xEV-DO Rev. 0 System Using Field Measurements and Simulations," Lucent Technologies. Retrieved from the Internet: http://www.cdg.org/resources/white%5Fpapers/files/white_papers/files/Luce-nt%201xEV-DO%20Rev%20O%20Mar%2004.pdf, Mar. 2004, 19 pages.
Qualcomm, "The 1000x data challenge, the latest on wireless, voice, services and chipset evolution", 4G World, Oct. 31, 2012 61 pages submitted as Parts 1-3.
Quantum Cryptography. Wikipedia: The Free Encyclopedia. Wikimedia Foundation, Inc. Jul. 26, 2014. Web. Nov. 14, 2014. <http://en.wikipedia.org/wiki/Quantum.sub.-cryptography>.
Radio Frequency Identification Tag Application for Tracking Vehicle Refueling, Maintenance, and Theft, IBM Technical disclosure Bulletin, vol. 40 (3), Mar. 1997, p. 81/82.
Rao, R., et al., "I/Q mismatch cancellation for MIMO-OFDM systems", In Personal, Indoor and Mobile Radio Communications, PIMRC 2004. 15th IEEE International Symposium on, vol. 4, (2004), pp. 2710-2714.
Rao, R.M., et al., "Multi-antenna testbeds for research and education in wireless communications", IEEE Communications Magazine, vol. 42, No. 12, (Dec. 2004), 72-81.
Rapajic P., et al., Information Capacity of Random Signature Multiple-Input Multiple Output Channel, IEEE Trans. Commun., 2000, vol. 48 (8), pp. 1245-1248.
Rappaport, T, Wireless Communications, Principles and Practice, Second Edition, Prentice Hall, 2002, ISBN 0-13-042232-0, Cover page, Title page, Table of Contents, 13 pages.
Ravindran N., et al., "MIMO Broadcast Channels with Block Diagonalization and Finite Rate Feedback", IEEE, ICASSP Apr. 2007, pp. 111-113-111-116.
Reconfigurable Radio Systems (RRS), Radio Base Station (RBS), Software Defined Radio (SOR), Status Implementations and Costs Aspects Including Future Possibilities, Technical Report, ETSI, No. V1.1.1, 2009, 24 pages.
Regenerative Power and Motion, "Electric Highway Vehicles", Aug. 2015, 10 pages, http://home.earthlink.net/ .about.fradella/car.htm.
Rejection Decision from foreign counterpart Japanese Patent Application No. JP2014264325, dated Oct. 3, 2016, 7 pages.
Renner E, "Pinhole Photography,"2000, pp. 1-5.
Requirement for Restriction/Election from U.S. Appl. No. 15/792,610, dated Jun. 11, 2018, 6 pages.
Requirement for Restriction/Election from U.S. Appl. No. 15/792,610, dated Nov. 29, 2018, 7 pages.
Restriction Requirement for U.S. Appl. No. 11/039,029, dated Apr. 12, 2006, 5 pages.
Riegler, et al., "Asymptotic Statistics of the Mutual Information for Spatially Correlated Rician Fading MIMO Channels with Interference", IEEE Trans. Inform. Theory, 2010, vol. 56 (4), pp. 1542-1559.
Robinsons., "Toward an Optimal Algorithm for Matrix Multiplication," Nov. 2005, vol. 38 (9), 3 pages.
Ruckus wireless, "Long-range 802.11 n Wi-Fi point-to-pointmultipoint backhaul," Sep. 4, 2015, 2 pages, Retrieved from the Internet:< URL: http:www. ruckuswi reless. comproductszaneflex -outdoor7731>.
Rusek, et al., "Scaling up MIMO: Opportunities and Challenges with Very Large Arrays", IEEE Signal Proces. Mag., Jan. 2012, vol. 30 (1), pp. 1-30.
Rysavy P., "No silver bullets for FCC, NTIA spectrum challenge", Daily report for executives, Bloomberg BNA, Aug. 2012, pp. 1-4, http://www.rysavy.com/Articles/2012 09 No Spectrum Silver Bullets.pdf.
S. Parkvall, E. Dahlman, A. Furuskar, Y. Jading, M. Olsson, S. Wanstedt, and K. Zangi, "LTE-Advanced-evolving LTE towards IMT-Advanced", (Ericsson) IEEE VTC, pp. 1-5, Sep. 2008.
S. Venkatesan, A. Lozano, and R. Valenzuela, "Network MIMO: overcoming inter-cell interference in indoor wireless systems", Proc. of Asilomar conf., pp. 83-87, Nov. 2007.
Saleh A. A. M., et al.,"A Statistical Model for Indoor Multipath Propagation", Institute of Electrical and Electronics Engineers Journal on Selected Areas in Communications, 1987, vol. SAC-5 (2), pp. 128-137.
Samsung: "Discussion on open-loop CoMP schemes", 3GPP Draft; R1-093377 Open- Loop Comp, 3rd Generation Partnership Project (3GPP), Mobile Competence Centre; 650, Route Des Lucioles; F-06921 Sophia-Antipolis Cedex, France, Aug. 19, 2009, 4 pages.
Sandhu et al. (US 2005/0058217); Mar. 17, 2005; Multicarrier Transmitter, Multicarrier Receiver, and Method for Communicating Multiple Spatial Signal Streams.
Sasako M., et al., "Device for Detecting Abnormality on Wheel Tread of Railcar,"Abstract, 1993, 1 page.
Schafhuber D et al., "MMSE and Adaptive Prediction of Time-Varying Channels for OFDM Systems", IEEE Trans. Wireless Commun., 2005, vol. 4 (2), pp. 593-602.
Schmidl, T.M, et al., "Robust frequency and timing synchronization for OFDM", IEEE Trans. Commun., vol. 45, No. 12, (Dec. 1997), 1613-1621 pages.
Schubert M., et al., "Joint 'Dirty Paper' Pre-Coding and Downlink Beamforming," Spread Spectrum Techniques and Applications, 2002 IEEE Seventh International Symposium, Dec. 2002, vol. 2, pp. 536-540.
Schuchert S., et al., "A novel I/O imbalance compensation scheme for the reception of OFDM signals," IEEE Transaction on Consumer Electronics, 2001, pp. 313-318.
Second Office Action and Search Report from foreign counterpart Chinese Patent Application No. 201180061132.X, dated Mar. 11, 2016, 11 pages.
Second Office Action and Search Report from foreign counterpart Chinese Patent Application No. 201580007666.2, dated Jul. 30, 2019, 8 pages.
Second Office Action and Search report from foreign counterpart Chinese Patent Application No. 201280044869.5, dated Jan. 17, 2017, 19 pages.
Second office action from foreign counterpart China Patent Application No. 200680021909.9 dated Sep. 5, 2011, 4 pages.
Second Office Action from foreign counterpart Mexican Patent Application No. MX/a/2014/013795, dated Feb. 3, 2016, 7 pages.
Serpedin, E, et al., "Blind channel and carrier frequency offset estimation using periodic modulation precoders", Signal Processing, IEEE Transactions on [see also Acoustics, Speech, and Signal Processing, IEEE Transactions on] vol. 48, No. 8, (Aug. 2000), 2389-2405 pages.
Sharif M., et al., "On the capacity of MIMO broadcast channel with partial side information," IEEE Trans. Info. Th, Feb. 2005, vol. 51 (2), pp. 506-522.
Shen Z., et al., "Low complexity user selection algorithms for multiuser MIMO systems with block diagonalization," IEEE Transactions on Signal Processing, 2005, pp. 1-12.
E. Dahlman, S. Parkvall and J. Skold, "4G: LTE/LTE-Advanced for mobile broadband", Elsevier, 2011—This is a Book!!! Need TOC, Copyright page, Title Page, Cover of book, Side of book.
Eklund C., et aL, "IEEE Standard 802.16: A Technical Overview of the WirelessMAN Air Interface for Broadband Wireless Access," IEEE Communications Magazine, Jun. 2002, 12 pages, http://ieee802.org/16/docs/02/C80216-02_05.pdf.
Ekstrom H., et al., "Technical Solutions for the 3G Long-Term Evolution", IEEE Communications Magazine, 2006, pp. 38-45.
Electromagnetic-Wave Propagation, HW Sams Publishers, Reference Data for Radio Engineers, "Electromagnetic-Wave Propagation", 5th Edition, 1973, Chapter 26., (1973), 1-32.

(56) References Cited

OTHER PUBLICATIONS

Erceg V., et al., "TGn Channel Models," IEEE 802.11-03940r4, May 2004, 45 pages.
Ericsson, The evolution of EDGE, Feb. 2007, 18 pages, downloaded from http:www.ericsson.com/res/docs/whitepapersevolution_to_edge.pdf.
ETSI Reconfigurable Radio Systems: Status and Future Directions on Software Defined Radio and Cognitive Radio Standards, IEEE Communications Magazine, IEEE Service Center, Sep. 2010, vol. 48 (9), pp. 78-86.
ETSI, Mobile Technologies GSM, Retrieved from the Internet: URL http://www.etsi.org/WebSite/Technologies/gsm.asp on Aug. 14, 2014, 2 pages.
European Search Report and Search Opinion, EP App. No. 05254757.7, dated Sep. 13, 2005, 9 pages.
European Search Report for Application No. 10156954.9-2411, dated Sep. 2, 2010, 5 pages.
European Search Report, EP. App. No. 19159810.1, dated Sep. 25, 2019, 8 pages.
Examination Report from counterpart Australian Patent Application No. AU2014200745, dated Sep. 25, 2015, 3 pages.
Examination Report from foreign counterpart Australian Patent Application No. 2016219662, dated Sep. 9, 2016, 2 pages.
Examination report from foreign counterpart Indian Patent Application No. 3496/CHENP/2013, dated Oct. 29, 2018, 7 pages.
Examination Report from foreign counterpart New Zealand Patent Application No. 622137, dated Dec. 21, 2016, 3 pages.
Examination Report No. 1 from Foreign Counterpart Australian Patent Application No. 2012308632, dated Oct. 11, 2016, 3 pages.
Examination report No. 1 from foreign counterpart Australian Patent Application No. 2015214278, dated Jun. 5, 2018, 4 pages.
Examination report No. 1 from foreign counterpart Australian Patent Application No. 2015248161, dated Jul. 2, 2018, 5 pages.
Examination report No. 1 from foreign counterpart Australian Patent Application No. 2018253582, dated Jun. 3, 2019, 3 pages.
Examination Report No. 2 from Foreign Counterpart Australian Patent Application No. 2012308632, dated Jun. 6, 2017, 5 pages.
Examination report No. 2 from foreign counterpart Australian Patent Application No. 2017210619, dated May 31, 2019, 4 pages.
Examination report No. 4 from foreign counterpart Australian Patent Application No. 2013347803, dated Jan. 25, 2018, 6 pages.
Examination report, AU App. No. 2018241100, dated Sep. 27, 2019, 2 pages.
Examiner Report from foreign counterpart Canada Patent Application No. 2,562,657, dated Aug. 31, 2015, 3 pages.
Examiner's Report from counterpart Australian Patent Application No. 2013256044, dated May 9, 2016, 2 pages.
Examiner's Report from foreign counterpart Australian Patent Application No. 2010256510, dated Apr. 16, 2015, 3 pages.
Examiner's Report from foreign counterpart Canadian Patent Application No. 2539333, dated Dec. 4, 2012, 15 pages.
Examiner's Report from foreign counterpart Canadian Patent Application No. 2657309, dated Apr. 16, 2015, 3 pages.
Examiner's Report from foreign counterpart Canadian Patent Application No. 2657309, dated Apr. 25, 2016, 4 pages.
Examiner's Report from foreign counterpart Canadian Patent Application No. 28656772, dated Jan. 7, 2016, 3 pages.
Examiner's Report from foreign counterpart Canadian Patent Application No. CA2659572, dated Jul. 29, 2015, 3 pages.
Examiner's Report from foreign counterpart Canadian Patent Application No. CA2695799, dated Apr. 1, 2015, 4 pages.
Extended European Search Report for Application No. 06750805.1, dated Dec. 1, 2016, 12 pages.
Extended European Search Report for Application No. 08798313.6, dated Nov. 14, 2012, 10 pages.
Extended European Search Report for Application No. 10156950.7, dated Jun. 11, 2012, 10 pages.
Extended European Search Report for Application No. 10184659.0, dated Nov. 29, 2012, 8 pages.
Extended European Search Report for Application No. 11838640.8, dated May 31, 2017, 15 pages.
Extended European Search Report for Application No. 13843203.4, dated Feb. 15, 2016, 8 pages.
Extended European Search Report for Application No. 13856705.2, dated Mar. 2, 2016, 10 pages.
Extended European Search Report for Application No. 14770916.6, dated Jan. 24, 2017, 12 pages.
Extended European Search Report for Application No. 14779084.4, dated Sep. 29, 2016, 8 pages.
Extended European Search Report for Application No. 15746217.7, dated Jan. 22, 2018, 18 pages.
Extended European Search Report for Application No. 15780522.7, dated Feb. 6, 2018, 13 pages.
Extended European Search Report for Application No. 18186156.8, dated Nov. 26, 2018, 7 pages.
Extended Search Report from counterpart European Patent Application No. EP13784690.3, dated Nov. 23, 2015, 4 pages.
Extended Search Report from foreign counterpart European Patent Application No. 06718208.8, dated Jan. 22, 2015, 6 pages.
Fakhereddin M.J., et al., "Combined effect of polarization diversity and mutual coupling on MIMO capacity," Proc. IEEE Antennas and Prop. Symp, 2003, vol. 2, pp. 495-498.
FCC, Broadband action agenda, National Broadband Plan, 2010, pp. 1-8, Retrieved from the Internet: http://www.broadband.gov/plan/national-broadband-plan-action-agenda. pdf.
FCC, Open commission meeting, Sep. 23, 2010, Retrieved from the Internet: http:reboot.fcc.govopen-meetings2010september, 3 pages.
Federal Communications Commission, "Authorization of Spread Spectrum Systems under Parts 15 and 90 of the FCC Rules and Regulations", Jun. 1985, 18 pages.
Further Examination Report (Postponed Acceptance) from foreign counterpart New Zealand Patent Application No. 728719, dated Jan. 31, 2018, 2 pages.
Further Examination Report from foreign counterpart New Zealand Application No. 701567, dated Aug. 24, 2016, 6 pages.
Further Examination Report from foreign counterpart New Zealand Application No. 701691, dated Sep. 26, 2016, 3 pages.
Further Examination Report from foreign counterpart New Zealand Patent Application No. 717370, dated Aug. 3, 2017, 4 pages.
Fusco T., et al., "Blind Frequency-offset Estimation for OFDM/OQAM Systems," IEEE Transactions on [see also Acoustics, Speech, and Signal Processing, IEEE Transactions on], 2007, vol. 55, pp. 1828-1838.
G. Guthy, et al., Large System Analysis of the Successive Encoding Successive Allocation Method for the MIMO BC, Proc, of the International ITG Workshop on Smart Antennas, Bremen, Germany, Feb. 2010.
Gao X., et al., "Linear Pre-Coding Performance in Measured Very-Large MIMO Channels," IEEE Vehicular Technology, 2011, pp. 1-5.
Garcia, C.R., et al., "Channel Model for Train to Train Communication Using the 400 MHz Band", in Proc. of IEEE Vehicular Technology Conference, pp. 3082-3086, May 2008.
Gesbert D., et al., "From Theory to Practice: An Overview of MIMO Space—Time Coded Wireless Systems," IEEE Journal on Selected Areas in Communications, 2003, vol. 21 (3), pp. 281-302.
Gesbert D., et al., "Multi-Cell MIMO Cooperative Networks: A New Look at Interference," IEEE Journal on Selected Areas in Communications, Dec. 2010, vol. 28 (9), pp. 1380-1408.
Gesbert, David, et al., "Outdoor MIMO Wireless Channels: Models and Performance Prediction", IEEE Transactions on Communications, vol. 50, No. 12, Dec. 2002, pp. 1926-1934.
Ghogho, M, et al., "Training design for multipath channel and frequency offset estimation in MIMO systems", Signal Processing, IEEE Transactions on [see also Acoustics, Speech, and Signal Processing, IEEE Transactions on], vol. 54, No. 10, (Oct. 2006), 3957-3965 pages.
Glazunov A.A., et al., "Experimental Characterization of the Propagation Channel along a Very Large Virtual Array in a Reverberation Chamber", Progress in Electromagnetics Research B, 2014, vol. 59, pp. 205-217.

(56) References Cited

OTHER PUBLICATIONS

Goldman D., "Sorry, America: your wireless airwaves are full", CNN Money, 3 pages, http://money.cnn.com/2012/02/21/technology/spectrum crunch/index html.

Gopalakrishnan B., et al., "An Analysis of Pilot Contamination on Multi-User MIMO Cellular Systems with Many Antennas," Proceedings in Signal Processing Advances in Wireless Communications, 2011, pp. 381-385.

Gottesman S., et al., "New Family of Binary Arrays for Coded Aperture imaging,"Applied Optics, 1989, vol. 28(20), pp. 4344-4392.

Govindasamy S., et al., "Asymptotic Spectral Efficiency of the Uplink in Spatially Distributed Wireless Networks with Multi-Antenna Base Stations," IEEE Transactions on Communications, 2013, vol. 61(7), 100 pages.

GSMA, "GSM technology" 1 page, printed on Aug. 14, 2014, http://www.gsmworld.com/technology/index.htm.

Guey J.C., et al., "Modeling and Evaluation of MIMO Systems Exploiting Channel Reciprocity in TDD Mode," VTC 2004-Fall, IEEE 60th, Oct. 2004, pp. 4265-4269.

Guillaud M., et al., "A Practical Method for Wireless Channel Reciprocity Exploitation Through Relative Calibration", IEEE Proceedings of Sign Processing, Aug. 2005, vol. 1, pp. 403-406.

Guillaud M., et al., "A Specular Approach to MIMO Frequency selective Channel Tracking and Prediction," Fifth IEEE Workshop on Signal Processing Advances in Wireless Communications, Jul. 11-14, 2004, pp. 59-63.

Gunashekar G., "Investigations into the Feasibility of MIMO Techniques within the HF Band: Preliminary Results," Radio Science, 2009, 33 pages.

Gunson J., et al., "Optimum Design of a Coded Mask X-Ray Telescope for Rocket Applications,"Monthly Notices of the Royal Astronomical Society, 1976, vol. 177, pp. 485-497.

Guthy C., et al., "Large System Analysis of Sum Capacity in the Gaussian MIMO Broadcast Channel", IEEE J. Sel. Areas Communication, 2013, vol. 31 (2), pp. 149-159.

Hachem W., et al., "A New Approach for Mutual Information Analysis of Large Dimensional Multi-Antenna Channels," IEEE Transactions on Information Theory, 2008, vol. 54(9), pp. 3987-4004.

Hakkarainen A., et al., "Widely-Linear Beamforming and RF Impairment Suppression in Massive Antenna Arrays", Journal of Communications and Networks, 2013, vol. 15 (4), pp. 383-397.

Hallen H., "Long-Range Prediction of Fading Signals", Institute of Electrical and Electronics Engineers Signal Processing Magazine, 2000, vol. 17 (3), pp. 62-75.

Haring, L., "Residual carrier and sampling frequency synchronization in multiuser OFDM systems", VTC -Spring. IEEE 63rd Vehicular Technology Conference, vol. 4, (2006), 1937-1941 pages.

Hazlett et al., "Radio Spectrum for a Hungry Wireless World", Sep. 22, 2011, 41 pages.

Heath R W., et al., "Antenna selection for spatial multiplexing systems with linear receivers," IEEE Trans. Comm, 2001, vol. 5, pp. 142-144.

Heath R.W., et al., "Exploiting Limited Feedback in Tomorrow's Wireless Communication Networks," IEEE Journal on Sel. Areas in Comm., Special Issue on Exploiting Limited Feedback in Tomorrow's Wireless Communication Networks, 2008, vol. 26 (8), pp. 1337-1340.

Heath R.W., et al., "Switching between Multiplexing and Diversity Based on Constellation Distance," Proc. of Allerton Conf on 208, Comm Control and Comp, Oct. 4-6, 2000, pp. 212-221.

Heath, Robert W., et al., "Switching between diversity and multiplexing in MIMO systems", IEEE Trans. Comm., vol. 53, No. 6, (Jun. 2005), 962-968 pages.

Hendriks B., et al., "Through a Lens Sharply,"IEEE Spectrum, 2004, pp. 32-36.

Hewlett Packard, "GPS and Precision Timing Applications", Application Note 1272, pp. 1-28, May 1996.

High Frequency Active Auroroal Research Program—Homepage, printed Apr. 9, 2004, http:www.haarp.alaska.edu, 1 page.

Hochwald B., et al., "Multi-Antenna Channel Hardening and its Implications for Rate Feedback and Scheduling", Institute of Electrical and Electronics Engineers Transactions on Information Theory, 2004, vol. 50 (9), pp. 1893-1909.

Hochwald B.M., et al., "A Vector-Perturbation Technique for Near-Capacity Multiantenna Multiuser Communication—Part I: Channel Inversion and Regularization", Institute of Electrical and Electronics Engineers Transactions on Communications, 2005, vol. 53 (1), pp. 195-202.

Hochwald B.M., et al., "A Vector-Perturbation Technique for Near-Capacity Multiantenna Multiuser Communication-Part II: Perturbation", Institute of Electrical and Electronics Engineers Transactions on Communications, 2005, vol. 53 (3), pp. 537-544.

Hoeffert M., et al., "Climate Change and Energy, Overview", Encyclopedia of Energy, vol. 1, Copyright 2004, Elsevier, Article No. NRGY: 00396, 23 pages.

Hong M., et al. "Joint Base Station Clustering and Beamformer Design for Partial Coordinated Transmission in Heterogenous Networks," IEEE Journal on Selected Areas in Communications, 2013, vol. 31 (2), pp. 226-240.

Hosseini K., et al., "Massive MIMO and Small Cells: How to Densify Heterogeneous Networks," Wireless Communications Symposium, IEEE ICC, 2013, p. 5442 5447.

Hoydis J., et al., "Iterative Deterministic Equivalents for the Performance Analysis of Communication Systems," Dec. 18, 2011, pp. 1-43.

Huang Y., et al., "Joint Beamforming and Power Control in Coordinated Multicell: Max-Min Duality, Effective Network and Large System Transition," IEEE Transactions on Wireless Communications, 2013, pp. 1-14.

Huawei, et al., "CoMP Clarification of definitions and TP," R1-084351, Nov. 10-14, 2008, 3GPP TSG RAN WG1 Meeting #55, 7 pages.

Huff G. H., et al., "A Novel Radiation Pattern and Frequency Reconfigurable Single Turn Square Spiral Microstrip Antenna", IEEE Microwave and Wireless Components Letters, vol. 13 (2), Feb. 2003, pp. 57-59.

Huh H., et al., Achieving "Massive MIMO" Spectral Efficiency with a Not-so-Large Number of Antennas. IEEE Transactions on Wireless Communications, Sep. 2012, vol. 11 (9), pp. 3226-3239.

Huh H., et al., Multi-cell MIMO Downlink with Cell Cooperation and Fair Scheduling: A Large- System Limit Analysis, IEEE Transactions on Information Theory, 2011, vol. 57 (12), pp. 7771-7786.

IEEE 802.22, "IEEE 802.22 Working Group on Wireless Regional Area Networks", [online], [retrieved on Aug. 14, 2014], Retrieved from the Internet: URL:http:www.ieee802.org/22/, 1 page.

IntelliCell: A Fully Adaptive Approach to Smart Antennas, ArrayComm, Incorporated, WP-ISA-031502-2.0, (2002), 1-18.

Notice of Allowance from U.S. Appl. No. 11/210,098, dated Oct. 21, 2009, 7 pages.

Notice of Allowance from U.S. Appl. No. 11/899,814, dated Mar. 23, 2010, 5 pages.

Notice of Allowance from U.S. Appl. No. 12/291,856, dated Jun. 28, 2012, 8 pages.

Notice of Allowance from U.S. Appl. No. 12/291,858, dated Feb. 25, 2013, pages.

Notice of Allowance from U.S. Appl. No. 12/291,858, dated Oct. 15, 2012, 8 pages.

Notice of Allowance from U.S. Appl. No. 12/691,500, dated Apr. 29, 2011, 7 pages.

Notice of Allowance from U.S. Appl. No. 12/691,500, dated Dec. 27, 2010, 5 pages.

Notice of Allowance from U.S. Appl. No. 12/802,976, dated Apr. 14, 2011, 8 pgs.

Notice of Allowance from U.S. Appl. No. 12/802,976, dated Mar. 14, 2011, 9 pages.

Notice of Allowance from U.S. Appl. No. 12/802,976, dated Nov. 29, 2010, 6 pgs.

Notice of Allowance from U.S. Appl. No. 13/226,461, dated Jun. 12, 2012, 7 pages.

Notice of Allowance from U.S. Appl. No. 13/475,596, dated Oct. 19, 2015, 29 pages.

(56) References Cited

OTHER PUBLICATIONS

Notice of Allowance from U.S. Appl. No. 13/797,950, dated Apr. 16, 2018, 117 pages.
Notice of Allowance from U.S. Appl. No. 13/797,950, dated Aug. 2, 2018, 23 pages.
Notice of Allowance from U.S. Appl. No. 14/156,254, dated Nov. 11, 2015, 29 pages.
Notice of Allowance from U.S. Appl. No. 14/187,759, dated Jun. 23, 2015, 16 pages.
Notice of Allowance from U.S. Appl. No. 10/817,731, dated Sep. 30, 2010, 6 pages.
Notice of Allowance from U.S. Appl. No. 10/902,978, dated Apr. 16, 2008, 7 pages.
Notice of Allowance from U.S. Appl. No. 10/902,978, dated Jun. 27, 2008, 7 pages.
Notice of Allowance from U.S. Appl. No. 11/256,478, dated Jan. 26, 2010, 9 pages.
Notice of Allowance from U.S. Appl. No. 11/256,478, dated Jul. 30, 2009, 9 pages.
Notice of Allowance from U.S. Appl. No. 11/256,478, dated Oct. 29, 2009, 16 pages.
Notice of Allowance from U.S. Appl. No. 11/894,362, dated Mar. 23, 2009, 10 pages.
Notice of Allowance from U.S. Appl. No. 11/894,362, dated Nov. 10, 2009, 5 pages.
Notice of Allowance from U.S. Appl. No. 11/894,362, dated Sep. 3, 2009, 12 pages.
Notice of Allowance from U.S. Appl. No. 11/894,394, dated Jul. 30, 2009, 14 pages.
Notice of Allowance from U.S. Appl. No. 11/894,394, dated Jun. 26, 2009, 5 pgs.
Notice of Allowance from U.S. Appl. No. 11/894,394, dated Mar. 6, 2009, 11 pages.
Notice of Allowance from U.S. Appl. No. 11/894,540, dated Nov. 9, 2009, 5 pages.
Notice of Allowance from U.S. Appl. No. 11/894,540, dated Sep. 14, 2009, 13 pages.
Notice of Allowance from U.S. Appl. No. 12/143,503 , dated Aug. 18, 2011, 12 pages.
Notice of Allowance from U.S. Appl. No. 12/143,503, dated Apr. 11, 2011, 9 pages.
Notice of Allowance from U.S. Appl. No. 12/143,503, dated Dec. 9, 2011, 11 pages.
Notice of Allowance from U.S. Appl. No. 12/630,627, dated Sep. 25, 2013, 11 pages.
Notice of Allowance from U.S. Appl. No. 12/637,643, dated Jan. 17, 2013, 11 pages.
Notice of Allowance from U.S. Appl. No. 12/802,938, dated Apr. 4, 2013, 16 pages.
Notice of Allowance from U.S. Appl. No. 12/802,938, dated Dec. 6, 2012, 37 pages.
Notice of Allowance from U.S. Appl. No. 12/802,938, dated May 24, 2013, 10 pages.
Notice of Allowance from U.S. Appl. No. 12/802,938, dated Sep. 19, 2012, 8 pages.
Notice of Allowance from U.S. Appl. No. 12/802,974, dated Feb. 28, 2017, 15 pages.
Notice of Allowance from U.S. Appl. No. 12/802,974, dated Jun. 30, 2017, 89 pages.
Notice of Allowance from U.S. Appl. No. 12/802,974, dated Oct. 4, 2017, 17 pages.
Notice of Allowance from U.S. Appl. No. 12/802,974, dated Sep. 29, 2016, 5 pages.
Notice of Allowance from U.S. Appl. No. 12/802,976, dated Apr. 14, 2011, 16 pages.
Notice of Allowance from U.S. Appl. No. 12/802,976, dated Aug. 22, 2011, 8 pages.
Notice of Allowance from U.S. Appl. No. 12/802,976, dated Dec. 9, 2011, 11 pages.
Notice of Allowance from U.S. Appl. No. 12/802,976, dated Nov. 29, 2010, 7 pages.
Notice of Allowance from U.S. Appl. No. 12/802,988, dated Nov. 15, 2018, 11 pages.
Notice of Allowance from U.S. Appl. No. 12/802,988, dated Sep. 25, 2018, 96 pages.
Notice of Allowance from U.S. Appl. No. 12/802,989 dated Jun. 27, 2017, 121 pages.
Notice of Allowance from U.S. Appl. No. 12/802,974, dated Sep. 13, 2016, 43 pages.
Notice of Allowance from U.S. Appl. No. 12/917,257, dated May 31, 2013, 12 pages.
Notice of Allowance from U.S. Appl. No. 13/232,996, dated Jan. 9, 2019, 11 pages.
Notice of Allowance from U.S. Appl. No. 13/232,996, dated Oct. 12, 2016, 5 pages.
Notice of Allowance from U.S. Appl. No. 13/232,996, dated Oct. 26, 2016, 4 pages.
Notice of Allowance from U.S. Appl. No. 13/232,996, dated Mar. 20, 2019, 10 pages.
Notice of Allowance from U.S. Appl. No. 13/233,006, dated Apr. 3, 2019, 19 pages.
Notice of Allowance from U.S. Appl. No. 13/233,006, dated Jul. 12, 2019, 12 pages.
Notice of Allowance from U.S. Appl. No. 13/233,006, dated May 30, 2019 12 pages.
Notice of Allowance from U.S. Appl. No. 13/461,682, dated Oct. 2, 2014, 10 pages.
Notice of Allowance from U.S. Appl. No. 13/464,648, dated Aug. 14, 2015, 21 pages.
Notice of Allowance from U.S. Appl. No. 13/464,648, dated Aug. 25, 2015, 4 pages.
Notice of Allowance from U.S. Appl. No. 13/464,648, dated Feb. 23, 2016, 15 pages.
Notice of Allowance from U.S. Appl. No. 13/464,648, dated Nov. 30, 2015, 12 pages.
Notice of Allowance from U.S. Appl. No. 13/464,648, dated Sep. 19, 2014, 5 pages.
Notice of Allowance from U.S. Appl. No. 13/464,648, dated Apr. 24, 2015, 23 pages.
Notice of Allowance from U.S. Appl. No. 13/464,648, dated Jan. 9, 2015, 11 pages.
Notice of Allowance from U.S. Appl. No. 13/475,598, dated Feb. 14, 2017, 41 pages.
Notice of Allowance from U.S. Appl. No. 13/475,598, dated Oct. 19, 2015, 29 pages.
Notice of Allowance from U.S. Appl. No. 13/633,702, dated Aug. 15, 2014, 11 pages.
Notice of Allowance from U.S. Appl. No. 13/633,702, dated Jan. 6, 2015, 27 pages.
Notice of Allowance from U.S. Appl. No. 13/797,971, dated Jan. 29, 2018, 15 pages.
Notice of Allowance from U.S. Appl. No. 13/797,971, dated May 4, 2017, 8 pages.
Notice of Allowance from U.S. Appl. No. 13/797,971, dated Oct. 18, 2017, 144 pages.
Notice of Allowance from U.S. Appl. No. 13/797,984, dated Jan. 17, 2018, 146 pages.
Notice of Allowance from U.S. Appl. No. 13/797,984, dated Oct. 19, 2017, 10 pages.
Notice of Allowance from U.S. Appl. No. 14/023,302, dated Apr. 27, 2016, 3 pages.
Notice of Allowance from U.S. Appl. No. 14/023,302, dated Feb. 5, 2016, 27 pages.
Notice of Allowance from U.S. Appl. No. 14/023,302, dated May 17, 2016 5 pages.
Notice of Allowance from U.S. Appl. No. 14/023,302, dated Oct. 9, 2015, 5 pages.
Notice of Allowance from U.S. Appl. No. 14/086,700, dated Feb. 28, 2018, 5 pages.
Notice of Allowance from U.S. Appl. No. 14/086,700, dated May 18, 2018, 21 pages.

(56) References Cited

OTHER PUBLICATIONS

Notice of Allowance from U.S. Appl. No. 14/086,700, dated Sep. 28, 2018, 21 pages.
Notice of Allowance from U.S. Appl. No. 14/156,254, dated Feb. 26, 2016, 21 pages.
Notice of Allowance from U.S. Appl. No. 14/156,254, dated Jul. 8, 2015, 7 pages.
Notice of Allowance from U.S. Appl. No. 14/156,254, dated Mar. 12, 2015, 5 pages.
Notice of Allowance from U.S. Appl. No. 14/156,254, dated Nov. 3, 2015, 29 pages.
Notice of Allowance from U.S. Appl. No. 15/057,002, dated Apr. 16, 2019, 11 pages.
Notice of Allowance from U.S. Appl. No. 15/181,383, dated Jan. 25, 2019, 87 pages.
Notice of Allowance from U.S. Appl. No. 15/181,383, dated Mar. 20, 2019, 10 pages.
Notice of Allowance from U.S. Appl. No. 15/201,276, dated Jan. 23, 2019, 29 pages.
Notice of Allowance from U.S. Appl. No. 15/201,276, dated Oct. 11, 2018, 5 pages.
Notice of Allowance from U.S. Appl. No. 15/201,276, dated May 28, 2019, 4 pages.
Notice of Allowance from U.S. Appl. No. 15/201,276, dated Nov. 27, 2017, 7 pages.
Notice of Allowance from U.S. Appl. No. 15/616,817, dated Jun. 26, 2018, 131 pages.
Notice of Allowance from U.S. Appl. No. 15/616,817, dated Oct. 22, 2018, 21 pages.
Notice of Allowance from U.S. Appl. No. 15/616,817, dated Apr. 25, 2018, 10 pages.
Notice of Allowance, for U.S. Appl. No. 12/917,257, dated Feb. 15, 2013, 18 pages.
Notice of Allowance, KR App. No. 10-2014-7009876, dated Oct. 4, 2019, 3 pages (1 page of English Translation and 2 pages of Original Document).
Notice of Allowance, KR App. No. 10-2018-7035654, dated Oct. 2, 2019, 4 pages (2 pages of English Translation and 2 pages of Original Document).
Advisory Action, U.S. Appl. No. 14/611,565, dated Feb. 7, 2020, 3 pages.
Communication pursuant to Article 94(3) EPC, EP App. No. 05254757.7, dated Sep. 2, 2020, 5 pages.
Communication Pursuant to Article 94(3) EPC, EP App. No. 10156950.7, dated Dec. 12, 2017, 9 pages.
Communication pursuant to Article 94(3) EPC, EP App No. 10184659.0, dated Sep. 2, 2020, 5 pages.
Communication Pursuant to Article 94(3) EPC, EP App No. 12762167.0, dated Sep. 30, 2016, 6 pages.
Communication Pursuant to Article 94(3) EPC, EP App No. 13784690.3, dated Apr. 15, 2019, 4 pages.
Communication Pursuant to Article 94(3) EPC, EP App. No. 13843203.4, dated Feb. 25, 2019, 6 pages.
Communication Pursuant to Article 94(3) EPC, EP App. No. 13843203.4, dated Mar. 23, 2018, 5 pages.
Communication Pursuant to Article 94(3) EPC, EP App. No. 14770916.6, dated Mar. 13, 2018, 5 pages.
Communication Pursuant to Article 94(3) EPC, EP App. No. 15780522.7, dated Mar. 19, 2020, 6 pages.
Communication pursuant to Article 94(3) EPC, EP App. No. 18186156.8, dated Jun. 12, 2020, 6 pages.
Communication under Rule 71(3) EPC, EP App. No. 10156950.7, dated Jan. 7, 2020, 6 pages.
Corrected Notice of Allowability, U.S. Appl. No. 16/436,864, dated Jul. 22, 2020, 2 pages.
Decision of Grant, RU App. No. 2016144927, dated Nov. 29, 2019, 8 pages of Original Document Only.
Decision to grant a European patent, EP App. No. 10156950.7, dated May 8, 2020, 2 pages.
Divisional Notification CN App. No. 201710491990.7, dated Jul. 13, 2020, 4 pages (2 pages of English Translation and 2 pages of Original Document).
European Search Report and Search Opinion, EP App. No. 17844265.3, dated Feb. 21, 2020, 12 pages.
European Search Report and Search Opinion, EP App. No. 17864744.2, dated Aug. 14, 2020, 15 pages.
Examination Report No. 2, NZ App. No. 761315, dated Aug. 5, 2020, 3 pages.
Examination Report No. 3, AU App. No. 2019200838, dated Aug. 4, 2020, 5 pages.
Final Office Action, U.S. Appl. No. 14/611,565, dated Sep. 3, 2020, 7 pages.
Final Office Action, U.S. Appl. No. 16/188,841, dated Jul. 7, 2020, 17 pages.
Fourth Office Action, CN App. No. 201480016091.6, dated Dec. 10, 2019, 6 pages (3 pages of English Translation and 3 pages of Original Document).
Intention to Grant, EP App. No. 13790935.4, dated Jun. 24, 2020, 8 pages.
Li et al., "MIMO techniques in WiMAX and LTE a feature overview", IEEE Communications Magazine, May 2010, pp. 86-92.
Non Final Office Action, U.S. Appl. No. 16/505,593, dated Sep. 10, 2020, 12 pages.
Non-Final Office Action, U.S. Appl. No. 14/611,565, dated Mar. 25, 2020, 5 pages.
Non-Final Office Action, U.S. Appl. No. 14/672,014, dated Jun. 8, 2020, 11 pages.
Non-Final Office Action, U.S. Appl. No. 15/340,914, dated Mar. 25, 2020, 15 pages.
Non-Final Office Action, U.S. Appl. No. 15/682,076, dated May 27, 2020, 8 pages.
Non-Final Office Action, U.S. Appl. No. 15/792,610, dated Apr. 29, 2020, 7 pages.
Non-Final Office Action, U.S. Appl. No. 16/188,841, dated Jan. 22, 2020, 9 pages.
Non-Final Office Action, U.S. Appl. No. 16/208,895, dated Jan. 3, 2020, 7 pages.
Non-Final Office Action, U.S. Appl. No. 16/208,895, dated Jul. 28, 2020, 7 pages.
Non-Final Office Action, U.S. Appl. No. 16/436,864, dated Mar. 4, 2020, 6 pages.
Non-Final Office Action, U.S. Appl. No. 16/578,265, dated May 12, 2020, 8 pages.
Notice of Acceptance, NZ App. No. 751530, dated May 1, 2020, 2 pages.
Notice of Allowance, CA App. No. 2,848,355, dated Apr. 3, 2020, 1 page.
Notice of Allowance, CN App. No. 201480016091.6, dated Apr. 24, 2020, 8 pages (3 pages of English Translation and 5 pages of Original Document).
Notice of Allowance, IL App. No. 248265, dated May 7, 2020, 3 pages.
Notice of Allowance, TW App. No. 107123446, dated Nov. 20, 2019, 3 pages of Original Document Only.
Notice of Allowance, U.S. Appl. No. 12/802,975, dated Apr. 17, 2020, 12 pages.
Notice of Allowance, U.S. Appl. No. 12/802,975, dated Aug. 26, 2020, 14 pages.
Notice of Allowance, U.S. Appl. No. 16/188,841, dated Sep. 10, 2020, 9 pages.
Notice of Allowance, U.S. Appl. No. 16/436,864, dated Jun. 11, 2020, 5 pages.
Notice of Allowance, U.S. Appl. No. 16/253,028, dated Feb. 25, 2020, 7 pages.
Notice of Allowance, U.S. Appl. No. 16/253,028, dated Mar. 12, 2020, 7 pages.
Office Action, AU App. No. 2019202296, dated May 12, 2020, 5 pages.
Office Action, CA App. No. 2816556, dated May 19, 2020, 3 pages.
Office Action, IL App. No. 241319, dated Nov. 26, 2019, 6 pages (3 pages of English Translation and 3 pages of Original Document).

(56) References Cited

OTHER PUBLICATIONS

Bjornson E, et al., Massive MIMO and Small Cells: Improving Energy Efficiency by Optimal Soft-Cell Coordination, ICT, 2013, Wireless Communications Symposium, pp. 5442-5447.
Blelloch, "Introduction to Data Compression", Carnegie Mellon University Tech. Report Sep. 2010, pp. 1-55.
Boche H., et al., "A General Duality Theory for Uplink and Downlink Beamforming", 2002, vol. 1, pp. 87-91.
Boche H., et al., "Analysis of Different Precoding decoding Strategies for Multiuser Beamforming", IEEE Vehicular Technology Conference, 2003, vol. 1, pp. 39-43.
Bourdoux A., et al., "Non-reciprocal Transceivers in OFDM/SDMA Systems: Impact and Mitigation", IEEE, 2003, pp. 183-186.
Brassard, Gilles, et al., "A Quantum Bit Commitment Scheme Provably Unbreakable by both Parties". IEEE, FOGS 1993, pp. 362-371.
Brodersen R et al., "Degrees of Freedom in Multiple Antenna Channels: A Signal Space Approach," IEEE Transactions on Information Theory, 2005, vol. 51 (2), pp. 523-536.
Buhrman, Harry, et al., "Position-Based Quantum Cryptography: Impossibility and Constructions". 2010, 27 pages.
Busboom A., "Arrays and Rekonstruktions-algoritihmen fur bildgebende System emit codierter Apertur,"Relevant Chapters 1-5, 1999, pp. 128, Translation included: Busboom, A., "Arrays and reconstruction algorithms for coded aperture imaging systems", vol. 10, No. 572, Translated Chapters, Ch.1-5, pp. 36.
Bydon, "Silicon Valley Inventor's Radical Rewrite of Wireless", The Wall Street Journal [online], [retrieved on Jul. 28, 2011] Retrieved from the Internet: URL: http:biogs.wsj. comdigits20110728silicon-valley-inventors-radical-rewrite-of-wireless, 2 pages.
C. Guthy, W. Utschick, and M. L. Honig, Large System Analysis of Projection Based Algorithms for the MIMO Broadcast Channel, in Proc. of the IEEE Intl Symp. Inform. Theory, Austin, U.S.A., Jun. 2010, 5 pages.
C. Lee, C-B. Chae, T. Kim, S. Choi, and J. Leez, Network Massive MIMO for Cell-Boundary Users: From a Precoding Normalization Perspective, IEEE Goblecom Workshops, 2012.
Cachin, Christian, et al. "Oblivious Transfer with a Memory-Bounded Receiver". FOCS 1998. IEEE. pp. 493-502.
Caire G., et al., "On the Achievable Throughput of a Multiantenna Gaussian Broadcast Channel", IEEE Transactions on Information Theory, Jul. 23, 2001, vol. 49, pp. 1-46.
Caire, "On Achivable Rates in a Multi-Antenna Broadcast Downlink," IEEE Transactions on Information Theory, 2003, vol. 49, pp. 1691-1706.
Catreux S., et al., "Adaptive Modulation and MIMO Coding for Broadband Wireless Data Networks," IEEE Communications Magazine, 2002, vol. 2, pp. 108-115.
Cerato B., et al.. Hardware implementation of low-complexity detector for large MIMO, in Proc. IEEE ISCAS'2009, Taipei, May 2009, pp. 593-596.
Cetiner B.A., et al., "Multifunctional Reconfigurable MEMS Integrated Antennas for Adaptive MIMO Systems," Adaptive Antennas and MIMO Systems for Wireless Systems, IEEE Communications Magazine, vol. 42 (12), Dec. 2004, pp. 62-70.
Cetiner et al., "A Reconfigurable Spiral Antenna for Adaptive MIMO Systems", EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.
Chae CB., et al., "Adaptive MIMO Transmission Techniques for Broadband Wireless Communication Systems", IEEE Communications Magazine, 2010, vol. 48 (5), pp. 112-118.
Chae CB., et al., "Coordinated Beamforming with Limited Feedback in the MIMO Broadcast Channel," Special Issue on Exploiting Limited Feedback in Tomorrow's Wireless Comm. Networks, IEEE Journal on Selected Areas in Communications, 2008, vol. 26 (8), pp. 1505-1515.
Chandran N., et al., "Position-Based Cryptography", Department of Computer Science, UCLA, 2009, 50 pages.
Chandrasekaran S., et al., "Near-Optimal Large-MIMO Detection Using Randomized MCMC and Randomized Search Algorithms," Proceeding in Institute of Electrical and Electronics Engineers International Conference on Communications, 2011, 5 pages.
Chen R., "Multiuser Space-Time Block Coded MIMO System with Downlink," IEEE Communications Society, 2004, pp. 2689-2693.
Chen R., et al., "Transmit Selection Diversity for Unitary Precoded Multiuser Spatial Multiplexing Systems with Linear Receivers", IEEE Trans on Signal Processing, 2007, vol. 55 (3), pp. 1159-1171.
Chockalingam A., "Low-Complexity Algorithms for Large-MIMO Detection," International Symposium on Communications, Control and Signal Processing, 2010, 6 pages.
Choi J., et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013, 13 pages.
Choi J., et al., "Interpolation Based Transmit Beamforming for MIMO-OFDM with Limited Feedback," IEEE Transactions on Signal Processing, 2005, vol. 53 (11), pp. 4125-4135.
Choi J., et al., "Interpolation Based Unitary Precoding for Spatial Multiplexing MIMO-OFDM with Limited Feedback," Global Telecommunications Conference 2004 (GLOBECOM '04), IEEE, Dec. 2004, pp. 214-218.
Choi J., et al., "Noncoherent Trellis Coded Quantization: A Practical Limited Feedback Technique for Massive MIMO Systems," Nov. 8, 2013, pp. 1-14.
Choi L.U., et al., "A transmit preprocessing technique for multiuser MIMO systems using a decomposition approach," IEEE Trans Wireless Comm, 2004, vol. 3 (1), pp. 20-24.
Choi W., et al., "Opportunistic space division multiple access with beam selection," IEEE Trans. on Communications, 2006, pp. 1-23.
Chu, D , et al., "Polyphase codes with good periodic correlation properties (corresp.)", IEEE Trans. Inform. Theory, vol. 18, No. 4, (Jul. 1972), 531-532 pages.
Chuah C. N., et al.,"Capacity Scaling in MIMO Wireless Systems under Correlated Fading", IEEE Trans. Inform. Theory, 2002, vol. 48 (3), pp. 637-650.
Cohn H., et al., "Group-theoretic Algorithms for Matrix Multiplication", IEEE Symposium on Foundations of Computer Science, 2005, pp. 379-388.
Communication pursuant to Article 94(3) EPC for Application No. 10184659.0, dated Dec. 21, 2018, 4 pages.
Communication Pursuant to Article 94(3) EPC for Application No. 13790935.4, dated Feb. 4, 2019, 11 pages.
Communication pursuant to Article 94(3) EPC for Application No. 18186156.8, dated Jul. 30, 2019, 5 pages.
Communication pursuant to Article 94(3) EPC for Application No. EP13856705.2, dated Mar. 13, 2018, 6 pages.
Communication pursuant to Article 94(3) EPC for European Application No. 06718208.9, dated May 10, 2017, 4 pages.
Communication pursuant to Article 94(3) EPC for European Application No. 08798313.6, dated May 2, 2017, 7 pages.
Communication pursuant to Article 94(3) EPC for European Application No. 10156950.7, dated May 9, 2017, 9 pages.
Communication pursuant to Article 94(3) EPC for European Application No. 10156954, dated Jan. 25, 2017, 5 pages.
Communication Pursuant to Article 94(3) EPC from foreign counterpart European Application No. 13784690.3, dated Aug. 23, 2018, 6 pages.
Communication pursuant to Article 94(3) EPC from foreign counterpart European Application No. 13856705.2, dated Jul. 18, 2017, 5 pages.
Communication pursuant to Article 94(3) EPC, EP App. No. 05254757.7, dated Dec. 3, 2012, 6 pages.
Communication pursuant to Article 94(3) EPC, EP App. No. 05254757.7, dated Dec. 21, 2018, 4 pages.

(56) References Cited

OTHER PUBLICATIONS

Communication pursuant to Article 94(3) EPC, EP App. No. 05254757.7, dated Nov. 11, 2019, 5 pages.
Communication pursuant to Article 94(3) EPC, EP App. No. 10184659, dated Nov. 11, 2019, 5 pages.
Communication pursuant to Article 94(3) EPC, EP App. No. 10184659, dated Dec. 4, 2017, 5 pages.
Third Office Action from foreign counterpart Chinese Patent Application No. 201280044869.5, dated Aug. 31, 2017, 15 pages.
Third Office Action from foreign counterpart Chinese Patent Application No. 201480016091.6, dated Jul. 10, 2019, 5 pages.
Third Office Action from foreign counterpart Mexican Patent Application No. MX/a/2014/013795, dated Jul. 27, 2016, 6 pages.
Tomlinson M., "New Automatic Equaliser Employing Modulo Arithmetic," Electronics Letters, 1971, vol. 7 (5/6), pp. 138-139.
Toyota Special Reports, Toyota FCHV-The First Step Toward the Hydrogen Society of Tomorrow, "Accelerating Towards a Hydrogen Society through Fuel Cell Vehicles", 2003, pp. 1-8.
Tran L.N., et al. "A Conic Quadratic Programming Approach to Physical Layer Multicasting for Large-Scale Antenna Arrays," IEEE Signal Processing Letters, Jan. 1, 2014, vol. 21 (1), pp. 114-117.
Truong K.T., et al. "Effects of Channel Aging in Massive MIMO Systems," Journal of Communications and Networks, Special Issue on Massive MIMO, 2013, vol. 15 (4), pp. 338-351.
Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.
Tsakalaki E. P., et al., On the Beamforming Performance of Large-Scale Antenna Arrays, Proc. Loughborough Antennas and Propagation Conference (LAPC), Nov. 12-13, 2012, 4 pages.
Tse D et al., "Diversity-multiplexing tradeoff in multiple-access channels", IEEE Trans. Info. Th., Mar. 2004, vol. 50 (9), pp. 1859-1874.
Tse et al., "Performance Tradeoffs between Maximum Ratio Transmission and Switched-Transmit Diversity", in Proc. 11 sup.th IEEE International Symposium on Personal, Indoor and Mobile Radio Communication, vol. 2, Sep. 2000, pp. 1485-1489.
Tureli, U , et al., "OFDM blind carrier offset estimation: ESPRIT", IEEE Trans. Commun., vol. 48, No. 9, (Sep. 2000), 1459-1461 pages.
Tyler N., et al., "Adaptive antennas: the Calibration Problem", IEEE Comm. Mag., pp. 114-122, Dec. 2004.
U.S. Appl. No. 12/802,976, filed Jun. 16, 2010.
Ubuquiti, "airFiber", downloaded from http:f/www.ubnt.com/airfiber on Sep. 4, 2015, 10 pages.
Ubuquiti, "airMAX", [online], Retrieved from the Internet: http:www.ubnt.comairmax, 2015, 10 pages.
Uthansakul P., et al., MIMO antenna selection using CSI from reciprocal channel, Int. Journal of Elect. and Info. Eng., 2010, vol. 4 (10), pp. 482-491.
Valkama M., et al., "Advanced methods for 1/Q imbalance compensation in communication receivers," IEEE Transactions on Signal Processing, vol. 49, No. 10, 2001, pp. 2335-2344.
Vallet P., et al., Improved Subspace Estimation for Multivariate Observations of High Dimension: The Deterministic Signals Case, IEEE Trans. Inform Theory, 2012, vol. 58 (2), pp. 1043-1068.
Van B.D et al.."Beamforming: A Versatile Approach to Spatial Filtering," IEEE ASSP Magazine, 1988, pp. 4-24.
Van De Beek, Jan-Jaap, et al., "ML estimation of time and frequency offset in OFDM systems", Signal Processing, IEEE Transactions on [see also Acoustics, Speech, and Signal Processing, IEEE Transactions on] vol. 45, No. 7, (Jul. 1997), pp. 1800-1805.
Vance, "Steve Perlman's wireless fix", BusinessWeek, Jul. 2011, 10 pages [online], retrieved from the Internet: URL:http://www.businessweek.com/magazine/the-edison-of-silicon-valley-07272011.html.

Vaughan R. G., "On Optimum Combining at the Mobile," IEEE Transactions on Vehicular Technology, Nov. 1988, vol. 37(4), pp. 181-188.
Vaughn R., et al., "Switched parasitic elements for antenna diversity," IEEE Transactions on Antennas and Propagation, 1999, vol. 47, pp. 399-405.
Venkatesan et al., "Network MIMO: Overcoming InterCell Interference In Indoor Wireless Systems," ASILOMAR Conference on Signals, 2007, vol. 2007, pp. 83-87.
Venkatesan S., et al., "A WiMAX-Based Implementation of Network MIMO for Indoor Wireless Systems," EURASIP Journal on Advances in Signal Processing, 2009, vol. 2009, 11 pages.
Vieira J., et al., "A flexible 100-antenna testbed for Massive MIMO," in Proc IEEE Globecom 2014 Workshop-Massive MIMO: From Theory to Practice, Austin, Texas, USA, Dec. 2014, pp. 287-293.
Vishwanath, S, "Duality, Achievable Rates, and Sum-Rate Capacity of Gaussian MIMO Broadcast Channels," IEEE Trans. Info. Th., vol. 49, No. 10, pp. 2658-2668, Oct. 2003.
Visotsky E., et al., "Space-Time Transmit Precoding with Imperfect Feedback," IEEE Transactions on Information Theory, 2001, vol. 47, pp. 2632-2639.
Visuri et al. "Colocated Antenna Arrays: Design Desiderata for Wireless Communications," 2002, vol. 2002, pp. 580-584.
Viswanath P., et al., "Opportunistic beamforming using dump antennas," IEEE Transactions on Information Theory, 2002, vol. 48, pp. 1277-1294.
Viswanath, "Sum Capacity of the Vector Gaussian Broadcast Channel and Uplink-Downlink Duality," IEEE Transactions on Information Theory, 2003, vol. 49 (8), pp. 1912-1921.
Vivato—Homepage, http://www.vivato.net/, printed Apr. 9, 2004, 1 page.
Wagner et al., "Large System Analysis of Linear Precoding in MISO Broadcast Channels with Limited Feedback," IEEE Transactions on Information Theory, 2012, vol. 58(7), pp. 4509-4537.
Waldschmidt C., et al., "Compact MIMO-arrays based on polarisation-diversity", Proc. IEEE Antennas and Prop. Symp , 2003, vol. 2, pp. 499-502.
Waldschmidt C., et al., "Complete RF system model for analysis of compact MIMO arrays," IEEE Trans. on Vehicular Technologies, 2004, vol. 53, pp. 579-586.
Wallace J. W., et al., "Statistical Characteristics of Measured MIMO Wireless Channel Data and Comparison to Conventional Models," Proceedings IEEE Vehicular Technology Conference, Oct. 2001, vol. 2 (7-11), pp. 1078-1082.
Wallace, Jon W., et al., "Termination-dependent diversity performance of coupled antennas: Network theory analysis,", IEEE Trans. Antennas Propagat., vol. 52, (Jan. 2004), 98-105.
Wampfler, Inc., Home page, Wampfler, Inc., KY, USA- Wampfler Group, 1 page, printed on Apr. 17, 2006, http://www.wampfler.US/.
Wang Z., "Performance of Uplink Multiuser Massive MIMO system," International Conference on Acoustics Speech and Signal Processing, Florence, Italy, Nov. 6, 2013, 5 pages.
Wang Z., et al., "Enhanced downlink MU-Comp schemes for TD-LTE-Advanced," Wireless Communications and Networking Conference (WCNC), IEEE, 2010, 6 pages.
Wannstrom J., "Carrier Aggregation Explained," 3GPP, Jun. 2013, 6 pages, Retrieved from the Internet: URL: http://www.3gpp.org/Carrier-Aggregation-explained.
Warrington, E.M, et al. "Measurement and Modeling of HF Channel Directional Spread Characteristics for Northerly Paths", Radio Science, vol. 41, RS2006, DOI:10.1029/2005RS003294, 2006, pp. 1-13.
WATROUS., et al.,"Zero-Knowledge against Quantum Attacks," SIAM Journal on Scientific Computing, 2009, vol. 2009, pp. 25-58.
Webpass, Buildings online, printed on Sep. 4, 2015, Retrieved from the Internet: http://www.webpass.net/buildings?city=san+francisco&column=address&order=asc, 3 pages.
Weedon W.H., et al., "MEMS-switched reconfigurable antennas", IEEE Antennas and Propagation Society, AP-S International Symposium (Digest), vol. 3, 2001, pp. 654-657.

(56) References Cited

OTHER PUBLICATIONS

Well-to-Wheels Analysis of Advanced Fuel/Vehicle Systems—A North American Study of Energy Use, Greenhouse Gas Emission, and Criteria Pollutant Emissions, May 2005, 238 pages.
Wen C K., et al.,"On the Sum-Rate of Multiuser MIMO Uplink Channels with Jointly-Correlated Rician fading", IEEE Trans Commun., 2011, vol. 59 (10), pp. 2883-2895.
Wenck., et al., "Asymptotic Mutual Information for Rician MIMO-MA Channels with Arbitrary Inputs: A Replica Analysis", IEEE Trans. Commun , 2010, vol. 58 (10), pp. 2782-2788.
Wenger J., et al., "The Intelligent Highway: A Smart Idea?", Strategy +Business, Booz & Co., Feb. 26, 2008, http://www.strategy-business.com/media/file/leading.ideas-20080226.pdf, pp. 5 total.
Wennestrom et al., "An Antenna Solution for MIMO Channels: The Switched Parasitic Antenna," IEEE International Symposium on Personal, Indoor and Mobile Radio Communications, PIMRC, vol. 1, 2001, pp. 159-163.
Wheeler HA., et al., "Small antennas," IEEE Transactions on Antennas and Propagation, 1975, vol. AP-23 (4), pp. 462-469.
Wi-Fi alliance, "Wi-Fi certified makes it Wi-Fi: What Retailers and Consumers Need to Know" pp. 1-8, Sep. 2009, Retrieved from the Internet: URL: http://www.wi-fi.org/files/WFA_Certification_Overview_WP_en.pdf.
Wikipedia, "List of ad hoc routing protocols", printed on Mar. 8, 2011, http://en.wikipedia.org/wiki/List.sub.-of.sub.-ad.sub.-hoc.sub.-routi-ng.sub.-protocols, 1 page.
Wikipedia, 2014, 6 pages [online], "IS-95" Retrieved from the Internet: URL: http:en.wikipedia.orgwikiIS-95.
Wikipedia, Advanced Mobile Phone System. 2014, 6 pages [online]. Retrieved from the Internet: URL: https://en.wikipedia.org/wiki/AdvancedMobilePhoneSystem.
Wikipedia., "Mobile ad hoc network," 2011, pp. 1-3, http:en.wikipedia.orgwikiMobile_ad_hoc_network.
WiMAX forum, 1 page, Aug. 14, 2014 http://www.wimaxforum.org/.
Wired, Has OnLive's Steve Perlman Discovered Holy Grail of Wireless?, Jun. 30, 2011 Retrieved from the Internet: http:www.wired.comepicenter201106perlman-holy-grail-wireless.
Wireless Broadband Access Demonstrator, in Proc. IEEE International Symposium on Communications and Information Technologies (ISCIT), Oct. 2012.
Wong I., et al., "Long Range Channel Prediction for Adaptive OFDM Systems," Proceedings IEEE Asilomar Conf. on Signals, Systems, and Computers, vol. 1,pp. 723-736, Pacific Grove, CA, USA, Nov. 7-10, 2004.
Wong I.C., et al., "Exploiting Spatia-Temporal Correlations in MIMO Wireless Channel Prediction," Dec. 2006, IEEE GLOBECOM Conference, 5 pages.
Wong, "Performance Enhancement of Multiuser MIMO Wireless Communication Systems," IEEE Transactions on Communications, 2002, vol. 50 (12), pp. 1960-1970.
Wong, I.C., et al., "Joint Channel Estimation and Prediction for OFDM Systems," Proceedings in IEEE Global Telecommunications Conference, St. Louis, MO, 2005, pp. 2255-2259.
Wong, Kai-Kit, et al., "A joint-channel diagonalization for multiuser MIMO antenna systems", IEEE Trans. Wireless Comm., vol. 2, (Jul. 2003), 773-786.
Written Opinion for Application No. PCT/US06/14854, dated May 8, 2008, 3 pages.
Wu M., et al., "Approximate Matrix Inversion for High-Throughput Data Detection in the Large-scale MIMO Uplink," IEEE International Symposium on Circuits and Systems (ISCAS), May 2013, pp. 2155-2158.
www.tfcbooks.com Resource cite on Nikola Tesla.
Xiao L., et al., "A Comparative Study of MIMO Capacity with Different Antenna Topologies," IEEE ICCS'02, vol. 1, Nov. 2002, pp. 431-435.
Xu J., "LTE-Advanced Signal Generation and Measurements using SystemVue," Agilent Technologies, Dec. 23, 2010, 46 pages.

Yang W., et al., "On the Capacity of Large-MIMO Block-Fading Channels," IEEE Journal on Selected Areas in Communications, 2013, vol. 31(2), pp. 117-132.
Yin B., et al., "Full-Duplex in Large-Scale Wireless System," Proceeding of the Asilomar Conference on Signals, Systems and Computers, 2013, 5 pages.
Yin B., et al., "Implementation trade-offs for linear detection in large-scale MIMO systems," Proceeding Institute of Electrical and Electronics Engineers International Conference on Acoustics Speech, and Signal Processing, 2013, 5 pages.
Yin H., et al., A Coordinated Approach to Channel Estimation in Large-scale Multiple-antenna Systems, IEEE Journal on Selected Areas in Communications, 2013, vol. 31 (2), pp. 264-273.
Yoo., "Multi-Antenna Downlink Channels with Limited Feedback and User Selection," IEEE Journal on Selected Areas in Communications, 2007, vol. 25 (7), pp. 1478-1491.
Yu W., et al., "Trellis Precoding for the Broadcast Channel," IEEE GLOBECOM, 2001, vol. 2, pp. 1344-1348.
Yu, et al., "Sum Capacity of Gaussian Vector Broadcast Channels", IEEE Transactions on Information Theory, vol. 50, No. 9, Sep. 2004, pp. 1875-1892.
Zaidel B., et al., "Vector Precoding for Gaussian MIMO Broadcast Channels: Impact of Replica Symmetry Breaking", Institute of Electrical and Electronics Engineers Transactions on Information Theory, Mar. 2012, vol. 58 (3), pp. 1413-1440.
Zakhour R., et al., "Min-Max Fair Coordinated Beamforming via Large Systems Analysis,", in Proc, of the IEEE International Symposium on Information Theory, St. Petersburg, Jul. 2011.
Zamir R ., et al., "Capacity and lattice-strategies for cancelling known interference," Proceedings of International Symposium on Information Theory, Honolulu, Hawaii, Nov. 2000, pp. 1-32.
Zetterberg P., "Experimental Investigation of TDD Reciprocity based Zero-Forcing Transmit Precoding", EURASIP, Jun. 2010.
Zhang H., et al., "Cochannel Interference Mitigation and Cooperative Processing in Downlink Multicell Multiuser MIMO Networks," EURASIP Journal on Wireless Communications and Networking, vol. 2004 (2), Jul. 2004, pp. 222-235.
Zhang J., et al. "On Capacity of Large-Scale MIMO Multiple Access Channels with Distributed Sets of Correlated Antennas," IEEE Journal on Selected Areas in Communications, Sep. 26, 2012, vol. 31 (2), pp. 1-52.
Zhang J., et al., "Hermitian Precoding for Distributed MIMO Systems with Individual Channel State Information," IEEE Journal on Selected Areas in Communications, 2013, vol. 31 (2), pp. 241-250.
Zhang R., et al. Electromagnetic Lens-focusing Antenna Enabled Massive MIMO, Jun. 6, 2013, pp. 1-7.
Zhang, et al., "Coordinated Multi-Cell MIMO Systems With Cellular Block Diagonalization", IEEE 2007, pp. 1669-1673.
Zhang, et al., "Networked MIMO with Clustered Linear Precoding", IEEE Transactions on Wireless Communications, vol. 8, No. 4, Apr. 2009, pp. 1910-1921.
Zheng L., et al., "Diversity and multiplexing: a fundamental tradeoff in multiple antenna channels," IEEE Trans. Info. Th., 2003, vol. 49 (5), pp. 1073-1096.
Zhou Q., et al., "An Improved LR-aided K-Best Algorithm for MIMO Detection," in Proc. IEEE International Conference on Wireless Communications and Signal Processing (WCSP), Oct. 2012, 5 pages.
Zhuang, X, et al., "Channel models for link and system level simulations", IEEE 802.16 Broadband Wireless Access Working Group, (Sep. 2004) 15 pages.
Zogg, et al., "Multipath Delay Spread in a Hilly Region at 210 MHz", IEEE Transactions on Vehicular Technology, vol. VT-36, No. 4, Nov. 1987, pp. 184-187.
Zou R., et al., "Li Reducing the Complexity of Quasi-Maximum-Likelihood Detectors Through Companding for Coded MIMO Systems," IEEE Transactions on Vehicular Technology, Mar. 2012, vol. 2012, pp. 1109-1123.
Zyren J., "Overview on the 3GPP Long Term Evolution Physical Layer," Freescale White Paper, Jul. 2007, 27 pages.

(56) References Cited

OTHER PUBLICATIONS

International Preliminary Report on Patentability and Written Opinion for Application No. PCT/US2009/063935, dated May 17, 2011, 8 pages.
International Preliminary Report on Patentability and Written Opinion for Application No. PCT/US2013/071749, dated Jun. 4, 2015, 7 pages.
International Preliminary Report on Patentability and Written Opinion for Application No. PCT/US2014/025102, dated Sep. 24, 2015, 10 pages.
International Preliminary Report on Patentability and Written Opinion for Application No. PCT/US2014/025108, dated Sep. 24, 2015, 8 pages.
International Preliminary Report on Patentability and Written Opinion for Application No. PCT/US2014/025123, dated Sep. 24, 2015, 10 pages.
International Preliminary Report on Patentability and Written Opinion for Application No. PCT/US2015/014511, dated Aug. 18, 2016, 5 pages.
International Preliminary Report on Patentability and Written Opinion from foreign counterpart PCT/US2014/025109, dated Oct. 1, 2015, 5 pages.
International Preliminary Report on Patentability for Application No. PCT/US06/41009, dated Apr. 23, 2008, 4 pages.
International Preliminary Report on Patentability for Application No. PCT/US11/58663, May 7, 2013, 26 pages.
International Preliminary Report on Patentability for Application No. PCT/US2005/11033, dated Jun. 3, 2008, 7 pages.
International Preliminary Report on Patentability for Application No. PCT/US2006/14854, dated Mar. 17, 2009, 4 pages.
International Preliminary Report on Patentability for Application No. PCT/US2008/073780, dated Mar. 4, 2010, 10 pages.
International Preliminary Report on Patentability for Application No. PCT/US2012/054937, dated Mar. 27, 2014, 13 pages.
International Preliminary Report on Patentability for Application No. PCT/US2013/039580, dated Nov. 4, 2014, 7 pages.
International Preliminary Report on Patentability for Application No. PCT/US2013/041726, dated Nov. 18, 2014, 6 pages.
International Preliminary Report on Patentability for Application No. PCT/US2015/023436, dated Oct. 27, 2016, 6 pages.
International Preliminary Report on Patentability for Application No. PCT/US2017/047963 dated Mar. 7, 2019, 8 pages.
International Preliminary Report on Patentability for Application No. PCT/US2017/058291, dated May 9, 2019, 7 pages.
International Preliminary Report on Patentability for PCT Application No. PCT/US06/01111, dated Jul. 24, 2007, 8 pages.
International Preliminary Report on Patentability from foreign counterpart PCT/US2013/061493 dated Apr. 16, 2015, 7 pages.
International Search Report and the Written Opinion for Application No. PCT/US15/14511, dated May 18, 2015, 7 pages.
International Search Report and the Written Opinion for Application No. PCT/US2013/061493, dated Dec. 6, 2013, 9 pages.
International Search Report and Written Opinion for Application No. PCT/US2009/063932, dated Jan. 7, 2010, 12 pages.
International Search Report and Written opinion for Application No. PCT/US 06/41009, dated May 24, 2007, 6 Pages.
International Search Report and Written opinion for Application No. PCT/US05/11033, dated May 2, 2008, 10 pages.
International Search Report and Written opinion for Application No. PCT/US06/01111, dated Aug. 3, 2006, 13 pages.
International Search Report and Written Opinion for Application No. PCT/US13/41726, dated Jul. 16, 2013, 7 pages.
International Search Report and Written Opinion for Application No. PCT/US2008/073780, dated Nov. 19, 2008.
International Search Report and Written Opinion for Application No. PCT/US2009/063935, dated Feb. 3, 2010, 11 pages.
International Search Report and Written Opinion for Application No. PCT/US2012/054937, dated Apr. 2, 2013, 17 pages.
International Search Report and Written Opinion for Application No. PCT/US2013/039580, dated Aug. 20, 2013, 12 pages.
International Search Report and Written opinion for Application No. PCT/US2014/025105, dated Jul. 14, 2014, 12 pages.
International Search Report and Written Opinion for Application No. PCT/US2014/025108, dated Sep. 19, 2014, 10 Pages.
International Search Report and Written Opinion for Application No. PCT/US2014/025109, dated Jul. 14, 2014, 6 pages.
International Search Report and Written Opinion for Application No. PCT/US2015/023436, dated Aug. 19, 2015, 10 pages.
International Search Report and Written Opinion for Application No. PCT/US2017/047963, dated Nov. 3, 2017, 9 pages.
International Search Report and Written Opinion for Application No. PCT/US2017/058291, dated Mar. 8, 2018, 12 pages.
International Search Report and Written opinion for International Application No. PCT/US2013/071749, dated Apr. 8, 2014, 9 pages.
International Search Report and Written opinion for International Application No. PCT/US2014/025102, dated Jul. 18, 2014, 11 pages.
International Search Report and Written opinion for International Application No. PCT/US2014/025123, dated Jul. 18, 2014, 11 pages.
International Search Report and Written Opinion for PCT Application No. PCT/US 11/58663, dated Mar. 29, 2012, 33 pages.
International Search Report for Application No. PCT/US06/14854, dated 1 page.
International Search Report from International Application No. PCT/US2000/019613, dated Nov. 14, 2000, 1 page.
Itu, "ISM Band," [online], Aug. 14, 2014. Retrieved from the Internet: http://www.itu.int/ITUR/terrestrial/faq/index.html#g013, pp. 1-8.
J. Duplicity, et al., "MU-MIMO in LTE systems", EURASIP Journal on Wireless Communications and Networking, Mar. 2011, 10 pages.
J. G. Proakis, Communication System Engineering, Prentice Hall, 1994, 11 pages.
Jafar S. A., et al., "Channel Capacity and Beamforming for Multiple Transmit and Receive Antennas with Covariance Feedback," Proc. IEEE Int. Cont. on Comm, Jun. 2001, vol. 7, pp. 2266-2270.
Jafar S.A., et al., "Transmitter Optimization and Optimality of Beamforming for Multiple Antenna Systems," IEEE Trans Wireless Comm, Jul. 2004, vol. 3, No. 4, pp. 1165-1175.
Jakes W.C., Microwave Mobile Communications, IEEE Press, 1974, Table of Contents, 4 pages.
Jindal N., et al., "Dirty Paper Coding vs. TOMA for MIMO Broadcast Channels", IEEE Trans, on Information Theory, vol. 51, May 2005, pp. 1783-1794.
Lunghi T. et al., "Experimental Bit Commitment Based on Quantum Communication and Special Relativity", Physical review letters 2013, vol. 111 (18), pp. 1-16.
Lytro User Manual, 2012, 25 pages, www.lytro.com.
Lytro, Lytro Support, What are the specs on the First Generation Lytro Light Field Camera?, 1 page.
M. Costa, "Writing on dirty paper," IEEE Transactions on Information Theory, vol. 29, No. 3, pp. 439-441, May 1983.
Malaney, Robert, A., et al., "Location-dependent communications using quantum entanglement". Physical Review A, 2010, 81: 042319, 11 pages.
Marek S., "AT&T's Rinne talks about carrier aggregation trials, small cells and more", Retrieved from the Internet URL: http:www.fiercebroadbandwireless.comstoryatts-rinne-talks-about-carrieraggregation-trials-small-cells-and-more2012-11-08, 3 pages.
Martinez A.O., et al. "Very Large Aperture Massive MIMO: a Measurement Based Study", Dec. 8, 2014, 6 pages.
Martinez A.O., et al., "Energy Detection Using Very Large Antenna Array Receivers," 48th Asilomar Conference on Signals, Systems, and Computers Proceedings, Nov. 2-5, 2014, 5 pages.
Marzetta L.A., et al., "Noncooperative Cellular Wireless with Unlimited Numbers of Base Station Antennas," IEEE Transactions on Wireless Communications, 2010, vol. 9(11), pp. 3590-3600.
Masouros C., et al., "Large-Scale MIMO Transmitters in Fixed Physical Spaces: The Effect of Transmit Correlation and Mutual Coupling", IEEE Trans. Commun., 2013, vol. 61 (7), pp. 2794-2804.

(56) References Cited

OTHER PUBLICATIONS

Matthaiou M., et al. "Sum Rate Analysis of ZF Receivers in Distributed MIMO Systems," IEEE Journal on Selected Areas in Communications, 2013, vol. 31 (2), pp. 180-191.

Matthaiou M., et al., "Sum Rate Analysis of ZF Receivers in Distributed MIMO Systems with Rayleigh/Lognormal Fading," 2012 IEEE International Conference on Communications, ICC 2012, Ottawa, Jun. 10-15, pp. 3857-3861.

Mattheijssen P., "Antenna-Pattern Diversity versus Space Diversity for use at Handhelds," IEEE Trans. on Yeh. Technol, 2004, vol. 53 (4), pp. 1035-1042.

Mayers, Dominic, "Unconditionally Secure Quantum Bit Commitment is Impossible". Physical Review Letters (APS) 78 (17), 1997.

Mazrouei-Sebdani et al.. Vector Perbutation Precoding and User Scheduling for Network MIMO, 2011, Wireless Communications and Networking Conference (WCNC), 2011 IEEE, pp. 203-208.

McKay MR., et al., "A throughput-based adaptive MIMO BICM approach for spatially- correlated channels," IEEE to appear in Proc ICC, 2006, 5 pages.

McKay MR., et al., "Multiplexing/beamforming switching for coded MIMO in spatially correlated channels based on Closed-Form BER Approximations," IEEE Transactions on Vehicular Technology, 2007, vol. 56 (5), pp. 2555-2567.

McKay, Matthew R., et al., "Multiplexing/beamforming switching for coded MIMO in spatially correlated Rayleigh channels", IEEE Transactions on Vehicular Technology, vol. 56, No. 5, (Sep. 2007), 2555-2567 pages.

McLean, James S., et al., "A re-examination of the fundamental limits on the radiation Q of electrically small antennas", IEEE Trans. Antennas Propagat., vol. 44, n.5 (May 1996), 672-676.

MikroTik, "Routerboard," [online]. 2015, 30 pages, Retrieved from the Internet: URL: http:routerboard.com.

MIMO System uses SOMA for IEEE802.11 n, Electronicstalk, 2004, pp. 1-3, http://www.electronicstalk.com/news/ime/ime149.html.

Minn, et al., "A robust timing and frequency synchronization for OFDM systems", IEEE Trans. Wireless Commun., vol. 2, No. 4, (Jul. 2003), 822-839.

MIT Media Lab, "Wireless Power- from Wirelessly Powered Car to Wirelessly Powered Fabrication", MAS 863, Final Project Webpage, 2002, pp. 1-5. http://www.media.mit.edu/physics/pedagogy/fab/fab_2002/personal_pages/aks-hay/mit.edu/index42.html.

Mitsubishi Electric, "Leakage-based Precoding for CoMP in LTE-A," 3GPP RAN1 #56, R1-090596, Feb. 9-13, 2009, 14 pages.

Miyakawa H., et al., "A Method of Code Conversion for Digital Communication Channels with Intersymbol Interference," Transactions of the Institute of Engineers of Japan, vol. 52-A (6), 1969, pp. 272-273.

Mohammed S. K., et al., "Constant-Envelope Multi-User Precoding for Frequency-Selective Massive MIMO Systems," IEEE Wireless Communications Letters, 2013, vol. 2(5), pp. 547-550.

Mohammed S.K., et al., "A Low-Complexity Precoder for Large Multiuser MISO Systems", IEEE Vehicular Technology Conference, 2008, pp. 797-801.

Mohammed S.K., et al., "Per-Antenna Constant Envelope Precoding for Large Multi-User MIMO Systems," IEEE Transactions on Communications, Jan. 2012, vol. 61(3), pp. 1-24.

Mohammed S.K., et al., "Single-User Beamforming in Large-Scale MISO Systems with Per- Antenna Constant-Envelope Constraints," IEEE Transactions on Wireless Communications, Sep. 2012, vol. 2012, pp. 3992-4005.

Molisch et al., "MIMO Systems with Antenna Selection," IEEE Microwave Magazine, vol. 5 (1), Mar. 2004, pp. 46-56.

Montgomery B.G., "Analog RF-over-fiber technology, Syntonics LLC," 2008, pp. 2-51, http:chesapeakebayaoc.orgdocumentsSyntonics_AOC_RF_over-Fiber_19_Jan_08.pdf.

Monziano R. A., et al., "Introduction to Adaptive Arrays," New York, Wiley, 1980, Table of Contents 21 pages.

Moose, Paul H., et al., "A technique for orthogonal frequency division multiplexing frequency offset correction", IEEE Trans Commun., vol. 42, No. 10, (Oct. 1994), 2908-2914.

Morelli M., et al., "Frequency ambiguity resolution in OFDM systems," IEEE Commun. Lett, 2000, vol. 4 (4), pp. 134-136.

Morelli, M, et al., "An improved frequency offset estimator for OFDM applications", IEEE Commun. Lett., vol. 3, No. 3, (Mar. 1999), 75-77 pages.

Morris M. L., et al., "The Impact of Array Configuration on MIMO Wireless Channel Capacity," Proc. IEEE Antennas and Propagation Symposium, Jun. 2002, vol. 3, pp. 214-217.

Morris M.L., et al., "Network model for MIMO systems with coupled antennas and noisy amplifiers," IEEE Transactions on Antennas and Propagation, 2005, vol. 53, pp. 545-552.

Motorola, "Long Term Evolution (LTE): A Technical Overview," 2007, Retrieved from the Internet: http:business.motorola.comexperienceltepdfLTETechnicalOverview.pdf, 15 pages.

Moustakas A., et al.,"MIMO Capacity Through Correlated Channels in the Presence of Correlated Interferers and Noise: A (Not so) Large N Analysis", Institute of Electrical and Electronics Engineers Transformations and Information Theory, 2003, vol. 49 (10), pp. 2545-2561.

Moustakas A.L., et al., "Optimizing Multiple-Input Single-Output (MISO) Communication Systems with General Gaussian channels: Nontrivial Covariance and Nonzero Mean", Institute of Electrical and Electronics Engineers Transactions on Information Theory, 2003, vol. 49, pp. 2770-2780.

Muharar R., et al., "Downlink Beamforming with Transmit-Side Channel Correlation: A Large System Analysis," in Proc. IEEE International Conference on Communications (ICC), Kyoto, Japan, Jun. 2011, 5 pages.

Muller R., et al., "Vector Precoding for Wireless MIMO Systems and its Replica Analysis," IEEE J. Sel. Areas Commun, 2008, vol. 26 (3), pp. 530-540.

Muller R.R., et al., "Blind Pilot Decontamination," IEEE Journal of Selected Topics in Signal Processing on Signal Processing for Large-Scale MIMO Communications, 2013, 31 pages.

Nam J., et al., "Joint Spatial Division and Multiplexing: Realizing Massive MIMO Gains with Limited Channel State Information," in Proceedings Conference on Information Sciences and Systems, IEEE, Mar. 2012, 6 pages.

Narasimhan, et al., "M-ary Detection and q-ary Decoding in Large-Scale MIMO: A Non- Binary Belief Propagation Approach," Oct. 16, 2013, 7 pages.

Nec, "Self organizing networks", White paper, Feb. 2009, 5 pages.

Netsukuku, 8 pages, printed on Sep. 30, 2015, [online], Retrieved from the Internet: URL: http:netsukuku.freaknet.org.

Ngo H. Q., et al., Massive MU-MIMO Downlink TDD Systems with Linear Precoding and Downlink Pilots, Proceedings in Allerton Conference on Communication, Control, and Computing, Urbana-Champaign, Illinois, Oct. 2013.

Ngo H.Q., et al., Energy and Spectral Efficiency of Very Large Multiuser MIMO Systems, IEEE Transactions on Communications, May 21, 2012, vol. 61 (4), pp. 1436-1449.

Ngo H.Q., et al., EVD-Based Channel Estimations for Multicell Multiuser MIMO with Very Large Antenna Arrays, IEEE International Conference on Acoustics, Speed and Signal Processing (ICASSP), Kyoto, Japan, Mar. 2012, 5 pages.

Non-Final Office Action from U.S. Appl. No. 13/652,259, dated Apr. 10, 2014, 13 pages.

Non-Final Office Action from U.S. Appl. No. 13/797,950, dated Jan. 11, 2017, 65 pages.

Non-Final Office Action from U.S. Appl. No. 13/797,950, dated May 11, 2015, 61 pages.

Non-Final Office Action from U.S. Appl. No. 13/797,971, dated May 11, 2015, 52 pages.

Non-Final Office Action from U.S. Appl. No. 13/797,971, dated Oct. 4, 2016, 56 pages.

Non-Final Office Action from U.S. Appl. No. 13/844,355, dated Apr. 18, 2016, 21 pages.

Non-Final Office Action from U.S. Appl. No. 13/844,355, dated Aug. 27, 2018, 39 pages.

(56) References Cited

OTHER PUBLICATIONS

Non-Final Office Action from U.S. Appl. No. 13/844,355, dated Jun. 30, 2017, 159 pages.
Non-Final Office Action from U.S. Appl. No. 14/023,302, dated Jun. 11, 2015, 8 pages.
Non-Final Office Action from U.S. Appl. No. 14/086,700, dated Mar. 4, 2016, 10 pages.
Non-Final Office Action from U.S. Appl. No. 14/086,700, dated May 25, 2017, 12 pages.
Non-Final Office Action from U.S. Appl. No. 14/156,254, dated Sep. 11, 2014, 44 pages.
Non-Final Office Action from U.S. Appl. No. 14/611,565, dated Apr. 19, 2018, 141 pages.
Non-Final Office Action from U.S. Appl. No. 15/181,383, dated Jun. 25, 2018, 7 pages.
Non-Final Office Action from U.S. Appl. No. 15/181,383, dated May 22, 2017, 48 pages.
Non-Final Office Action from U.S. Appl. No. 15/682,076, dated Jan. 28, 2019, 20 pages.
Non-Final Office Action from U.S. Appl. No. 10/817,731, dated Jan. 4, 2008, 14 pages.
Non-Final Office Action from U.S. Appl. No. 10/817,731, dated Jan. 21, 2009, 23 pages.
Non-Final Office Action from U.S. Appl. No. 10/817,731, dated Mar. 15, 2010, 26 pages.
Non-Final Office Action from U.S. Appl. No. 10/817,731, dated May 18, 2007, 16 pages.
Non-Final Office Action from U.S. Appl. No. 11/256,478, dated Sep. 19, 2008, 14 pages.
Non-Final Office Action from U.S. Appl. No. 11/894,394, dated Oct. 28, 2008, 13 pages.
Non-Final Office Action from U.S. Appl. No. 11/894,540, dated Oct. 29, 2008, 13 pages.
Non-Final Office Action from U.S. Appl. No. 12/143,503, dated Dec. 9, 2010, 15 pages.
Non-Final Office Action from U.S. Appl. No. 12/630,627, dated Aug. 22, 2012, 23 pages.
Non-Final Office Action from U.S. Appl. No. 12/630,627, dated Mar. 16, 2011, 5 pages.
Non-Final Office Action from U.S. Appl. No. 12/637,643, dated Sep. 23, 2011, 18 pages.
Non-Final Office Action from U.S. Appl. No. 12/802,958, dated Jun. 23, 2014, 24 pages.
Non-Final Office Action from U.S. Appl. No. 12/802,974, dated Aug. 1, 2013, 35 pages.
Non-Final Office Action from U.S. Appl. No. 12/802,974, dated Dec. 19, 2012, 7 pages.
Non-Final Office Action from U.S. Appl. No. 12/802,975, dated Aug. 1, 2013, 27 pages.
Non-Final Office Action from U.S. Appl. No. 12/802,975, dated Aug. 14, 2013, 26 pages.
Non-Final Office Action from U.S. Appl. No. 12/802,975, dated Dec. 19, 2012, 16 pages.
Non-Final Office Action from U.S. Appl. No. 12/802,975, dated May 7, 2015, 25 pages.
Non-Final Office Action from U.S. Appl. No. 12/802,988, dated Apr. 12, 2013, 45 pages.
Non-Final Office Action from U.S. Appl. No. 12/802,988, dated Jun. 26, 2015, 17 pages.
Non-Final Office Action from U.S. Appl. No. 12/802,988, dated Mar. 24, 2014, 11 pages.
Non-Final Office Action from U.S. Appl. No. 12/802,989, dated Nov. 25, 2014, 17 pages.
Non-Final Office Action from U.S. Appl. No. 12/802,989, dated Nov. 26, 2013, 27 pages.
Non-Final Office Action from U.S. Appl. No. 13/232,996, dated Apr. 11, 2013, 23 pages.
Non-Final Office Action from U.S. Appl. No. 13/232,996, dated Jun. 24, 2015, 15 pages.
Non-Final Office Action from U.S. Appl. No. 13/233,006, dated Apr. 1, 2016, 9 pages.
Non-Final Office Action from U.S. Appl. No. 13/233,006, dated Apr. 16, 2013, 9 pages.
Non-Final Office Action from U.S. Appl. No. 13/233,006, dated Apr. 28, 2017, 10 pages.
Non-Final Office Action from U.S. Appl. No. 13/233,006, dated Jul. 11, 2018, 29 pages.
Non-Final Office Action from U.S. Appl. No. 13/233,006, dated Jun. 4, 2015, 12 pages.
Non-Final Office Action from U.S. Appl. No. 13/233,006, dated Sep. 12, 2013, 6 pages.
Non-Final Office Action from U.S. Appl. No. 13/233,006, dated Sep. 24, 2014, 9 pages.
Non-Final Office Action from U.S. Appl. No. 13/461,682, dated Feb. 25, 2014, 37 pages.
Non-Final Office Action from U.S. Appl. No. 13/464,648, dated Feb. 14, 2014, 11 pages.
First Examination Report from counterpart Australian Patent Application No. 2011323559, dated Oct. 12, 2015, 3 pages.
First Examination Report from counterpart Australian Patent Application No. 2020256510 dated Aug. 10, 2015, 3 pages.
First Examination Report from counterpart India Patent Application No. 1528/DELNP/2007 dated Sep. 29, 2015, 3 pages.
First Examination Report from foreign counterpart Australian Patent Application No. 2014248533, dated Mar. 1, 2017, 5 pages.
First Examination Report from foreign counterpart Australian Patent Application No. AU2017245425, dated May 9, 2018, 9 pages.
First Examination Report from foreign counterpart New Zealand Application No. 729017, dated, Jun. 30, 2017, 3 pages.
First Examination Report from foreign counterpart New Zealand Application No. 742186, dated Jun. 28, 2018, 4 pages.
First Examination Report from foreign counterpart New Zealand Application No. 743604, dated Jul. 10, 2018, 5 pages.
First Examination Report from foreign counterpart New Zealand Patent Application No. 728719, dated May 31, 2017, 4 pages.
First Examination Report, for counterpart Australian Patent Application No. AU2011323559, dated Sep. 30, 2015, 3 pages.
First Examination Report, for foreign counterpart New Zealand Patent Application No. 622137, dated Aug. 28, 2014, 2 pages.
First Examination Report, NZ App. No. 751530, dated Oct. 18, 2019, 3 pages.
First Examination Report, NZ App. No. 757995, dated Nov. 1, 2019, 2 pages.
First Office Action and Search Report from foreign counterpart Chinese Patent Application No. 201210466082X, dated Apr. 3, 2015, 26 pages.
First Office Action and Search report from foreign counterpart Chinese Patent Application No. 201380026522.2, dated Mar. 27, 2017, 20 pages.
First Office Action and Search Report from foreign counterpart Chinese Patent Application No. 201480016091.6, dated Apr. 25, 2018, 17 pages.
First Office Action and Search Report from foreign counterpart Chinese Patent Application No. 201580007666.2, dated Jan. 11, 2019, 13 pages.
First Office Action and Search Report from foreign counterpart Chinese Patent Application No. 201580019760.X, dated Jun. 5, 2019, 12 pages.
First Office Action and Search Report from foreign counterpart Taiwan Application No. 100139880, dated Feb. 26, 2016, 27 pages.
First Office Action for counterpart Japan Patent Application No. JP2014264325, dated Nov. 12, 2015, 4 pages.
First office action for foreign counterpart China Patent Application No. 200680021909.9, dated Feb. 25, 2011, 4 pages.
First Office Action for Foreign counterpart Russian Patent Application No. 2007148006/11, dated Nov. 17, 2009, 7 pages.
First Office Action from counterpart China Patent Application No. 200880102933.4, dated Dec. 7, 2012, 20 pages.
First Office Action from counterpart European Patent Application No. 10 784 126.4 dated Dec. 17, 2015, 7 pages.
First Office Action from foreign counterpart European Patent Application No. 12762167.0, dated Jan. 4, 2016, 4 pages.

(56) References Cited

OTHER PUBLICATIONS

First Office Action from foreign counterpart European Patent Application No. 201380035543.0 , dated Feb. 15, 2016, 8 pages.
First Office Action from foreign counterpart Korean Patent Application No. 10-2015-7033311, dated Feb. 16, 2016, 12 pages.
First Office Action from foreign counterpart Mexican Patent Application No. MXa2014013795, dated Nov. 1, 2016, 3 pages.
First Office Action from foreign counterpart Mexican Patent Application No. MXa2014013795, dated Oct. 30, 2015, 7 pages.
First Office Action from foreign counterpart Russian Patent Application No. 2011131821, dated Jun. 26, 2015, 8 pages.
First Office Action from foreign counterpart Taiwan Patent Application No. 102117728, dated Aug. 9, 2016,11 pages.
First Office Action Report for counterpart Chinese Patent Application No. 201310407419.4, dated Nov. 20, 2015, 8 pages.
First Office Action, dated Apr. 24, 2015 for foreign counterpart Mexican Patent Application No. MX/a/2014/002900, Apr. 24, 2015, 3 pages.
Fletcher P.N., et al., "Mutual coupling in multi-element array antennas and its influence on MIMO channel capacity," IEEE Electronics Letters, 2003, vol. 39 (4), pp. 342 344.
Foreign counterpart Final Rejection for Korean Patent Application No. 10-2007-7028402, dated Nov. 15, 2012, 8 pages.
Foreign counterpart Inquiry Japan Patent Application No. 2008-513486, dated Mar. 26, 2012, 2 pages.
Forenza A., et al., "Adaptive MIMO transmission for exploiting the capacity of spatially correlated channels," IEEE Trans. on Veh. Tech, 2007, vol. 56 (2), pp. 619-630.
Forenza A., et al., "Adaptive MIMO transmission scheme: Exploiting the spatial selectivity of wireless channels", Proceedings Institute of Electrical and Electronics Engineers Vehicular Technology Conference, 2005, vol. 5, pp. 3188-3192.
Forenza A., et al., "Benefit of Pattern Diversity Via 2-element Array of Circular Patch Antennas in Indoor Clustered MIMO Channels," IEEE Trans. on Communications, 2006, vol. 54 (5), pp. 943-954.
Forenza A., et al., "Impact of antenna geometry on MIMO communication in indoor clustered channels," Proc. IEEE Antennas and Prop. Symp, 2004, vol. 2, pp. 1700-1703.
Forenza A., et al., "Link Adaptation and Channel Prediction in Wireless OFDM Systems," Proceeding of IEEE International Midwest Symposium on Circuits and Systems, 2002, pp. 211-214.
Forenza A., et al., "Optimization Methodology for Designing 2-CPAs Exploiting Pattern Diversity in Clustered MIMO Channels", Institute of Electrical and Electronics Engineers Transactions on Communications, 2008, vol. 56 (10), pp. 1748-1759.
Forenza, Antonio , et al., "Switching Between OSTBC and Spatial Multiplexing with Linear Receivers in Spatially Correlated MIMO Channels", IEEE, (2006), 1-5 pages.
Foschin, et al., "Coordinating multiple antenna cellular networks to achieve enormous spectral efficiency", Proceedings of the IEEE, Aug. 2006, vol. 153 (4), pp. 548-555.
Foschini, et al., The Value of Coherent Base Station Coordination, Conference on In-formation Sciences and Systems (CISS 2005), Mar. 16-18, 2005, 6 pages.
Foschini, G.J., et al., "Simplified processing for high spectral efficiency wireless communication employing multi-element arrays", IEEE Jour. Select. Areas in Comm., vol. 17, No. 11, (Nov. 1999), 1841-1852.
Fradella R.B., "Electric Highway Vehicles: A Way to Save Our Mobility, Air, Energy, and Fortunes"Technology Assessment of Future Intercity Passenger Transportation Systems, vol. 2, Mar. 1976, pp. cover p. iii, v, vi, title p., and XIX3-XIX-27.
Friends of CRC, "Sharp (Stationary High Altitude Relay Platform)", http://www.friendsofcrc.ca/Projects/SHARP.html, page created on Jun. 25, 1996 by Cynthia Boyko, pp. 1-5.
Friends of CRC,"The Friends of CRC Association", Home page, printed on May 14, 2008, http://www.friendsofcrc.ca/, 3 pages.
Full Examiner's Report from foreign counterpart Australian Patent Application No. 2010256510, dated Aug. 10, 2015, 3 pages.

Office Action from foreign counterpart Japanese Patent Application No. 2012-057351, dated Jul. 1, 2013, 6 pages.
Office Action from foreign counterpart Japanese Patent Application No. 2012-057351, dated Mar. 10, 2014, 2 pages.
Office Action from foreign counterpart Japanese Patent Application No. 2013-156855, dated Apr. 22, 2015, 6 pages.
Office Action from foreign counterpart Japanese Patent Application No. 2014 -140413, dated Jun. 27, 2015, 6 pages.
Office Action from foreign counterpart Japanese Patent Application No. 20150162819, dated Oct. 3, 2016, 6 pages.
Office Action from foreign counterpart Japanese Patent Application No. 2016-550718, dated Jan. 10, 2019, 4 pages.
Office Action from foreign counterpart Japanese Patent Application No. 2019- 039195, dated Jun. 17, 2019, 8 pages.
Office Action from foreign counterpart Korean Patent Application No. 1020107006265, dated Jul. 29, 2014, 10 pages.
Office Action from foreign counterpart Korean Patent Application No. 20050070079, dated Jul. 29, 2011, 3 pages.
Office Action from foreign counterpart Korean Patent Application No. 2015-7002560, dated May 21, 2015, 10 pages
Office Action from foreign counterpart Mexican Patent Application No. MX/a/2014/002900, dated May 25, 2015, 7 pages.
Office Action from foreign counterpart Mexican Patent Application No. MX/a/2014/013377, dated Mar. 22, 2016, 20 pages.
Office Action from foreign counterpart Mexican Patent Application No. MX/a/2014/013377, dated Nov. 30, 2017, 4 pages.
Office Action from foreign counterpart Mexican Patent Application No. Mx/a/2015/002992, dated Nov. 8, 2016, 4 pages.
Office Action from foreign counterpart New Zealand Patent Application No. 610463, dated Jan. 22, 2014, 2 pages.
Office Action from foreign counterpart Russian Patent Application No. 2014151216, dated Sep. 30, 2016, 12 pages.
Office Action from foreign counterpart Russian Patent Application No. 2016144927, dated Dec. 21, 2016, 6 pages.
Office Action from foreign counterpart Taiwan Application No. 100139880, dated Jan. 26, 2017, 7 pages.
Office Action from Foreign Counterpart Taiwan Patent Application No. 094125985, dated Jan. 6, 2012, 7 pages.
Office Action from foreign counterpart Taiwan Patent Application No. 101133865, dated Oct. 28, 2016, 5 pages.
Office Action from foreign counterpart Taiwan Patent Application No. 102116145, dated Mar. 31, 2017, 7 pages.
Office Action from foreign counterpart Taiwan Patent Application No. 102117728, dated Nov. 29, 2016, 6 pages.
Office Action from foreign counterpart Taiwan Patent Application No. 103107541, dated Sep. 28, 2018, 7 pages.
Office Action from U.S. Appl. No. 12/802,988, dated Aug. 14, 2013, 26 pages.
Office Action from U.S. Appl. No. 13/642,259 dated May 14, 2015, 9 pages.
Office Action from U.S. Appl. No. 13/652,259, dated Feb. 18, 2016, 8 pages.
Office Action from U.S. Appl. No. 13/652,259, dated Sep. 23, 2015, 6 pages.
Office Action from U.S. Appl. No. 13/798,004, dated Jun. 17, 2015, 13 pages.
Office Action from U.S. Appl. No. 14/187,759, dated Mar. 9, 2016, 16 pages.
Office Action from U.S. Appl. No. 14/754,651, dated Mar. 15, 2016, 23 pages.
Office Action received for European Appliction No. 13790935, dated Oct. 23, 2019, 8 pages.
Office Action, KR App. No. 10-2014-7035524, dated Oct. 21, 2019, 11 pages (6 pages of English Translation and 5 pages of Original Document).
Oman H, et al., "Eventful Developments in Energy Conversion", Conference Report, IEEE AESS Systems Magazine, Jan. 2002, pp. 34-40.
Onggosanusi E. N., et al.. High Rate Space- Time Block Coded Scheme: Performance and Improvement in Correlated Fading Channels, Proc. IEEE Wireless Comm and Net. Conf, Mar. 2002, vol. 1, pp. 194-199.

(56) References Cited

OTHER PUBLICATIONS

Oprea (US 2004/0190636)—System and Method For Wireless Communication Systems.
Optimized Markov Chain Monte Carlo for Signal Detection in MIMO Systems: An Analysis of the Stationary Distribution and Mixing Time, Signal Processing, vol. 62, No. 17, Sep. 2014.
Ozgur A., et al., "Spatial Degrees of Freedom of Large Distributed MIMO Systems and Wireless Ad Hoc Networks", Institute of Electrical and Electronics Engineers Journal on Selected Areas in Communications, 2013, vol. 31 (2), pp. 202-214.
Pan, et al., "Precoding and Power avocation for Cooperative Mimo systems", International Conference on Wireless Communications, Networking and Mobile Computing, IEEE, 2006, 4 pages.
Panasonic, "Target scenarios for new carrier types," 3GPP TSG-RAN WGI#72, R1-130684, Jan. 28, 2013-Feb. 1, 2013, 7 pages.
Papadogiannis A., et al. "Efficient Selective Feedback Design for Multicell Cooperative Networks," Institute of Electrical and Electronics Engineers Transactions on Vehicular Technology, 2010, vol. 60 (1), pp. 196-205.
Papadopoulos H. C., et al., Achieving Large Spectral Efficiencies from MU-MIMO with Tens of Antennas Location-Adaptive TDD MU-MIMO Design and User Scheduling, in Proc. IEEE Asilomar Conf. on Signals, Systems, and Computers (ACSSC), Pacific Grove, CA, Nov. 2010, pp. 636-643.
Partial Supplementary European Search Report for Application No. 15780522.7, dated Oct. 20, 2017, 7 pages.
Parvall, et al., "LTE Advanced-Evolving LTE Towards IMT-Advanced," IEEE VTC 2008, 978-1-4244-1722-3/08/$25.00, 5 pages.
Paul Carlisle "Coded Aperture Imaging,"1998, pp. 1-6, printed on Mar. 15, 2007 Internet http://paulcarlisle.net/old/codedaperature.html.
Paulraj A., et al., "Introduction to Space-Time Wireless Communications", 2003, 33 Pages.
Paulraj, "Is OFDMA, MIMO and OS the right stuff for mobile broad- band?" 63 pages, http://www ieeevtc.org/vtc2005fal1/presentations/paulraj.pdf, Sep. 2005.
Payami S., et al., Channel Measurements and Analysis for Very Large Array Systems At 2.6 GHz, in Proc. 6th European Conference on Antennas and Propagation, EuCAP 2012, Prague, Czech Republic, Mar. 26, 2012, 5 pages.
Pedersen et al. (US 2007/0082674); Apr. 12, 2007; Adaptive Broadband Platforms and Methods of Operation.
Per-Erik., et al., "VDSL2: Next Important Broadband Technology", Ericsson Review No. 1, 2006, pp. 36-47.
Perlman, et al., "Distributed-Input Distributed-Output (Dido), Wireless Technology: A New Approach to Multiuser Wireless," Retrieved from http://www.rearden.com/DIDO/DIDO White Paper 110727.pdf, Aug. 2011, 19 pages.
Final Office Action from U.S. Appl. No. 12/802,989, dated Nov. 2, 2016, 14 pages.
Final Office Action from U.S. Appl. No. 12/802,989, dated Nov. 27, 2012, 12 pages.
Final Office Action from U.S. Appl. No. 13/232,996, dated Apr. 11, 2017, 149 pages.
Final Office Action from U.S. Appl. No. 13/232,996, dated Jul. 31, 2013, 12 pages.
Final Office Action from U.S. Appl. No. 13/232,996, dated Mar. 21, 2018, 20 pages.
Final Office Action from U.S. Appl. No. 13/232,996, dated Nov. 12, 2015, 14 pages.
Final Office Action from U.S. Appl. No. 13/232,996, dated Oct. 23, 2014, 15 pages.
Final Office Action from U.S. Appl. No. 13/464,648, dated Aug. 1, 2013, 10 pages.
Final Office Action from U.S. Appl. No. 13/475,598, dated Aug. 27, 2014, 30 pages.
Final Office Action from U.S. Appl. No. 13/652,259, dated Aug. 4, 2016, 7 pages.
Final Office Action from U.S. Appl. No. 13/652,259, dated Oct. 28, 2014, 9 pages.
Final Office Action from U.S. Appl. No. 13/797,950, dated Aug. 24, 2017, 74 pages.
Final Office Action from U.S. Appl. No. 13/797,950, dated Feb. 2, 2016, 65 pages.
Final Office Action from U.S. Appl. No. 13/797,971, dated Oct. 9, 2015, 52 pages.
Final Office Action from U.S. Appl. No. 13/797,984, dated Aug. 20, 2015, 15 pages.
Final Office Action from U.S. Appl. No. 13/797,984, dated Sep. 29, 2016, 13 pages.
Final Office Action from U.S. Appl. No. 13/798,004, dated Feb. 2, 2016, 12 pages.
Final Office Action from U.S. Appl. No. 13/798,004, dated Jun. 26, 2017, 15 pages.
Final Office Action from U.S. Appl. No. 13/798,004, dated Oct. 22, 2014, 8 pages.
Final Office Action from U.S. Appl. No. 13/844,355, dated Aug. 12, 2015, 20 pages.
Final Office Action from U.S. Appl. No. 13/844,355, dated Dec. 15, 2016, 23 pages.
Final Office Action from U.S. Appl. No. 13/844,355, dated Feb. 21, 2019, 34 pages.
Final Office Action from U.S. Appl. No. 13/844,355, dated Feb. 7, 2018, 24 pages.
Final Office Action from U.S. Appl. No. 14/023,302, dated Mar. 2, 2015, 5 pages.
Final Office Action from U.S. Appl. No. 14/086,700, dated Oct. 14, 2016, 11 pages.
Final Office Action from U.S. Appl. No. 14/086,700, dated Sep. 2, 2015, 9 pages.
Final Office Action from U.S. Appl. No. 14/611,565, dated Jun. 16, 2016, 22 pages.
Final Office Action from U.S. Appl. No. 14/611,565, dated Oct. 25, 2017, 25 pages.
Final Office Action from U.S. Appl. No. 14/611,565, dated Oct. 25, 2018, 20 pages.
Final Office Action from U.S. Appl. No. 14/672,014, dated Oct. 16, 2017, 9 pages.
Final Office Action from U.S. Appl. No. 15/057,002, dated Jul. 16, 2018, 13 pages.
Final Office Action from U.S. Appl. No. 15/181,383, dated Jan. 11, 2018, 8 pages.
Final Office Action from U.S. Appl. No. 15/340,914, dated Jan. 3, 2019, 67 pages.
Final Office Action from U.S. Appl. No. 10/817,731, dated Jul. 9, 2008, 21 pages.
Final Office Action from U.S. Appl. No. 10/817,731, dated Sep. 11, 2009, 36 pages.
Final Office Action from U.S. Appl. No. 13/233,006, dated Dec. 19, 2017, 114 pages.
Final Office Action from U.S. Appl. No. 13/233,006, dated Feb. 18, 2014, 18 pages.
Final Office Action from U.S. Appl. No. 13/233,006, dated Nov. 5, 2015, 10 pages.
Final Office Action from U.S. Appl. No. 13/233,006, dated Nov. 13, 2018, 9 pages.
Final Office Action from U.S. Appl. No. 13/233,006, dated Oct. 12, 2016, 10 pages.
Final Office Action from U.S. Appl. No. 13/844,355, dated Jun. 3, 2019, 26 pages.
Final Office Action received for U.S. Appl. No. 14/672,014, dated Oct. 2, 2019, 10 pages.
Final Office Action with partial English translation for Japanese Patent Application No. 2005223345, dated Feb. 18, 2014, 23 pages.
Final Office Action, U.S. Appl. No. 12/802,975, dated Oct. 18, 2019, 21 pages.
Final Office Action, U.S. Appl. No. 15/682,076, dated Oct. 30, 2019, 26 pages.
Final Office Action, U.S. Appl. No. 14/611,565, dated Dec. 4, 2019, 19 pages.

(56) References Cited

OTHER PUBLICATIONS

Final Office Action, U.S. Appl. No. 15/792,610, dated Dec. 16, 2019, 8 pages.
First Exam Report from foreign counterpart New Zealand Application No. 701567, dated Feb. 3, 2016, 4 pages.
First Exam Report from foreign counterpart New Zealand Application No. 701691, dated Feb. 10, 2016, 4 pages.
First Exam Report from foreign counterpart New Zealand Patent Application No. 717370, dated Apr. 8, 2016, 2 pages.
Jindal, N , "MIMO Broadcast Channels With Finite-Rate Feedback," IEEE Trans. on Info. Theory, vol. 52, pp. 5045-5060, Nov. 2006.
Jing J., et al. "A Downlink Max-SINR Precoding for Massive MIMO System," International Journal of Future Generation Communication and Networking, 2014, vol. 7 (3), pp. 107-116.
Joho D., et al., "Articles of the Electronic Information and Communication Society," vol. J87-C (5), May 2004, pp. 1-19.
Jorswieck E.A., et al., "Channel Capacity and Capacity-Range of Beamforming in MIMO Wireless Systems under Correlated Fading with Covariance Feedback," IEEE Transactions on Wireless Communications, Sep. 2004, vol. 3, pp. 1543-1553.
Jose J., "Channel Estimation and Linear Precoding in Multiuser Multiple-Antenna TDD Systems," IEEE Transactions on Vehicular Technology, 2011, vol. 60 (5), pp. 2102-2116.
Jose J., et al. "Pilot Contamination and Precoding in Multi-cell TDD Systems," IEEE Transactions on Wireless Communications, 2011, vol. 10 (8), pp. 2640-2651.
Judge P., "GreenTouch Shows Low Power Wireless," TechWeekEurope UK, [online], Feb. 1, 2011, Retrieved from the Internet: http://www.techweekeruope.co.uk/workspace/greentouch-showslow. 3 pages.
Jungnickel, V., et al., "Capacity of MIMO systems with closely spaced antennas", IEEE Comm. Lett., vol. 7, (Aug. 2003), 361-363 pages.
Kamata H., et al., "Effects of IQ Imbalance and an Effective Compensation Scheme in the MIMO-OFDM Communication System," Proceedings of the 2005 Institute of Electronics, Information and Communication General Conference, Mar. 7, 2005, B-5-90, 5 pages.
Kang M., et al., "Water-Filling Capacity and Beamforming Performance of MIMO Systems With Covariance Feedback," IEEE Workshop on Signal Processing Advances in Wireless Communications, Jun. 2003, pp. 556-560.
Kannan, T.P , et al., "Separation of cochannel signals under imperfect timing and carrier synchronization", IEEE Trans Veh. Technol., vol. 50, No. 1, (Jan. 2001), 79-96 pages.
Karakayali M. K., et al. "Network Coordination for Spectrally Efficient Communications in Cellular Systems," IEEE Wireless Communications Magazine, 2006, vol. 13 (4), pp. 56-61.
Karakayali M. K., et al., "On the Maximum Common Rate Achievable in a Coordinated Network," Proceedings of the International Conference on Communications (ICC'06), Mar. 3, 2006, vol. 9, pp. 1-6.
Kayama H., et al., "Demodulation Reference Signal Design and Channel Estimation for LTE-Advanced Uplink," Advances in Vehicular Networking Technologies, 2011, pp. 418-432.
Kellerman F C., "LDPC OFDM Space-Time Multipath Fading Channel Results," Proceedings SPIE , Digital Wireless Communications, XP-002672064,2003, vol. 5100, pp. 19-30.
Kent, Adrian, et al., "Quantum Tagging: Authenticating Location via Quantum Information and Relativistic Signaling Constraints". 2010, 9 pages. Phys. Rev. A84, 012326 (2011), DOI: 10.1103/PhysRevA.84.012326, arXiv: 1008.2147.
Kermoal J. P., et al., "A Stochastic MIMO Radio Channel Model With Experimental Validation," IEEE Journal on Selected Areas in Communications, 2002, vol. 20 (6), pp. 1211-1226.
Ketchum et al. (US 2004/0179627)—Pilots for MIMO Communication Systems.

Khaled N., et al., "Interpolation Based Multi-Mode Precoding for MIMO-OFDM Systems with Limited Feedback," IEEE Transactions on Wireless Communications, vol. 6 (3), Mar. 2007, pp. 1003-1013.
Knievel C, Low Complexity Receiver for Large-MIMO Space Time Coded Systems, in Proc. IEEE VTC-Fall'2011, Sep. 2011, 5 pages.
Knievel C., et al., "On Particle Swarm Optimization for MIMO Channel Estimation", Article ID 614384, Journal of Electrical and Computer Engineering, 2012, vol. 2012, 10 pages.
Koenig, Robert, et al., "Unconditional security from noisy quantum storage". IEEE Transactions on Information Theory, vol. 58, No. 3, Mar. 2012, pp. 1962-1984.
Kouassi B et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Kreith F., et al., "Efficiency of Advanced Ground Transportation Technologies", Journal of Energy Resources Technology, Copyright 2002 by ASME, Sep. 2002, vol. 124, pp. 173-179.
Krim H., et al., "Two Decades of Array Signal Processing Research," IEEE Signal Processing Magazine, 1996, pp. 67-94.
Krishnan N., et al., "Cellular Systems with Many Antennas: Large System Analysis under Pilot Contamination," in Proceedings of the 50th Annual Allerton Conference on Communication, Control, and Computing, 2012, pp. 1220-1224.
Kumagawa S., et al., "A Study of Introducing Distributed Transmit Power Control to Distributed Antenna System," 2011, 30 pages.
Kumar K.R., et al. "Asymptotic Performance of Linear Receivers in MIMO Fading Channels," IEEE Information Theory Workshop, Feb. 19, 2009, 48 pages.
Lang, S, et al., "Design and development of a 5.25 GHz software defined wireless OFDM communication platform", IEEE Communications Magazine, vol. 42, No. 6, (Jun. 2004), 6-12 pages.
Lau, Hoi-Kwan, et al., "Insecurity of position-based quantum-cryptography protocols against entanglement attacks". Physical Review A (APS), 2010, 83: 012322, 13 pages.
Lee D., et al., "Coordinated Multipoint Transmission and Reception in LTE-Advanced: Deployment Scenarios and Operational Challenges," IEEE Communications Magazine, Feb. 2012, pp. 148-155.
Lee J., "Introduction of LTE-Advanced DL/UL MIMO," Samsung Electronics, Sep. 2009, 18 pages.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Lee J., et al., "MIMO Technologies in 3GPP LTE and LTE-Advanced," EURASIP Journal on Wireless Communications and Networking, 2009, 10 pages.
Lee, K, et al., "Frequency-offset estimation for MIMO and OFDM systems using orthogonal training sequences", IEEE Trans Veh. Technol., vol. 56, No. 1, (Jan. 2007), 146-156 pages.
Letter Restarting Period for Response from U.S. Appl. No. 13/233,006, dated Apr. 15, 2016, 9 pages.
Li P., et al., Multiple Output Selection-LAS Algorithm in Large MIMO Systems, IEEE Commun., 2010, vol. 14 (5), pp. 399-401.
Liang et al., "Asymptotic Performance of MMSE Receivers for Large Systems Using Random Matrix Theory," IEEE Transactions on Information Theory, 2007, vol. 53(11), pp. 4173-4190.
Liang Y., et al., "Interference Suppression in Wireless Cellular Networks through Picocells," Annual Conference on Social Studies Communication and Education, 2007, vol. 2007, pp. 1041-1045.
Liang Y., et al., "On the Relationship Between MMSE-SIC and Bi-GDFE Receivers for Large Multiple-Input Multiple-Output Channels," IEEE Transactions on Signal Processing, 2008, vol. 56 (8), pp. 3627-3637.
Liang Y.C., et al., "Block-iterative Generalized Decision Feedback Equalizers (BI-GDFE) for Large MIMO Systems Algorithm Design and Asymptotic Performance Analysis," IEEE Transactions on Signal Processing, 2006, vol. 54(6), pp. 2035-2048.
Lin, et al., "Mirror MoCap: Automatic and efficient capture of dense 3D facial motion parameters from video", The Visual Computer,

(56) References Cited

OTHER PUBLICATIONS

International Journal of Computer Graphics, Springer, Berlin, DE, vol. 21, No. 6, Jul. 2005, pp. 355-372, XP019339114.
Lindstrom M (Ericsson), "LTE-Advanced Radio Layer 2 and RRC Aspects," 3GPP TSG- RAN WG2, Dec. 17-18, 2009, 38 pages.
Liu G., "Time and frequency offset estimation for distributed multiple-input multiple-output orthogonal frequency division multiplexing system," Institute of Engineering and Technology Communications, 2010, vol. 4 (6), pp. 708-715.
Love D J., et al.,"Grassmannian Beamforming for Multiple-Input Multiple-Output Wireless Systems", IEEE Trans, on Info. Theory special issue on MIMO Communication, 2003, vol. 49, pp. 2735-2747.
Love DJ., et al., "An Overview of Limited Feedback in Wireless Communication Systems," Special Issue on Exploiting Limited Feedback in Tomorrow's Wireless Communication Networks, IEEE Journal on Sel. Areas in Comm., 2008, vol. 26 (8), pp. 1341-1365.
Lozano A., et al., "Fundamental Limits of Cooperation", Mar. 2012, 27 pages.
Luise M., et al., "Low-complexity blind carrier frequency recovery for OFDM signals over frequency-selective radio channels," IEEE Transactions. Communications, 2002, vol. 50 (7), pp. 1182-1188.
Luise, M , et al., "Carrier frequency acquisition and tracking for OFDM systems", IEEE Trans. Commun., vol. 44, No. 11, (Nov. 1996), 1590-1598 pages.
Non-Final Office Action from U.S. Appl. No. 13/475,598, dated Mar. 23, 2015, 14 pages.
Non-Final Office Action from U.S. Appl. No. 13/633,702, dated Dec. 17, 2013, 21 pages.
Non-Final Office Action from U.S. Appl. No. 13/797,984, dated Feb. 28, 2017, 13 pages.
Non-Final Office Action from U.S. Appl. No. 13/797,984, dated Jan. 14, 2016, 14 pages.
Non-Final Office Action from U.S. Appl. No. 13/797,984, dated Jan. 29, 2015, 15 pages.
Non-Final office action from U.S. Appl. No. 13/844,355, dated Aug. 12, 2019, 14 pages.
Non-Final Office Action from U.S. Appl. No. 13/844,355, dated Jan. 8, 2015, 23 pages.
Non-final Office Action from U.S. Appl. No. 13/844,355, dated Mar. 21, 2019, 31 pages.
Non-Final Office Action from U.S. Appl. No. 14/023,302, dated Jul. 17, 2014, 37 pages.
Non-Final Office Action from U.S. Appl. No. 14/086,700, dated Apr. 2, 2015, 12 pages.
Non-Final Office Action from U.S. Appl. No. 14/611,565, dated Apr. 4, 2019, 35 pages.
Non-Final Office Action from U.S. Appl. No. 14/611,565, dated Aug. 31, 2015, 21 pages.
Non-Final Office Action from U.S. Appl. No. 14/611,565, dated Mar. 14, 2017, 23 pages.
Non-Final Office Action from U.S. Appl. No. 14/672,014, dated Dec. 30, 2016, 7 pages.
Non-Final Office Action from U.S. Appl. No. 14/672,014, dated Jun. 14, 2018, 129 pages.
Non-Final office action from U.S. Appl. No. 15/057,002, dated Oct. 23, 2017, 60 pages.
Non-Final Office Action from U.S. Appl. No. 15/201,276, dated Jan. 25, 2018, 77 pages.
Non-Final Office Action from U.S. Appl. No. 15/201,276, dated Mar. 1, 2017, 107 pages.
Non-Final Office Action from U.S. Appl. No. 15/340,914, dated Apr. 25, 2018, 15 pages.
Non-Final office action from U.S. Appl. No. 15/340,914, dated Aug. 8, 2019, 27 pages.
Non-Final Office Action from U.S. Appl. No. 15/340,914, dated Jul. 21, 2017, 114 pages.
Non-Final Office Action from U.S. Appl. No. 15/616,817, dated Nov. 1, 2017, 14 pages.
Non-Final Office Action from U.S. Appl. No. 15/792,610, dated Apr. 18, 2019, 147 pages.
Non-Final Office Action from U.S. Appl. No. 16/208,895, dated Apr. 26, 2019, 7 pages.
Non-Final Office Action, U.S. Appl. No. 16/253,028, dated Oct. 18, 2019, 10 pages.
Notice of Acceptance for Foreign counterpart Australia Patent Application No. 2006249578, dated Jan. 3, 2012, 3 pages.
Notice of Acceptance for Patent Application, AU App. No. 2018253582, dated Nov. 18, 2019, 3 pages.
Notice of Acceptance from foreign counterpart Australian Patent Application No. 2013327697, dated Feb. 15, 2017, 4 pages.
Notice of Acceptance from foreign counterpart Australian Patent Application No. 2014248533, dated Jun. 28, 2017, 4 pages.
Notice of Acceptance from foreign counterpart Australian Patent Application No. 20160219662, dated May 5, 2017, 3 pages.
Notice of Acceptance from foreign counterpart Australian Patent Application No. AU20140200745, dated Sep. 19, 2016, 3 page.
Notice of Acceptance from foreign counterpart New Zealand Patent Application No. 610463 dated Aug. 5, 2015, 1 page.
Notice of Acceptance from foreign counterpart New Zealand Patent Application No. 717370, dated Jan. 10, 2018, 1 page.
Notice of Acceptance from foreign counterpart New Zealand Patent Application No. 729017, dated Jun. 28, 2018, 1 page.
Notice of Acceptance from foreign counterpart New Zealand Patent Application No. 738000, dated Jun. 4, 2019, 1 page.
Notice of Acceptance from Foreign Counterpart Patent Application No. 2012308632, dated Sep. 13, 2017, 4 pages.
Notice of acceptance, AU App. No. 2017210619, dated Oct. 14, 2019, 4 pages.
Notice of acceptance, AU App. No. 2018201553, dated Nov. 14, 2019, 4 pages.
Notice of Allowance and Search Report from foreign counterpart Taiwan Patent Application No. 102134408, dated Feb. 17, 2017, 9 pages.
Notice of Allowance for Patent from foreign counterpart Korean Patent Application No. 10-2017- 7002596, dated Feb. 27, 2019, 3 pages.
Notice of Allowance from counterpart Mexican Patent Application No. MX/a/2014/002900, dated Nov. 26, 2015,4 pages Translation attached.
Notice of Allowance from counterpart U.S. Appl. No. 12/917,257, dated Dec. 6, 2012, 8 pages.
Notice of Allowance from foreign counterpart Australian Patent Application No. 2011323559, dated May 13, 2016, 2 pages.
Notice of Allowance from foreign counterpart Canadian Patent Application No. 2,659,572, dated Jun. 7, 2016, 1 page.
Notice of Allowance from foreign counterpart Canadian Patent Application No. 2695799, dated Feb. 9, 2016, 1 page.
Notice of Allowance from foreign counterpart Canadian Patent Application No. P14906, dated Jun. 1, 2015, 1 page.
Notice of Allowance from foreign counterpart Korean Patent Application No. 2015-7002560, dated Feb. 4, 2016, 2 Pages.
Notice of Allowance from U.S. Appl. No. 10/758,475, dated May 11, 2009, 4 pages.
Notice of Allowance from U.S. Appl. No. 11/039,029, dated Mar. 24, 2010, 5 pages.
Notice of Allowance from U.S. Appl. No. 11/136,946, dated Jul. 14, 2008, 7 pages.
Office Action, IL App. No. 248265, dated Feb. 26, 2020, 4 pages (2 pages of English Translation and 2 pages of Original Document).
Office Action, IL App. No. 269145, dated Jun. 16, 2020, 4 pages (2 pages of English Translation and 2 pages of Original Document).
Office Action, IL App. No. 270106, dated May 19, 2020, 8 pages (4 pages of English Translation and 4 pages of Original Document).
Office Action, JP App. No. 2016-562961, dated Feb. 6, 2020, 7 pages (4 pages of English Translation and 3 pages of Original Document).
Office Action, JP App. No. 2018-222367, dated Jun. 8, 2020, 7 pages (4 pages of English Translation and 3 pages of Original Document).
Office Action, JP App. No. 2019-093904, dated Jul. 6, 2020, 6 pages (3 pages of English Translation and 3 pages of Original Document).

(56) References Cited

OTHER PUBLICATIONS

Office Action, KR App. No. 10-2015-7028298, dated Jul. 27, 2020, 14 pages (8 pages of English Translation and 6 pages of Original Document).
Office Action, KR App. No. 10-2015-7029455, dated Jul. 27, 2020, 14 pages (8 pages of English Translation and 6 pages of Original Document).
Office Action, TW App. No. 108118765, dated Apr. 16, 2020, 6 pages (3 pages of English Translation and 3 pages of Original Document).
Office Action, TW App. No. 108148122, dated Jul. 8, 2020, 19 pages (8 pages of English Translation and 11 pages of Original Document).
Qualcomm Incorporated, "Definition of Virtual Antenna Mapping (VAM) and Applicability of S-CPICH Power Accuracy Requirement", Meeting 58Ad hoc #1-2011, R4-112408, Apr. 11-15, 2011, 6 pages.
Summons to attend oral proceedings pursuant to Rule 115(1) EPC, EP App. No. 12762167.0, Nov. 29, 2017, 8 pages.
Summons to attend oral proceedings pursuant to Rule 115(1) EPC, EP App. No. 13784690.3 Jul. 6, 2020, 5 pages.
Summons to attend oral proceedings pursuant to Rule 115(1) EPC, EP App. No. 13856705.2, Nov. 5, 2018, 7 pages.
Summons to attend oral proceedings pursuant to Rule 115(1) EPC, EP App. No. 14779084.4, Nov. 29, 2019, 9 pages.
Supplementary Partial European Search Report and Search Opinion, EP App No. 17864744.2, May 13, 2020, 16 pages.
Communication under rule 71(3) EPC from foreign counterpart European Application No. 08798313.6, dated Oct. 24, 2017, 8 pages.
Coopersmith D., et al., "Matrix Multiplication via Arithmetic Progression", Journal of Symbolic Computation, 1990, vol. 9, pp. 251-280.
Corrected Notice of Allowability from U.S. Appl. No. 15/057,002, dated Jun. 3, 2019, 11 pages.
Corrected Notice of Allowance from U.S. Appl. No. 13/797,950, dated Nov. 13, 2018, 16 pages.
Corrected Notice of Allowance from U.S. Appl. No. 13/797,984, dated Apr. 5, 2018, 12 pages.
Corrected Notice of Allowance from U.S. Appl. No. 13/797,984, dated Feb. 8, 2018, 4 pages.
Corrected Notice of Allowance from U.S. Appl. No. 14/086,700, dated Nov. 8, 2018, 104 pages.
Couillet R., et al., "A Deterministic Equivalent for the Analysis of Correlated MIMO Multiple Access Channels," IEEE Trans Inform. Theory, 2011, vol. 57 (6), pp. 3493-3514.
Coulson J., et al., "Maximum likelihood synchronization for OFDM using a pilot symbol: analysis," IEEE Journal on Selected Areas in Communications, 2001, vol. 19 (12), pp. 2495-2503.
Dahlman E., et al., "4G: LTE/LTE-Advanced for Mobile Broadband", Elsevier, 2011, Cover page, Title page, Copyright page, Table of Contents, 21 pages.
Dai et al., "Reduced-complexity performance-lossless (quasi-)maximum-likelihood detectors for S-QAM modulated MIMO systems," Electronics Letters, 2013, vol. 49(11), pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17(5), pp. 916-919.
Dai X., et al., "Carrier frequency offset estimation for OFDM/SDMA systems using consecutive pilots," IEEE Proceedings Communications, 2005, vol. 152, pp. 624-632.
Damgard, Ivan, et al., "Cryptography in the Bounded Quantum-Storage Model". IEEE, FOCS 2005, pp. 24-27.
Daniel J., "Introduction to public safety: RF Signal Distribution Using Fiber Optics," 2009, 13 pages, http://www.rfsolutions.com/fiber.pdf.
Datta et al., "Random-Restart Reactive Tabu Search Algorithm for Detection in Large-MIMO Systems," IEEE Communications Letters, 2010, vol. 14(12), pp. 1107-1109.

Datta T., et al., "A Novel MCMC Based Receiver for Large-Scale Uplink Multiuser MIMO Systems," Jan. 2012, 37 pages.
Datta, et al., "A Hybrid RTS-BP Algorithm for Improved Detection of Large-MIMO M-QAM Signals," in Proc. IEEE National Conference on Communication, 2011, 6 pages.
Debbah M., et al., "MIMO Channel Modelling and the Principle of Maximum Entropy," IEEE Transactions on Information Theory, 2005, vol. 51 (5), pp. 1667-1690.
Decision of Grant a Patent from foreign counterpart Japanese Application No. 2016120928, dated Apr. 10, 2017, 6 pages.
Decision of Grant from foreign counterpart Japanese Patent Application No. 2015-510498, dated Jun. 14, 2017, 6 pages.
Decision of Grant from foreign counterpart Russian Patent Application No. 2014151216, dated Jan. 31, 2017, 18 pages.
Decision of Refusal from foreign counterpart Japanese Patent Application No. 2014530763, dated Dec. 19, 2016, 6 pages.
Decision of Refusal from foreign counterpart Korean Patent Application No. 2010-7006265, dated Apr. 23, 2015, 2 pages.
Decision of Rejection office action for Japan Patent Application No. 2008-513486, dated Jul. 19, 2011, 12 pages.
Decision to grant a European patent pursuant to Article 97(1) EPC for Application No. 11838640.8, dated Feb. 7, 2019, 2 pages.
Decision to Grant a Patent from foreign counterpart Japanese Patent Application No. 2017-082862, dated Dec. 10, 2018, 7 pages.
Decision to Grant a patent from foreign counterpart Japanese Patent Application No. 2017-110950, dated Nov. 15, 2017, 6 pages.
Degen C., et al., "Performance evaluation of MIMO systems using dual-polarized antennas," International Conference on Telecommunications, 2003, vol. 2, pp. 1520-1525.
Delfas N., "Mobile Data Wave: Who Dares to Invest, Wins," Morgan Stanley Research Global, Jun. 13, 2012, pp. 1-62.
Demirodoeven N., et al., "Hybrid Cars Now, Fuel Cell Cars Later", Aug. 13, 2004, vol. 305 Science, pp. 974-976, www.sciencemag.org.
Derrick W K et al., "Energy-Efficient Resource Allocation in OFDMA Systems with Large Numbers of Base Station Antennas", 2011, 30 pages.
Devasirvatham, "Time Delay Spread and Signal Level Measurements of 850 MHz Radio Waves in Building Environments," IEEE Transactions on Antennas and Propagation, 1986, vol. AP-34 (11), pp. 1300-1305.
Devasirvatham, et al., "Time Delay Spread Measurements at 850 MHz and 1 7 GHz Inside a Metropolitan Office Building", Electronics Letters, Feb. 2, 1989, vol. 25, No. 3, pp. 194-196.
Devasirvatham, et al., Radio Propagation Measurements at 850MHz. 1.7GHz and 4GHz Inside Two Dissimilar Office Buildings, Electronics Letter Mar. 29, 1990 vol. 26 No. 7, pp. 445-447.
Devillers B et al., Mutual coupling effects in multiuser massive MIMO base stations, IEEE Antennas and Propagation Society International Symposium (APSURSI), Jul. 2012, 2 pages.
Dicks R.H., "Scatter-Hole Cameras for X-Rays and Gamma Rays,"Astrophysical Journal, 1968, vol. 153, pp. L101-L106.
Dietrich C B., et al., "Spatial, polarization, and pattern diversity for wireless handheld terminals," Proc. IEEE Antennas and Prop. Symp, 2001, vol. 49, pp. 1271-1281.
Dighe et al., "Analysis of Transmit-Receive Diversity in Rayleigh Fading", IEEE Transactions on Communications, vol. 51 (4), Apr. 2003, pp. 694-703.
DigitalAir wireless, GeoDesy Laser Links 1.25Gbps Full Duplex, downloaded from URL: http:www.digitalairwireless.comoutdoor-wireless-networkspoint-to-point-wirelesslaser-fso-linksgeodesy-fso-laser-links.html on Oct. 2, 2015,4 pages.
DigitalAir wireless, Outdoor Wireless, Sep. 29, 2015, 5 pages, printed on Sep. 29, 2015. Retrieved from the Internet: <URL: http:www digitalairwireless.comoutdoor-wireless-networks.html>.
Ding, P. et al., "On the Sum Rate of Channel Subspace Feedback for Multi-Antenna Broadcast Channels," in Proc., IEEE Globecom, vol. 5, pp. 2699-2703, Nov. 2005.
Discussion Draft, A bill, 112th congress, 1st session, Jul. 12, 2011, House Republicans, Spectrum Innovation Act of 2011, 2011, 55 pages.

(56) References Cited

OTHER PUBLICATIONS

Dohler M., et al., "A Step towards MIMO: Virtual Antenna Arrays," European Cooperation in the Field of Scientific and Technical Research, 2003, 9 pages.

Dong L., et al., "Multiple-input multiple-output wireless communication systems using antenna pattern diversity," Proceedings of IEEE Globe Telecommunications Conference, 2002, vol. 1, pp. 997-1001.

Dumont J., et al. "On the Capacity Achieving Transmit Covariance Matrices for MIMO Rician Channels: An Asymptotic Approach," IEEE Transactions on Information Theory, 2010, vol. 56 (3), pp. 1048-1069.

Dupuy, et al., "On the Capacity Achieving Covariance Matrix for Frequency Selective MIMO Channels Using the Asymptotic Approach", IEEE Trans. Inform. Theory. 2010, pp. 2153-2157.

Dupuy, et al., On the Capacity Achieving Covariance Matrix for Frequency Selective MIMO Channels Using the Asymptotic Approach, IEEE Trans. Inform Theory, 2011, vol. 57 (9), pp. 5737-5753.

Durgin, "Space-Time Wireless Channels", Prentice Hall Communications Engineering and Emerging Technologies Series, 2003, Upper Saddle River, NJ, Cover page, Title pages, Copyright page, Table of Contents, Preface, 16 pages, USA.

Dziembowski, Stefan, et al. "On Generating the Initial Key in the Bounded-Storage Model". Eurocrypt 2004. LNCS 3027. Springer, pp. 126-137.

Notice of Allowance, dated May 17, 2016 for U.S. Appl. No. 14/023,302, filed Sep. 10, 2013, 5 pages.

Notice of Allowance, U.S. Appl. No. 13/844,355, dated Oct. 21, 2019, 8 pages.

Notice of Allowance, U.S. Appl. No. 16/253,028, dated Dec. 27, 2019, 10 pages.

Notice of Allowance, U.S. Appl. No. 13/844,355, dated Dec. 16, 2019, 2 pages.

Notice of Allowance from U.S. Appl. No. 12/802,958, dated Sep. 19, 2018, 22 pages.

Notice of Allowance from U.S. Appl. No. 15/057,002, dated Dec. 19, 2018, 68 pages.

Notice of Grant for Foreign counterpart China Patent Application No. 200680021909.9, dated Mar. 5, 2012, 3 pages.

Notice of Grant for Foreign counterpart Russian Patent Application No. 2007148006 /11, dated Mar. 17, 2010, 12 pages.

Notice of Grant from foreign counterpart China Patent Application No. 201210464974.6, dated Jul. 1, 2015, 3 pages.

Notice of Reasons for Rejection from foreign counterpart Japanese Patent Application No. 20150510498, dated Sep. 26, 2016, 21 pages.

Notice of Reasons for Rejection from foreign counterpart Japanese Patent Application No. 2016-234908, dated May 30, 2019, 5 pages.

Notice of Reasons for Rejection from foreign counterpart Japanese Patent Application No. 2016-23490, dated Nov. 22, 2018, 10 pages.

Notice of Reasons for Rejection from foreign counterpart Japanese Patent Application No. 2016-501744, dated Mar. 5, 2018, 15 pages.

Notice of Reasons for Rejection from foreign counterpart Korean Patent Application No. 10- 2014-7009876, dated Mar. 25, 2019, 11 pages.

Notice to File a Response from foreign counterpart Korea Patent Application No. 10-2007-7028402, dated Jul. 31, 2012, 13 pages.

Notice to File a Response from foreign counterpart Korean Patent Application No. 10-2018-7035654, dated Dec. 14, 2018, 10 pages.

Notification for Granting Patent Right from foreign counterpart Chinese Patent Application No. 201180061132.X, dated Apr. 6, 2017, 6 pages.

Notification of Reason for Refusal from foreign counterpart Korean Patent Application No. 2019-7014768, dated Jun. 27, 2019, 10 pages.

Notification of Reason for Rejection for counterpart Japan Patent Application No. 2007552179, dated Oct. 28, 2010, 2 pages.

Notification of Reason for Rejection office action from foreign counterpart for Japan Patent Application No. 2008-513486, dated Dec. 6, 2010, 2 pages.

Notification of Reasons for Refusal from foreign counterpart Japanese Patent Application No. 2017-112639, dated Aug. 13, 2018, 4 pages.

Notification of the 1st Substantive requirement, MX App. No. MX/A/2017/002906, dated Sep. 13, 2019, 6 pages (3 pages of English Translation and 3 pages of Original Document).

Notification on Grant of Patent Right for Invention from foreign counterpart Chinese Patent Application No. 201210466082.X, dated Jan. 26, 2017, 3 pages.

NuCORE Technology, CleanCapture NCX-1260 Analog Image Processor, 2004, 12 pages.

Oberli C., et al., "Maximum likelihood tracking algorithms for MIMOOFDM, in Communications," IEEE International Conference on Networking, Jun. 20-24, 2004, vol. 4, pp. 2468-2472.

Oday., "Measured Path Loss and Multipath Propagation Characteristics in UHF and Microwave Frequency Bands for Urban Mobile Communications," IEEE, 2001, pp. 337-341.

Office Action and Examination Search Report from foreign counterpart Canadian Patent Application No. 2885817, dated Jul. 16, 2019, 4 pages.

Office Action and Examination Search Report from foreign counterpart Canadian Patent Application No. 2904981, dated May 3, 2019, 6 pages.

Office Action and Search Report from foreign counterpart Chinese Patent Application No. CN201380035543, dated Jan. 3, 2017, 22 pages.

Office Action and Search Report from foreign counterpart Russian Patent Application No. 2014148791 /28(078479), dated Apr. 13, 2017, 14 pages.

Office Action and Search Report from foreign counterpart Russian Patent Application No. 2015143188/07, dated Dec. 15, 2017, 13 pages.

Office Action and Search Report from foreign counterpart Russian Patent Application No. 2016144927/08(072072), dated Oct. 30, 2018, 12 pages.

Office Action and Search Report from foreign counterpart Taiwan Patent Application No. 103107541, dated Dec. 6, 2017, 15 pages.

Office Action and Search Report from foreign counterpart Taiwan Patent Application No. 105143637, dated Jan. 19, 2018, 12 pages.

Office Action and Search Report from foreign counterpart Taiwan Patent Application No. 107123446, dated Aug. 8, 2019, 27 pages.

Office Action for foreign counterpart China Patent Application No. 20051008867.1, dated Oct. 26, 2010, 4 pages.

Office Action from foreign counterpart Australian Patent Application No. 2004203336, dated Jun. 5, 2009, 2 pages.

Office Action from foreign counterpart Canada Patent Application No. 2514383, dated Jul. 26, 2012, 3 pages.

Office Action from foreign counterpart Canadian Patent Application No. 2816556, dated May 30, 2019, 3 pages.

Office Action from foreign counterpart China Patent Application No. 200510088676, dated Jan. 25, 2011, 8 pages.

Office Action from foreign counterpart China Patent Application No. 200510088676.1, dated Feb. 5, 2010, 18 pages.

Office Action from foreign counterpart China Patent Application No. 200510088676.1, dated Mar. 20, 2009, 24 pages.

Office Action from foreign counterpart China Patent Application No. 201180061132.X, dated May 27, 2015, 6 pages.

Office Action from foreign counterpart China Patent Application No. 201180061132.X, dated Oct. 10, 2016, 11 pages.

Office Action from foreign counterpart Chinese Patent Application No. 201380061515.6, dated Apr. 23, 2019, 2 pages.

Office Action from foreign counterpart for Japan Patent Application No. 2007-506302, dated Jan. 11, 2011, 5 pages.

Office Action from foreign counterpart Israel Patent Application No. 235518, dated Apr. 7, 2019, 4 pages.

Office Action from foreign counterpart Israel Patent Application No. 248265, dated Oct. 25, 2018, 6 pages.

Office Action from foreign counterpart Israel Patent Application No. 253541 dated Nov. 29, 2018, 4 pages.

Office Action from foreign counterpart Japan Patent Application No. 2013-537753, dated Sep. 7, 2015, 9 pages.

(56) References Cited

OTHER PUBLICATIONS

Ngo H.Q., et al., The multicell multiuser MIMO uplink with very large antenna arrays and a finite-dimensional channel, IEEE Transactions Communications, 2013, vol. 61 (6), pp. 2350-2361.
Ngo H.Q., et al., Uplink Performance Analysis of Multicell MU-MIMO Systems with ZF Receivers, Jun. 2012, pp. 1-32.
Nguyen S., et al., "Compressive Sensing-Based Channel Estimation for Massive Multiuser MIMO Systems" in proceeding IEEE WCNC, 2013, 6 pages.
Nguyen S., et al., "Precoding for Multicell Massive MIMO Systems With Compressive Rank-Q Channel Approximation," 24th IEEE International Symposium, 2013, pp. 1227-1232.
Nguyen, et al., "Multiuser Transmit Beamforming via Regularized Channel Inversion: A Large System Analysis" IEEE Global Communications Conference, New Orleans, LO, US, Dec. 2008, pp. 1-4.
Nicta, "InterfereX", downloaded Jun. 22, 2015, 3 pages, http://www.interfereX.com.
Nokia Siemens Networks, "2020: Beyond 4g, Radio Evolution for the Gigabit Experience", White Paper, 2011, www.nokiasiemensnetworks.com, 16 pages.
Non-Final Office Action from U.S. Appl. No. 10/758,475, dated Nov. 24, 2008, 8 pages.
Non-Final Office Action from U.S. Appl. No. 11/210,098, dated Sep. 26, 2007, 8 pages.
Non-Final Office Action from U.S. Appl. No. 13/652,259, dated Mar. 31, 2017, 7 pages.
Non-Final Office Action from U.S. Appl. No. 13/798,004, dated Mar. 26, 2014, 12 pages.
Non-Final Office Action from U.S. Appl. No. 13/798,004, dated Sep. 23, 2016, 11 pages.
Non-Final Office Action from U.S. Appl. No. 10/758,475, dated Oct. 16, 2007, 8 pages.
Non-Final Office Action from U.S. Appl. No. 10/902,978, dated Apr. 10, 2008, 8 pages.
Non-Final Office Action from U.S. Appl. No. 10/902,978, dated Nov. 6, 2007, 11 pages.
Non-Final Office Action from U.S. Appl. No. 11/039,029, dated Apr. 12, 2007, 5 pages.
Non-Final Office Action from U.S. Appl. No. 11/039,029, dated Aug. 14, 2009, 13 pages.
Non-Final Office Action from U.S. Appl. No. 11/039,029, dated Jun. 27, 2006, 9 pages.
Non-Final Office Action from U.S. Appl. No. 11/039,029, dated Mar. 17, 2008, 9 pages.
Non-Final Office Action from U.S. Appl. No. 11/136,946, dated Nov. 14, 2007, 9 pages.
Non-Final Office Action from U.S. Appl. No. 11/210,098, dated Jun. 22, 2006 8 pages.
Non-Final Office Action from U.S. Appl. No. 11/894,362, dated Oct. 29, 2008, 17 pages.
Non-Final Office Action from U.S. Appl. No. 11/894,540, dated Apr. 29, 2009, 8 pages.
Non-Final Office Action from U.S. Appl. No. 11/899,814, dated Aug. 17, 2009, 10 pages.
Non-Final Office Action from U.S. Appl. No. 11/899,814, dated Mar. 7, 2008, 13 pages.
Non-Final Office Action from U.S. Appl. No. 12/291,856, dated Dec. 7, 2010, 12 pages.
Non-Final Office Action from U.S. Appl. No. 12/291,858, dated Dec. 7, 2010, 12 pages.
Non-Final Office Action from U.S. Appl. No. 12/291,858, dated Jun. 28, 2012, 5 pages.
Non-Final Office Action from U.S. Appl. No. 12/637,643, dated Jun. 7, 2012, 25 pages.
Non-Final Office Action from U.S. Appl. No. 12/691,500, dated Aug. 23, 2010, 9 pages.
Non-Final Office Action from U.S. Appl. No. 12/802,958, dated Aug. 13, 2015, 22 pages.
Non-Final Office Action from U.S. Appl. No. 12/802,958, dated Jan. 16, 2018, 118 pages.
Non-Final Office Action from U.S. Appl. No. 12/802,958, dated Nov. 21, 2012, 17 pages.
Non-Final Office Action from U.S. Appl. No. 12/802,958, dated Nov. 4, 2016, 19 pages.
Non-Final Office Action from U.S. Appl. No. 12/802,974, dated Apr. 24, 2015, 27 pages.
Non-Final Office Action from U.S. Appl. No. 12/802,975, dated Jan. 14, 2019, 112 pages.
Non-Final Office Action from U.S. Appl. No. 12/802,975, dated Jul. 1, 2016, 21 pages.
Non-Final Office Action from U.S. Appl. No. 12/802,975, dated Sep. 14, 2017, 23 pages.
Non-Final Office Action from U.S. Appl. No. 12/802,988, dated Apr. 17, 2012,10 pages.
Non-Final Office Action from U.S. Appl. No. 12/802,988, dated Aug. 15, 2016, 19 pages.
Non-Final Office Action from U.S. Appl. No. 12/802,988, dated Sep. 15, 2017, 11 pages.
Non-Final Office Action from U.S. Appl. No. 12/802,989, dated Jun. 14, 2012, 10 pages.
Non-Final Office Action from U.S. Appl. No. 12/802,989, dated Mar. 30, 2016, 35 pages.
Non-Final Office Action from U.S. Appl. No. 13/226,461, dated Dec. 27, 2011, 10 pages.
Non-Final Office Action from U.S. Appl. No. 13/232,996, dated Jun. 20, 2016, 30 pages.
Non-Final Office Action from U.S. Appl. No. 13/232,996, dated Mar. 21, 2014, 9 pages.
Non-Final Office Action from U.S. Appl. No. 13/232,996, dated Nov. 5, 2018, 36 pages.
Non-Final Office Action from U.S. Appl. No. 13/232,996, dated Sep. 21, 2017, 15 pages.
Non-Final Office Action from U.S. Appl. No. 13/464,648, dated Feb. 12, 2013, 12 pages.
Non-Final Office Action from U.S. Appl. No. 13/475,598, dated Dec. 30, 2013, 16 pages.
Federal Communications Commission, "Evaluating Compliance with FCC Guidelines for Human Exposure to Radiofrequency Electromagnetic Fields," OET Bulletin 65, Ed. 97-01, Aug. 1997, 84 pages.
Fella A., "Adaptive WiMAX Antennas: The promise of higher ROI," http:www.wimax.comcommentaryspotlightspotlight8-08-2005searchterm=Adlane Fella, printed May 9, 2008, Aug. 8, 2005, 3 pages.
Feng S., et al., "Self-organizing networks (SON) in 3GPP LTE", Nom or Research, May 2008, pp. 1-15.
Fenimore E.E, "Coded Aperture Imaging: Predicted Performance of Uniformly Redundant Arrays,"Applied Optics, 1978, vol. 17 (22), pp. 3562-3570.
Fenimore E.E., "Large Symmetric .pi. Transformations for Hadamard Transforms,"Applied Optics, 1983, vol. 22(6), pp. 826-829.
Fenimore E.E., "Time-Resolved and Energy-Resolved Coded Aperture Images with URA Tagging, "Applied Optics, 1987, vol. 26 (14), pp. 2760-2769.
Fenimore E.E., "X-Ray Imaging Using Uniformly Redundant Arrays,"1979, pp. 1-4.
Fenimore E.E., et al., "Coded Aperture Imaging: The Modulation Transfer Function for Uniformly Redundant Arrays,"Applied Optics, 1980, vol. 19(14), pp. 2465-2471.
Fenimore E.E., et al.,, "Fast Delta Hadamard Transform,"Applied Optics, 1981, vol. 20(1 7), pp. 3058-3067.
Fenimore E.E., et al., "Coded Aperture Imaging with Uniformly Redundant Arrays," Applied Optics, 1978, vol. 17(3), pp. 337-347.
Fenimore E.E., et al., "Comparison of Fresnel Zone Plates and Uniformly Redundant Arrays,"SPIE, Applications of Digital Image Processing, 1978, vol. 149, pp. 232-236.
Fenimore E.E., et al., "Tomographical Imaging Using Uniformly Redundant Arrays,"Applied Optics, 1979, vol. 18(7), pp. 1052-1057.
Fenimore E.E., et al., "Uniformly Redundant Array Imaging of Laser Driven Compressions: Preliminary Results," Applied Optics, 1979, vol. 18(7), pp. 945-947.

(56) References Cited

OTHER PUBLICATIONS

Fenimore E.E., et al., "Uniformly Redundant Arrays," Digital Signal Processing Symposium, 1977, pp. 1-14.
Fenimore E.E., et al., "Uniformly Redundant Arrays: Digital Reconstruction Methods," Applied Optics, 1981, vol. 20(10), pp. 1858-1864.
Final Office Action for Japanese Application No. 2005223345, dated May 12, 2011, 9 pages.
Final Office Action from U.S. Appl. No. 10/758,475, dated Jul. 8, 2008, 8 pages.
Final Office Action from U.S. Appl. No. 11/039,029, dated Dec. 15, 2006, 10 pages.
Final Office Action from U.S. Appl. No. 11/039,029, dated Mar. 3, 2009, 9 pages.
Final Office Action from U.S. Appl. No. 11/039,029, dated Nov. 6, 2007, 11 pages.
Final Office Action from U.S. Appl. No. 11/039,029, dated Nov. 6, 2008, 7 pages.
Final Office Action from U.S. Appl. No. 11/210,098, dated Aug. 21, 2008, 10 pages.
Final Office Action from U.S. Appl. No. 11/210,098, dated Jan. 13, 2009, 7 pages.
Final Office Action from U.S. Appl. No. 11/210,098, dated Jan. 29, 2007, 9 pages.
Final Office Action from U.S. Appl. No. 11/210,098, dated Mar. 31, 2008, 8 pages.
Final Office Action from U.S. Appl. No. 11/899,814, dated Jul. 29, 2008, 8 pages.
Final Office Action from U.S. Appl. No. 11/899,814, dated Mar. 3, 2009, 8 pages.
Final Office Action from U.S. Appl. No. 12/291,856, dated Sep. 15, 2011, 16 pages.
Final Office Action from U.S. Appl. No. 12/291,858, dated Sep. 15, 2011, 15 pages.
Final Office Action from U.S. Appl. No. 12/630,627, dated Apr. 2, 2013, 23 pages.
Final Office Action from U.S. Appl. No. 12/630,62, dated Oct. 20, 2011, 13 pgs.
Final Office Action from U.S. Appl. No. 12/802,958, dated Apr. 15, 2015, 24 pages.
Final Office Action from U.S. Appl. No. 12/802,958, dated Apr. 29, 2016, 33 pages.
Final Office Action from U.S. Appl. No. 12/802,958, dated Jun. 25, 2013, 48 pages.
Final Office Action from U.S. Appl. No. 12/802,958, dated Jun. 7, 2017, 18 pages.
Final Office Action from U.S. Appl. No. 12/802,974, dated Aug. 1, 2014, 23 pages.
Final Office Action from U.S. Appl. No. 12/802,974, dated Nov. 30, 2015, 22 pages.
Final Office Action from U.S. Appl. No. 12/802,975, dated Aug. 4, 2014, 40 pages.
Final Office Action from U.S. Appl. No. 12/802,975, dated Dec. 14, 2015, 26 pages.
Final Office Action from U.S. Appl. No. 12/802,975, dated Dec. 22, 2016, 29 pages.
Final Office Action from U.S. Appl. No. 12/802,975, dated Jun. 22, 2018, 27 pages.
Final Office Action from U.S. Appl. No. 12/802,988, dated Aug. 2, 2013, 13 pages.
Final Office Action from U.S. Appl. No. 12/802,988, dated Feb. 8, 2017, 13 pages.
Final Office Action from U.S. Appl. No. 12/802,988, dated Jan. 13, 2016, 11 pages.
Final Office Action from U.S. Appl. No. 12/802,988, dated Jan. 22, 2018, 11 pages.
Final Office Action from U.S. Appl. No. 12/802,988, dated Nov. 27, 2012, 12 pages.
Final Office Action from U.S. Appl. No. 12/802,988, dated Oct. 21, 2014, 13 pages.
Final Office Action from U.S. Appl. No. 12/802,988, dated Sep. 5, 2012, 8 pages.
Final Office Action from U.S. Appl. No. 12/802,989, dated Aug. 25, 2015, 24 pages.
Final Office Action from U.S. Appl. No. 12/802,989, dated Jun. 12, 2014, 17 pages.
Advisory Office Action, U.S. Appl. No. 14/611,565, dated Nov. 10, 2020, 3 pages.
Corrected Notice of Allowability, U.S. Appl. No. 16/188,841, dated Oct. 28, 2020, 7 pages.
Corrected Notice of Allowance, U.S. Appl. No. 15/792,610, dated Oct. 6, 2020, 4 pages.
Decision of Refusal, JP App. No. 2016-562961, dated Oct. 28, 2020, 5 pages (4 pages of English Translation and 1 page of Original Document).
Decision to Grant a Patent, EP App. No. 13790935.4, dated Sep. 24, 2020, 2 pages.
Examination Report No. 1, AU App. No. 2019203120, dated Jul. 3, 2020, 4 pages.
Examination Report No. 1, AU App. No. 2020200070, dated Sep. 8, 2020, 4 pages.
Examiner Report, CA App. No. 2885817, dated Jul. 17, 2020, 5 pages.
Examiner's Report, CA App. No. 2892555, dated Sep. 15, 2020, 2 pages.
Final Office Action, U.S. Appl. No. 14/611,565, dated May 10, 2021, 7 pages.
Final Office Action, U.S. Appl. No. 16/208,895, dated Apr. 6, 2021, 8 pages.
Intention to Grant, EP App. No. 14770916.6, dated Apr. 28, 2021, 8 pages.
Non-Final Office Action, U.S. Appl. No. 14/611,565, dated Feb. 26, 2021, 11 pages.
Non-Final Office Action, U.S. Appl. No. 14/672,014, dated Feb. 22, 2021, 12 pages.
Non-Final Office Action, U.S. Appl. No. 15/792,610, dated Jan. 13, 2021, 8 pages.
Notice of Allowance, IL App. No. 269145, dated Aug. 23, 2020, 3 pages of Original Document Only.
Notice of Allowance, KR App. No. 10-2015-7014235, dated Oct. 28, 2020, 3 pages (1 pages of English Translation and 2 page of Original Document).
Notice of Allowance, KR. App. No. 10-2014-7035524, dated Oct. 14, 2020, 4 pages (1 page of English Translation and 3 pages of Original Document).
Notice of Allowance, U.S. Appl. No. 16/578,265, dated Jan. 28, 2021, 7 pages.
Notice of Allowance, U.S. Appl. No. 15/340,914, dated Dec. 2, 2020, 9 pages.
Notice of Allowance, U.S. Appl. No. 15/340,914, dated Mar. 15, 2021, 4 pages.
Notice of Allowance, U.S. Appl. No. 15/682,076, dated Jan. 14, 2021, 11 pages.
Notice of Allowance, U.S. Appl. No. 15/682,076, dated Mar. 24, 2021, 11 pages.
Notice of Allowance, U.S. Appl. No. 15/792,610, dated Oct. 2, 2020, 7 pages.
Notice of Allowance, U.S. Appl. No. 16/578,265, dated Mar. 31, 2021, 7 pages.
Notice of Final Rejection, KR App. No. 10-2020-7002077, dated Oct. 15, 2020, 8 pages (4 pages of English Translation and 4 pages of Original Document).
Notice of Reasons for Refusal, JP App. No. 2019-074024, dated Aug. 3, 2020, 10 pages (6 pages of English Translation and 4 pages of Original Document).
Notice of Reasons for Refusal, JP App. No. 2019-109413, dated Sep. 10, 2020, 8 pages (5 pages of English Translation and 3 pages of Original Document).
Notification of Reason for Refusal, KR App. No. 10-2021-7002823, dated Apr. 14, 2021, 06 pages (03 pages of English Translation and 03 pages of Original Document).

(56) References Cited

OTHER PUBLICATIONS

Notification of Reason for Refusal, KR. App. No. 10-2016-7031260, dated Dec. 4, 2020, 12 pages (7 pages of English Translation and 5 pages of Original Document).
Notification of the 2nd Substantive requirement, MX App. No. MX/A/2017/002906, dated Jul. 15, 2020, 10 pages (5 pages of English Translation and 5 pages of Original Document).
Office Action, CA App. No. 2945987, dated Apr. 13, 2021, 3 pages.
Office Action, CA App. No. 3025857, dated Dec. 8, 2020, 5 pages.
Office Action, EP App. No. 15746217.7, dated Feb. 1, 2021, 10 pages.
Office Action, EP App. No. 17844265.3, dated May 10, 2021, 9 pages.
Office Action, JP App No. 2019-168511, dated Dec. 24, 2020, 6 pages (3 pages of English Translation and 3 pages of Original Document).
Office Action, JP App. No. 2019-238040, dated Feb. 25, 2021, 7 pages (4 pages of English Translation and 3 pages of Original Document).
Office Action, RU App. No. 2019104259, dated Aug. 20, 2020, 14 pages (7 pages of English Translation and 7 pages of Original Document).
Office Action, TW App. No. 108130461, dated Oct. 30, 2020, 16 pages (7 pages of English Translation and 9 pages of Original Document).
Office Action, TW App. No. 109105764, dated Sep. 9, 2020, 47 pages (21 pages of English Translation and 26 pages of Original Document).
Ponnampalam et al. "On DL Precoding for 11ac", IEEE 802.11-10/01119r0, Mediatek, Sep. 2010, 8 pages.
Summons to attend oral proceedings pursuant to Rule 115(1) EPC, EP App. No. 13843203.4, Dec. 21, 2020, 9 pages.
Supplemental Notice of Allowability, U.S. Appl. No. 12/802,975, dated Oct. 28, 2020, 2 pages.
Supplemental Notice of Allowability, U.S. Appl. No. 15/340,914, dated Jan. 13, 2021, 5 pages.
Written Opinion, BR App. No. 112014027631-5, dated Jun. 18, 2020, 4 pages of Original document only.
Written Opinion, BR App. No. 112015022911-5, dated Jul. 22, 2020, 4 pages of Original Document Only.
Written Opinion, BR App. No. 1120150232234, dated Jul. 22, 2020, 5 pages of Original Document Only.
3GPP, "3rd Generation Partnership Project; Technical Specification Group Radio Access Network, Coordinated multi-point operation for LTE physical layer aspects (Release 11)", 3GPP Draft; DRAFT36819-B10, 3rd Generation Partnership Project; (3GPP), Dec. 20, 2011, V11.1.0, pp. 1-69.
International Search Report and Written Opinion, PCT App. No. PCT/US2021/026431, dated Jun. 29, 2021, 6 pages.
Notice of Reason for Rejection, KR App. No 10-2019-7006428, dated Jun. 28, 2021, 20 pages (11 pages of English Translation and 9 pages of Original Document).
Office Action, EP App. No. 15780522.7, dated Jun. 7, 2021, 8 pages.
Samsung, "Discussion on open-loop CoMP schemes", 3GPP TSG RAN WG1 #58, R1-093377, 3rd Generation Partnership Project, (3GPP), dated Aug. 24-28, 2009, pp. 1-4.
Search Report and Written Opinion, BR App. No 112015012165-9, dated Jul. 16, 2021, 8 pages (4 pages of English Translation and 4 pages of Original Document).
Final Office Action, U.S. Appl. No. 17/317,856, dated Aug. 20, 2021, 33 pages.
Non-Final Office Action, U.S. Appl. No. 17/234,699, dated Jul. 15, 2021, 9 pages.
Non-Final Office Action, U.S. Appl. No. 17/308,031, dated Jul. 15, 2021, 12 pages.
Non-Final Office Action, U.S. Appl. No. 17/317,856, dated Jul. 19, 2021, 39 pages.
Non-Final Office Action, U.S. Appl. No. 17/379,985, dated Aug. 26, 2021, 10 pages.
Notice of Allowance, U.S. Appl. No. 15/792,610, dated Jul. 13, 2021, 10 pages.
Notice of Allowance, U.S. Appl. No. 17/234,699, dated Jul. 28, 2021, 7 pages.
Notice of Allowance, U.S. Appl. No. 17/308,031, dated Aug. 4, 2021, 7 pages.
Werner, Kari, et al., "LTE-Advanced 8x8 MIMO Measurements in an Indoor Scenario", Proceedings of ISAP2012, Nagoya, Japan, Oct. 29, 2012, pp. 750-753.

\* cited by examiner

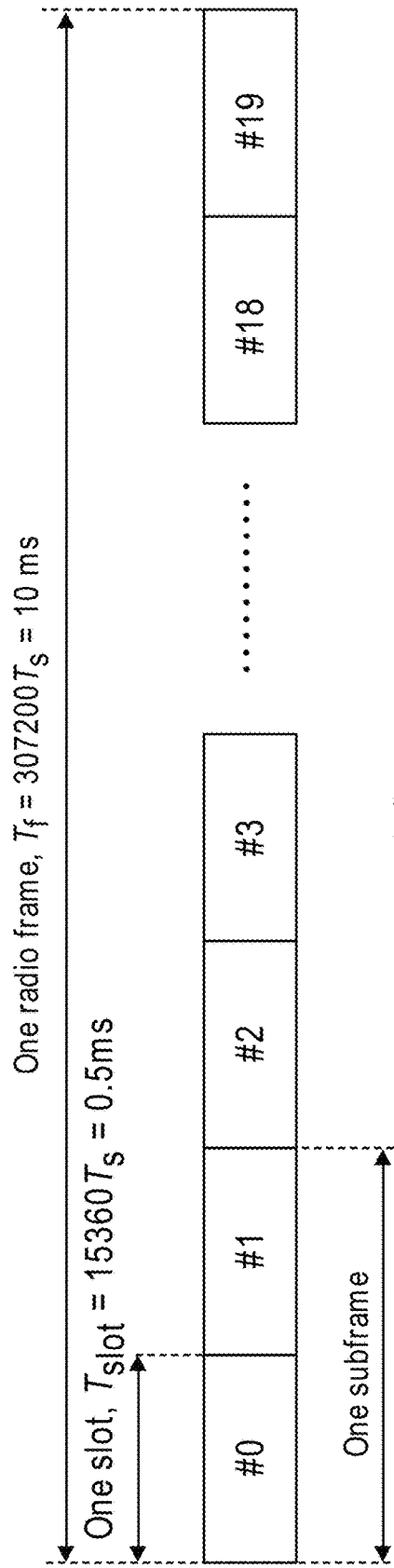
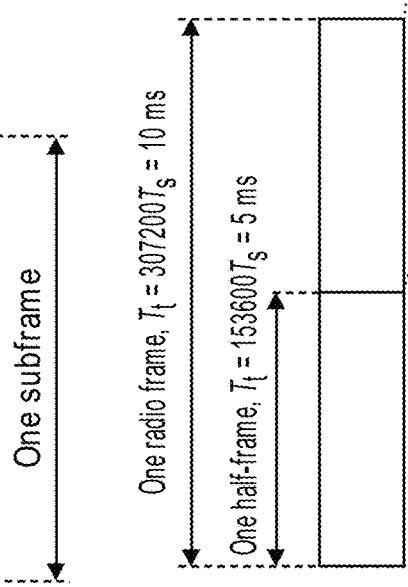
FIG. 7A
FIG. 7B

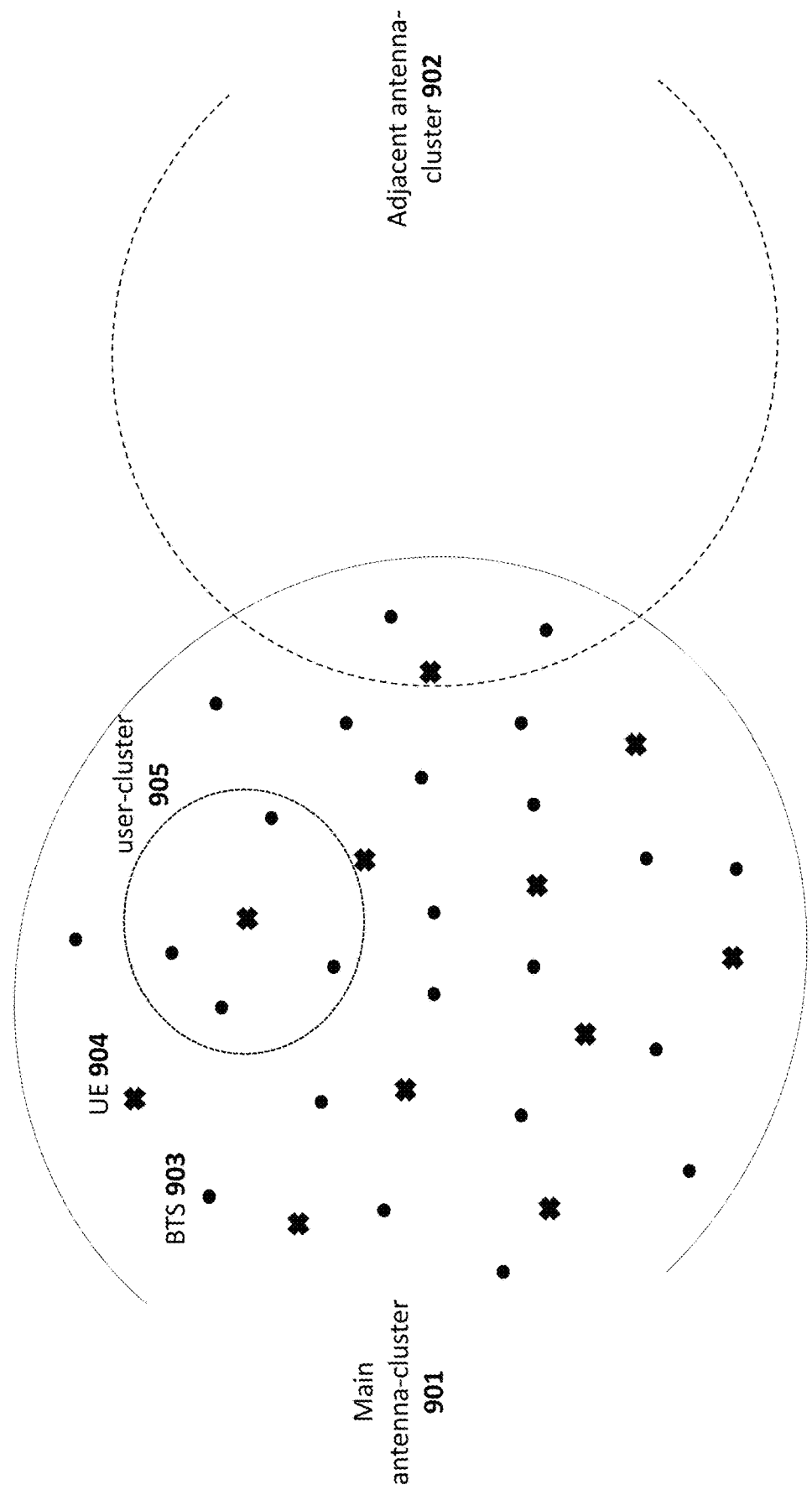

SYSTEMS AND METHODS FOR RADIO FREQUENCY CALIBRATION EXPLOITING CHANNEL RECIPROCITY IN DISTRIBUTED INPUT DISTRIBUTED OUTPUT WIRELESS COMMUNICATIONS

CROSS REFERENCE TO RELATED APPLICATION

This application is a continuation of co-pending U.S. patent application Ser. No. 13/844,355, which was filed Mar. 15, 2013, all of which is herein incorporated by reference.

RELATED APPLICATIONS

This application may be related to the following co-pending U.S. Patent Applications:

U.S. application Ser. No. 13/797,984, entitled "Systems and Methods for exploiting inter-cell multiplexing gain in wireless systems via distributed input distributed output technology"

U.S. application Ser. No. 13/797,971, entitled "Systems and Methods for exploiting inter-cell multiplexing gain in wireless systems via distributed input distributed output technology"

U.S. application Ser. No. 13/797,950, entitled "Systems and Methods for exploiting inter-cell multiplexing gain in wireless systems via distributed input distributed output technology"

U.S. application Ser. No. 13/633,702, entitled "Systems and Methods for wireless backhaul in distributed-input distributed-output wireless systems"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 13/464,648, entitled "System and Methods to Compensate for Doppler Effects in Distributed-Input Distributed Output Systems"

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

BACKGROUND

In the last three decades, the wireless cellular market has experienced increasing number of subscribers worldwide as well as demand for better services shifting from voice to web-browsing and real-time HD video streaming. This increasing demand for services that requires higher data rate, lower latency and improved reliability has driven a radical evolution of wireless technologies through different standards. Beginning from the first generation analog AMPS and TACS (for voice service) in the early 1980s, to 2G and 2.5G digital GSM, IS-95 and GPRS (for voice and data services) in the 1990s, to 3G with UMTS and CDMA2000 (for web-browsing) in the early 2000s, and finally LTE (for high-speed internet connectivity) currently under deployment in different countries worldwide.

Long-term evolution (LTE) is the standard developed by the $3^{rd}$ generation partnership project (3GPP) for fourth generation (4G) wireless cellular systems. LTE can achieve theoretically up to 4× improvement in downlink spectral efficiency over previous 3G and HSPA+ standards by exploiting the spatial components of wireless channels via multiple-input multiple-output (MIMO) technology. LTE-Advanced is the evolution of LTE, currently under standardization, that will enable theoretically up to 8× increase in spectral efficiency over 3G standard systems.

Despite this technology evolution, it is very likely that in the next three years wireless carriers will not be able to satisfy the growing demand for data rate due to raising market penetration of smartphones and tables, offering more data-hungry applications like real-time HD video streaming, video conferencing and gaming. It has been estimated that capacity of wireless networks will grow 5× in Europe from 2011 to 2015 due to improved technologies such as LTE as well as more spectrum made available by the government [25]. For example, the FCC is planning to free 500 MHz of spectrum by 2020 (of which 300 MHz will be available by 2015) to promote wireless Internet connectivity throughout the US as part of the National Broadband Plan [24]. Unfortunately, the forecast for capacity usage by 2015 is 23× over 2011 in Europe [25] and similar spectrum deficit is expected to happen in the US by 2014 [26-27]. As a result of this data crunch, revenues for wireless carriers may drop below their CAPEX and OPEX with potentially devastating impact on the wireless market [28].

As capacity gains offered by LTE deployment and increased spectrum availability are insufficient, the only foreseeable solution to prevent this upcoming spectrum crisis is to promote new wireless technologies [29]. LTE-Advanced (the evolution of LTE standard) promises additional gains over LTE through more sophisticated MIMO techniques and by increasing the density of "small cells" [30]. However, there are limits to the number of cells that can fit a certain area without incurring interference issues or increasing the complexity of the backhaul to allow coordination across cells.

One promising technology that will provide orders of magnitude increase in spectral efficiency over wireless links without the limitations of conventional cellular systems is distributed-input distributed-output (DIDO) technology. The present invention describes DIDO technology employed in the context of cellular systems (such as LTE or LTE-Advanced), both within and without the constraints of cellular standards, to provide significant performance benefits over conventional wireless systems. We begin with an overview on MIMO and review different spatial processing techniques employed by LTE and LTE-Advanced. Then we show how the present invention provides significant capacity gains for next generation wireless communications systems compared to prior art approaches.

MIMO employs multiple antennas at the transmitter and receiver sides of the wireless link and uses spatial processing to improve link reliability via diversity techniques (i.e., diversity gain) or provide higher data rate via multiplexing schemes (i.e., multiplexing gain) [1-2]. Diversity gain is a measure of enhanced robustness to signal fading, resulting in higher signal-to-noise ratio (SNR) for fixed data rate. Multiplexing gain is obtained by exploiting additional spatial degrees of freedom of the wireless channel to increase data rate for fixed probability of error. Fundamental tradeoffs between diversity and multiplexing in MIMO systems were described in [3-4].

In practical MIMO systems, link adaptation techniques can be used to switch dynamically between diversity and multiplexing schemes based on propagation conditions [20-23]. For example, link adaptation schemes described in [22-23] showed that beamforming or Orthogonal Space-Time Block Codes (OSTBC) are preferred schemes in low SNR regime or channels characterized by low spatial selectivity. By contrast, spatial multiplexing can provide significant gain in data rate for channels with high SNR and high spatial selectivity. For example, FIG. 1 shows that cells can be divided in two regions: i) multiplexing region 101, characterized by high SNR (due to proximity to the cell tower or base station) where the spatial degrees of freedom of the channel can be exploited via spatial multiplexing to increase data rate; ii) diversity region 102 or cell-edge, where spatial multiplexing techniques are not as effective and diversity methods can be used to improve SNR and coverage (yielding only marginal increase in data rate). Note that the circle of the macrocell 103 in FIG. 1 labels the shaded center of the circle as the "multiplexing region" and the unshaded outer region of the circle as the "diversity region". This same region designation is used throughout FIGS. 1,3-5, where the shaded region is the "multiplexing region" and the unshaded region is the "diversity region", even if they are not labeled. For example, the same designation is used for the small-cell 104 in FIG. 1.

The LTE (Release 8) and LTE-Advanced (Release 10) standards define a set of ten transmission modes (TM) including either diversity or multiplexing schemes [35, 85-86]:

Mode 1: Single antenna port, port 0
Mode 2: Transmit diversity
Mode 3: Large-delay cyclic delay diversity (CDD), extension of open-loop spatial multiplexing for single-user MIMO (SU-MIMO)
Mode 4: Closed-loop spatial multiplexing for SU-MIMO
Mode 5: Multi-user MIMO (MU-MIMO)
Mode 6: Closed-loop spatial multiplexing, using a single transmission layers
Mode 7: Single antenna port, UE-specific RS (port 5)
Mode 8: Single or dual-layer transmission with UE-specific RS (ports 7 and/or 8)
Mode 9: Single or up to eight layers closed-loop SU-MIMO (added in Release 10)
Mode 10: Multi-layer closed-loop SU-MIMO, up to eight layers (added in Release 10)

Hereafter we describe diversity and multiplexing schemes commonly used in cellular systems as well as specific methods employed in LTE as outlined above, and compare them against techniques that are unique for DIDO communications. We first identify two types of transmission methods: i) intra-cell methods (exploiting micro-diversity in cellular systems), using multiple antennas to improve link reliability or data rate within one cell; ii) inter-cell methods (exploiting macro-diversity), allowing cooperation between cells to provide additional diversity or multiplexing gains. Then we describe how the present invention provides significant advantages (including spectral capacity gain) over prior art.

1. Intra-cell Diversity Methods

Intra-cell diversity methods operate within one cell and are designed to increase SNR in scenarios with poor link quality (e.g., users at the cell-edge subject to high pathloss from the central tower or base station). Typical diversity schemes employed in MIMO communications are beamforming [5-11] and orthogonal space-time block codes (OSTBC) [12-15].

Diversity techniques supported by the LTE standard are transmit diversity, closed-loop rank-1 precoding and dedicated beamforming [31-35]. Transmit diversity scheme supports two or four transmit antennas over the downlink (DL) and only two antennas for the uplink (UL). In the DL channel, it is implemented via space-frequency block codes (SFBC) combined with frequency-switched transmit diversity (FSTD) to exploit space as well as frequency selectivity [31]. Rank-1 precoding creates a dedicated beam to one user based on quantized weights selected from a codebook (pre-designed using limited feedback techniques [36-42]) to reduce the feedback overhead from the user equipment (UE) to the base transceiver station (BTS 105 in FIG. 1, or eNodeB using LTE terminology). Alternatively, dedicated beamforming weights can be computed based on UE-specific reference signal.

2. Intra-Cell Multiplexing Methods

MIMO multiplexing schemes [1, 19] provide gain in data rate in high SNR regime and in scenarios with enough spatial degrees of freedom in the channel (e.g., rich multipath environments with high spatial selectivity [16-18]) to support multiple parallel data streams over wireless links.

The LTE standard supports different multiplexing techniques for single-user MIMO (SU-MIMO) and multi-user MIMO (MU-MIMO) [31]. SU-MIMO schemes have two modes of operation: i) closed-loop, exploiting feedback information from the UE to select the DL precoding weights; ii) open-loop, used when feedback from the UE is unavailable or the UE is moving too fast to support closed-loop schemes. Closed-loop schemes use a set of pre-computed weights selected from a codebook. These weights can support two or four transmit antennas as well as one to four parallel data streams (identified by number of layers of the precoding matrix), depending on the UE request and decision of the scheduler at the BTS. LTE-Advanced will include new transmission modes up to MIMO 8×8 to provide up to 8× increase in spectral efficiency via spatial processing [62].

MU-MIMO schemes are defined for both UL and DL channels [31, 50]. In the UL, every UE sends a reference signal to the BTS (consisting of cyclically shifted version of the Zadoff-Chu sequence [33]). Those reference signals are orthogonal, such that the BTS can estimate the channel from all UEs and demodulate data streams from multiple UEs simultaneously via spatial processing. In the DL, precoding weights for different UEs are selected from codebooks based on the feedback from the UEs and the scheduler (similarly to closed-loop SU-MIMO schemes) and only rank-1 precoding is allowed for every UE (e.g., each UE receives only one data stream).

Intra-cell multiplexing techniques employing spatial processing provide satisfactory performance only in propagation scenarios characterized by high SNR (or SINR) and high spatial selectivity (multipath-rich environments). For conventional macrocells, these conditions may be harder to achieve as BTSs are typically far from the UEs and the distribution of the SINR is typically centered at low values [43]. In these scenarios, MU-MIMO schemes or diversity techniques may be better choices than SU-MIMO with spatial multiplexing.

Other techniques and network solutions contemplated by LTE-Advanced to achieve additional multiplexing gain (without requiring spatial processing through MIMO) are: carrier aggregation (CA) and small cells. CA [30, 44-47] combines different portions of the RF spectrum to increase signal bandwidth up to 100 MHz [85], thereby yielding higher data rates. Intra-band CA combines different bands within the same portion of the spectrum. As such it can use the same RF chain for multiple channels, and multiple data streams are recombined in software. Inter-band CA requires different RF chains to operate at different portions of the spectrum as well as signal processing to recombine multiple data streams from different bands.

The key idea of small cells [30, 47] is to reduce the size of conventional macro-cells, thereby allowing higher cell density and larger throughput per area of coverage. Small-cells are typically deployed through inexpensive access points 106 with low power transmission (as depicted in FIG. 1) as opposed to tall and expensive cell towers used for macro-cells. Two types of small cells are defined in LTE-Advanced: i) metrocells, for outdoor installation in urban areas, supporting up 32 to 64 simultaneous users; and ii) femtocells, for indoor use, can serve at most 4 active users. One advantage of small cells is that the density of UEs close to the BTS is statistically higher, yielding better SNR that can be exploited via spatial multiplexing to increase data rate. There are, however, still many concerns about practical deployment of small cells, particularly related to the backhaul. In fact, it may be challenging to reach BTSs of every small cell via high-speed wireline connections, especially considering the high density of metrocells and femtocells in a given coverage area. While using Line-Of-Sight (LOS) backhaul to small cells can often be implemented inexpensively, compared to wireline backhaul, there often are no practical LOS backhaul paths available for preferred small cell BTS placements, and there is no general solution for Non-Line-Of-Sight (NLOS) wireless backhaul to small cell BTSs. Moreover, small cells require complex real-time coordination across BTSs to avoid interference as in self-organized networks (SON) [30, 51-52] and sophisticated cell-planning tools (even more complex than conventional cellular systems, due to higher density of small cells) to plan their optimal location [48, 49]. Finally, handoff is a limiting factor for small cells deployment, particularly in scenarios where groups of subscribers switch cells at the same time, causing large amount of handoff overhead over the backhaul, resulting in high latency and unavoidable dropped calls.

It can be trivially shown there is no practical general solution that enables small cells to co-exist with macrocells and achieve optimal, or necessarily even improved, throughput. Among the myriad of such unsolvable situations is when a small cell is located such that its UEs unavoidably overlap with a macrocell transmission and the small cell and the macrocell use the same frequencies to reach their respective UEs. Clearly in this situation, the macrocell transmission will interfere with the small cell transmission. While there may be some approach that mitigates such interference for particular circumstances of a particular macrocell, a particular small cell, the particular macrocell and small cell UEs involved, the throughput requirements of those UEs, and environmental circumstances, etc., any such approach would be highly specific, not only to the static plan of the macrocell and small cell, but to the dynamic circumstances of a particular time interval. Typically, the full throughput of the channel to each UE cannot be achieved.

3. Inter-Cell Diversity Methods

In a heterogeneous network (HetNet) [90] where macrocells coexist with small-cells (e.g., metro-cells, pico-cells and femto-cells) it is necessary to employ different techniques to eliminate inter-cell interference. While HetNets provide better coverage through small-cells, the gains in data rate are only marginal since they require sharing the spectrum through different forms of frequency reuse patterns or using spatial processing to remove interference rather than achieve multiplexing gain. The LTE standards employ inter-cell interference coordination (ICIC) schemes to remove interference particularly at the cell-edge. There are two types of ICIC methods: cell-autonomous and coordinated between BTSs.

Cell-autonomous ICIC schemes avoid inter-cell interference via different frequency reuse patterns depicted in FIG. 2, where the hexagons represent the cells and the colors refer to different carrier frequencies. Three types of schemes are considered in LTE: i) full frequency reuse (or reuse 1), where the cells utilize all the available bandwidth as in FIG. 2a, thereby producing high interference at the cell-edge; ii) hard frequency reuse (HFR), where every cell is assigned with a different frequency band as in FIG. 2b (with typical reuse factor of 3) to avoid interference across adjacent cells; iii) fractional frequency reuse (FFR), where the center of the cell is assigned with the whole available bandwidth as in frequency reuse 1, whereas the cell-edge operates in HFR mode to mitigate inter-cell interference as in FIG. 2c.

Coordinated ICIC methods enable cooperation across BTSs to improve performance of wireless networks. These techniques are a special case of methods taught in Related Patents and Applications to enable cooperation across wireless transceivers in the general case of distributed antenna networks for multiple UEs all using the same frequency simultaneously. Cooperation across BTSs to remove inter-cell interference for the particular case of cellular systems for a single UE at a given time at a given frequency was described in [53]. The system in [53] divides every macro-cell into multiple subcells and enables soft-handoff across subcells by employing dedicated beamforming from coordinated BTSs to improve link robustness at a single UE at a single frequency, as it moves along the subcell boundaries.

More recently, this class of cooperative wireless cellular networks has been defined in the MIMO literature as "network MIMO" or "coordinated multi-point" (CoMP) systems. Theoretical analysis and simulated results on the benefits obtained in network MIMO by eliminating inter-cell interference are presented in [54-61]. The key advantage of network MIMO and CoMP is to remove inter-cell interference in the overlapping regions of the cells denoted as "interference region" 301 in FIG. 3 for the case of macro-cells 302.

CoMP networks are actively becoming part of LTE-Advanced standard as a solution to mitigate inter-cell interference in next generation cellular networks [62-64]. Three CoMP solutions have been proposed so far in the standard to remove inter-cell interference: i) coordinated scheduling/beamforming (CS/CB), where the UE receives its data stream from only one BTS via beamfoming and coordination across BTSs is enabled to remove interference via beamforming or scheduling techniques; ii) dynamic cell selection (DCS) that chooses dynamically the cell for every UE on a per-subframe basis, transparently to the UE; iii) joint transmission (JT), where data for given UE is jointly transmitted from multiple BTSs to improve received signal quality and eliminate inter-cell interference. CoMP-JT yields larger gains than CoMP-CS/CB at the expenses of higher overhead in the backhaul to enable coordination across BTSs.

4. Inter-Cell Multiplexing Methods

Prior art multi-user wireless systems add complexity and introduce limitations to wireless networks which result in a situation where a given user's experience (e.g. available throughput, latency, predictability, reliability) is impacted by the utilization of the spectrum by other users in the area. Given the increasing demands for aggregate throughput within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), prior art wireless techniques will be insufficient to meet the increasing demands for bandwidth that is reliable, predictable and low-latency.

Prior art intra-cell diversity and multiplexing methods can only provide up to a theoretical 4× increase in throughput over current cellular networks for LTE (through MIMO 4×4) or at most a theoretical 8× for LTE-Advanced (through MIMO 8×8), although higher orders of MIMO achieve diminishing improvements in increasing throughput in a given multipath environment, particularly as UEs (such as smartphones) get smaller and more constrained in terms of antenna placement. Other marginal throughput gains in next generation cellular systems may be obtained from additional spectrum allocation (e.g., FCC national broadband plan), exploited via carrier aggregation techniques, and more dense distribution of BTSs via small cell networks and SON [30, 46]. All the above techniques, however, still rely heavily on spectrum or time sharing techniques to enable multi-user transmissions, since the spectral efficiency gains obtained by spatial processing is limited.

While prior art inter-cell methods (e.g., network MIMO and CoMP systems [53-64]) can improve reliability of cellular networks by eliminating inter-cell interference, their capacity gains are only marginal. In fact, those systems constrain power transmitted from every BTS to be contained within the cell boundaries and are only effective to eliminate inter-cell interference due to power leakage across cells. FIG. 3 shows one example of cellular networks with three BTSs, each one characterized by its own coverage area or cell. The power transmitted from each BTS is constrained to limit the amount of interference across cells, depicted in FIG. 3 by the areas where the cells overlap. As these systems operate in the low SINR regime at the interference region, their gains in spectral efficiency is only marginal, similarly to intra-cell schemes for SU-MIMO. To truly obtain significant capacity gains in inter-cell cooperative networks, power constraints limited to cell-boundaries must be relaxed and spatial multiplexing techniques should be enabled throughout the cells where the SINR is high (not just at the cell-edge with poor SINR performance as in prior art approaches).

FIG. 4 shows the case where the power transmitted from the three BTSs 401 all transmitting simultaneously at the same frequency is increased, thereby allowing a higher level of interference throughout the cell 402. In prior art systems, such interference would result in incoherent interference (disrupting UE signal reception) throughout the interfering areas of the BTSs, but this interference is actually exploited in the present invention through novel inter-cell multiplexing methods using spatial processing to create areas of coherent interference (enhancing UE signal reception) around every UE, thereby providing simultaneous non-interfering data streams to every UE and increasing their SINR throughout the cell.

The scenario depicted in FIG. 4 is described in [89] for the particular case of cellular systems. The system in [89] consists of several BTSs identifying different cells that are grouped into clusters. Cooperation is allowed only across BTSs from adjacent cells within the same clusters. In this case it was shown that, as the power transmitted from the BTSs increases, there is a limit to the capacity (or spectral efficiency) achievable through inter-cell multiplexing methods. In fact, as the transmit power increases, the out-of-cluster interference increases proportionally, producing a saturation regime for the SINR and consequently for the capacity. As a consequence of this effect, the system in [89] can theoretically achieve at most 3× gain in capacity (i.e., at most three cells within the cluster) and any additional cell included in the cluster would reduce capacity due to increased out-of-cluster interference (e.g., the case of 21 cells per cluster yields lower capacity than the case of 3 cells per cluster). We observe that the fundamental capacity limit in [89] holds because the BTSs are constrained to predefined locations, as in cellular systems, and multiplexing gain is achieved by increasing transmit power from the BTSs. To obtain theoretically unlimited capacity gain via inter-cell multiplexing methods, the constraint on the BTS placement must be removed, allowing the BTSs to be placed anywhere is convenient.

It would thus be desirable to provide a system that achieves orders of magnitudes increase in spectral efficiency exploiting inter-cell multiplexing gain via spatial processing by removing any constraint on the power transmitted from distributed BTSs 501 as well as on their placement. FIG. 5 shows one example where many additional access points 502 are added to deliberately increase the level of incoherent interference throughout the cell 503, that, is exploited in the present invention to generate areas of coherent interference around UEs, thereby yielding theoretically unlimited inter-cell multiplexing gain. The additional access points are placed serendipitously wherever it is convenient and are not constrained to any specific cell planning, as in cellular systems described in prior art. In an exemplary embodiment of the invention, the serendipitous access points are distributed-input distributed-output (DIDO) access points and the inter-cell multiplexing gain is achieved through DIDO methods described herein. In another embodiment, the serendipitous access points are low power transceivers, similar to inexpensive Wi-Fi access points or small-cells [30,47], thereby providing smaller areas of coverage overlapping throughout the macro-cell as shown in FIG. 5.

We observe that prior art inter-cell methods [53-64] avoid incoherent interference by intentionally limiting the transmit power from every BTS as in FIG. 3 and eliminate residual inter-cell interference (on the overlapping areas between cells) via spatial processing, thereby providing improved SINR and inter-cell diversity gain. We further observe that [89] constrains BTS placement to cell planning while increasing transmit power, thereby limiting the achievable capacity due to out-of-cluster interference, and as such it is still limited by interference. By contrast, the present invention exploits incoherent interference to create coherent interference around the UEs, by transmitting higher power from every BTS serendipitously placed, thereby improving signal quality at the UE that is necessary condition to obtain inter-cell multiplexing gain throughout the cell via spatial processing. As such, the systems described in prior art cannot be used to achieve unlimited inter-cell multiplexing gain via spatial processing, since there is not sufficient SINR throughout the cell (due to the limited transmit power from the BTSs or the out-of-cluster interference when transmit power is increased) to enable inter-cell multiplexing methods as in the present invention. Moreover, the systems described in prior art would be inoperable to achieve the multiplexing gain achieved in the present invention depicted in FIGS. 4-5, given that prior art systems were designed to avoid inter-cell interference within the diversity regions shown in the shaded area of FIG. 1 and FIGS. 3-5 rather than exploit inter-cell interference in the multiplexing regions to obtain inter-cell multiplexing gain as achieved in the present invention.

BRIEF DESCRIPTION OF THE DRAWINGS

A better understanding of the present invention can be obtained from the following detailed description in conjunction with the drawings, in which:

FIG. 7A illustrates the LTE frame structure for FDD operation.

FIG. 7B illustrates the LTE frame structure for TDD operation.

FIG. 9 illustrates one embodiment of a multi-user (MU) multiple antenna system (MAS), or MU-MAS, consisting of antenna-clusters and user-clusters.

DETAILED DESCRIPTION

Figure 1:
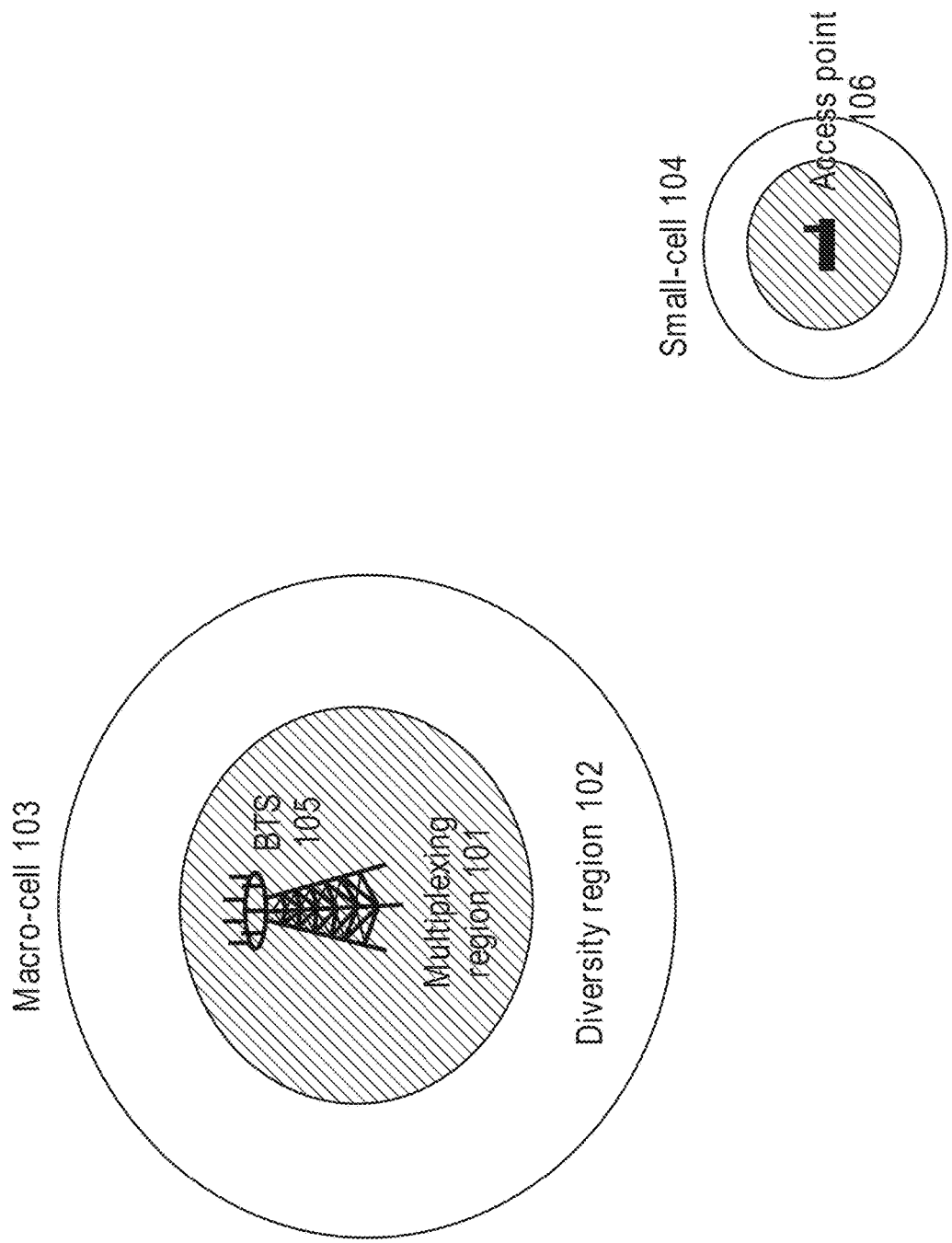
FIG. 1 illustrates multiplexing and diversity regions for a macro-cell and a small-cell.
Figure 2C:
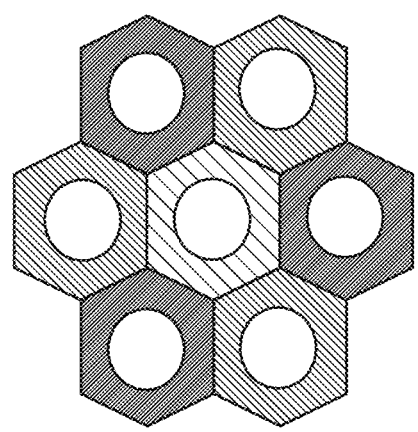
FIG. 2C illustrates fractional frequency reuse (FFR) pattern in conventional cellular systems.
Figure 2B:
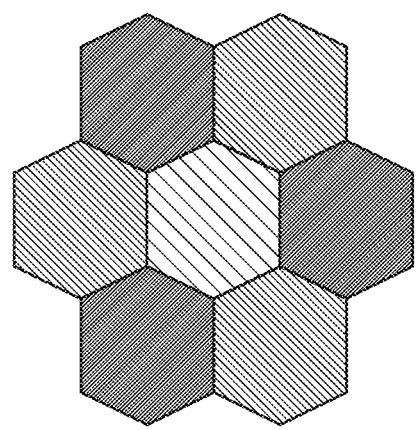
FIG. 2B illustrates hard frequency reuse (HFR) pattern in conventional cellular systems.
Figure 2A:
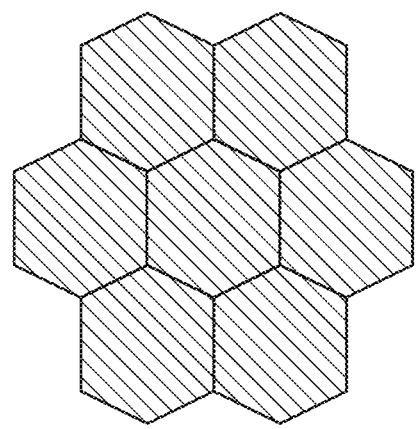
FIG. 2A illustrates full frequency reuse pattern in conventional cellular systems.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "Related Patents and Applications."

U.S. application Ser. No. 13/633,702, entitled "Systems and Methods for wireless backhaul in distributed-input distributed-output wireless systems"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 13/464,648, entitled "System and Methods to Compensate for Doppler Effects in Distributed-Input Distributed Output Systems"

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

To reduce the size and complexity of the present patent application, the disclosure of some of the Related Patents and Applications is not explicitly set forth below. Please see the Related Patents and Applications for a full description of the disclosure.

The present invention describes system and methods to exploit inter-cell multiplexing gain in wireless communications networks via spatial processing, employing a multiple antenna system (MAS) with multi-user (MU) transmissions (a Multi-User Multiple Antenna System, or "MU-MAS"), where the multiple antennas are placed serendipitously. In one embodiment of the invention, the power transmitted from the multiple antennas is constrained to minimize interference at cell boundaries (as in conventional cellular systems) and spatial processing methods are employed only to eliminate inter-cell interference. In another embodiment of the invention, the power transmitted from the multiple antennas is not constrained to any particular power level (as long as their power emission level falls within the regulatory, safety or practical (e.g. available power, transmitter and/or antenna specifications) limits), thereby creating intentionally higher levels of inter-cell interference throughout the cell that is exploited to achieve inter-cell multiplexing gain and increase the capacity of the wireless communications network.

Figure 3:
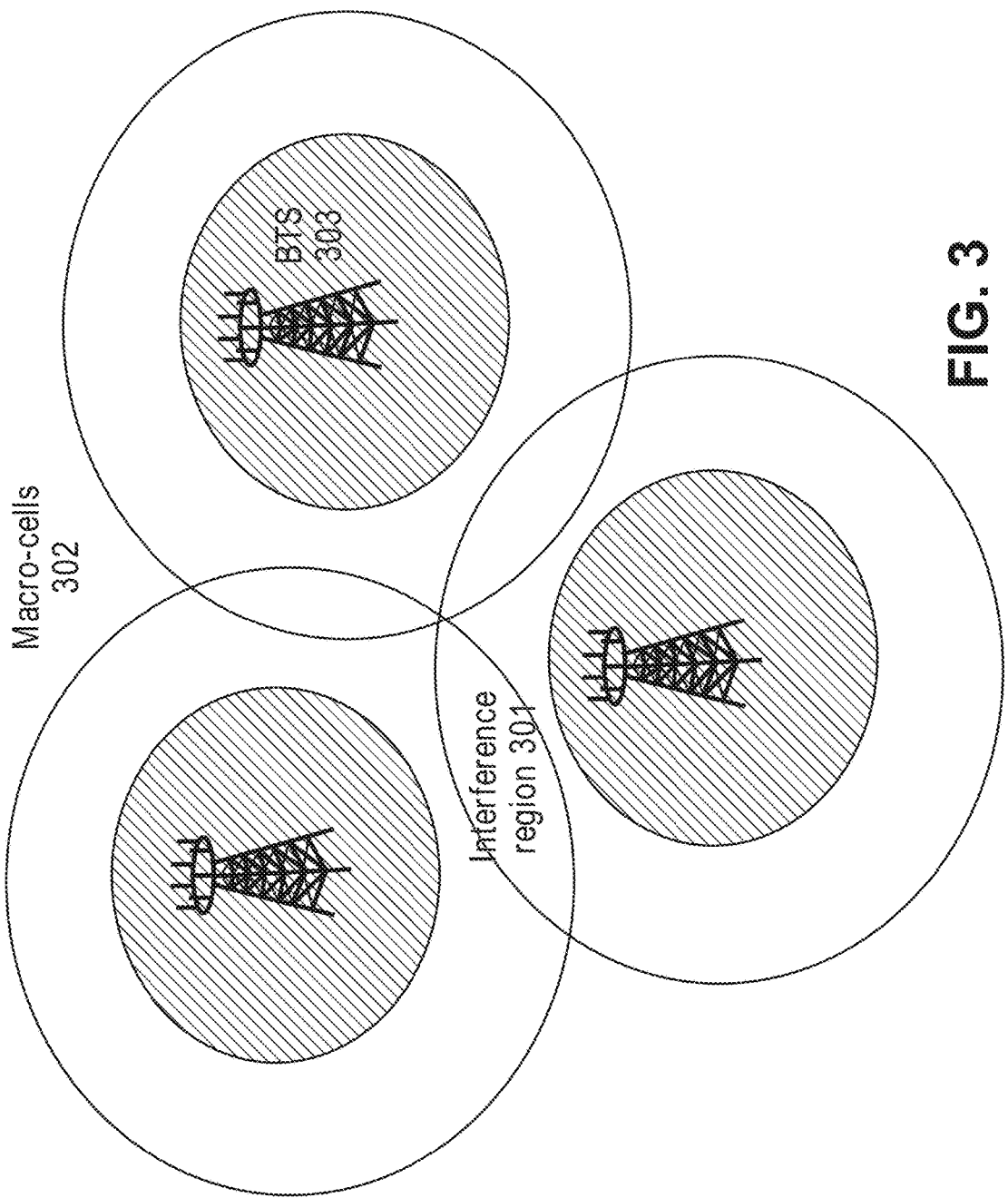
FIG. 3 illustrates the interference region between adjacent macro-cells.
Figure 4:
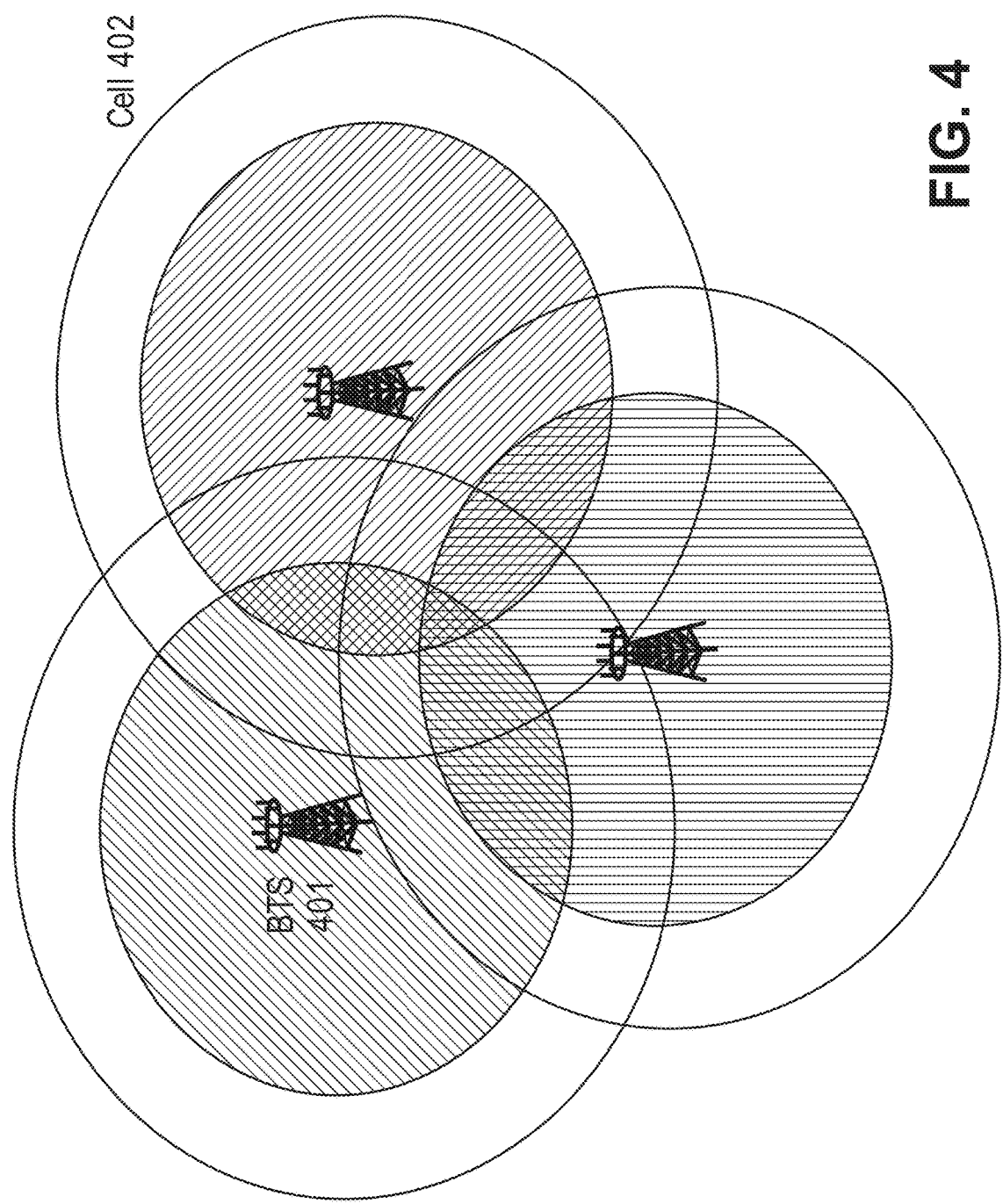
FIG. 4 illustrates multiple BTSs transmitting at higher power to increase the level of interference between cells.
Figure 5:
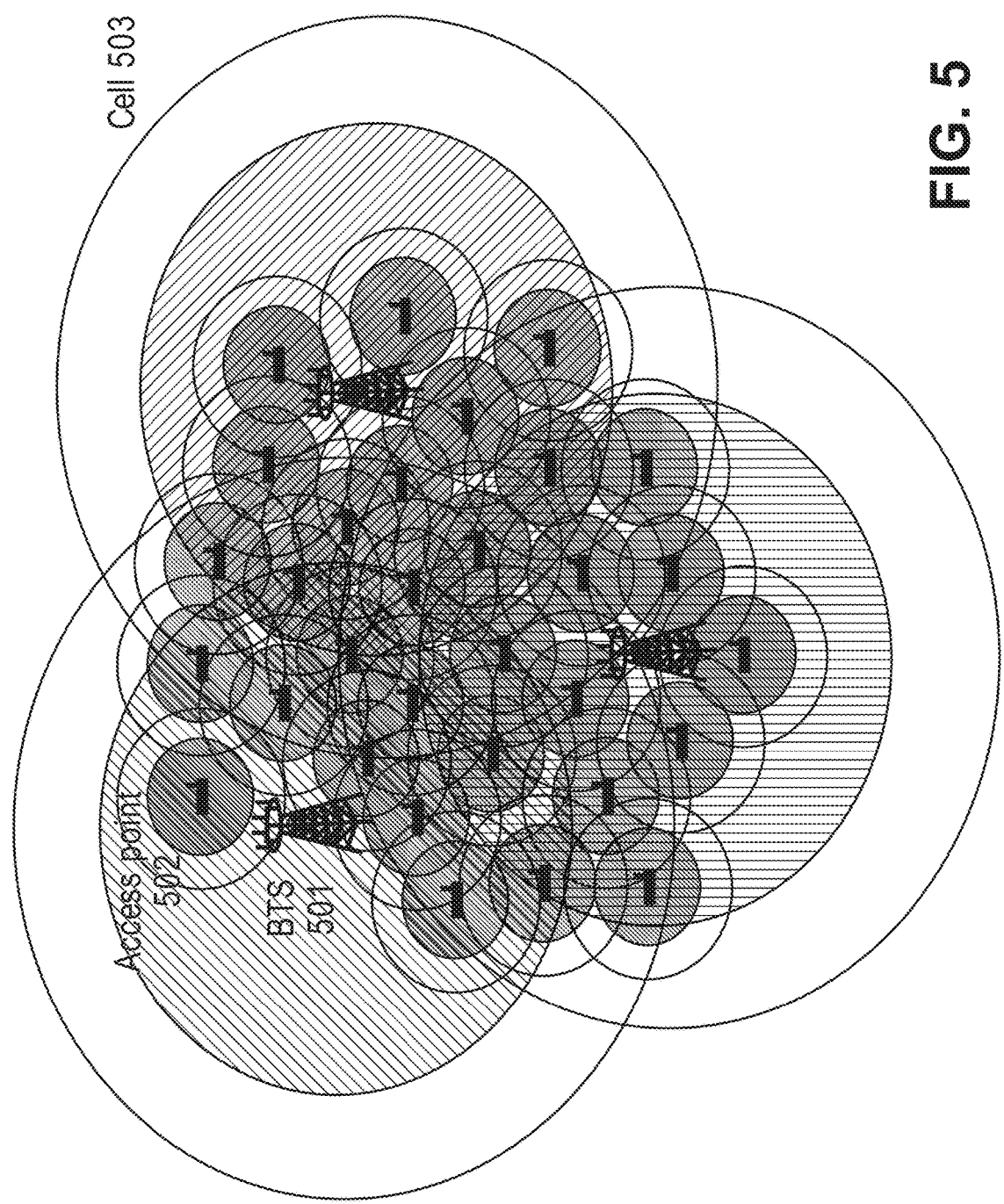
FIG. 5 illustrates one example where many access points are added to deliberately increase the level of incoherent interference throughout the cell.

In one embodiment, the wireless communications network is a cellular network as in FIGS. 1 and 3, such as a cellular network based on LTE standards and the multiple antennas serendipitously deployed are transceivers for macro-cells or small-cells. In another embodiment of the invention, the wireless communications network is not constrained to any particular cell layout and the cell boundaries can extend over larger areas as in FIGS. 4-5. For example, the wireless communications network could be a wireless local area network (WLAN) with multiple antennas being WiFi access points, or a mesh, ad-hoc or sensor network, or a distributed antenna system, or a DIDO system with access points placed serendipitously without any transmit power constraint. But, such example network structures should not be considered as limiting the general applicability of the present invention to wireless communications networks. The present invention applies to any wireless network where multiplexing gain is achieved by transmitting signals from multiple antennas that interfere where received by multiple UEs so as to create simultaneous non-interfering data streams to multiple UEs.

The MU-MAS consists of a centralized processor, a network and M transceiver stations (or distributed antennas) communicating wirelessly to N client devices or UEs. The centralized processor unit receives N streams of information with different network content (e.g., videos, web-pages, video games, text, voice, etc., streamed from Web servers or other network sources) intended for different client devices. Hereafter, we use the term "stream of information" to refer to any stream of data sent over the network containing information that can be demodulated or decoded as a standalone stream, according to certain modulation/coding scheme or protocol, to produce any data, including but not limited to audio, Web and video content. In one embodiment, the stream of information is a sequence of bits carrying network content that can be demodulated or decoded as a standalone stream.

The centralized processor utilizes precoding transformation to combine (according to algorithms, such as those described in the Related Patents and Applications) the N streams of information from the network content into M streams of bits. By way of example, but not limitation, the precoding transformation can be linear (e.g., zero-forcing [65], block-diagonalization [66-67], matrix inversion, etc.) or non-linear (e.g., dirty-paper coding [68-70] or Tomlinson-Harashima precoding [71-72], lattice techniques or trellis precoding [73-74], vector perturbation techniques [75-76]). Hereafter, we use the term "stream of bits" to refer to any sequence of bits that does not necessarily contain any useful bit of information and as such cannot be demodulated or decoded as a standalone stream to retrieve the network content. In one embodiment of the invention, the stream of bits is the complex baseband signal produced by the centralized processor and quantized over given number of bits to be sent to one of the M transceiver stations.

Precoding is computed at the centralized processor by employing the Channel State Information (CSI) and applied over the DL or UL channels to multiplex data streams to or from multiple users. In one embodiment of the invention, the centralized processor is aware of the CSI between the distributed antennas and the client devices, and utilizes the CSI to precode data sent over the DL or UL channels. In the same embodiment, the CSI is estimated at the client devices and fed back to the distributed antennas. In another embodiment, the DL-CSI is derived at the distributed antennas from the UL-CSI using radio frequency (RF) calibration and exploiting UL/DL channel reciprocity.

Figure 13:
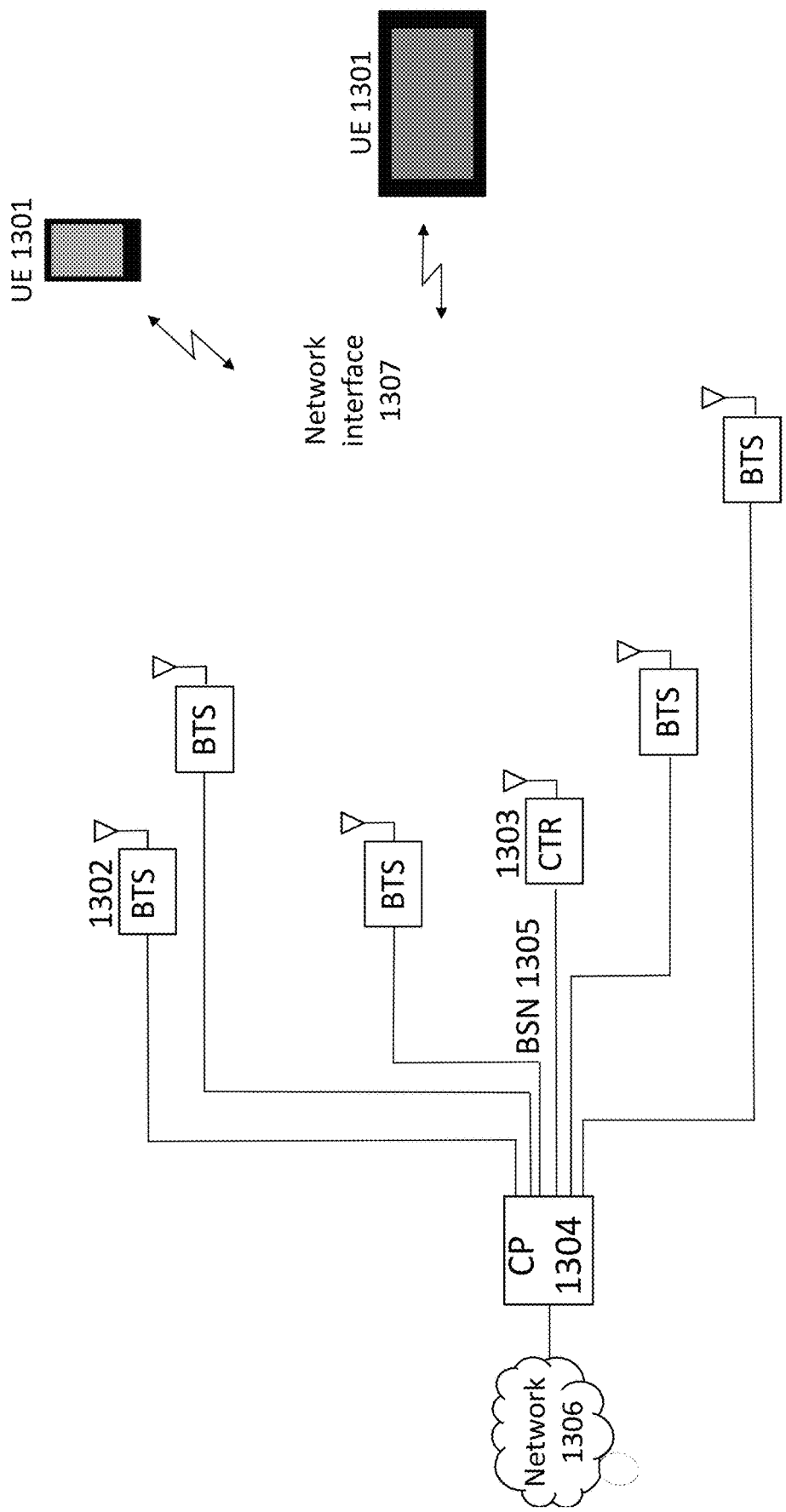
FIG. 13 illustrates one embodiment of a MU-MAS consisting of CP, distributed BTSs and multiple UEs.

In one embodiment, the MU-MAS is a distributed-input distributed-output (DIDO) system as described in Related Patents and Patent Applications. In another embodiment, the MU-MAS depicted in FIG. 13 consists of:

User Equipment (UE) 1301: An RF transceiver for fixed and/or mobile clients receiving data streams over the downlink (DL) channel from the backhaul and transmitting data to the backhaul via the uplink (UL) channel Base Transceiver Station (BTS) 1302: The BTSs interface the backhaul with the wireless channel. BTSs of one embodiment are access points consisting of Digital-to-Analog Converter (DAC)/Analog-to-Digital Converter (ADC) and radio frequency (RF) chain to convert the baseband signal to RF. In some cases, the BTS is a simple RF transceiver equipped with power amplifier/antenna and the RF signal is carried to the BTS via RF-over-fiber technology as described in Related Patents and Applications.

Controller (CTR) 1303: A CTR is one particular type of BTS designed for certain specialized features such as transmitting training signals for time/frequency synchronization of the BTSs and/or the UEs, receiving/transmitting control information from/to the UEs, receiving the channel state information (CSI) or channel quality information from the UEs. One or multiple CTR stations can be included in any MU-MAS system. When multiple CTRs are available, the information to or from those stations can be combined to increase diversity and improve link quality. In one embodiment, the CSI is received from multiple CTRs via maximum ratio combining (MRC) techniques to improve CSI demodulation. In another embodiment, the control information is sent from multiple CTRs via maximum ratio transmission (MRT) to improve SNR at the receiver side. The scope of the invention is not limited to MRC or MRT, and any other diversity technique (such as antenna selection, etc.) can be employed to improve wireless links between CTRs and UEs.

Centralized Processor (CP) 1304: The CP is a server interfacing the Internet or other types of external networks 1306 with the backhaul. In one embodiment, the CP computes the MU-MAS baseband processing and sends the waveforms to the distributed BTSs for DL transmission Base Station Network (BSN) 1305: The BSN is the network connecting the CP to the distributed BTSs carrying information for either the DL or the UL channel. The BSN is a wireline or a wireless network or a combination of the two. For example, the BSN is a DSL, cable, optical fiber network, or Line-of-Sight (LOS) or Non-Line-of-Sight (NLOS) wireless link. Furthermore, the BSN is a proprietary network, or a local area network, or the Internet.

Hereafter we describe how the above MU-MAS framework is incorporated into the LTE standard for cellular systems (and also non-cellular system utilizing LTE protocols) to achieve additional gains in spectral efficiency. We begin with a general overview of LTE framework and modulation techniques employed in the DL and UL channels. Then we provide a brief description of the physical layer frame structure and resource allocation in the LTE standard. Finally, we define MU-MAS precoding methods for downlink (DL) and uplink (UL) channels in multi-user scenarios using the LTE framework. For the DL schemes, we propose two solutions: open-loop and closed-loop DIDO schemes.

Figure 6:
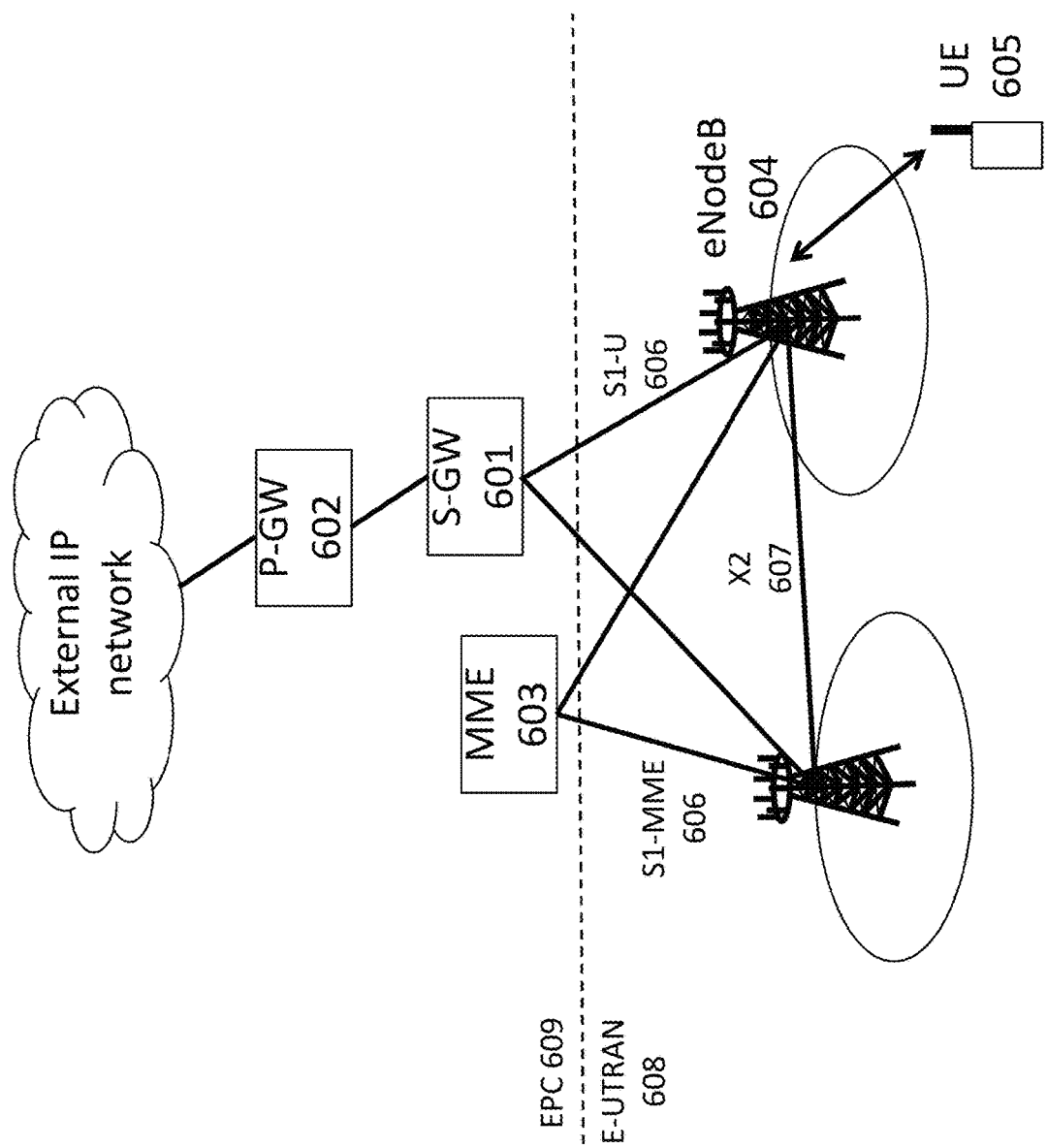
FIG. 6 illustrates the network elements in LTE networks.

LTE is designed with a flat network architecture (as opposed a hierarchical architecture from previous cellular standards) to provide: reduced latency, reduced packet losses via ARQ, reduced call setup time, improved coverage and throughput via macro-diversity. The network elements in LTE networks depicted in FIG. 6 are per [79]:

GW (gateway): is the router connecting the LTE network to external networks (i.e., the Internet). The GW is split into serving gateway (S-GW) 601 that terminates the E-UTRAN interface 608 and PDN gateway (P-GW) 602 being the interface with external networks. The S-GW and P-GW are part of the so called evolved packet core (EPC) 609;

MME (mobility management entity) 603: manages mobility, security parameters and UE identity. The MME is also part of the LTE EPC;

eNodeB (enhanced Node-B) 604: is the base station handling radio resource management, user mobility and scheduling;

UE (user equipment) 605: is the mobile station.

S1 and X2 interfaces (606 and 607): are the wireline or wireless backhauls between the MME and eNodeBs (S1-MME), the S-GW and eNodeBs (S1-U) and between multiple eNodeBs (X2).

In one embodiment of the invention, the MU-MAS network is an LTE network wherein the UE is the LTE UE, the BTS is the LTE eNodeB, the CTR is the LTE eNodeB or MME, the CP is the LTE GW, the BSN is the S1 or X1 interface. Hereafter we use the terms distributed antennas, BTS and eNodeB interchangeably to refer to any base station in MU-MAS, DIDO or LTE systems.

The LTE frame has duration of 10 msec and consists of ten subframes as depicted in FIG. 7 [33, 80]. Every subframe is divided in two slots of duration 0.5 msec each. The LTE standards defines two types of frames: i) type 1 for FDD operation as in FIG. 7a), where all subframes are assigned either for the DL or UL channels; ii) type 2 for TDD operation as in FIG. 7b), where part of the subframes are assigned to the DL and part to the UL (depending on the selected configuration), whereas a few subframes are reserved for "special use". These is at least one special subframe per frame and it consists of three fields: i) downlink pilot time slot (DwPTS) reserved for DL transmission; ii) guard period (GP); iii) uplink pilot time slot (UpPTS), for UL transmission.

LTE employs orthogonal frequency division multiplexing (OFDM) and orthogonal frequency division multiple access (OFDMA) modulation for the DL and single-carrier frequency division multiple access (SC-FDMA) for the UL.

Figure 8A:
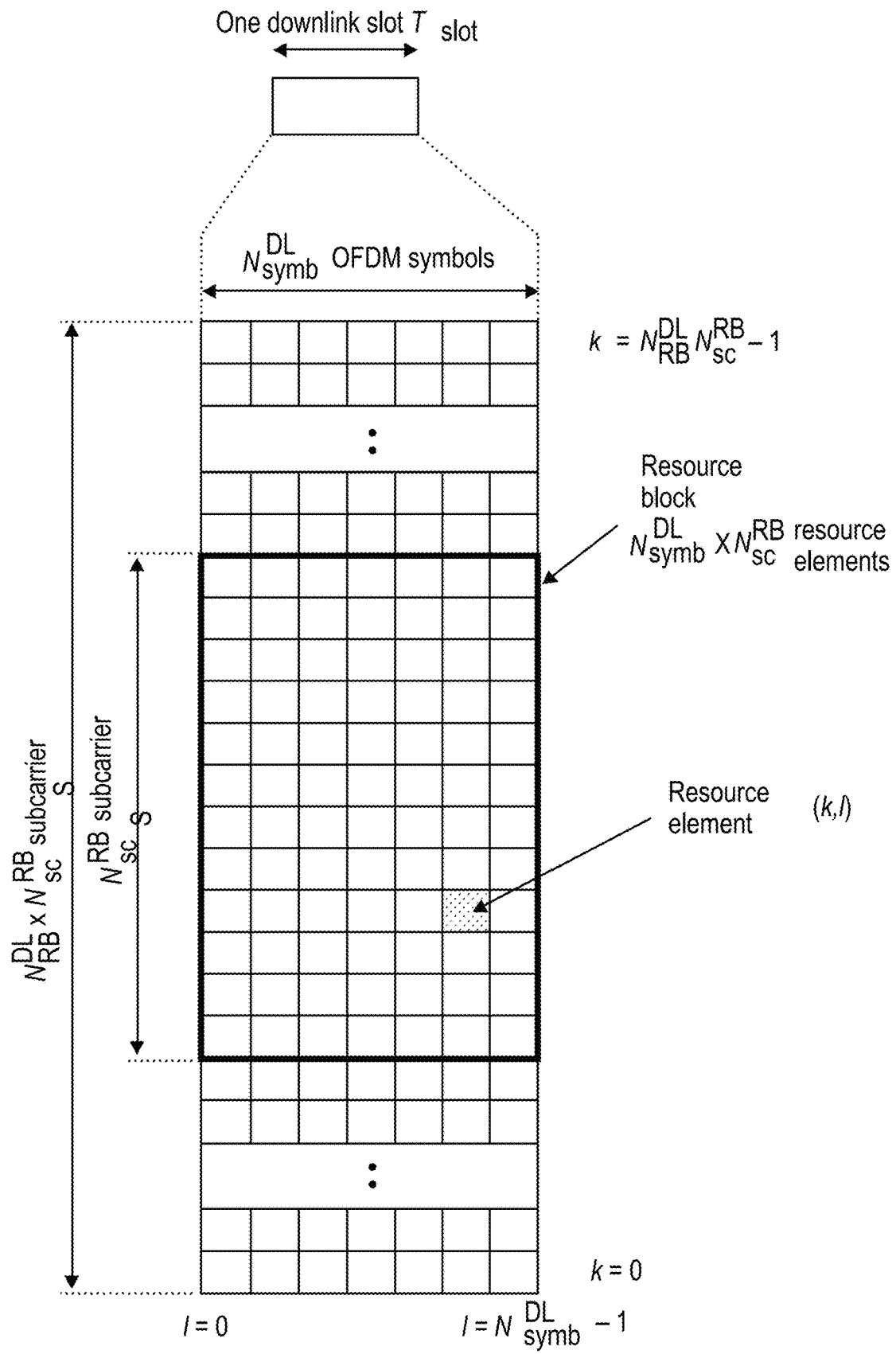
FIG. 8A illustrates the LTE "resource elements" and "resource blocks" in the OFDM DL channel.
Figure 8B:
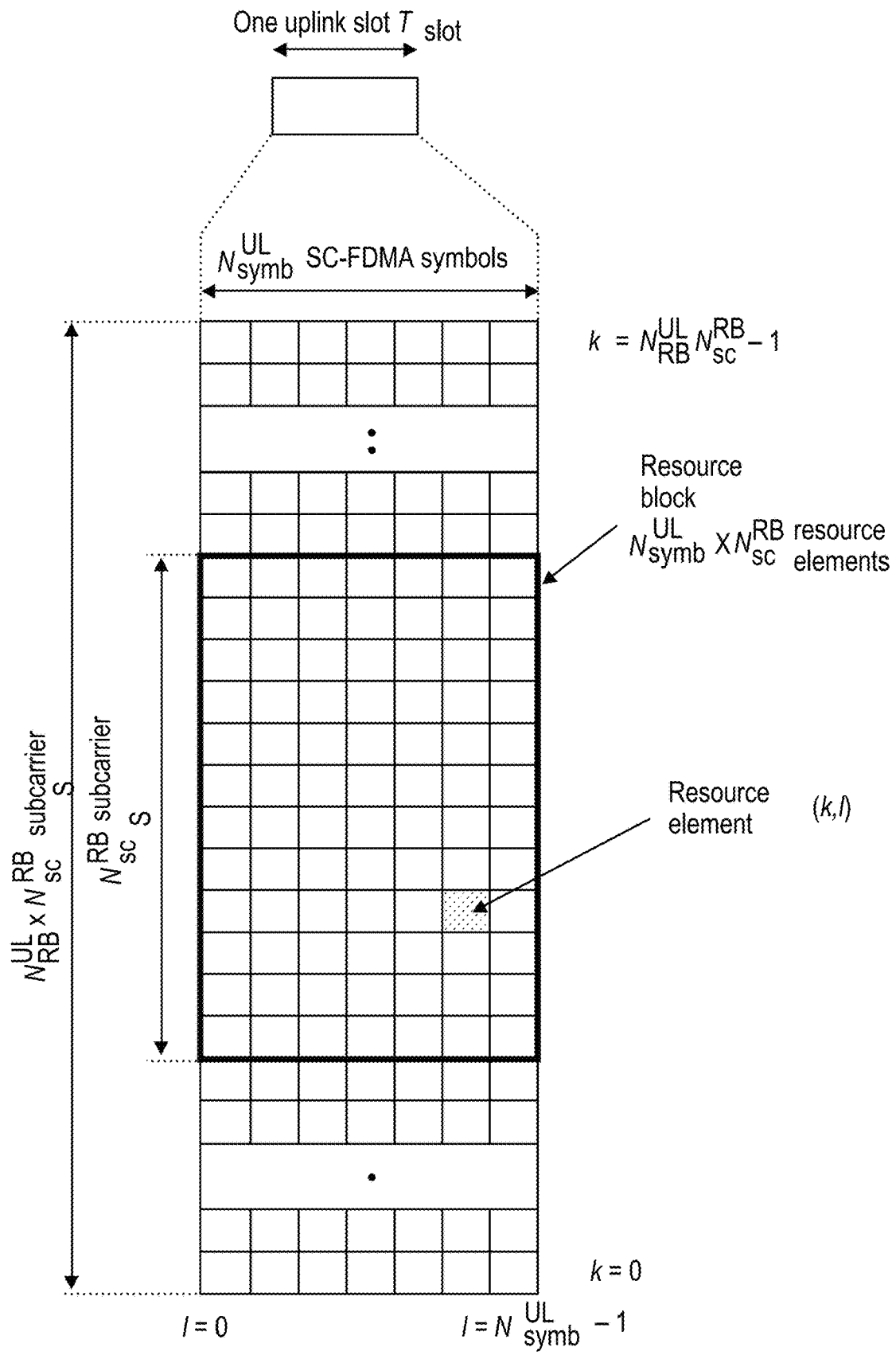
FIG. 8B illustrates the LTE "resource elements" and "resource blocks" in the SC-FDMA UL channel.

The "resource element" (RE) is the smallest modulation structure in LTE and consists of one OFDM subcarrier in frequency and one OFDM symbol duration in time, as shown in FIG. 8a for the DL channel and in FIG. 8b for the UL channel. The "resource block" (RB) consists of 12 subcarriers in frequency and one 0.5 msec slot in time (consisting of 3 to 7 OFDM symbol periods, depending on DL versus UL channel and type of cyclic prefix). Resource blocks for every UE are assigned on a subframe basis. Since the MU-MAS in the present invention uses spatial processing to send multiple data streams to different UEs, at every subframe all resource blocks can be allocated to the same UE. In one embodiment, all or a subset of resource blocks are allocated to every UE and simultaneous non-interfering data streams are sent to the UEs via precoding.

To setup the link between the BTS and the UEs, the LTE standard defines the synchronization procedure. The BTS sends two consecutive signals to the UE: the primary synchronization signal (P-SS) sent over the primary synchronization channel (PSCH) and the secondary synchronization signal (S-SS) sent over the secondary synchronization channel (SSCH). Both signals are used by the UE for time/frequency synchronization as well as to retrieve the cell ID. The P-SS consists of length-63 Zadoff-Chu sequence from which the UE derives the physical layer ID (0 to 2). The S-SS is an interleaved concatenation of two length-31 binary sequences and is used to derive the cell ID group number (0 to 167). From the two identity numbers above, the UE derives the physical cell ID (PCI, defined from 0 to 503).

In the MU-MAS system described in the present invention, there are no cell boundaries as the power transmitted from the BTSs is increased intentionally to produce interference that is exploited to create areas of coherence around the UEs. In the present invention, different BTSs are grouped into "antenna-clusters" or "DIDO-clusters" as defined in related U.S. Pat. No. 8,170,081, issued May 1, 2012, entitled "System And Method For Adjusting DIDO Interference Cancellation Based On Signal Strength Measurements". For example, FIG. 9 shows the main antenna-cluster 901 and one adjacent antenna-cluster 902. Every antenna-cluster consists of multiple BTSs 903.

The cell ID can be used in MU-MAS and DIDO systems to differentiate the antenna-clusters. In one embodiment of the invention, the same cell ID is transmitted from all BTSs of the same antenna-cluster via the P-SS and S-SS. In the same embodiment, different antenna-clusters employ different cell IDs. In another embodiment of the invention, all BTSs within the same antenna-cluster 1001 are grouped into "antenna-subclusters" 1003 depicted in FIG. 10 with different shaded colors and a different cell ID 1004 is associated to every antenna-subcluster. In one embodiment, the antenna-subclusters are defined statically according to pre-defined cluster planning or based on GPS positioning information. In another embodiment, the antenna-subclusters are defined dynamically based on measurements of relative signal strength between BTSs or GPS positioning information. In a different embodiment of the invention, a different cell ID is assigned to every area of coherence (described in related co-pending U.S. application Ser. No. 13/232,996, entitled "Systems and Methods to Exploit Areas of Coherence in Wireless Systems") associated to the UEs.

When all BTSs within the same antenna-cluster or antenna-subcluster transmit the LTE broadcast channels (e.g., P-SS and S-SS) to the UEs, destructive interference may degrade the performance of time or frequency synchronization enabled by the broadcast channel. Destructive interference may be caused by multipaths generated from spatially distributed BTSs that recombine incoherently at some UE locations. To avoid or mitigate this effect, in one embodiment of the invention, only one BTS out of all BTSs within the same antenna-cluster or antenna-subcluster transmits the LTE broadcast channels (e.g., P-SS and S-SS) to all UEs. In the same embodiment, the BTS that transmits the LTE broadcast channels is selected to maximize the power received at the UEs over the broadcast channels. In another embodiment, only a limited set of BTSs is selected to transmit simultaneously the LTE broadcast channels to all UEs, such that destructive interference is avoided at the UE. In a different embodiment of the invention, the LTE broadcast channels are sent at higher power than the payload to reach all the UEs within the same antenna-cluster or antenna-subcluster.

As described above, LTE-Advanced supports carrier aggregation (CA) schemes to increase data rate over the DL channel. In MU-MASs, CA can be used in combination with precoding to increase per-user data rate. In one embodiment of this invention, transmit precoding is applied to different portions of the RF spectrum (inter-band CA) or different bands within the same portion of the spectrum (intra-band CA) to increase per-user data rate. When employing inter-band CA, pathloss at different bands may change significantly as those bands are centered at different carrier frequencies. In conventional LTE cellular systems, frequency bands at lower carrier frequencies may experience lower pathloss than higher carrier frequencies. Hence, applying inter-band CA in cellular systems may cause undesired inter-cell interference at lower carrier frequencies. By contrast, the MU-MAS in the present invention is not limited by interference at the cell boundary as the BTSs are distributed and there is no concept of cell. This more flexible system layout allows different methods for inter-band CA in MU-MAS. In one embodiment of the present invention, the MU-MAS enables inter-band CA by employing one set of BTSs to operate at lower carrier frequencies and another set of BTSs to operate at higher carrier frequencies, such that the two sets intersect or one set is the subset of the other. In another embodiment, the MU-MAS with precoding employs CA methods in conjunction with frequency hopping patterns to improve robustness against frequency-selective fading or interference.

1. Downlink Closed-Loop MU-MAS Precoding Methods in LTE

MU-MAS closed-loop schemes can be used either in time-division duplex (TDD) or frequency division duplex (FDD) systems. In FDD systems, DL and UL channels operate at different frequencies and therefore the DL channel state information (CSI) must be estimated at the UE side and reported back to the CP through the BTSs or the CTRs via the UL channel. In TDD systems, DL and UL channels are set at the same frequency and the system may employ either closed-loop techniques or open-loop schemes exploiting channel reciprocity (as described in the following section). The main disadvantage of closed-loop schemes is they require feedback, resulting in larger overhead for control information over the UL.

The general mechanism for closed-loop schemes in MU-MASs is described as follows: i) the BTSs send signaling information to the UEs over the DL; ii) the UEs exploit that signaling information to estimate the DL CSI from all the "active BTSs"; iii) the UEs quantize the DL CSI or use codebooks to select the precoding weights to be used for the next transmission; iv) the UEs send the quantized CSI or the codebook index to the BTSs or CTRs via the UL channel; v) the BTSs or CTRs report the CSI information or codebook index to the CP that calculates the precoding weights for data transmission over the DL. The "active BTSs" are defined as the set of BTSs that are reached by given UE. For example, in related co-pending U.S. application Ser. No. 12/802,974, entitled "System And Method For Managing Inter-Cluster Handoff Of Clients Which Traverse Multiple DIDO Clusters" and related co-pending U.S. application Ser. No. 12/917,257, entitled "Systems And Methods To Coordinate Transmissions In Distributed Wireless Systems Via User Clustering" we defined the "user-cluster" 905 as the set of BTSs that are reached by given UE, as depicted in FIG. 9. The number of active BTSs are limited to a user-cluster so as to reduce the amount of CSI to be estimated from the BTSs to given UE, thereby reducing the feedback overhead over the UL and the complexity of the MU-MAS precoding calculation at the CP.

As described above, MU-MAS precoding employs either linear or non-linear methods. In the case of non-linear methods (e.g., dirty-paper coding [68-70] or Tomlinson-Harashima precoding [71-72], lattice techniques or trellis precoding [73-74], vector perturbation techniques [75-76]), successive interference cancellation is applied at the transmitter to avoid inter-user interference. In this case the precoding matrix is computed accounting for the CSI to all the UEs within the antenna-cluster. Alternatively, linear precoding methods (e.g., zero-forcing [65], block-diagonalization [66-67], matrix inversion, etc.) can be used on a user-cluster basis, since the precoding weights for every UE are computed independent on the other UEs. Depending on the number of UEs and eNodeBs inside the antenna-cluster and user-clusters, linear versus non-linear precoding methods offer different computational performance. For example, if the MU-MAS consists of K UEs per antenna-cluster, M eNodeBs per antenna-cluster and C eNodeBs per user-cluster, the complexity of linear precoding is $O(K*C^3)$ whereas for non-linear precoding it is $O(M*K^2)$. It is thus desirable to develop a method that dynamically switches between the two types of precoding techniques based on the number if UEs and eNodeBs in MU-MASs to reduce the computational complexity at the CP. In one embodiment of the invention, the MU-MAS employs linear precoding methods. In another embodiment, the MU-MAS employs non-linear precoding methods. In the same embodiment of the invention, the MU-MAS dynamically switches between linear and non-linear precoding methods based on the number of UEs and eNodeBs in the antenna-clusters and user-clusters to reduce computational complexity at the CP. In a different embodiment, the MU-MAS switches between precoding multiplexing methods for UEs experiencing good channel quality (e.g., in the proximity of eNodeBs) and beamforming or diversity methods for UEs with poor link quality (e.g., far away from the eNodeBs).

1.1 Downlink MU-MAS Signaling Methods within the LTE Standard

The LTE standard defines two types of reference signals (RS) that can be used for DL signaling in closed-loop schemes [33, 50, 82-83]: i) cell-specific reference signal (CRS); ii) UE specific RS such as channel state information (CSI) reference signal (CSI-RS) and demodulation RS (DM-RS). The cell-specific RS is not precoded, whereas the UE-specific RS is precoded [50]. CRS is used in LTE Release 8 that employs SU/MU-MIMO codebook-based techniques with up to four antennas in every cell. LTE-Advanced Release 10 supports non-codebook based SU/MU-MIMO schemes with up to eight transmit antennas as well as CoMP schemes with antennas distributed over different cells. As such, Release 10 allows for more flexible signaling schemes via CSI-RS. In the present invention, we describe how either types of signaling schemes can be used in MU-MAS systems to enable precoding.

1.1.1 MU-MAS signaling using CRS

The CRS is employed in LTE (Release 8) systems to estimate the CSI from all transmit antennas at the BTS to the UE [80, 84]. The CRS is obtained as the product of a two-dimensional orthogonal sequence and a two-dimensional pseudo-random numerical (PRN) sequence. There are 3 orthogonal sequences (i.e., placed on orthogonal sets of OFDM subcarriers) and 168 possible PRN sequences, for a total of 504 different CRS sequences. Every sequence uniquely identifies one cell. Each of the three orthogonal CRSs is associated to one of the three physical layer IDs (0 to 2) that generate a different cell ID, as explained in the previous subsection. The CRS is transmitted within the first and third-last OFDM symbol of every slot, and every sixth subcarrier. Orthogonal patterns in time and frequency are designed for every transmit antenna of the BTS, for the UE to uniquely estimate the CSI from each of transmit antennas. Release 8 defines up to four orthogonal patters per CRS, one for each of the four transmit antennas employed in MIMO 4×4. This high density of CRS in time and frequency (i.e., sent every slot of 0.5 msec, and every sixth subcarrier), producing 5% overhead, was designed intentionally to support scenarios with fast channel variations over time and frequency [83].

In Release 8, since there are up to 3 orthogonal CRSs with 4 orthogonal patterns each for multi-antenna modes (or 6 orthogonal CRSs for single antenna mode), it is possible to discriminate up to 12 transmit antennas within the same coverage area, without causing interference to the CRS. In one embodiment of the invention, the antenna-cluster 1001 is divided into three antenna-subclusters 1005 as in FIG. 10. Different physical layer IDs (or cell IDs) are associated to each of the antenna-subclusters, such that each antenna-subcluster is assigned with one of the three orthogonal CRSs with four orthogonal patterns (i.e., each antenna-subcluster can support up to four BTS without causing interference to the CRS from other BTSs). In this embodiment, every cluster can support up to 12 BTSs without causing interference to the CRS.

Figure 11:
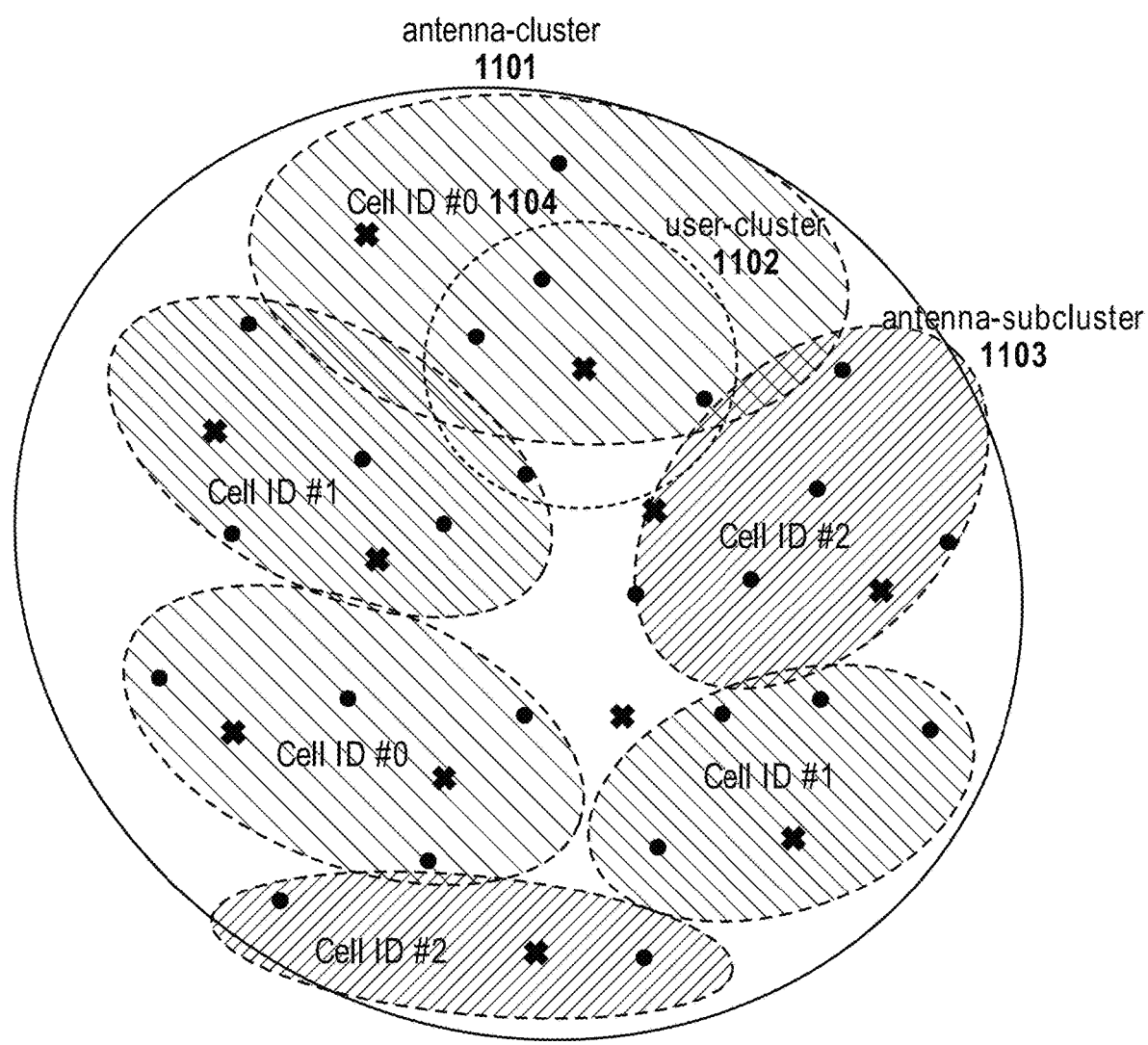
FIG. 11 illustrates one embodiment of a MU-MAS wherein the same set of cell IDs are assigned to the antenna-subclusters with given repetition pattern.

In scenarios where more than twelve BTSs are placed within the same cluster, it is desirable to increase the number of available orthogonal CRSs to support larger number of active BTSs (i.e., BTSs that simultaneously transmit precoded signals to the UEs). One way to achieve that is to define more than three antenna-subclusters 1003 per antenna-cluster 1101 and assign the same three physical layer IDs (or cell ID 1104 from 0 to 2) to the antenna-subclusters 1103 with a repetition pattern as shown in FIG. 11. We observe that the antenna-subclusters may come in different shapes and are defined in such a way that every user-cluster 1102 cannot reach two antenna-subclusters with the same physical layer ID, thereby avoiding interference to the CRS. For example, one way to achieve that is to define the area of the antenna-subcluster 1103 larger than the user-cluster 1102 and avoid that adjacent antenna-subcluster use the same physical layer ID. In one embodiment of the invention, the multiple antenna-subclusters are placed within the same antenna-cluster with repetition patterns such that their respective CRSs do not interfere, thereby enabling simultaneous non-interfering transmissions from more than twelve BTSs.

Figure 12:
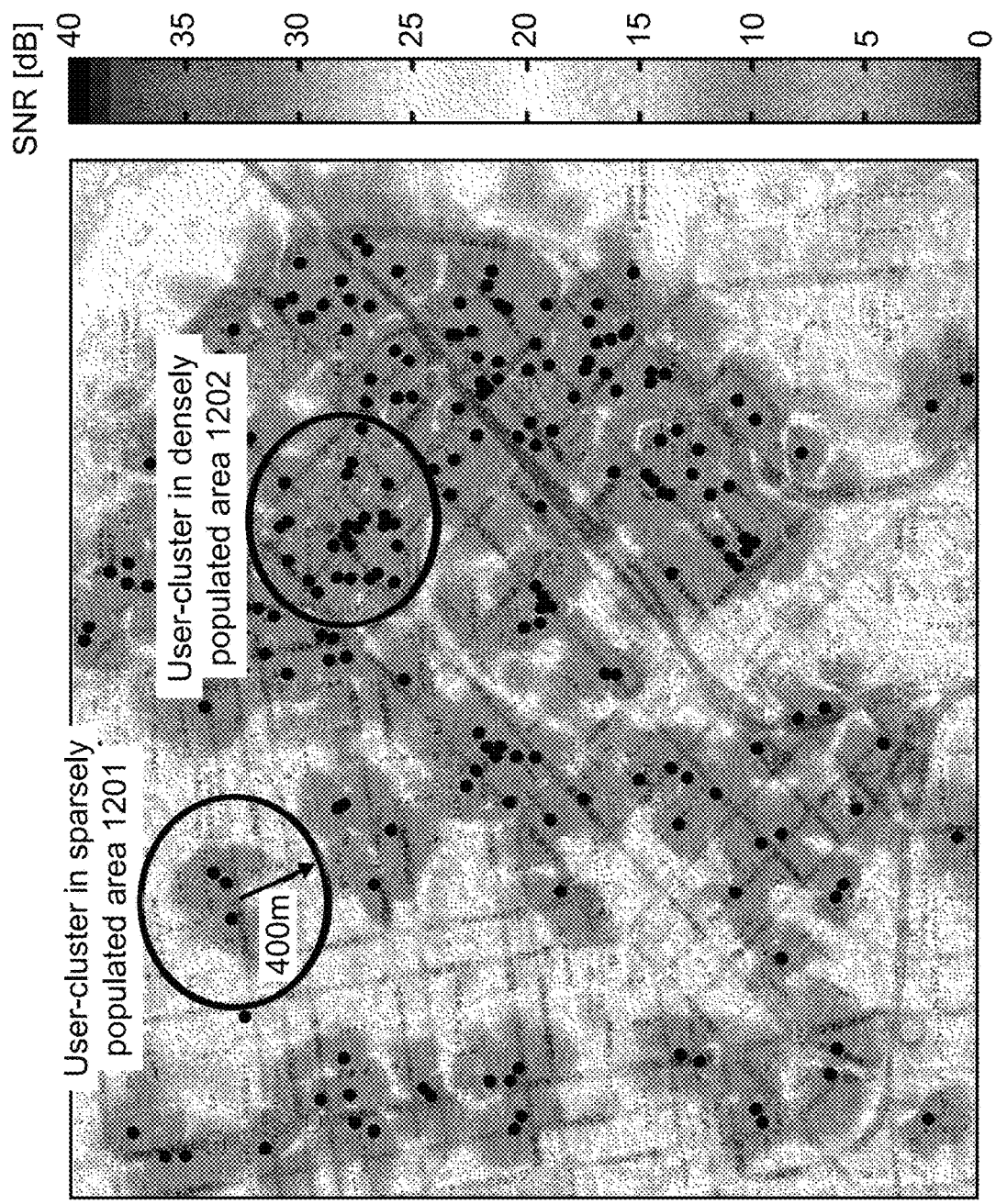
FIG. 12 illustrates the SNR distribution for practical deployment of MU-MAS systems in downtown San Francisco, Calif., with sparsely and densely populated areas.

In practical MU-MAS systems, it may be the case that every UE sees more than only four BTSs within its user-cluster. For example, FIG. 12 shows the SNR distribution for practical deployment of DIDO or MU-MAS systems in downtown San Francisco, Calif. The propagation model is based on 3GPP pathloss/shadowing model [81] and assumes a carrier frequency of 900 MHz. The dots in the map indicate the location of the DIDO-BTSs, whereas the dark circle represents the user-cluster (with the UE being located at the center of the circle). In sparsely populated areas 1201, the UE sees only a few BTSs within its user-cluster (e.g., as low as three BTSs for the example in FIG. 12), whereas in densely populated areas 1202 each user-cluster may comprise as many as 26 BTSs as in FIG. 12.

The high redundancy of the CRS can be exploited in MU-MASs to enable CSI estimation from any number of transmit antennas greater than four. For example, if the channel is fixed-wireless or characterized by low Doppler effects, there is no need to compute the CSI from all four transmit antennas every 0.5 msec (slot duration). Likewise, if the channel is frequency-flat, estimating the CSI every sixth subcarrier is redundant. In that case, the resource elements (RE) occupied by the redundant CRS can be re-allocated for other transmit antennas or BTSs in the MU-MAS. In one embodiment of the invention, the system allocates resource elements of redundant CRS to extra antennas or BTSs in the MU-MAS system. In another embodiment, the system estimates time and frequency selectivity of the channel and dynamically allocates the CRS for different BTSs or only the BTSs within the user-cluster to different resource elements.

The number of BTSs included in every user-cluster depends on the signal power level measured at the UE from all BTSs in the user-cluster relative to the noise power level, or signal-to-noise ratio (SNR). In one embodiment, the UE estimates the SNR from all BTSs in its neighborhood and selects the BTSs that belong to its user-cluster based on the SNR information. In another embodiment, the CP is aware of the SNR from the BTSs to every UE (based on feedback information from the UEs or information obtained from the UL channel, assuming UL/DL channel reciprocity) and selects the set of BTSs to be included in every user-cluster.

The number of BTSs included in every user-cluster determines the performance of the MU-MAS methods described in the present invention. For example, if the number of BTSs per user-cluster is low, the UE experiences higher level of out-of-cluster interference, resulting in high signal-to-interference-plus-noise ratio (SINR) and low data rate. Similarly, if large number of BTSs is selected for every user-cluster, the SNR measured at the UE from the BTSs at the edge of the user-cluster is low and may be dominated by the out-of-cluster interference from adjacent BTSs outside the user-cluster. There is an optimal number of BTSs per user-cluster that produces the highest SINR and data rate. In one embodiment of the invention, the CP selects the optimal number of BTSs per user-cluster to maximize SINR and data rate to the UE. In another embodiment of the invention, the BTSs per user-cluster are dynamically selected to adapt to the changing conditions of the propagation environment or UE mobility.

Another drawback of using large number of BTSs per user-cluster is high computational load. In fact, the more BTSs in the user-cluster the larger the computation complexity of the MU-MAS precoder. In one embodiment of the inventions, the BTSs per user-cluster are selected to achieve optimal tradeoff between SINR or data rate performance and computational complexity of the MU-MAS precoder. In another embodiment, the BTSs per user-cluster are dynamically selected based on tradeoffs between propagation conditions and computational resources available in the MU-MAS.

1.1.2 MU-MAS Signaling Using CSI-RS and DM-RS

In the LTE-Advanced (Release 10) standard the CSI-RS is used by every UE to estimate the CSI from the BTSs [33, 83]. The standard defines orthogonal CSI-RS for different transmitters at the BTS, so that the UE can differentiate the CSI from different BTSs. Up to eight transmit antennas at the BTS are supported by the CSI-RS as in Tables 6.10.5.2-1,2 in [33]. The CSI-RS is sent with a periodicity that ranges between 5 and 80 subframes (i.e., CSI-RS send every 5 to 80 msec) as in Tables 6.10.5.3-1 in [33]. The periodicity of the CSI-RS in LTE-Advanced was designed intentionally larger than the CRS in LTE to avoid excessive overhead of control information, particularly for legacy LTE terminals unable to make use of these extra resources. Another reference signal used for CSI estimation is to demodulation RS (DM-RS). The DM-RS is a demodulation reference signal intended to a specific UE and transmitted only in the resource block assigned for transmission to that UE.

When more than eight antennas (maximum number of transmitters supported by the LTE-Advanced standard) are within the user-cluster, alternative techniques must be employed to enable DIDO precoding while maintaining system compliance to the LTE-Advanced standard. In one embodiment of the invention, every UE uses the CSI-RS or the DM-RS or combination of both to estimate the CSI from all active BTSs in its own user-cluster. In the same embodiment, the DIDO system detects the number of BTSs within the user-cluster and whether or not the user-cluster is compliant to the LTE-Advanced standard (supporting at most eight antennas). If it not compliant, the DIDO system employs alternative techniques to enable DL signaling from the BTSs to the current UE. In one embodiment, the transmit power from the BTSs is reduced until at most eight BTSs are reachable by the UE within its user-cluster. This solution, however, may result in reduction of data rate as coverage would be reduced.

Another solution is to divide the BTSs in the user-cluster in subsets and send one set of CSI-RS for every subset at a time. For example, if the CSI-RS periodicity is 5 subframes (i.e., 5 msec) as in Table 6.10.5.3-1 in [33], every 5 msec the CSI-RS is sent from a new subset of BTSs. Note that this solution works as long as the CSI-RS periodicity is short enough to cover all BTS subsets within the channel coherence time of the UE (which is a function of the Doppler velocity of the UE). For example, if the selected CSI-RS periodicity is 5 msec and the channel coherence time is 100 msec, it is possible to define up to 20 BTS subsets of 8 BTS each, adding up to a total of 160 BTSs within the user-cluster. In another embodiment of the invention, the DIDO system estimates the channel coherence time of the UE and decides how many BTSs can be supported within the user-cluster for given CSI-RS periodicity, to avoid degradation due to channel variations and Doppler effect.

The solutions for CSI-RS proposed so far are all compliant with the LTE standard and can be deployed within the framework of conventional LTE systems. For example, the proposed method that allows more than eight antennas per user-cluster would not require modifications of the UE LTE hardware and software implementation, and only slight modification of the protocols used at the BTSs and CP to enable selection of BTSs subset at any given time. These modifications can be easily implemented in a cloud-based software defined radio (SDR) platform, which is one promising deployment paradigm for DIDO and MU-MAS systems. Alternatively, if it is possible to relax the constraints of the LTE standard and develop slightly modified hardware and software for LTE UEs to support similar, but non-LTE-compliant DIDO or MU-MAS modes of operation, so as enable UEs to be able to operate in full LTE-compliant mode, or in a modified mode that supports non-LTE-compliant DIDO or MU-MAS operation. For example, this would enable another solution is to increase the amount of CSI-RS to enable higher number of BTSs in the system. In another embodiment of the invention, different CSI-RS patterns and periodicities are allowed as a means to increase the number of supported BTSs per user-cluster. Such slight modifications to the LTE standard may be small enough that existing LTE UE chipsets can be used with simply software modification. Or, if hardware modification would be needed to the chipsets, the changes would be small.

1.2 Uplink MU-MAS CSI Feedback Methods within the LTE Standard

In the LTE and LTE-Advanced standards, the UE feedbacks information to the BTS to communicate its current channel conditions as well as the precoding weights for closed-loop transmission over the DL channel. Three different channel indicators are included in those standards [35]:

Rank indicator (RI): indicates how many spatial streams are transmitted to given UE. This number is always equal or less than the number of transmit antennas.

Precoding matrix indicator (PMI): is the index of the codebook used for precoding over the DL channel.

Channel quality indicator (CQI): defines the modulation and forward error correction (FEC) coding scheme to be used over the DL to maintain predefined error rate performance for given channel conditions Only one RI is reported for the whole bandwidth, whereas the PMI and CQI reporting can be wideband or per sub-band, depending on the frequency-selectivity of the channel. These indicators are transmitted in the UL over two different types of physical channels: i) the physical uplink control channel (PUCCH), used only for control information; ii) the physical uplink shared channel (PUSCH), used for both data and control information, allocated over one resource block (RB) and on a subframe basis. On the PUCCH, the procedure to report the RI, PMI and CQI is periodic and the indicators can be either wideband (for frequency-flat channels) or UE-selected on a sub-band basis (for frequency-selective channels). On the PUSCH, the feedback procedure is aperiodic and can be UE-selected on a sub-band basis (for frequency-selective channels) or higher-layer configured sub-band (e.g., for transmission mode 9 in LTE-Advance with eight transmitters).

In one embodiment of the invention, the DIDO or MU-MAS system employs RI, PMI and CQI to report to BTSs and CP its current channel conditions as well as precoding information. In one embodiment, the UE uses the PUCCH channel to report those indicators to the CP. In another embodiment, in case a larger number of indicators is necessary for DIDO precoding, the UE employs the PUSCH to report additional indicators to the CP. In case the channel is frequency-flat, the UE can exploit extra UL resources to report the PMI for a larger number of antennas in the DIDO systems. In one embodiment of the invention, the UE or BTSs or CP estimate the channel frequency selectivity and, in case the channel is frequency-flat, the UE exploits the extra UL resources to report the PMI for larger number of BTSs.

2. Downlink Open-Loop MU-MAS Precoding Methods in LTE

Open-loop MU-MAS precoding schemes can only be used in time-division duplex (TDD) systems employing RF calibration and exploiting channel reciprocity. The general mechanism of open-loop schemes in MU-MASs consists of: i) the UEs send signaling information to the BTSs or CTRs over the UL; ii) the BTSs or CTRs exploit that signaling information to estimate the UL CSI from all UEs; iii) the BTSs or CTRs employ RF calibration to convert the UL CSI into DL CSI; iv) the BTSs or CTRs send the DL CSI or codebook index to the CP via the BSN; v) based on that DL CSI, the CP calculates the precoding weights for data transmission over the DL. Similarly to closed-loop MU-MAS precoding schemes, user-clusters can be employed to reduce the amount of CSI to be estimated at the BTSs from the UEs, thereby reducing the computational burden at the BTSs as well as the amount of signaling required over the UL. In one embodiment of the invention, open-loop precoding techniques are employed to send simultaneous non-interfering data streams from the BTSs to the UEs over the DL channel.

In LTE there are two types of reference signal for the uplink channel [31, 33, 87]: i) sounding reference signal (SRS), used for scheduling and link adaptation; ii) demodulation reference signal (DMRS), used for data reception. In one embodiment of the invention, the DMRS is employed in open-loop precoding systems to estimate the UL channels form all UEs to all BTSs. In the time domain, the DMRS is sent at the fourth OFDM symbol (when a normal cyclic prefix is used) of every LTE slot (of duration 0.5 msec). In the frequency domain, the DMRS sent over the PUSCH is mapped for every UE to the same resource block (RB) used by that UE for UL data transmission.

The length of the DMRS is $M^{RS}=mN^{RB}$, where m is the number of RBs and $N^{RB}=12$ is the number of subcarriers per RB. To support multiple UEs, up to twelve DMRSs are generated from one base Zadoff-Chu [88] or computer-generated constant amplitude zero autocorrelation (CG-CAZAC) sequence, via twelve possible cyclic shifts of the base sequence. Base sequences are divided into 30 groups and neighbor LTE cells select DMRS from different groups to reduce inter-cell interference. For example, if the maximum number of resource blocks within one OFDM symbol is 110 (i.e., assuming 20 MHz overall signal bandwidth), it is possible to generate up to $110\times30=3300$ different sequences. We observe that the 30 base sequences are not guaranteed to be orthogonal and are designed to reduce interference across cells, without eliminating it completely. By contrast, the 12 cyclic shifts of the same base sequence are orthogonal, thereby allowing up to 12 UEs to transmit in the UL over the same RB without interference. The value of cyclic shift to be used by every UE is provided by the BTS through the downlink control information (DCI) message sent over the PDCCH. The DCI in Release 8 consists of 3 bits, that enables the UE to use only up to 8 values of cyclic shift in the pool of twelve possible options.

The cyclic shifts of the base DMRS sequence are exploited in the present invention to enable MU-MIMO schemes over the UL channel as well as to estimate the CSI from multiple UEs for DL precoding when channel reciprocity is exploited in TDD mode. In one embodiment of the invention, open-loop precoding methods are employed to send simultaneous non-interfering data streams from the distributed BTSs to the UEs over the DL channel. In a different embodiment of the invention, open-loop MU-MIMO methods are employed to receive simultaneous non-interfering data streams from the UEs to the BTSs over the UL channel. The same CSI estimated over the UL from all active UEs can be used to compute the receiver spatial filter for MU-MIMO operation in the UL as well as the weights for DL precoding. Since Release 8 defines only up to 8 orthogonal DMRSs (due to limited DCI bits, as explained above), MU-MIMO schemes for the UL channel and MU-MAS precoding schemes for the DL channel can support at most eight UEs, assuming all UEs utilize the full UL bandwidth.

One way to increase the number of simultaneous UEs being served through MU-MIMO in UL or MU-MAS precoding in DL is to multiplex the DMRS of the UEs over the frequency domain. For example, if 10 MHz bandwidth is used in TDD mode, there are 50 RBs that can be allocated to the UEs. In this case, 25 interleaved RBs can be assigned to one set of eight UEs and the remaining 25 interleaved RBs to another set of UEs, totaling to 16 UEs that can be served simultaneously. Then, the CSI is computed by interpolating the estimates from the DMRS sent over interleaved RBs. Larger number of simultaneous UEs can be supported by increasing the number of interleaving patterns of the UL RBs. These patterns can be assigned to different UEs statically or dynamically according to certain frequency hopping sequence. In one embodiment of the invention, DMRSs are assigned to the UEs over orthogonal interleaved RBs to increase the number of UEs to be supported via MU-MIMO or MU-MAS precoding. In the same embodiment, the interleaved RBs are assigned statically. In another embodiment, the interleaved RBs are assigned dynamically according to certain frequency hopping pattern.

An alternative solution is to multiplex the DMRS of different UEs in the time domain. For example, the UEs are divided into different groups and the DMRSs for those groups are sent over consecutive time slots (of duration 0.5 msec each). In this case, however, it is necessary to guarantee that the periodicity of the DMRS assignment for different groups is lower than the channel coherence time of the fastest moving UE. In fact, this is necessary condition to guarantee that the channel does not vary for all UEs from the time the CSI is estimated via DMRS to the time system transmits DL data streams to the UEs via DIDO precoding. In one embodiment of the invention, the system divides the active UEs into groups and assigns the same set of DMRS to each group over consecutive time slots. In the same embodiment, the system estimates the shortest channel coherence time for all active UEs and calculates the maximum number of UE groups as well as the periodicity of the DMRS time multiplexing based on that information.

Another solution is to spatially separate different groups of UEs employing the same sets of DMRSs. For example, the same set of orthogonal DMRSs can be used for all the UEs from different antenna-subclusters in FIG. 11 identified by the same cell ID. In one embodiment of the invention, groups of UEs employing the same set of orthogonal DMRSs are spatially separated to avoid interference between the groups. In the same embodiment, the same set of orthogonal DMRSs is employed by different antenna-subclusters identified by the same cell ID. The MU-MAS may assign the UEs to "virtual cells" to maximize the number of DMRS that can be used in the UL. In one exemplary embodiment, the virtual cell is the area of coherence (described in related co-pending U.S. application Ser. No. 13/232,996, entitled "Systems and Methods to Exploit Areas of Coherence in Wireless Systems") around the UE and the DIDO system generates up to 3300 areas of coherence for different UEs. In another embodiment of the invention, each of the 30 base sequences is assigned to a different antenna-cluster (clusters are defined in related U.S. Pat. No. 8,170,081, issued May 1, 2012, entitled "System And Method For Adjusting DIDO Interference Cancellation Based On Signal Strength Measurements") to reduce inter-cluster interference across adjacent antenna-clusters.

3. Uplink MU-MAS Methods in LTE

The present invention employs open-loop MU-MIMO schemes over the UL channel to receive simultaneous UL data streams from all UEs to the BTSs. The UL open-loop MU-MIMO scheme consists of the following steps: i) UEs send signaling information and data payload to all BTSs; ii) the BTSs compute the channel estimations from all UEs using the signaling information; iii) the BTSs send the channel estimates and data payloads to the CP; iv) the CP uses the channel estimates to remove inter-channel interference from all UEs' data payloads via spatial filtering and demodulates the data streams form all UEs. In one embodiment, the open-loop MU-MIMO system employs single-carrier frequency division multiple access (SC-FDMA) to increase the number of UL channels from the UEs to the BTSs and multiplex them in the frequency domain.

In one embodiment, synchronization among UEs is achieved via signaling from the DL and all BTSs are assumed locked to the same time/frequency reference clock, either via direct wiring to the same clock or sharing a common time/frequency reference, in one embodiment through GPSDO. Variations in channel delay spread at different UEs may generate jitter among the time references of different UEs that may affect the performance of MU-MIMO methods over the UL. In one embodiment, only the UEs within the same antenna-cluster (e.g., UEs in close proximity with one another) are processed with MU-MIMO methods to reduce the relative propagation delay spread across different UEs. In another embodiment, the relative propagation delays between UEs are compensated at the UEs or at the BTSs to guarantee simultaneous reception of data payloads from different UEs at the BTSs.

The methods for enabling signaling information for data demodulation over the UL are the same methods used for signaling in the downlink open-loop DIDO scheme described at the previous section. The CP employs different spatial processing techniques to remove inter-channel interference from the UEs data payload. In one embodiment of the invention, the CP employs non-linear spatial processing methods such as maximum likelihood (ML), decision feedback equalization (DFE) or successive interference cancellation (SIC) receivers. In another embodiment the CP employs linear filters such as zeros-forcing (ZF) or minimum mean squared error (MMSE) receivers to cancel co-channel interference and demodulate the uplink data streams individually.

4. Integration with Existing LTE Networks

In the United States and other regions of the world, LTE networks are already in operation or are in the process of being deployed and/or committed to be deployed. It would be of significant benefit to LTE operators if they could gradually deploy DIDO or MU-MAS capability into their existing or already-committed deployments. In this way, they could deploy DIDO or MU-MAS in areas where it would provide the most immediate benefit, and gradually expand the DIDO or MU-MAS capability to cover more their network. In time, once they have sufficient DIDO or MU-MAS coverage in an area, they can choose to cease using cells entirely, and instead switch entirely to DIDO or MU-MAS and achieve much higher spectral density at much lower cost. Throughout this entire transition from cellular to DIDO or MU-MAS, the LTE operator's wireless customers will never see a loss in service. Rather, they'll simply see their data throughput and reliability improve, while the operator will see its costs decline.

There are several embodiments that would enable a gradual integration of DIDO or MU-MAS into existing LTE networks. In all cases, the BTSs for DIDO or MU-MAS will be referred as DIDO-LTE BTSs and will utilize one of the LTE-compatible DIDO or MU-MAS embodiments described above, or other LTE-compatible embodiments as they may be developed in the future. Or, the DIDO-LTE BTSs will utilize a slight variant of the LTE standard, such as those described above and the UEs will either be updated (e.g. if a software update is sufficient to modify the UE to be DIDO or MU-MAS compatible), or a new generation of UEs that are DIDO- or MU-MAS-compatible will be deployed. In either case, the new BTSs that support DIDO or MU-MAS either within the constraints of the LTE standard, or as a variant of the LTE standard will be referred to below as DIDO-LTE BTSs.

The LTE standard supports various channel bandwidths (e.g., 1.4, 3, 5, 10, 15 and 20 MHz). In one embodiment, an operator with an existing LTE network would either allocate new bandwidth for the LTE-DIDO BTSs, or would subdivide the existing LTE spectrum (e.g. 20 MHz could be subdivided into two 10 MHz blocks) to support conventional LTE BTSs in a cellular configuration in one block of spectrum and DIDO LTE BTSs in another block of spectrum. Effectively, this would establish two separate LTE networks, and UE devices would be configured to use one or the other network, or select between the two. In the case of subdivided spectrum, the spectrum could be divided evenly between the conventional LTE network and the DIDO-LTE BTS network, or unevenly, allocated more spectrum to whichever network could best utilize it given the level of cellular LTE BTS and DIDO-LTE BTS deployment and/or UE usage patterns. This subdivision could change as needed over time, and at some point, when there are sufficient DIDO-LTE BTSs deployed to provide the same or better coverage as the cellular BTSs, all of the spectrum can be allocated to DIDO-LTE BTSs, and the cellular BTSs can be decommissioned.

In another embodiment, the conventional cellular LTE BTSs can be configured to be coordinated with the DIDO-LTE BTSs such that they share the same spectrum, but take turns using the spectrum. For example, if they were sharing the spectrum use equally, then each BTS network would utilize one 10 ms frame time in alternation, e.g. one 10 ms frame for the cellular LTE BTS, followed by one 10 ms frame for the DIDO-LTE BTS. The frame times could be subdivided in unequal intervals as well. This interval splitting could change as needed over time, and at some point, when there are sufficient DIDO-LTE BTSs deployed to provide the same or better coverage as the cellular BTSs, all of the time can be allocated to DIDO-LTE BTSs, and the cellular BTSs can be decommissioned.

In another embodiment of the invention, DIDO or MU-MAS is employed as LOS or NLOS wireless backhaul to small cells in LTE and LTE-Advanced networks. As small-cells are deployed in LTE networks, DIDO or MU-MAS provides high-speed wireless backhaul to those small cells. As the demand for higher data rate increases, more small-cells are added to the network until the wireless network reaches a limit where no more small-cells can be added in a given area without causing inter-cell interference. In the same embodiment of the invention, DIDO-LTE BTSs are used to replace gradually small-cells, thereby exploiting inter-cell interference to provide increased network capacity.

5. MU-MAS LTE Scheduler

In MU-MAS, distributed antennas or BTSs transmit simultaneous precoded data streams to multiple UEs. As described in Related Patents and Applications, the number of BTSs must be equal or larger than the number of UEs to enable simultaneous data transmissions. In practical deployments, the number of UEs may exceed the number of BTSs. In this case, the extra UEs can be selected for transmission at different time slots or frequency bands according to certain scheduling policy. The scheduler exploits the channel quality information of the UEs to decide the best set of UEs to be serviced at a give time and frequency. Different scheduling methods are used in the present invention, including proportional fair scheduler, round-robin or greedy algorithms.

As described in the previous sections, the LTE standard defines two parameters to inform the scheduler about the link quality of every UE: CQI and SRS. The CQI measures the quality of the DL channel and is fed back from the UE to the BTS. The SRS is signaling information sent from the UE to the BTS to measure the UL channel quality. Both indicators provide information of the UL/DL channel quality over time and frequency domains. In FDD systems, the DL scheduler must use the CQI as performance measure, since the DL and UL channel quality may vary due to different carrier frequencies. In TDD mode, the DL schedule employs either the CSI or the SRS or combination of both to perform its scheduling decision. The same performance metrics can be used for UL scheduling. In one embodiment of the invention, the MU-MAS scheduler employs the CQI and SRS as performance metrics used by the scheduling algorithm.

The MU-MAS described in the present invention enables one additional channel quality indicator not disclosed in prior art: the spatial selectivity indicator (SSI), described in related U.S. application Ser. No. 13/475,598, entitled "Systems and Methods to enhance spatial diversity in distributed-input distributed-output wireless systems". The SSI can be computed based on the CSI obtained from all UEs via feedback mechanisms or from the UL channel (applying UL/DL channel reciprocity). In one embodiment of the invention, the scheduler employs the SSI as performance metric. The SSI is a measure of the spatial diversity available in the wireless link. The SSI depends on the spatial characteristics of the BTSs as well as the UEs. In one exemplary embodiment of the invention, the scheduler obtains the SSI from all the UEs and schedules the UEs with the "optimal" SSI according to certain scheduling criterion. If more BTSs are available than the active BTSs, the users selection criterion described above is combined with the antenna selection method described in related U.S. application Ser. No. 13/475,598, entitled "Systems and Methods to enhance spatial diversity in distributed-input distributed-output wireless systems". In one embodiment of the invention, the scheduler selects the optimal subset of BTSs and UEs based on certain scheduling criterion.

Figure 10:
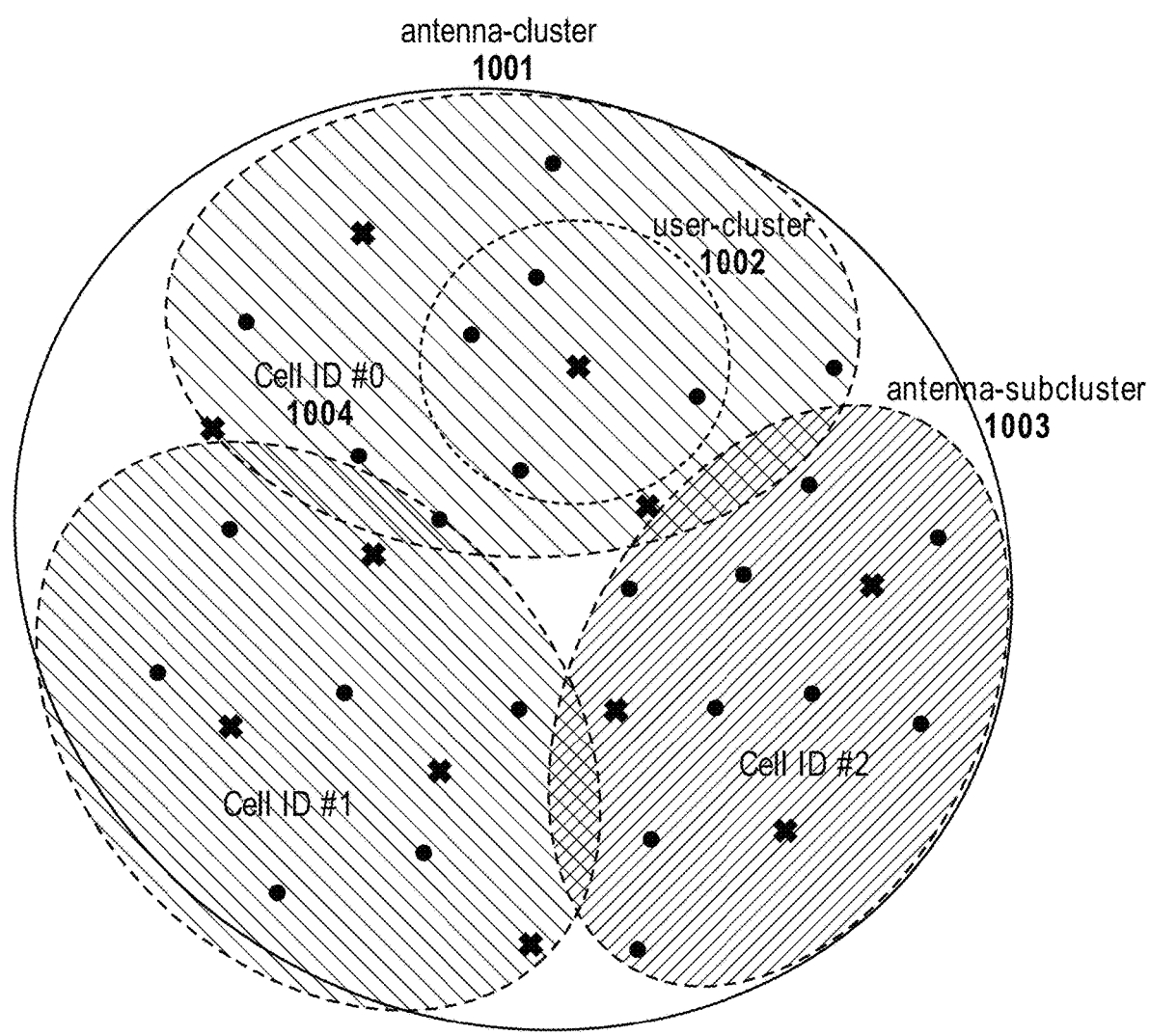
FIG. 10 illustrates one embodiment of a MU-MAS wherein a different cell ID is associated to every antenna-subcluster.

With respect to FIGS. 9, 10 and 11, in certain scenarios there may not be enough orthogonal signaling sequences to enable large number of BTSs within the same antenna-cluster or antenna-subcluster. In this case, some level of interference may occur if additional BTSs are activated to cover regions with larger numbers of active UEs. In one embodiment of the invention, the scheduler measures the level of interference between antenna-clusters or antenna-subclusters and schedules the UEs to minimize the effect of that interference over the wireless link.

The antenna selection algorithm described in related U.S. application Ser. No. 13/475,598, entitled "Systems and Methods to enhance spatial diversity in distributed-input distributed-output wireless systems" is employed in the present invention to select the optimal set of active BTSs based on the SSI. This antenna selection algorithm, however, may require high computational complexity as MU-MAS precoding processing must be applied over all possible permutations of antenna subsets before making a decision on the best subset based on the SSI performance metric. In MU-MAS with large number of cooperative BTSs, this computational burden may become expensive or untenable to achieve in practical deployments. It is thus desirable to develop alternative techniques to reduce the number of antenna subsets while maintaining good performance of the antenna selection method. In one embodiment of the invention, the MU-MAS employs methods based on queuing of the antenna subset ID numbers, hereafter referred to as "antenna shuffling method". In one embodiment of the invention, the antenna shuffling method subdivides the queue containing all possible antenna subset IDs (i.e., all possible permutations of active BTSs for given set of available BTSs) into different groups and assigns different priorities to those groups. These groups are defined to assign fair chances to all subset IDs to be selected, but the SSI metric is computed only for limited number of subsets (e.g., those ones with highest priority) thereby reducing computational complexity. In one exemplary embodiment, the queue of subset ID is divided into three groups where each group is assigned a different rule: i) group #1 contains the IDs with highest priority which are pulled out of the group only in case a new subset with higher priority is identified; ii) group #2 where new antenna subsets (selected from group #3) are included at every iteration of the method; iii) group #3 where the antenna subset IDs are shuffled according to round-robin policy. All subset IDs within group #1 and #2 are sorted at each iteration of the method based on their priority to give opportunity to subsets IDs from group #2 to be upgraded to group #1. The SSI is computed only for the subsets within groups #1 and #2 and the antenna selection algorithm is applied only to those subsets.

6. MU-MAS LTE User Equipment

The present invention comprises of different designs of the LTE UE. In one embodiment, the UE is an LTE UE that is compatible with the MU-MAS employing precoding as described above and depicted in FIG. 13.

Figure 14:
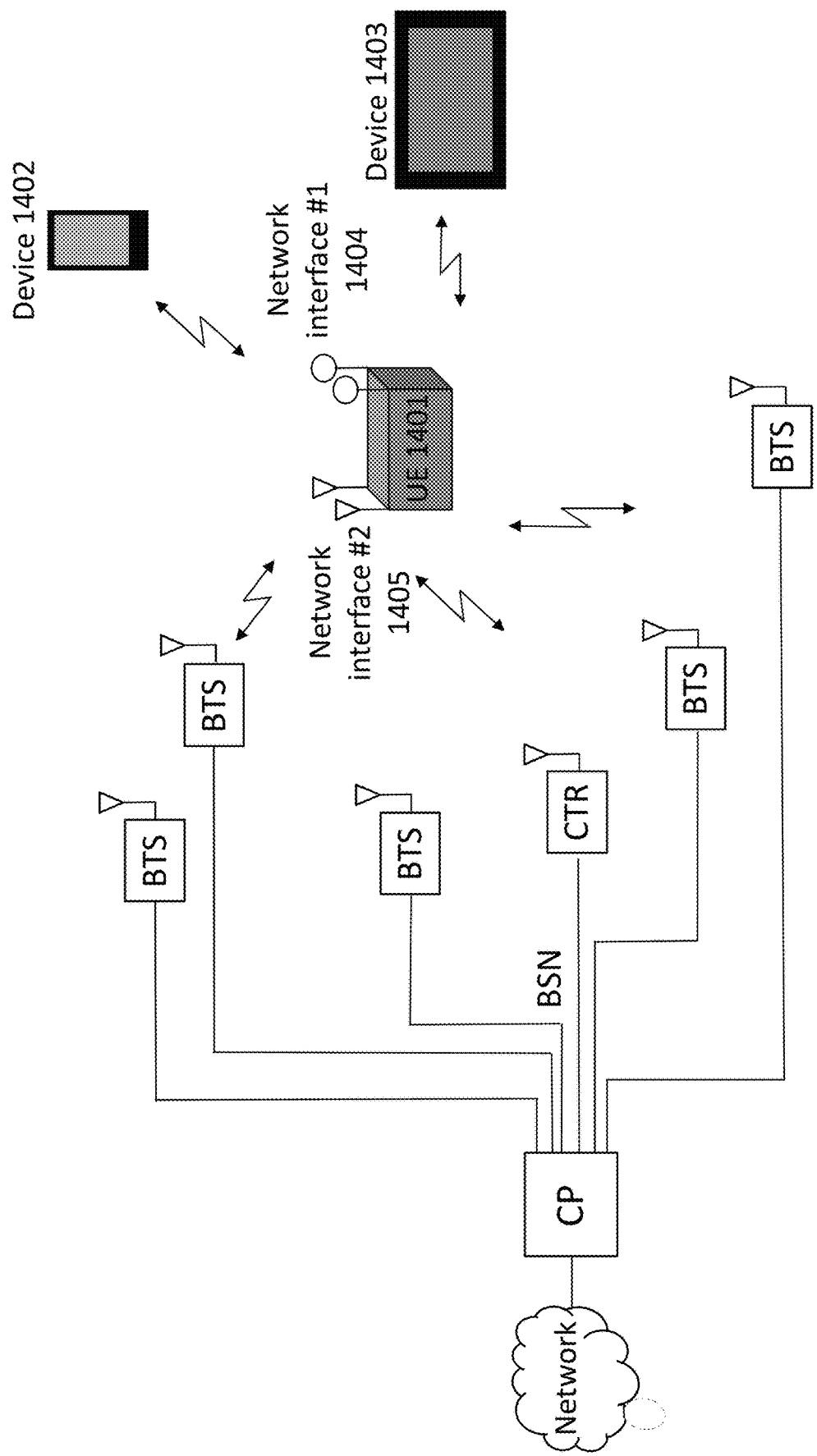
FIG. 14 illustrates one embodiment of a MU-MAS consisting of CP, distributed BTSs, multiple devices and one UE connected to the devices as well as the BTSs via network interfaces.

In a different embodiment, the UE 1401 connects to different devices 1402 and 1403 through a first network interface 1404 (e.g., Wi-Fi, USB, Ethernet, Bluetooth, optical fiber, etc.) and to the MU-MAS through a second network interface 1405 as shown in FIG. 14. The UE in FIG. 14 is equipped with two different network interfaces wherein each network interface comprises of one or multiple antennas (although in alternative embodiments, first network interface 1404 may be a wired interface without antennas). The antennas of the first network interface are denoted with circles, whereas the antennas of the second network interface are denoted with triangles. In the same embodiment, the second network interface supports MU-MAS precoding, MU-MAS implemented with LTE-compliant protocols, or MU-MAS (implemented with or without LTE-compliant protocols) and an alternative network. In the same embodiment, the alternative network is a cellular network, an LTE network or Wi-Fi network. In the same embodiment, the UE works with either and/or both MU-MAS and/or the alternative network and the UE selects either MU-MAS or the alternative network based on some criteria. In the same embodiment, the criteria are: i) whether only one network is available and is chosen; ii) whether one network has better performance; iii) whether one network is more economical; iv) whether one network is less congested; v) whether one network uses less UE resources.

Figure 15:
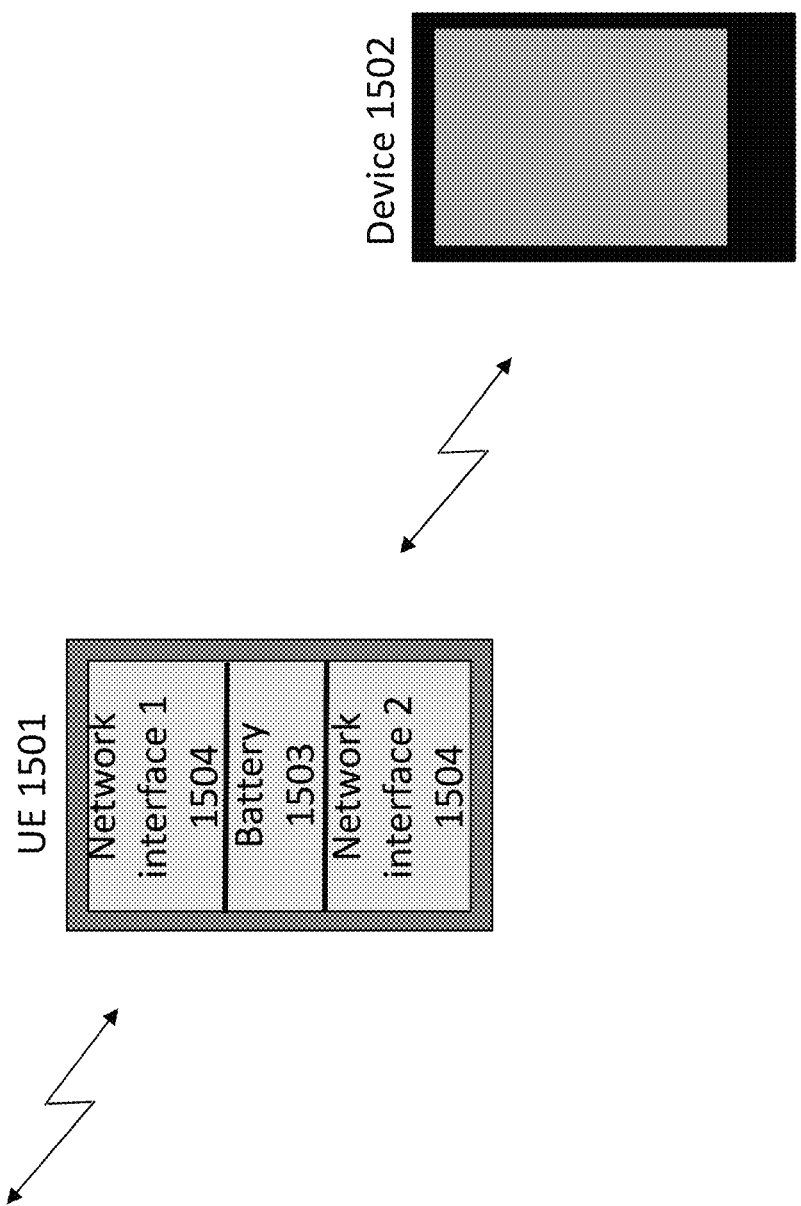
FIG. 15 illustrates one embodiment of a MU-MAS wherein the UE is in a case that physically attaches to the user device.

In one embodiment of the invention, the UE 1501 is in a case that physically attaches to the user device 1502 as depicted in FIG. 15. In the same embodiment, the case serves as a decorative addition to the user device. In another embodiment, the case serves to protect the user device from physical damage. The UE comprises of battery 1503, and one or multiple network interfaces 1504.

In one embodiment, the UE electronics are embedded within a case. In the same embodiment, the UE electronics include a battery 1503. The battery includes a power charger coupling through a physical electrical contact or a wireless contact. Exemplary power couplings are conductive, inductive, RF, light, or thermal, but power couplings are not limited these approaches. In the same embodiment, the UE electronics are coupled to receive power from the user device. This power coupling is through a physical contact or through an inductive or wireless contact. In the same embodiment, the user device is coupled to receive power from the MU-MAS UE. This coupling is through a physical contact or through an inductive or wireless contact. In a different embodiment, the same power charger powers both the user device and the MU MAS UE.

In one embodiment of the invention, the UE is configured to communicate to the user device. In the same embodiment, the UE can be reset (e.g., via switch, or by removing power) so the user device can initially connect to it, and once the connection is established, the UE can be configured by the user device. Such configuration includes configuring a private password and/or other security protocols. In a different embodiment, the UE includes a means to be configured to communicate with the user device. Such configuration is done via a communications port to another device, wherein the communications port is USB, or via controls and/or buttons on the UE, or via display, wherein buttons or touch input are used.

In another embodiment, the same RF chain is used for MU-MAS communications as well as for the alternative network. In another embodiment, a different RF chain is used for MU-MAS communications and the alternative network.

7. Radio Frequency (RF) Calibration Exploiting Channel Reciprocity

Conventional closed-loop MU-MAS methods employ UL channel to feedback quantized CSI or codebook indices (as in codebook-based limited feedback schemes) from the UEs to the BTSs or CP. This scheme, however, results in large feedback overhead and high protocol complexity to enable the CSI feedback channel. In TDD systems, where UL and DL are set at the same frequency, it is thus desirable to avoid CSI feedback by exploiting UL/DL channel reciprocity. In practical systems, transmit and receive RF chains at the BTS or UE typically have different characteristics due to different RF components and circuit layout. Therefore, to preserve UL/DL reciprocity it is necessary to employ RF calibration methods to compensate for RF mismatch between transmit and receive chains.

Models for RF mismatch in typical wireless transceivers were described in [91] and hardware solutions to mitigate the effect of RF mismatch on the performance of adaptive digital beamforming systems were discussed in [92]. Software techniques to enable RF calibration in multiple-input multiple-output (MIMO) systems where proposed in [93, 94] and experimental results for multiple-input single-output (MISO) and for systems employing antenna selection where shown in [95] and [96], respectively.

Prior art, however, assumes all RF chains are collocated on the same circuit board as in MIMO systems, thereby simplifying the RF calibration problem since information about the RF mismatch between all the RF chains is available locally. By contrast, the present invention consists of distributed antennas geographically placed far apart such that communication between those antennas only happens through the network. Hence, we define a novel system unit that we call "beacon station" designed specifically to enable RF calibration in MU-MASs with distributed antennas. Moreover, in prior art MIMO systems significant RF coupling between transmit/receive chains occurs due to the close proximity of the RF chains on the same board. By contrast, in the present invention, RF coupling occurs only between one transmit and one receive chain of the same distributed antenna. Hence, techniques employed for RF calibration are significantly different than the ones described in prior art as we will demonstrate hereafter. Finally, the RF calibration methods disclosed in prior art were limited to systems with a single user (e.g. a single User Equipment device). As shown in the derivations at the following paragraphs, systems with multiple users (e.g., MU-MASs) are particularly sensitive to RF mismatch, since that yields inter-user interference. As such, special techniques must be employed to enable RF calibration while exploiting channel reciprocity, as described below.

Figure 16:
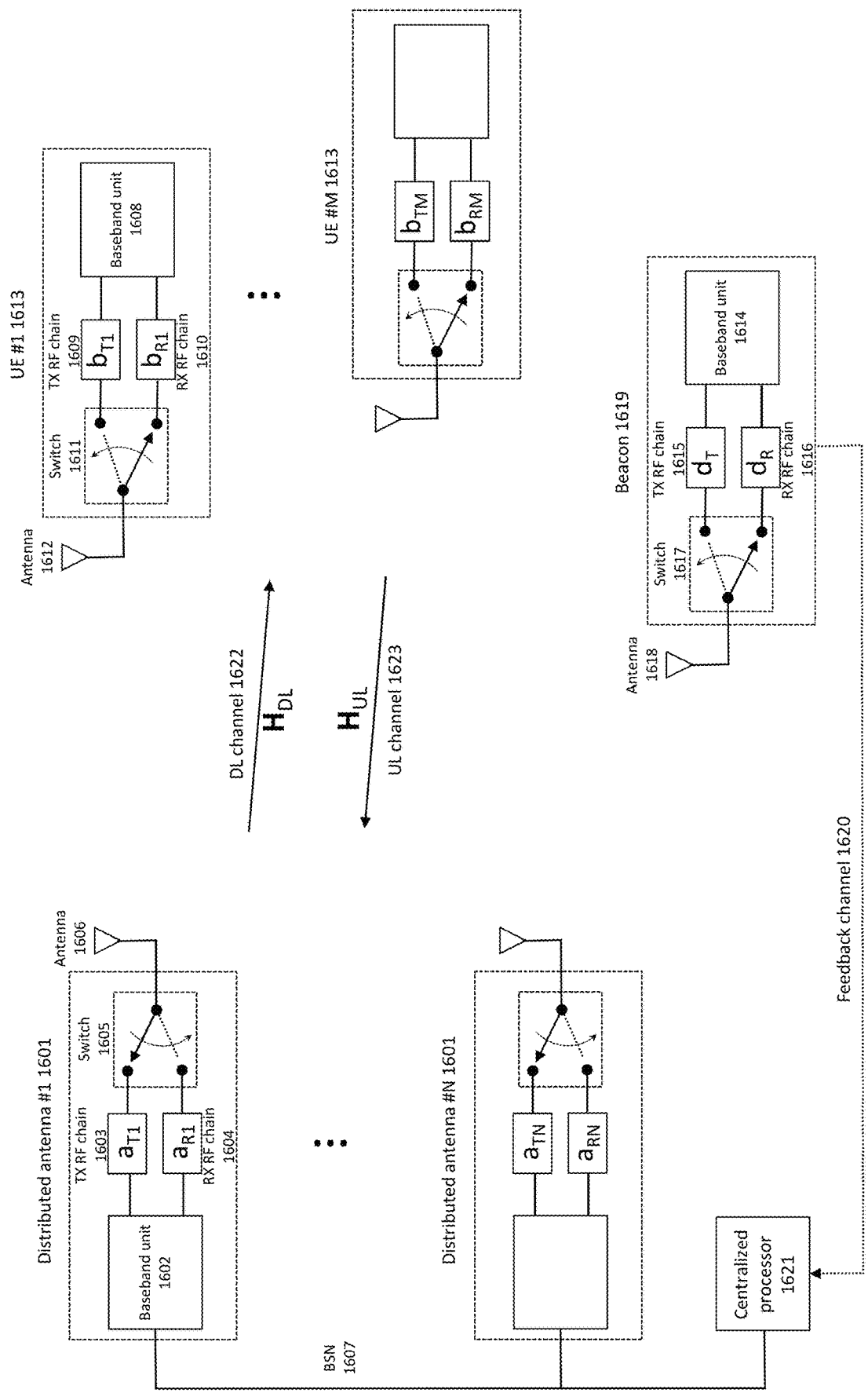
FIG. 16 illustrates one embodiment of a MU-MAS wherein the distributed antennas communicate to the UEs via the UL and DL channels.

The present invention consists of a MU-MAS that employs radio frequency (RF) calibration and exploits reciprocity between downlink (DL) and uplink (UL) channels, comprising of multiple distributed antennas, multiple User Equipment devices (UEs) and one or multiple beacon stations. In one embodiment, the RF calibration is employed to compute the DL MU-MAS precoding weights from the UL channel estimates. FIG. 16 shows the block diagram of the system including the distributed antennas 1601, multiple UEs 1613, one beacon station 1619, one base station network (BSN) 1607 connecting the distributed antennas, one centralized processor (CP) 1621 and one feedback channel 1620, that is the calibration control channel from the beacon to the CP.

Every distributed antenna unit consists of baseband unit 1602, transmit RF chain 1603, receive RF chain 1604, RF switch unit 1605 that dynamically selects transmit/receive RF chains for TDD operation, and antenna 1606. In one embodiment, the baseband unit comprises baseband signal processing and digital-to-analog converter (DAC). In another embodiment, all the baseband processing is executed at the CP such that RF signal is sent to every distributed antenna (e.g., via RF coax cables or RF over fiber networks). Every UE consists of baseband unit 1608, transmit/receive RF chains 1609 and 1610, respectively, RF switch 1611 and antenna 1612. The beacon station is composed of baseband unit 1614, transmit/receive RF chains 1615 and 1616, respectively, RF switch 1617 and antenna 1618.

The wireless links between the distributed antennas and the UEs are modeled as complex Gaussian channel matrix H of dimensions M×N, where M is the number of UEs and N is the number of distributed antennas. We define $H_{DL}$ the DL channel matrix 1622 and $H_{UL}$ the UL channel matrix 1623. Channel reciprocity holds as long as DL and UL are set to the same carrier frequency. In this case, the following property holds $$H_{DL} = H_{UL}^\dagger = H$$

where the symbol † denotes the transpose matrix operation.

The model above holds for either single-carrier or multicarrier systems. In multicarrier systems (e.g., OFDM) the complex matrix H represents the channel of one subcarrier, and the same model extends to any subcarrier in the system. FIG. 16 also shows transmit and receive RF units at the distributed antennas, modeled with complex channel matrices $A_T$ and $A_R$, respectively, of dimension N×N. Likewise, the transmit and receive RF units at the UEs are modeled by the matrices $B_T$ and $B_R$, respectively, of dimension M×M. In the case of MU-MAS with distributed antennas, RF coupling between distributed antennas and/or UEs is negligible due to relative antenna separation, such that $A_T$, $A_R$, $B_T$ and $B_R$ are represented as diagonal matrices. We observe this is a unique feature of MU-MAS with distributed antennas and distributed UEs. As such, the present invention is novel over prior art related to multiple-input multiple-output (MIMO) systems.

Based on the block diagram in FIG. 16, we write the effective DL channel matrix (modeling transmit/receive RF units and wireless links) as $$\overline{H}_{DL} = B_R H_{DL} A_T = B_R H A_T$$

and the effective UL channel matrix as $$\overline{H}_{UL} = A_R H_{UL} B_T = A_R H^\dagger B_T$$

In the present invention, RF calibration is obtained by preconditioning the matrix of the UL channel estimates $\overline{H}_{UL}$ with the complex RF calibration matrix C, as follows $$\tilde{H}_{DL} = (C\overline{H}_{UL})^\dagger$$

In one embodiment of the invention comprising LTE cellular networks, the effective UL channel is estimated at the eNodeB employing the DMRS from all UEs.

Figure 17:
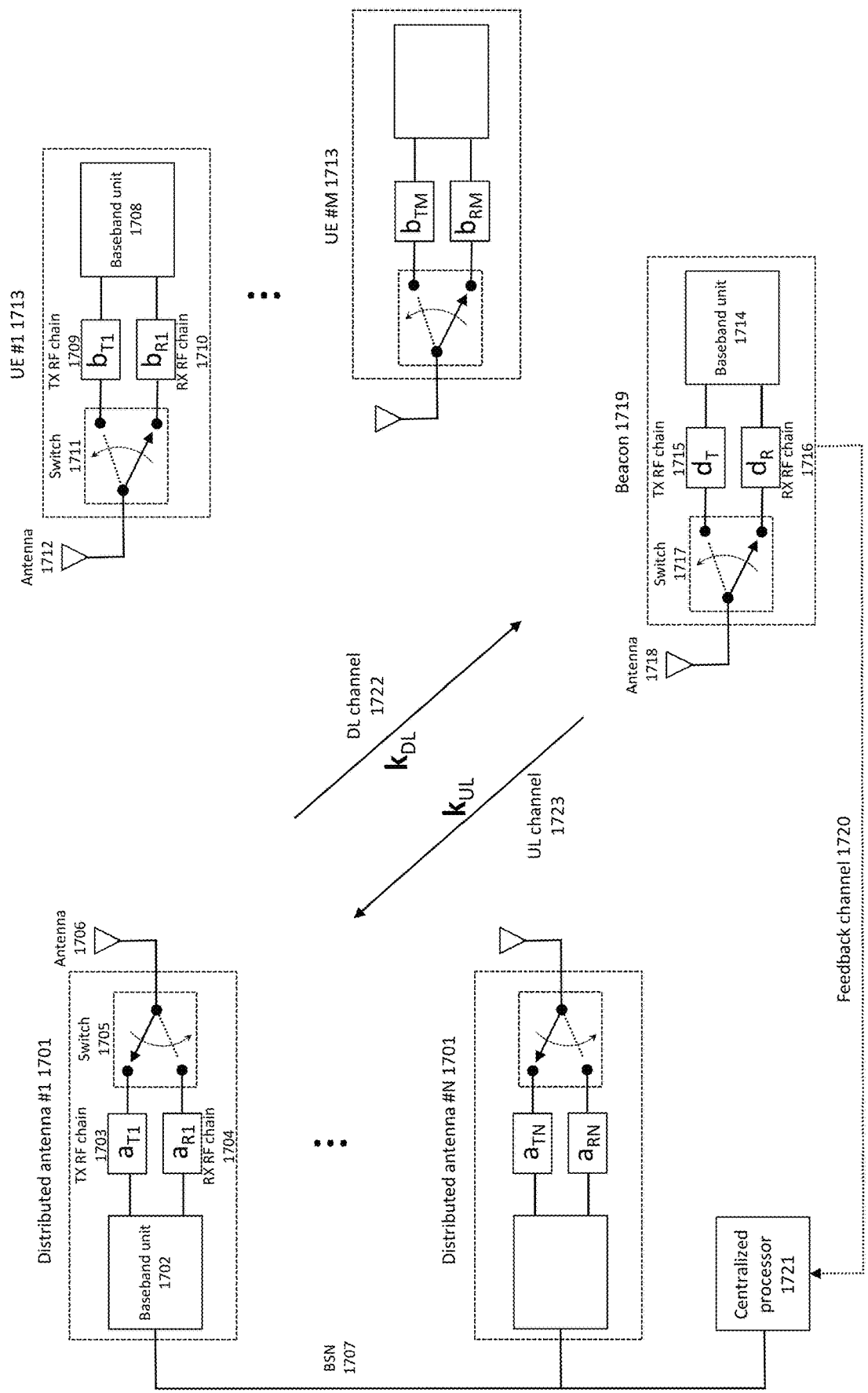
FIG. 17 illustrates one embodiment of a MU-MAS wherein the distributed antennas communicate to the beacon via the UL and DL channels.

As shown in FIG. 17, the matrix C is computed from the effective DL ($\overline{k}_{DL}$) channel 1722 and UL ($\overline{k}_{UL}$) channel 1723 vectors between every distributed antenna 1701 and the beacon station 1719, defined as $$\overline{k}_{DL} = D_R k_{DL} A_T$$

and $$\overline{k}_{UL} = A_R k_{UL} D_T$$

where $k_{DL} = k_{UL} = k$ are column vectors, assuming DL and UL channel reciprocity between the distributed antennas and the beacon station. In one embodiment, the DL channel between the distributed antennas and the beacon station is estimated by sending training signals from the distributed antennas to the beacon. In one exemplary embodiment comprising LTE cellular networks, the DL sequences CRS, or CSI-RS, or DM-RS are used by the beacon to estimate the effective DL channel from all eNodeBs. In the same embodiment, the UL channel between the beacon station and the distributed antennas is estimated by sending training signals from the beacon station to the antennas. In one embodiment of the invention, multiple beacon stations are employed to improve the estimation of the RF calibration matrix. In the present invention, there is no RF coupling between the distributed antennas, such that the RF calibration matrix C is diagonal.

Figure 18:
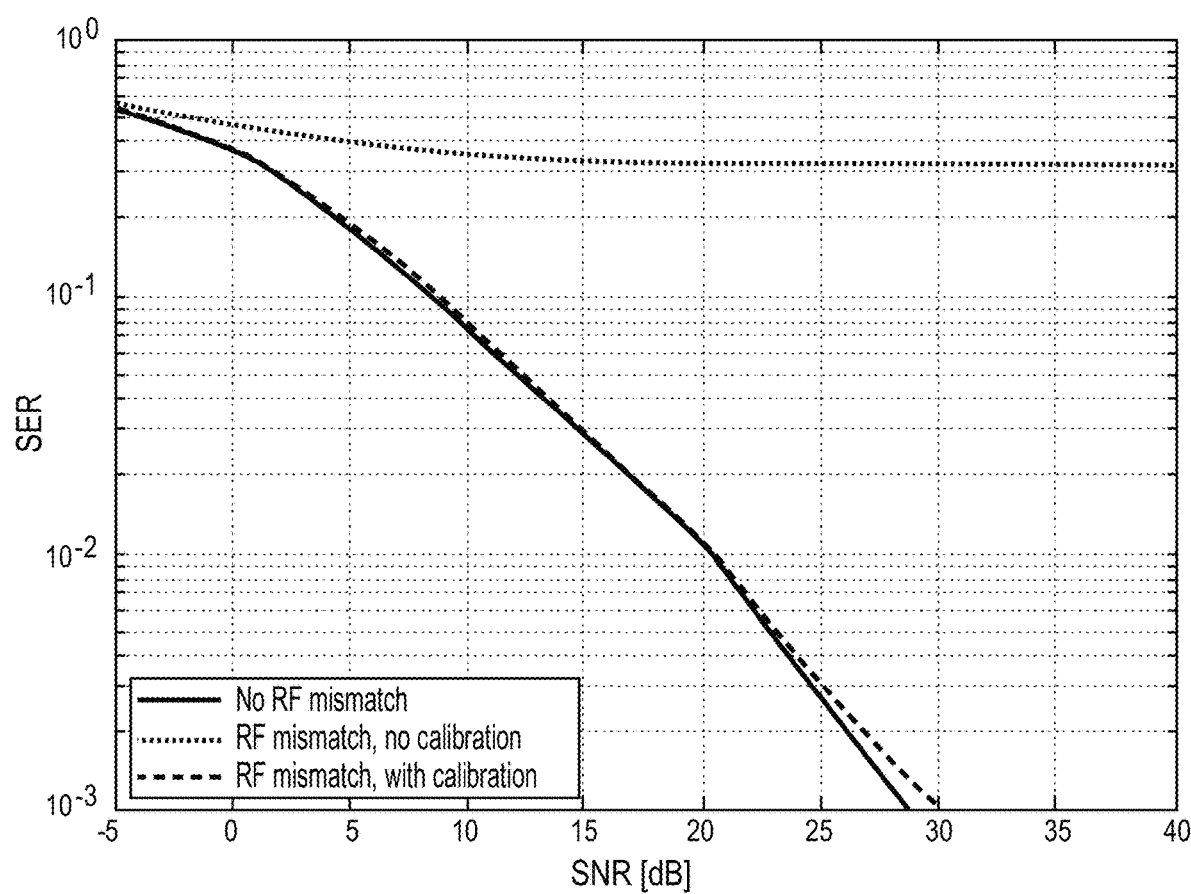
FIG. 18 illustrates the symbol error rate (SER) performance of the MU-MAS with linear precoding with/without RF mismatch and with/without RF calibration.

When linear precoding (e.g., zero-forcing [65], block-diagonalization or BD [66-67], matrix inversion, etc.) is employed, the symbol received at the m-th UE is given by $$r_m = \bar{h}_{DL,m} \bar{w}_{DL,m} s_m + \sum_{u=1, u \neq m}^{M} \bar{h}_{DL,m} \bar{w}_{DL,u} s_u + n_m$$

where $\bar{h}_{DL,m}$ is the m-th row of the effective channel matrix $\bar{H}_{DL}$, $\bar{w}_{DL,m}$ is the precoding vector for the m-th UE derived from $\bar{H}_{DL}$, $s_m$ is the symbol transmitted to the m-th UE and $n_m$ is white Gaussian noise at the m-th UE. For the sake of simplicity, the above model assumes a single receive antenna at every UE, but the present invention extends to any number of antennas at the UE. It is possible to show that when the RF calibration method described above is employed the inter-client interference at every UE is pre-cancelled at the transmitter such that the following condition holds $$\bar{h}_{DL,m} \bar{w}_{DL,u} = \bar{h}_{DL,m} \tilde{w}_{DL,u} = 0, \forall u=1,\ldots,M \text{ with } u \neq m$$

where $\tilde{w}_{DL,u}$ is the precoding weight vector derived from the RF calibrated channel matrix $\tilde{H}_{DL}$. In one embodiment, the precoding weights are computed from the RF calibrated channel matrix to pre-cancel inter-client interference at every UE. FIG. 18 shows the symbol error rate (SER) performance of MU-MAS employing BD precoding and 4-QAM modulation in frequency-flat channels for three scenarios: i) no RF mismatch; ii) RF mismatch without calibration; iii) RF mismatch with calibration. We observe the RF calibration method in the present invention reduces the SER down to ideal performance (i.e., with no RF mismatch).

Figure 19:
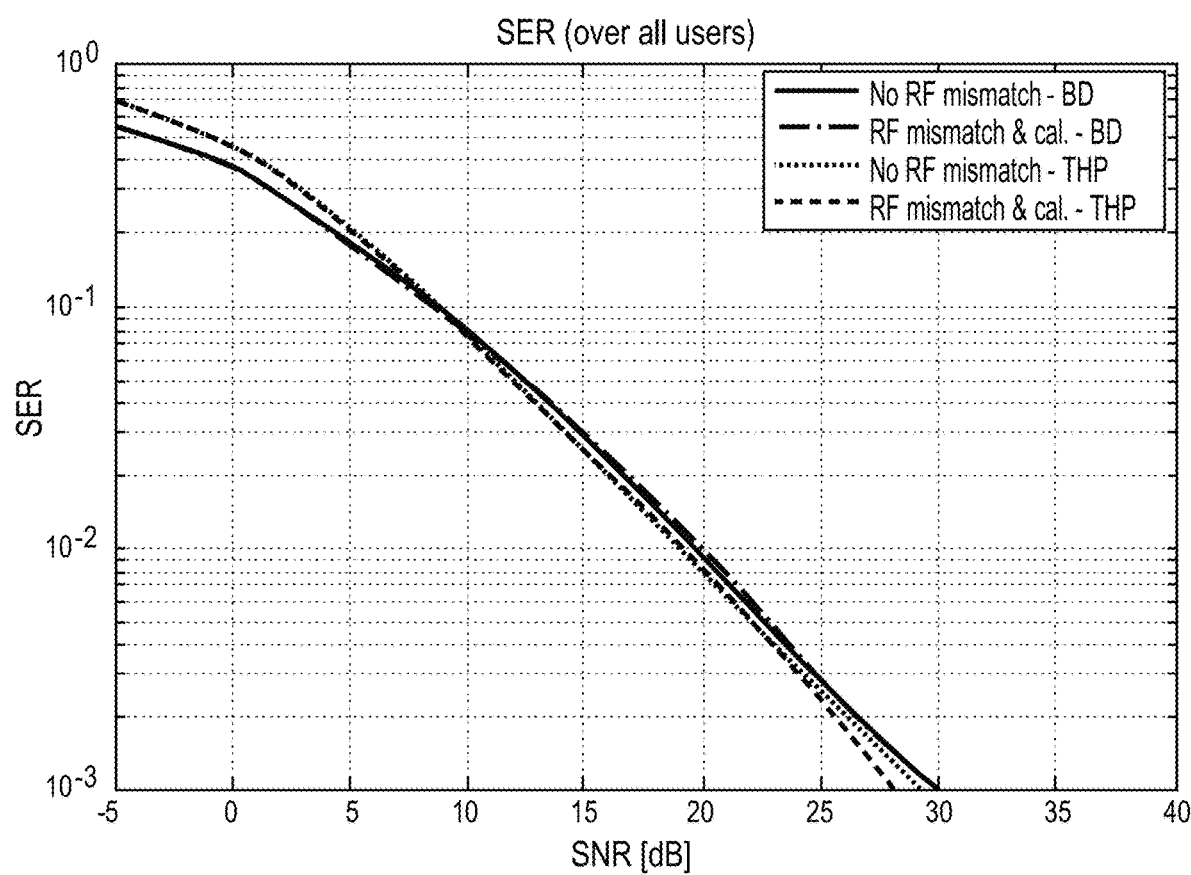
FIG. 19 illustrates the symbol error rate (SER) performance of the MU-MAS with linear and non-linear precoding with/without RF mismatch and with/without RF calibration.
Figure 20B:
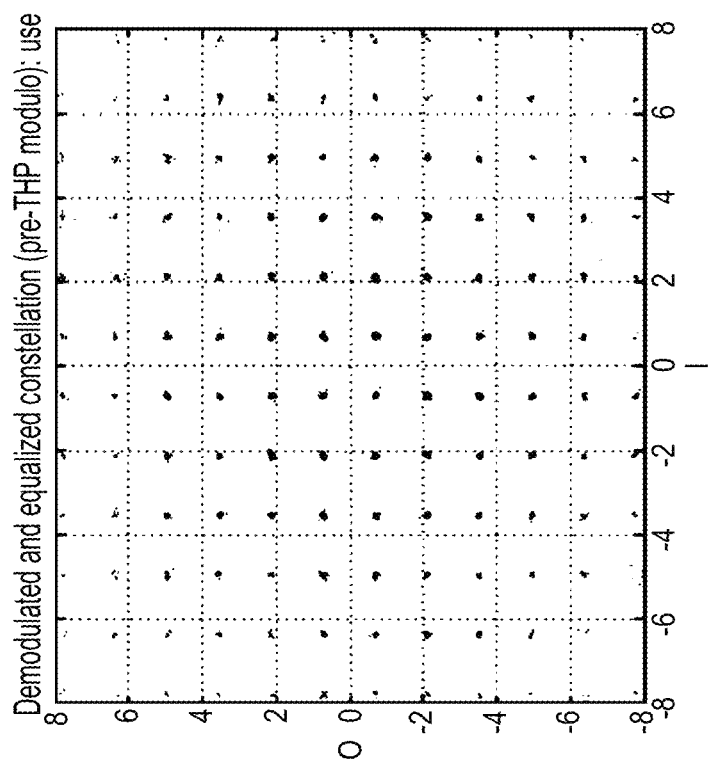
FIGS. 20A-B illustrates the 4-QAM constellations at the UEs (before modulo operation) when applying THP non-linear precoding.
Figure 20A:
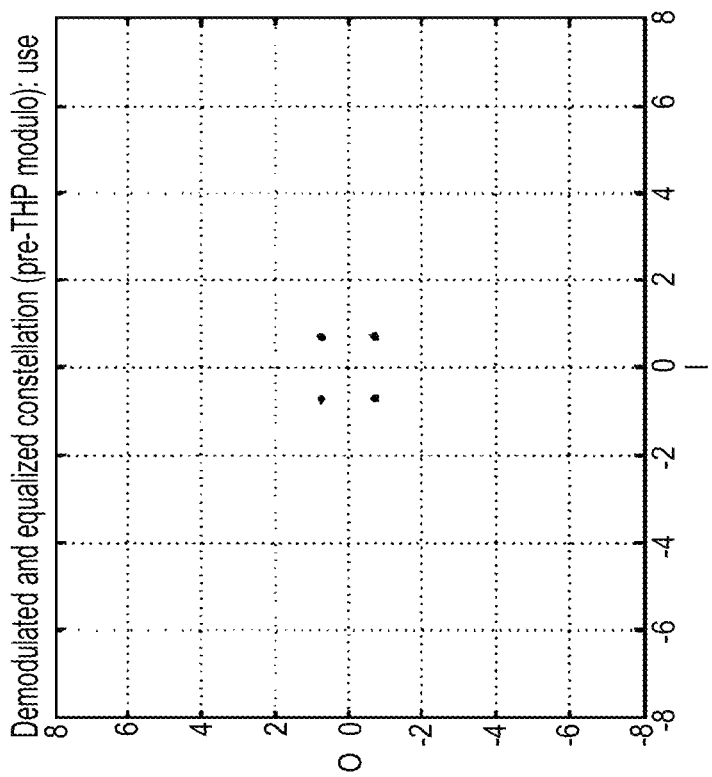

In another embodiment of the invention, non-linear precoding methods (e.g., dirty-paper coding [68-70] or Tomlinson-Harashima precoding or THP [71-72], lattice techniques or trellis precoding [73-74], vector perturbation techniques [75-76]) are applied to the RF calibrated channel matrix to pre-cancel inter-client interference at every UE. FIG. 19 shows that the SER obtained with non-linear precoding techniques using RF calibration and UL/DL reciprocity matches the performance of linear precoding. FIG. 20*a* shows the constellation before THP modulo operation for UE 1, whereas FIG. 20*b* shows the constellation before THP modulo operation for UE 2 (THP lattice structure) in MU-MAS with two distributed antennas and two UEs. THP precoding is designed to completely cancel interference to the "reference-UE" and applies successive interference cancellation schemes to the other UEs. As such it is expected the SER performance for the reference-UE may be better than the other UEs. In one embodiment, Round-Robin or proportional fair scheduling or other types of scheduling techniques are applied to the UEs to guarantee similar average SER performance to all UEs.

The computational performance of BD and THP methods may vary depending on the number of distributed antennas and/or UEs within every user-cluster. In one embodiment of the invention, the MU-MAS dynamically switches between linear and non-linear precoding techniques to minimize the computational complexity of the precoder, depending on the number of distributed antennas and/or UEs in every user-cluster.

In practical MU-MASs, the beacon station is a wireless transceiver dedicated to the use for RF calibration. Since the beacon requires feedback channel to communicate the estimated effective DL channel from all distributed antennas for calibration purposes, the beacon communicates to the CP via wireless or wireline link. In another embodiment, the beacon station is any of the distributed antennas, and the calibration parameters are computed with respect to that antenna. In the same embodiment, the distributed antennas are organized as in a mesh network and pair-wise RF calibration between adjacent distributed antennas is computed to guarantee good link quality. The RF calibration is carried across all antennas and calibration information is fed back to the CP such that all distributed antennas are calibrated with one another. In another embodiment, the beacon is any of the UEs that use any wireless or wireline link to feedback calibration information to the CP.

The calibration information from the beacon to the CP is quantized over limited number of bits or sent via codebook-based limited feedback methods to reduce overhead over the control channel. We observe that RF calibration can be run at a slow rate (depending on the rate of variation of the RF characteristics, due to temperature changes, etc.). If the rate of update of the calibration information is low, the wireless data channel can be used to send that information to the CP without causing any severe loss of data rate. In one exemplary embodiment, in LTE cellular networks the PUSCH is used to feedback calibration information from the UE to the CP.

One or multiple geographically distributed beacons are employed per user-cluster, or antenna-cluster or antenna-subcluster depending on the relative link quality between the beacon and the distributed antennas in that cluster. In one embodiment, the beacon with the best signal quality to all distributed antennas in the cluster is used for RF calibration. In another embodiment, the beacons are dynamically selected at every instance of time to adapt to the changing quality of the links to the distributed antennas due to variations in the propagation environment. In another embodiment, multiple beacons are employed cooperatively (e.g., via maximum ratio combining/transmission) to maximize the SNR or SINR over the links from/to the distributed antennas. In a different embodiment, one or more RF calibrations are carried out per cluster.

In one embodiment of the invention, the beacon station is used not only for RF calibration but also to send signaling information to the distributed antennas and/or UEs including time and frequency synchronization reference. The distributed antennas and/or UEs employ that reference to maintain time and frequency synchronization with the MU-MAS master reference clock. In one embodiment, this reference clock distribution from the beacon to the distributed antennas and UEs is enabled via the LTE multimedia broadcast single frequency network (MBSFN) communication channel.

REFERENCES

[1] A. Paulraj, R. Nabar, and D. Gore, Introduction to Space-Time Wireless Communications, Cambridge University Press, 40 West 20th Street, New York, N.Y., USA, 2003

[2] D. Gesbert, M. Shafi, D. Shiu, P. J. Smith and A. Naguib, "From theory to practice: an overview of MIMO space-time coded wireless systems", *IEEE Journal on Selected Areas on Communications*, vol. 2, n. 3, pp. 281-302, April 2003

[3] L. Zheng and D. N. C. Tse, "Diversity and multiplexing: a fundamental tradeoff in multiple-antenna channels," *IEEE Trans. Info. Th.*, vol. 49, no. 5, pp. 1073-1096, May 2003

[4] D. N. C. Tse, P. Viswanath, and L. Zheng, "Diversity-multiplexing tradeoff in multiple-access channels", *IEEE Trans. Info. Th.*, vol. 50, no. 9, pp. 1859-1874, September 2004

[5] E. Visotsky and U. Madhow, "Space-time transmit precoding with imperfect feedback," IEEE Trans. Info. Th., vol. 47, pp. 2632-2639, September 2001.

[6] S. A. Jafar, S. Vishwanath, and A. Goldsmith, "Channel capacity and beamforming for multiple transmit and receive antennas with covariance feedback," Proc. IEEE Int. Conf. on Comm., vol. 7, pp. 2266-2270, June 2001.

[7] S. A. Jafar and A. Goldsmith, "Transmitter optimization and optimality of beamforming for multiple antenna systems," IEEE Trans. Wireless Comm., vol. 3, pp. 1165-1175, July 2004.

[8] E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553, September 2004.

[9] A. L. Moustakas and S. H. Simon, "Optimizing multiple-input single-output (MISO) communication systems with general Gaussian channels: nontrivial covariance and nonzero mean," IEEE Trans. Info. Th., vol. 49, pp. 2770-2780, October 2003.

[10] M. Kang and M. S. Alouini, "Water-filling capacity and beamforming performance of MIMO systems with covariance feedback," IEEE Work. on Sign. Proc. Adv. in Wire. Comm., pp. 556-560, June 2003.

[11] S. H. Simon and A. L. Moustakas, "Optimizing MIMO antenna systems with channel covariance feedback," IEEE Jour. Select. Areas in Comm., vol. 21, pp. 406-417, April 2003.

[12] S. M. Alamouti, "A simple transmit diversity technique for wireless communications," IEEE Jour. Select. Areas in Comm., vol. 16, no. 8, pp. 1451-1458, October 1998.

[13] V. Tarokh, N. Seshadri, and A. R. Calderbank, "Space-time codes for high data rate wireless communication: Performance criterion and code construction," IEEE Trans. Info. Th., vol. 44, pp. 744-65, March 1998.

[14] V. Tarokh, H. Jafarkhani, and A. R. Calderbank, "Space-time block codes from orthogonal designs," IEEE Trans. Info. Th., vol. 45, pp. 1456-467, July 1999.

[15] E. N. Onggosanusi, A. G. Dabak, and T. A. Schmidl, "High rate space-time block coded scheme: performance and improvement in correlated fading channels," Proc. IEEE Wireless Comm. and Net. Conf., vol. 1, pp. 194-199, March 2002.

[16] G. D. Durgin, Space-Time Wireless Channels, Prentice Hall, Upper Saddle River, N.J., USA, 2003

[17] D.-S. Shiu, G. J. Foschini, M. J. Gans, and J. M. Kahn, "Fading correlation and its effect on the capacity of multielement antenna systems," IEEE Trans. Comm., vol. 48, no. 3, pp. 502-513, March 2000

[18] A. Forenza and R. W. Heath Jr., "Impact of antenna geometry on MIMO communication in indoor clustered channels," Proc. IEEE Antennas and Prop. Symp., vol. 2, pp. 1700-1703, June 2004.

[19] E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553, September 2004

[20] R. W. Heath Jr. and A. Paulraj, "Switching between multiplexing and diversity based on constellation distance," Proc. of Allerton Conf. on 208, Comm. Control and Comp., September 2000.

[21] S. Catreux, V. Erceg, D. Gesbert, and R. W. Heath Jr., "Adaptive modulation and MIMO coding for broadband wireless data networks," IEEE Comm. Mag., vol. 2, pp. 108-115, June 2002.

[22] A. Forenza, A. Pandharipande, H. Kim, and R. W. Heath Jr., "Adaptive MIMO transmission scheme: Exploiting the spatial selectivity of wireless channels," Proc. IEEE Veh. Technol. Conf., vol. 5, pp. 3188-3192, May 2005

[23] C. B. Chae, A. Forenza, R. W. Heath, Jr., M. R. McKay, and I. B. Collings, "Adaptive MIMO Transmission Techniques for Broadband Wireless Communication Systems," *IEEE Communications Magazine*, vol. 48, no. 5, pp. 112-118, May 2010

[24] FCC, "Broadband action agenda", National Broadband Plan, 2010 http://www.broadband.gov/plan/national-broadband-plan-action-agenda.pdf

[25] N. Delfas, F. Meunier, S. Flannery, T. Tsusaka, E. Gelblum and S. Kovler, "Mobile data wave: who dares to invest, wins", Morgan Stanley Research Global, Jun. 13, 2012

[26] D. Goldman, "Sorry, America: your wireless airwaves are full", CNN Money http://money.cnn.com/2012/02/21/technology/spectrum_crunch/index.htm

[27] P. Rysavy, "No silver bullets for FCC, NTIA spectrum challange", Daily report for executives, Bloomberg BNA, August 2012 http://www.rysavy.com/Articles/2012_09_No_Spectrum_Silver_Bullets.pdf

[28] T. W. Hazlett, "Radio spectrum for a hungry wireless world", Sep. 22, 2011

[29] B. J. Love, D. J. Love and J. V. Krogmeier, "Like deck chairs on the Titanic: why spectrum reallocation won't avert the coming data crunch but technology might keep the wireless industry afloat", February 2012

[30] Qualcomm, "The 1000× data challenge, the latest on wireless, voice, services and chipset evolution", 4G World, Oct. 31, 2012

[31] J. Lee, J.-K. Han, J. Zhang, "MIMO technologies in 3GPP LTE and LTE-advanced", EURASIP Journal on Wireless Comm. and Net., Hindawi, May 2009

[32] 3GPP, TS 36.201, "Evolved Universal Terrestrial Radio Access (E-UTRA); LTE Physical Layer-General Description (Release 8)"

[33] 3GPP, TS 36.211, "Evolved Universal Terrestrial Radio Access (E-UTRA); Physical Channels and Modulation (Release 8)"

[34] 3GPP, TS 36.212, "Evolved Universal Terrestrial Radio Access (E-UTRA); Multiplexing and channel coding (Release 8)"

[35] 3GPP, TS 36.213, "Evolved Universal Terrestrial Radio Access (E-UTRA); Physical layer procedures (Release 8)"

[36] T. Yoo, N. Jindal, and A. Goldsmith, "Multi-antenna broadcast channels with limited feedback and user selection," IEEE Journal on Sel. Areas in Communications, vol. 25, pp. 1478-91, July 2007.

[37] P. Ding, D. J. Love, and M. D. Zoltowski, "On the sum rate of channel subspace feedback for multi-antenna broadcast channels," in Proc., IEEE Globecom, vol. 5, pp. 2699-2703, November 2005.

[38] N. Jindal, "MIMO broadcast channels with finite-rate feedback," IEEE Trans. on Info. Theory, vol. 52, pp. 5045-60, November 2006.

[39] D. J. Love, R. W. Heath, Jr., V. K. N. Lau, D. Gesbert, B. D. Rao, and M. Andrews, "An Overview of Limited Feedback in Wireless Communication Systems," *IEEE Journal on Sel. Areas in Comm.*, Special Issue on Exploiting Limited Feedback in Tomorrow's Wireless Communication Networks, vol. 26, no. 8, pp. 1341-1365, October 2008.

R. W. Heath, Jr., D. J. Love, V. K. N. Lau, D. Gesbert, B. D. Rao, and M. Andrews, "Exploiting Limited Feedback in Tomorrow's Wireless Communication Networks," *IEEE Journal on Sel. Areas in Comm.*, Special Issue on Exploiting Limited Feedback in Tomorrow's Wireless Communication Networks, vol. 26, no. 8, pp. 1337-1340, October 2008.

[41] D. J. Love, R. W. Heath, Jr., and T. Strohmer, "Grassmannian Beamforming for Multiple-Input Multiple-Output Wireless Systems," *IEEE Trans. on Info. Theory special issue on MIMO Communication*, vol. 49, pp. 2735-2747, October 2003

[42] C. B. Chae, D. Mazzarese, N. Jindal and R. W. Heath, Jr., "Coordinated Beamforming with Limited Feedback in the MIMO Broadcast Channel" *IEEE Journal on Sel. Areas in Comm.*, Special Issue on Exploiting Limited Feedback in Tomorrow's Wireless Comm. Networks, vol. 26, no. 8, pp. 1505-1515, October 2008

[43] A. Paulraj, "Is OFDMA, MIMO and OS the right stuff for mobile broadband?" http://www.ieeevtc.org/vtc2005fall/presentations/paulraj.pdf, September 2005

[44] J. Wannstrom, "Carrier aggregation explained", 3GPP http://www.3gpp.org/Carrier-Aggregation-explained

[45] 3GPP, TS 36.808, "Evolved Universal Terrestrial Radio Access (E-UTRA); Carrier Aggregation (Release 10)", v10.0.0, June 2012

[46] Nokia Siemens Networks, "2020: beyond 4G, radio evolution for the gigabit experience", White Paper, 2011, www.nokiasiemensnetworks.com

[47] S. Marek, "AT&T's Rinne talks about carrier aggregation trials, small cells and more", http://www.fiercebroadbandwireless.com/story/atts-rinne-talks-about-carrier-aggregation-trials-small-cells-and-more/2012-11-08

[48] M. Reed, "InterfereX", Tech23, 2011 http://www.youtube.com/watch?v=YPpE Lm6iip8

[49] NICTA, "InterfereX", http://www.nicta.com.au/research/archive/research_themes/networked_systems/interfe rex

[50] J. Duplicity, et al., "MU-MIMO in LTE systems", EURASIP Journal on Wireless Communications and Netowrking, March 2011

[51] S. Feng and E. Seidel, "Self-organizing networks (SON) in 3GPP LTE", Nomor research, May 2008

[52] NEC, "Self organizing networks", White paper, February 2009

[53] U.S. Pat. No. 5,809,422, issued Sep. 15, 1998, entitled "Distributed microcellular communications system", G. R. Raleigh, M. A. Pollack

[54] G. J. Foschini, H. C. Huang, K. Karakayali, R. A. Valenzuela, and S. Venkatesan. The Value of Coherent Base Station Coordination. In *Conference on Information Sciences and Systems* (CISS 2005), March 2005

[55] M. K. Karakayali, G. J. Foschini, R. A. Valenzuela, and R. D. Yates, "On the maximum common rate achievable in a coordinated network," *Proc. of the Int'l Conf. on Communications* (ICC'06), vol. 9, pp. 4333-4338, June 2006.

[56] M. K. Karakayali, G. J. Foschini, and R. A. Valenzuela, "Network coordination for spectrally efficient communications in cellular systems," *IEEE Wireless Communications Magazine*, vol. 13, no. 4, pp. 56-61, August 2006.

[57] G. J. Foschini, M. K. Karakayali, and R. A. Valenzuela, "Coordinating multiple antenna cellular networks to achieve enormous spectral efficiency," *Proceedings of the IEEE*, vol. 153, no. 4, pp. 548-555, August 2006.

[58] S. Venkatesan, A. Lozano, and R. Valenzuela, "Network MIMO: overcoming inter-cell interference in indoor wireless systems", Proc. of Asilomar conf., pp. 83-87, November 2007

[59] S. Venkatesan, H. Huang, A. Lozano, and R. Valenzuela, "A WiMAX-based implementation of network MIMO for indoor wireless systems", EURASIP Journal on Advances in Signal Processing, September 2009

[60] Y. Liang, R. Valenzuela, G. Foschini, D. Chizhik, and A. Goldsmith, "Interference suppression in wireless cellular networks through picocells", ACSSC, pp. 1041-1045, November 2007

[61] A. Papadogiannis, H. J. Bang, D. Gesbert, and E. Hardouin, "Efficient selective feedback design for multi-cell cooperative networks", IEEE Trans. On Vehicular Techn., pp. 196-205, vol. 60, n. 1, January 2011

[62] I. F. Akyildiz, D. M. Guterrez-Estevez, E. C. Reyes, "The evolution to 4G cellular systems: LTE-Advanced", Physical Comm., Elsevier, pp. 217-244, 2010

[63] A. Barbieri, P. Gaal, S. Geirhofer, T. Ji, D. Malladi, Y. Wei, and F. Xue, "Coordinated downlink multi-point communications in heterogeneous cellular networks", (Qualcomm), Information Theory and App. Workshop, pp. 7-16, February 2012

[64] S. Parkvall, E. Dahlman, A. Furuskar, Y. Jading, M. Olsson, S. Wanstedt, and K. Zangi, "LTE-Advanced—evolving LTE towards IMT-Advanced", (Ericsson) IEEE VTC, pp. 1-5, September 2008

[65] R. A. Monziano and T. W. Miller, Introduction to Adaptive Arrays, New York: Wiley, 1980.

[66] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[67] R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Proc.*, vol. 55, no. 3, pp. 1159-1171, March 2007.

[68] M. Costa, "Writing on dirty paper," *IEEE Transactions on Information Theory*, Vol. 29, No. 3, Page(s): 439-441, May 1983.

[69] G. Caire and S. Shamai, "On the achievable throughput of a multiantenna Gaussian broadcast channel," IEEE Trans. Info. Th., vol. 49, pp. 1691-1706, July 2003.

[70] N. Jindal & A. Goldsmith, "Dirty Paper Coding vs. TDMA for MIMO Broadcast Channels", IEEE Trans. on Info. Theory, vol. 51, pp. 1783-1794, May 2005

[71] M. Tomlinson, "New automatic equalizer employing modulo arithmetic," *Electronics Letters*, Page(s): 138-139, March 1971.

[72] H. Miyakawa and H. Harashima, "A method of code conversion for digital communication channels with intersymbol interference," *Trans. of the Inst. of Electronic*

[73] U. Erez, S. Shamai (Shitz), and R. Zamir, "Capacity and lattice-strategies for cancelling known interference," *Proceedings of International Symposium on Information Theory*, Honolulu, Hi., November 2000.

[74] W. Yu and J. M. Cioffi, "Trellis Precoding for the Broadcast Channel", IEEE Globecom, vol. 2, pp. 1344-1348, 2001

[75] B. M. Hochwald, C. B. Peel, and A. L. Swindlehurst, "A Vector-Perturbation Technique for Near-Capacity Multi-antenna Multiuser Communication—Part I: Channel Inversion and Regularization", IEEE Trans. On Communications, vol. 53, n. 1, pp. 195-202, January 2005

[76] B. M. Hochwald, C. B. Peel, and A. L. Swindlehurst, "A Vector-Perturbation Technique for Near-Capacity Multiantenna Multiuser Communication—Part II: Perturbation", IEEE Trans. On Comm., vol. 53, n. 3, pp. 537-544, March 2005

[77] S. Perlman and A. Forenza, "Distributed-input distributed-output (DIDO) wireless technology: a new approach to multiuser wireless", Rearden Labs White Paper, July 2011, http://www.reardenwireless.com/110727-DIDO-A%20New%20Approach%20to%20Multiuser %20Wireless. pdf

[78] A. Vance, "Steve Perlman's wireless fix", Businessweek, July 2011 http://www.businessweek.com/magazine/the-edison-of-silicon-valley-07272011.html

[79] M. Lindström (Ericsson), "LTE-Advanced Radio Layer 2 and RRC aspects", 3GPP TSG-RAN WG2

[80] Anritsu, "LTE resource guide", www.us.anritsu.com

[81] 3GPP, "Spatial Channel Model AHG (Combined ad-hoc from 3GPP & 3GPP2)", SCM Text V6.0, Apr. 22, 2003

[82] J. Lee, "Introduction of LTE-Advanced DL/UL MIMO", Samsung Electronics, September 2009

[83] E. Dahlman, S. Parkvall and J. Skold, "4G: LTE/LTE-Advanced for mobile broadband", Elsevier, 2011

[84] J. Syren, "Overview on the 3GPP long term evolution physical layer", Freescale White Paper, July 2007

[85] M. Baker, "LTE-Advanced physical layer", Alcatel-Lucent, December 2009

[86] J. Xu, "LTE-Advanced signal generation and measurements using SystemVue", Agilent Technologies

[87] X. Hou and H. Kayama, "Demodulation reference signal design and channel estimation for LTE-Advanced uplink", DOCOMO, Adv. in Vehic. Netw. Tech., April 2011

[88] D. C. Chu, "Polyphase codes with good periodic correlation properties", *IEEE Trans. Info. Theory*, vol. 18, n. 4, pp. 531-532, July 1972

[89] A. Lozano, R. W. Heath and J. Andrews, "Fundamental limits of cooperation", March 2012, http://arxiv.org/pdf/1204.0011.pdf

[90] J. G. Andrews, "Seven ways that HetNet are a cellular paradigm shift" http://users.ece.utexas.edu/~jandrews/pubs/And_HetNet_CommMag2012_v3.pdf

[91] J-C. Guey, and L. D. Larsson, "Nodeling and evaluation of MIMO systems exploiting channel reciprocity in TDD mode", 2004

[92] N. Tyler, B. Allen, and H. Aghvami, "Adaptive antennas: the calibration problem", IEEE Comm. Mag., pp. 114-122, December 2004

[93] A. Bourdoux, B. Come, and N. Khaled, "Non-reciprocal transceivers in OFDM/SDMA systems: impact and mitigation", IEEE, pp. 183-186, 2003

[94] M. Guillaud, D. T. M. Slock, and R. Knopp, "A practical method for wireless channel reciprocity exploitation through relative calibration", IEEE Proc. Of Sign Proc., pp. 403-406, vol. 1, August 2005

[95] P. Zetterberg, "Experimental investigation of TDD reciprocity based zero-forcing transmit precoding", EURASIP, June 2010

[96] P. Uthansakul, K. Attakitmongkol, N. Promsuvana, and Uthansakul, "MIMO antenna selection using CSI from reciprocal channel", Int. Journ. Of Elect. And Info. Eng., 2010

We claim:

1. A method implemented within a multiple antenna system (MAS) with multiuser (MU) transmissions ("MU-MAS") comprising:
    forming wireless connections between a plurality of user equipment devices (UEs), a plurality of wireless base transceiver base stations (BTSs), a centralized processor (CP), and/or a plurality of beacon stations;
    estimating uplink (UL) channel state information (CSI) at the one or more BTSs and/or the centralized processor (CP) from UL signaling;
    transmitting a plurality of training signals between the BTSs and the beacon stations;
    processing the plurality of training signals at one of more of the plurality of BTSs, the CP, and/or one or more beacon stations to estimate a plurality of RF calibration coefficients;
    preconditioning a matrix of UL CSI and obtaining a matrix of downlink (DL) CSI using the plurality of RF calibration coefficients by one or more of the plurality of BTSs, the CP, and/or one or more beacon stations;
    precoding radio signals using use the DL CSI by one or more of the plurality of BTSs, the CP, and/or one or more beacon stations to produce precoded radio signals;
    simultaneously transmitting the precoded radio signals from the plurality of BTSs, the precoding to cause deliberate radio frequency interference to create concurrent, non-interfering enclosed shapes in space of coherent wireless signals around one or more antennas of one or more of the UEs; and
    adapting the size of the enclosed shapes in space by the CP by selecting different subsets of the plurality of BTSs.

2. The method as in claim 1 wherein the plurality of BTSs are interconnected to the centralized processor (CP) via a base stations network (BSN), wherein the one or more precoders of one or more of the plurality of BTSs use the DL CSI for precoding the radio signals.

3. The method as in claim 2 wherein the CP is aware of the DL CSI between the plurality of BTSs and the UEs and a CP precoder of the CP utilizes the DL CSI to precode data sent over the DL channels.

4. The method as in claim 3 wherein the DL CSI is estimated at the UEs and fed back to one or more of the plurality of BTSs.

5. The method as in claim 1 wherein the DL CSI is derived at one or more of the plurality of BTSs from the UL-CSI using radio frequency (RF) calibration and exploiting reciprocity of the UL and DL channels.

6. The method as in claim 1 wherein the plurality of RF calibration coefficients are employed to compute the DL MU-MAS precoding weights from the UL channel.

7. The method as in claim 6 wherein precoding weights are computed to pre-cancel inter-client interference to every UE.

8. The method as in claim 6 wherein precoding weights are computed from linear precoding methods including zero forcing, block diagonalization, and/or matrix inversion.

9. The method as in claim 6 wherein precoding weights are computed from non-linear precoding methods including dirty-paper coding, Tomlinson-Harashima, lattice trellis, and/or vector perturbation.

10. The method as in claim 2 wherein Round-Robin or proportional fair scheduling are used to guarantee similar symbol error rate (SER) performance to all UEs.

11. The method as in claim 2 wherein the one or more precoders of one or more of the plurality of BTSs and/or the CP precoder dynamically switches between linear and non-linear precoding techniques to minimize the computational complexity of the precoder, depending on a number of the plurality of BTSs and/or UEs.

12. The method as in claim 1 wherein the matrix of DL CSI is obtained by preconditioning the matrix of UL CSI with a matrix containing the plurality of RF calibration coefficients.

13. The method as in claim 1 wherein the plurality of RF calibration coefficients are obtained from one or more downlink DL channels and uplink (UL) channels between the plurality of BTSs and the plurality of beacon stations.

14. The method as in claim 13 wherein the one or more DL and UL channels are estimated via training signals sent from/to the plurality of BTSs to/from the plurality of beacon stations.

15. The method as in claim 1 wherein the plurality of beacon stations comprise any of the plurality of BTSs.

16. The method as in claim 1 wherein the plurality of beacon stations comprise any of the UEs.

17. The method as in claim 2 wherein the plurality of RF calibration coefficients are sent from at least one of the plurality of beacon stations to the CP via a wireless or wireline feedback channel.

18. The method as in claim 17 wherein quantization or codebook-based limited feedback techniques are employed to feedback the plurality of RF calibration coefficients from the plurality of beacon stations to the CP.

19. The method as in claim 2 wherein the MU-MAS is a long-term evolution (LTE) network, the UEs are LTE UEs, the plurality of BTSs are LTE enhanced NodeB (eNodeB) entities or mobility management entities (MME), the CP is an LTE gateway (GW), and the BSN is an S1 or X1 interface.

20. The method as in claim 19 wherein a UL LTE demodulation reference signal (DMRS) or an LTE sounding reference signal (SRS) is employed to estimate the UL CSI from the plurality of UEs to the eNodeB BTSs.

21. The method as in claim 19 wherein a DL LTE cell-specific reference signal (CRS), or an LTE CSI reference signal (CSI-RS), and/or an LTE demodulation reference signal (DM-RS) are employed to estimate the DL and UL CSI between the eNodeB BTSs and the plurality of beacon stations used for RF calibration.

22. The method as in claim 19 wherein an LTE physical uplink shared channel (PUSCH) is used to feedback the RF calibration coefficients from the plurality of beacon stations to the CP.

* * * * *